US009623577B2

(12) United States Patent
Whited et al.

(10) Patent No.: US 9,623,577 B2
(45) Date of Patent: Apr. 18, 2017

(54) POWER OPERATED ROTARY KNIFE

(71) Applicant: Bettcher Industries, Inc., Birmingham, OH (US)

(72) Inventors: Jeffrey A. Whited, Amherst, OH (US); Nicholas A. Mascari, Wellington, OH (US)

(73) Assignee: Bettcher Industries, Inc., Birmingham, OH (US)

(*) Notice: Subject to any disclaimer, the term of this patent is extended or adjusted under 35 U.S.C. 154(b) by 0 days.

(21) Appl. No.: 14/245,632

(22) Filed: Apr. 4, 2014

(65) Prior Publication Data

US 2014/0298662 A1 Oct. 9, 2014

Related U.S. Application Data

(62) Division of application No. 13/189,905, filed on Jul. 25, 2011, now Pat. No. 8,695,222.

(51) Int. Cl.

| | |
|---|---|
| ***B26B 25/00*** | (2006.01) |
| ***A22B 5/16*** | (2006.01) |
| ***A22C 17/12*** | (2006.01) |

(52) U.S. Cl.

CPC ............ *B26B 25/002* (2013.01); *A22B 5/165* (2013.01); *A22C 17/12* (2013.01)

(58) Field of Classification Search

CPC ........ B26B 25/002; A22C 17/12; A22B 5/165

(Continued)

(56) References Cited

U.S. PATENT DOCUMENTS

| | | | |
|---|---|---|---|
| 1,220,345 | A | 3/1917 | Koster |
| 1,374,988 | A | 4/1921 | Cooper |

(Continued)

FOREIGN PATENT DOCUMENTS

| | | |
|---|---|---|
| DE | 2906128 | 8/1980 |
| DE | 19958802 C2 | 7/2001 |

(Continued)

OTHER PUBLICATIONS

International Search Report dated Oct. 5, 2012 and Written Opinion of the International Searching Authority dated Oct. 5, 2012 for PCT International Application No. PCT/US2012/046606, filed Jul. 13, 2012. PCT International Application No. PCT/US2012/046606 corresponds to and claims priority from the parent (U.S. Appl. No. 13/189,905, filed Jul. 25, 2011) of the present application. The parent (U.S. Appl. No. 13/189,905, filed Jul. 25, 2011) issued as U.S. Pat. No. 8,695,222 on Apr. 15, 2014. (9 pages).

(Continued)

*Primary Examiner* — Sean Michalski
(74) *Attorney, Agent, or Firm* — Tarolli, Sundheim, Covell & Tummino LLP

(57) ABSTRACT

A power operated rotary knife (100) including: an annular rotary knife blade (300) including a knife blade bearing surface (319); a blade housing (400) defining a blade housing bearing surface (459); and a blade-blade housing bearing structure (500) disposed between the knife blade bearing surface (319) and the blade housing bearing surface (459). The blade-blade housing bearing structure (500) includes a rolling bearing strip (502) having a plurality of rolling bearings (506), such as ball bearings, disposed in spaced apart relation in a flexible separator cage (508). The rolling bearing strip (502) traverses through an annular passageway (504) defined between the knife blade bearing surface (319) and the blade housing bearing surface (459) to secure the knife blade (300) to the blade housing (400) and support the knife blade for rotation about a central axis (R) with respect to the blade housing (400).

30 Claims, 133 Drawing Sheets

(58) Field of Classification Search
USPC ............................................................ 30/276
See application file for complete search history.

(56) References Cited

U.S. PATENT DOCUMENTS

| | | | | | |
|---|---|---|---|---|---|
| 1,476,345 | A | * | 12/1923 | McGee | 384/275 |
| 2,266,886 | A | | 12/1941 | McCurdy et al. | |
| 2,656,012 | A | * | 10/1953 | Thorpe | 184/5.1 |
| 2,827,657 | A | | 3/1958 | Bettcher | |
| 3,024,532 | A | * | 3/1962 | Bettcher | 30/276 |
| RE25,947 | E | | 12/1965 | Bettcher | |
| 3,269,010 | A | * | 8/1966 | Bettcher | A22C 17/04 30/276 |
| 3,269,910 | A | | 8/1966 | Bettcher | |
| 3,461,557 | A | * | 8/1969 | Behring | B26B 25/002 30/276 |
| 3,816,875 | A | * | 6/1974 | Duncan et al. | 452/149 |
| 3,852,882 | A | * | 12/1974 | Bettcher | 30/276 |
| 4,082,232 | A | | 4/1978 | Brewer | |
| 4,170,063 | A | | 10/1979 | Bettcher | |
| 4,175,321 | A | * | 11/1979 | Bettcher | B26B 25/002 30/276 |
| 4,178,683 | A | * | 12/1979 | Bettcher | 30/276 |
| 4,198,750 | A | | 4/1980 | Bettcher | |
| 4,236,531 | A | | 12/1980 | McCullough | |
| 4,267,759 | A | | 5/1981 | Sullivan et al. | |
| 4,326,361 | A | | 4/1982 | McGill | |
| 4,336,651 | A | * | 6/1982 | Caro | 30/49 |
| 4,363,170 | A | * | 12/1982 | McCullough | 30/276 |
| 4,439,924 | A | | 4/1984 | Bettcher | |
| 4,494,311 | A | * | 1/1985 | McCullough | 30/276 |
| 4,509,261 | A | | 4/1985 | Bettcher | |
| 4,516,323 | A | | 5/1985 | Bettcher et al. | |
| 4,575,937 | A | * | 3/1986 | McCullough | 30/276 |
| 4,575,938 | A | * | 3/1986 | McCullough | 30/276 |
| 4,590,576 | A | * | 5/1986 | Elpiner | 700/282 |
| 4,590,676 | A | | 5/1986 | Bettcher | |
| 4,609,227 | A | | 9/1986 | Wild et al. | |
| 4,637,140 | A | | 1/1987 | Bettcher | |
| 4,829,860 | A | | 5/1989 | VanderPol | |
| 4,854,046 | A | * | 8/1989 | Decker et al. | 452/149 |
| 4,858,321 | A | * | 8/1989 | McCullough | 30/276 |
| 4,865,473 | A | * | 9/1989 | De Vito | 384/572 |
| 4,909,640 | A | | 3/1990 | Nakanishi | |
| 4,942,665 | A | * | 7/1990 | McCullough | 30/276 |
| 5,031,323 | A | * | 7/1991 | Honsa et al. | 30/276 |
| 5,033,876 | A | * | 7/1991 | Kraus | 384/572 |
| 5,071,264 | A | | 12/1991 | Franke et al. | |
| 5,099,721 | A | | 3/1992 | Decker et al. | |
| 5,230,154 | A | * | 7/1993 | Decker et al. | 30/276 |
| 5,331,877 | A | | 7/1994 | Ishii | |
| 5,419,619 | A | | 5/1995 | Lew | |
| 5,484,331 | A | * | 1/1996 | Buhlke | A22B 5/0005 30/276 |
| 5,499,492 | A | * | 3/1996 | Jameson | 56/12.1 |
| 5,522,142 | A | * | 6/1996 | Whited | 30/276 |
| 5,529,532 | A | | 6/1996 | Desrosiers | |
| 5,582,041 | A | * | 12/1996 | Spiess | 69/37 |
| 5,664,332 | A | * | 9/1997 | Whited et al. | 30/276 |
| 5,692,307 | A | | 12/1997 | Whited et al. | |
| 5,749,661 | A | | 5/1998 | Moller | |
| 5,761,817 | A | | 6/1998 | Whited et al. | |
| 5,971,413 | A | | 10/1999 | El-Kassouf | |
| 6,247,847 | B1 | * | 6/2001 | Lob | 384/51 |
| 6,364,086 | B1 | * | 4/2002 | Blaurock et al. | 193/35 MD |
| 6,604,288 | B2 | | 8/2003 | Whited et al. | |
| 6,615,494 | B2 | | 9/2003 | Long et al. | |
| 6,662,452 | B2 | | 12/2003 | Whited | |
| 6,665,940 | B2 | * | 12/2003 | Sanders | A01D 34/90 30/276 |
| 6,694,649 | B2 | | 2/2004 | Whited et al. | |
| 6,751,872 | B1 | * | 6/2004 | Whited | B26B 25/002 30/276 |
| 6,769,184 | B1 | * | 8/2004 | Whited | B26B 25/002 30/276 |
| 6,857,191 | B2 | | 2/2005 | Whited et al. | |
| 6,978,548 | B2 | | 12/2005 | Whited et al. | |
| 7,000,325 | B2 | * | 2/2006 | Whited | 30/276 |
| 7,107,887 | B2 | | 9/2006 | Whited | |
| 7,207,114 | B2 | | 4/2007 | Rosu et al. | |
| 2003/0131482 | A1 | * | 7/2003 | Long | A22B 5/165 30/276 |
| 2005/0217119 | A1 | * | 10/2005 | Rapp | 30/276 |
| 2006/0037200 | A1 | * | 2/2006 | Rosu et al. | 30/276 |
| 2007/0283573 | A1 | | 12/2007 | Levsen | |
| 2007/0283574 | A1 | * | 12/2007 | Levsen | 30/276 |
| 2008/0022537 | A1 | * | 1/2008 | Clarke et al. | 30/390 |
| 2008/0098605 | A1 | * | 5/2008 | Whited et al. | 30/276 |
| 2009/0227192 | A1 | | 9/2009 | Luthl et al. | |
| 2010/0101097 | A1 | * | 4/2010 | Thien | 30/276 |
| 2010/0170097 | A1 | * | 7/2010 | Levsen | 30/276 |
| 2011/0185580 | A1 | * | 8/2011 | Whited | 30/276 |
| 2011/0247220 | A1 | * | 10/2011 | Whited et al. | 30/276 |
| 2013/0025134 | A1 | | 1/2013 | Mascari et al. | |
| 2013/0025137 | A1 | | 1/2013 | Whited et al. | |
| 2013/0025138 | A1 | | 1/2013 | Whited et al. | |
| 2013/0185944 | A1 | | 7/2013 | Thompson et al. | |

FOREIGN PATENT DOCUMENTS

| | | |
|---|---|---|
| FR | 1216947 | 4/1960 |
| WO | WO 01/41980 A1 | 6/2001 |
| WO | WO 2008/107490 A1 | 9/2008 |

OTHER PUBLICATIONS

Oct. 3, 2011 Decision and Opinion of the United States Court of Appeal for the Federal Circuit (Appeal No. 2011-1038, -1046) regarding the case styled *Bettcher Industries, Inc.* v. *Bunzl USA, Inc. and Bunzl Processor Distribution, LLC*, Case No. 3:08 CV 2423, U.S. District Court for the Northern District of Ohio, Judge Zouhary. The Decision and Opinion relates to U.S. Pat. No. 7,000,325, owned by the assignee of the present application. (47 pages).

Catalog entitled "Ball Bearing Cages", Publication No. WLK 100 E, Publication Date—Sep. 2004, Published by International Customized Bearings. (34 pages).

* cited by examiner

Fig. 191
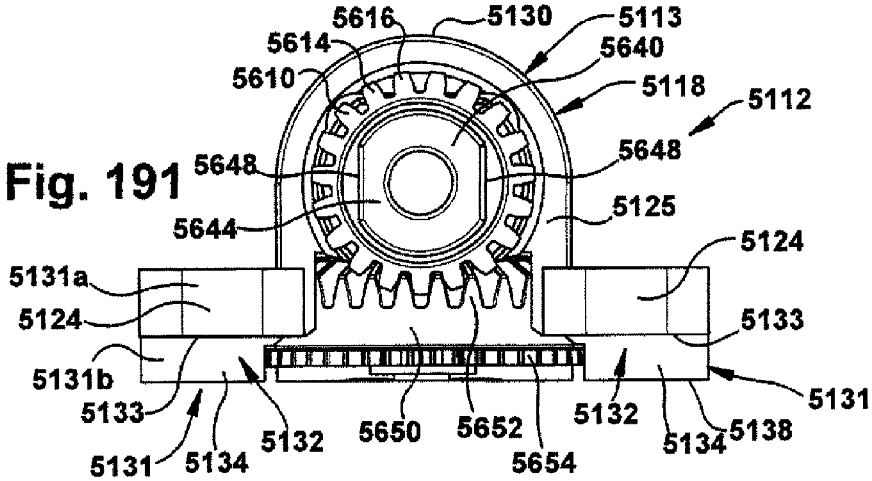
Fig. 192
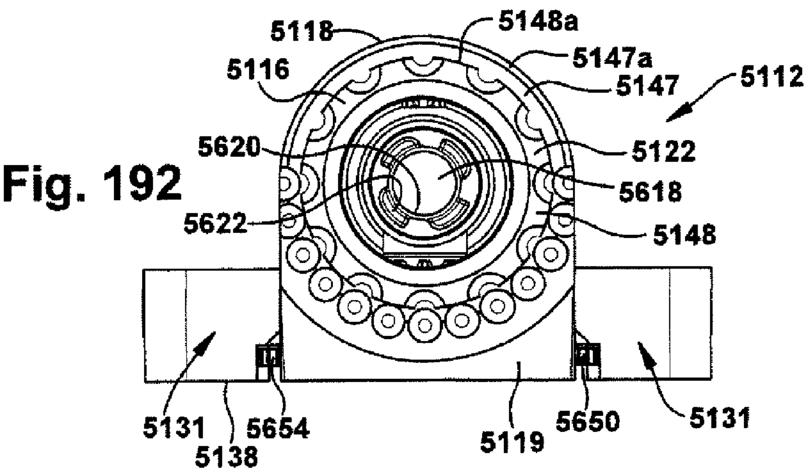
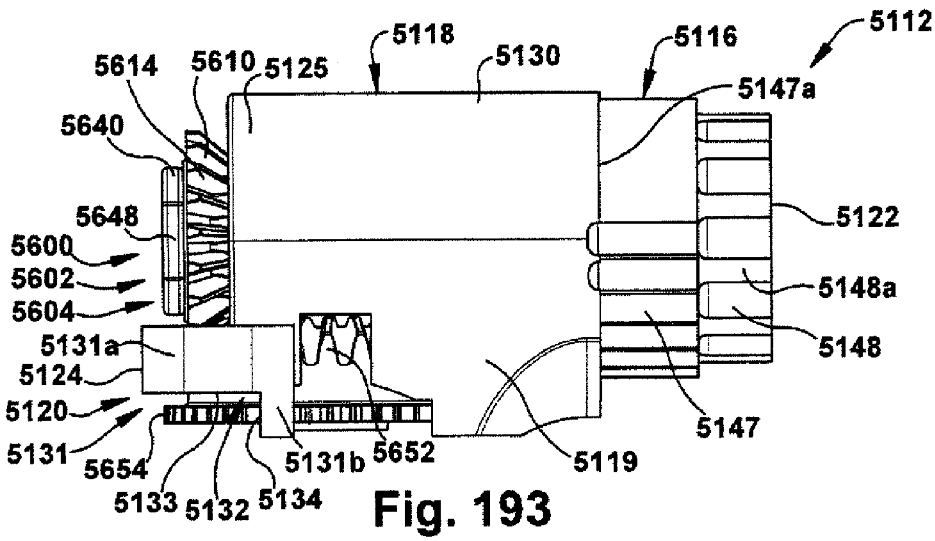
Fig. 193

POWER OPERATED ROTARY KNIFE

CROSS-REFERENCE TO RELATED APPLICATION

This application claims priority to and is a divisional of U.S. application Ser. No. 13/189,905, filed on Jul. 25, 2011, published as U.S. Publication No. US-2013-0025136-A1 on Jan. 31, 2013, issued as U.S. Pat. No. 8,695,222 on Apr. 15, 2014. U.S. application Ser. No. 13/189,905 and U.S. Publication No. US-2013-0025136-A1 are incorporated herein in their respective entireties by reference for any and all purposes.

TECHNICAL FIELD

The present disclosure relates to a power operated rotary knife.

BACKGROUND

Power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as taxidermy and cutting and trimming of elastomeric or urethane foam for a variety of applications including vehicle seats.

Power operated rotary knives typically include a handle assembly and a head assembly attachable to the handle assembly. The head assembly includes an annular blade housing and an annular rotary knife blade supported for rotation by the blade housing. The annular rotary blade of conventional power operated rotary knives is typically rotated by a drive assembly which include a flexible shaft drive assembly extending through an opening in the handle assembly. The shaft drive assembly engages and rotates a pinion gear supported by the head assembly. The flexible shaft drive assembly includes a stationary outer sheath and a rotatable interior drive shaft which is driven by a pneumatic or electric motor. Gear teeth of the pinion gear engage mating gear teeth formed on an upper surface of the rotary knife blade.

Upon rotation of the pinion gear by the drive shaft of the flexible shaft drive assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Conventional power operated rotary knives are disclosed in U.S. Pat. No. 6,354,949 to Baris et al., U.S. Pat. No. 6,751,872 to Whited et al., U.S. Pat. No. 6,769,184 to Whited, and U.S. Pat. No. 6,978,548 to Whited et al., all of which are assigned to the assignee of the present invention and all of which are incorporated herein in their respective entireties by reference.

SUMMARY

In one aspect, the present disclosure relates a power operated rotary knife comprising: an annular rotary knife blade including a wall defining a knife blade bearing surface; a blade housing including a wall defining a blade housing bearing surface; and a blade-blade housing bearing structure disposed between the knife blade bearing surface and the blade housing bearing surface, the blade-blade housing bearing structure supporting the knife blade for rotation with respect to the blade housing about a knife blade central axis, the blade-blade housing bearing structure including an elongated rolling bearing strip that extends circumferentially around the knife blade central axis between the knife blade bearing surface and the blade housing bearing surface. In one exemplary embodiment, the elongated rolling bearing strip comprises a plurality of rolling bearings disposed in spaced apart relation and a flexible separator cage for positioning the plurality of spaced apart rolling bearings.

In another aspect, the present disclosure relates to a support structure for use with a power operated rotary knife including an annular rotary knife blade rotating about a central axis and an annular blade housing, the support structure disposed between a knife blade bearing surface and a blade housing bearing surface to secure and rotatably support the knife blade with respect to the blade housing, the support structure comprising: an elongated rolling bearing strip having a plurality of rolling bearings disposed in spaced apart relation and a flexible separator cage for positioning the plurality of spaced apart rolling bearings, the rolling bearing strip extending circumferentially between the knife blade bearing surface and the blade housing bearing surface, the separator cage forming at least a portion of a circle and each of the plurality of rolling bearings extending radially from the separator cage and adapted to contact the knife blade bearing surface and the blade housing bearing surface.

In another aspect, the present disclosure relates to a method of supporting an annular knife blade for rotation about a central axis in a blade housing of a power operated rotary knife, the method comprising: aligning a knife blade and blade housing such that a bearing surface of the knife blade is in radial alignment with a bearing surface of the blade housing, the knife blade bearing surface and the blade housing bearing surface defining an annular passageway; and routing a rolling bearing strip along the annular passageway such that the strip extends circumferentially around the knife blade central axis between the knife blade bearing surface and the blade housing bearing surface forming at least a portion of a circle about the central axis.

In another aspect, the present disclosure relates to a power operated rotary knife comprising: a head assembly including a gearbox assembly, an annular rotary knife blade, a blade housing, and a blade-blade housing bearing structure; the blade housing coupled to the gearbox assembly and including an annular blade support section defining a bearing surface formed on an inner wall of the annular blade support section; the annular rotary knife blade including a body and a blade section extending axially from the body, the body including a first, upper end and a lower, second end spaced axially apart and an inner wall and an outer wall spaced radially apart, the blade section extending from the lower end of the body, the outer wall defining a knife blade bearing surface and a set of gear teeth, the set of gear teeth being axially spaced from the upper end of the body and from the knife blade bearing surface; the blade-blade housing bearing structure disposed between the knife blade bearing surface and the blade housing bearing surface; and a gear train of the gearbox assembly, the gear train including a drive gear having a plurality of gear teeth that mesh with the set of gear teeth of the knife blade to rotate the knife blade with respect to the blade housing.

In another aspect, the present disclosure relates to an annular rotary knife blade for rotation about a central axis in a power operated rotary knife, the rotary knife blade comprising: an annular rotary knife blade including a body and a blade section extending axially from the body, the body including a first upper end and a second lower end spaced axially apart and an inner wall and an outer wall spaced radially apart; the blade section extending from the lower end of the body; and the outer wall defining a knife blade bearing surface and a set of gear teeth, the set of gear teeth being axially spaced from the upper end of the body and axially spaced from the knife blade bearing surface.

In another aspect, the present disclosure relates to a power operated rotary knife comprising: a gearbox assembly including a gearbox housing and a gearbox; a blade housing coupled to the gearbox housing; and an annular rotary knife blade including an upper end and an axially spaced apart lower end, the lower end defining a cutting edge of the blade, the knife blade further including an outer wall defining a set of gear teeth, the set of gear teeth being axially spaced from the upper end of the knife blade, the knife blade rotating about a central axis with respect to the blade housing; the gearbox comprising a gear train including a pinion gear and a drive gear, the pinion gear engaging and rotating the drive gear and the drive gear engaging and rotating the knife blade about the central axis; and the drive gear comprising a double gear including a first gear engaging and being rotated by the pinion gear about a rotational axis of the drive gear and a second gear engaging the set of gear teeth of the knife blade to rotate the knife blade about the central axis, the first and second gears of the drive gear being concentric with the drive gear rotational axis.

In another aspect, the present disclosure relates to a gear train supported in a gearbox housing of a power operated rotary knife to rotate an annular rotary knife blade about a central axis, the gear train comprising: a pinion gear and drive gear wherein the pinion gear engages and rotates the drive gear and the drive gear is configured to engage and rotate an annular rotary knife blade; and wherein the drive gear comprises a double gear including a first gear engaging and being rotated by the pinion gear about a rotational axis of the drive gear and a second gear configured to engage an annular rotary knife blade, the first and second gears of the drive gear being concentric with the drive gear rotational axis.

In another aspect, the present disclosure relates to an annular blade housing for a power operated rotary knife, the blade housing comprising an inner wall and an outer wall, the inner wall defining a blade housing bearing surface, the blade housing further including a cleaning port having an entry opening and exit opening, the exit opening being in the inner wall and in fluid communication with the blade housing bearing surface.

In another aspect, the present disclosure relates to a power operated rotary knife power operated rotary knife comprising: an annular rotary knife blade including a wall defining a knife blade bearing surface; an annular blade housing comprising an inner wall and an outer wall, the inner wall defining a blade housing bearing surface on the inner wall; a blade-blade housing bearing structure disposed between the knife blade bearing surface and the blade housing bearing surface, the blade-blade housing bearing structure supporting the knife blade for rotation with respect to the blade housing about a knife blade central axis; and the blade housing further including a cleaning port extending radially between the inner wall and the outer wall, cleaning port including an entry opening and an exit opening, the exit opening being in the inner wall and in fluid communication with the blade housing bearing surface.

In another aspect, the present disclosure relates to an annular blade housing for a power operated rotary knife, the blade housing comprising an inner wall and an outer wall, the inner wall defining a blade housing bearing surface, the blade housing further including a blade housing plug opening extending between and through the inner wall and the outer wall, an end of the blade housing plug opening at the inner wall intersecting the blade housing bearing surface to provide access to the blade housing bearing surface through the blade housing plug opening, and a blade housing plug configured to be releasably secured within the blade housing plug opening.

In another aspect, the present disclosure relates to a power operated rotary knife comprising: an annular rotary knife blade including a wall defining a knife blade bearing surface; an annular blade housing comprising an inner wall and an outer wall, the inner wall defining a blade housing bearing surface; a blade-blade housing bearing structure disposed between the knife blade bearing surface and the blade housing bearing surface, the blade-blade housing bearing structure supporting the knife blade for rotation with respect to the blade housing about a knife blade central axis; and wherein the blade housing further includes a blade housing plug opening extending between and through the inner wall and the outer wall, an end of the blade housing plug opening at the inner wall intersecting the blade housing bearing surface to provide access to the blade housing bearing surface through the blade housing plug opening, and a blade housing plug configured to be releasably secured within the blade housing plug opening.

In another aspect, the present disclosure relates to an annular blade housing comprising an inner wall and an outer wall, a section of the inner wall defining a blade housing bearing surface, the blade housing bearing surface being axially spaced from opposite first and second ends of the inner wall, the blade housing further including a projection at one of the first and second ends of the inner wall, the projection extending radially inwardly with respect to the section of the inner wall defining the blade housing bearing surface.

In another aspect, the present disclosure relates to a power operated rotary knife comprising: an annular rotary knife blade including a wall defining a knife blade bearing surface; an annular blade housing comprising an inner wall and an outer wall, the inner wall defining a blade housing bearing surface; a blade-blade housing bearing structure disposed between the knife blade bearing surface and the blade housing bearing surface, the blade-blade housing bearing structure supporting the knife blade for rotation with respect to the blade housing about a knife blade central axis; and wherein the blade housing further includes a projection at one of the first and second ends of the inner wall, the projection extending radially inwardly with respect to the section of the inner wall defining the blade housing bearing surface.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 113 is a schematic perspective longitudinal section view of the power operated rotary knife of FIG. 101 as seen from a plane indicated by the line 110-112 in FIG. 105;

FIG. 114 is a schematic top plan view of a blade-blade housing combination of the head assembly of the power operated rotary knife of FIG. 101 including the rotary knife blade, the blade housing, and the blade-blade housing bearing structure;

FIG. 115 is a schematic top plan view of the blade-blade housing combination of FIG. 114 with a blade housing plug of the blade housing removed from a blade housing plug opening of the blade housing;

FIG. 116 is a schematic rear elevation view of the blade-blade housing combination of FIG. 114 with a blade housing plug of the blade housing removed from the blade housing plug opening of the blade housing;

FIG. 117 is a schematic section view of the blade-blade housing combination of FIG. 114 as seen from a plane indicated by the line 117-117 in FIG. 115;

FIG. 118 is a schematic perspective view of the rotary knife blade of the power operated rotary knife of FIG. 101;

FIG. 119 is a schematic sectional view of the rotary knife blade of FIG. 118 as seen from a plane indicated by the line 119-119 in FIG. 118;

FIG. 120 is a schematic perspective view of the blade housing of the power operated rotary knife of FIG. 101;

FIG. 121 is a schematic section view of the blade housing of FIG. 120 as seen from a plane indicated by the line 121-121 in FIG. 120;

FIG. 122 is a schematic front perspective of the blade housing plug of the blade housing of the power operated rotary knife of FIG. 60;

FIG. 123 is a schematic front elevation view of the power operated rotary knife of FIG. 101 with the blade-blade housing combination of the head assembly removed to show the gearbox assembly of the power operated rotary knife;

FIG. 124 is a schematic front elevation view of the gearbox assembly of the power operated rotary knife of FIG. 101, as shown in FIG. 123, with a pinion gear cover removed to more fully show a pinion gear and a gearbox housing of the gearbox assembly;

Figure 101:
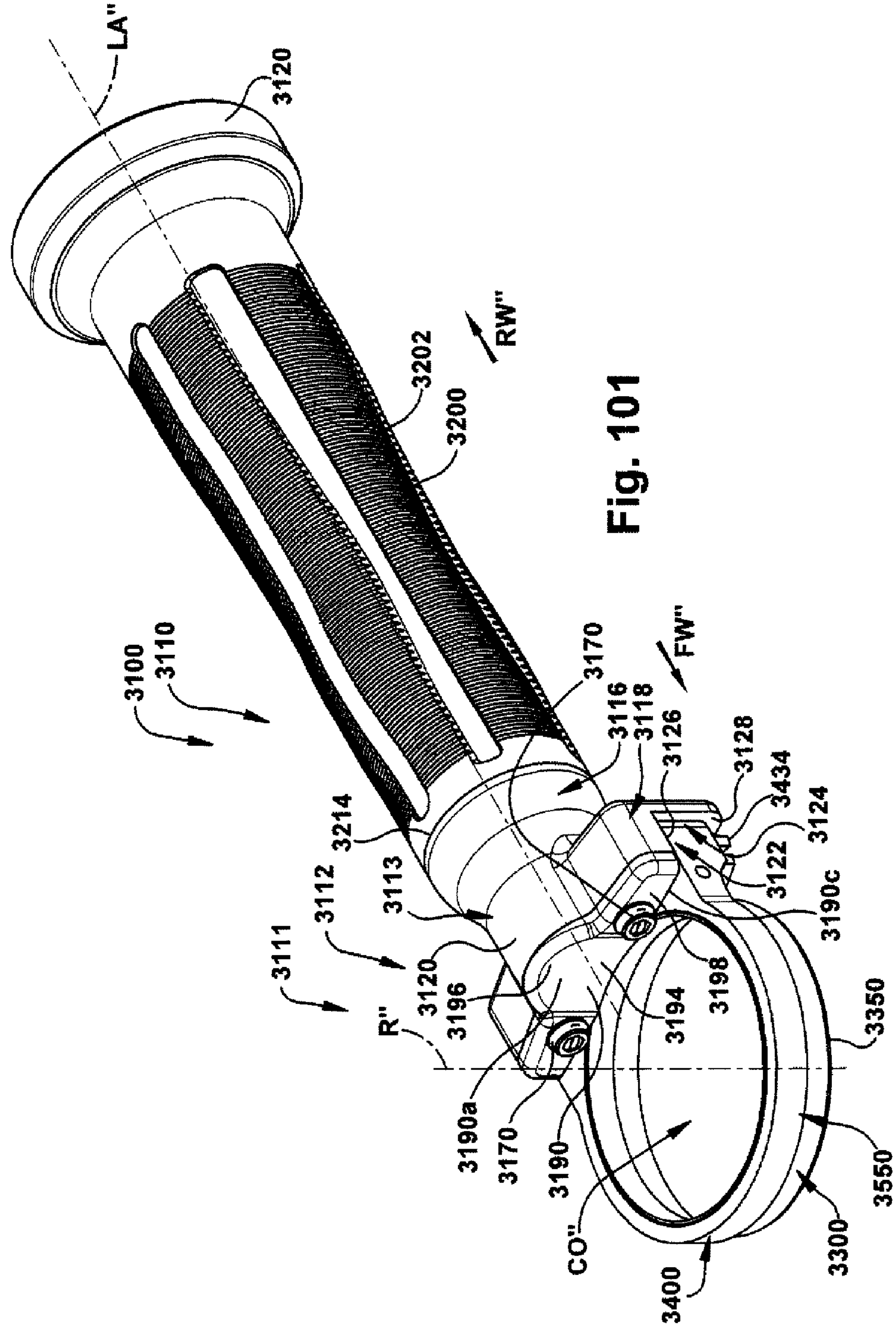
FIG. 101 is a schematic front perspective view of a third exemplary embodiment of a power operated rotary knife of the present disclosure including a head assembly, a handle assembly and a drive mechanism, the head assembly including a gearbox assembly, an annular rotary knife blade, a blade housing, and a blade-blade housing support or bearing structure.
Figure 103:
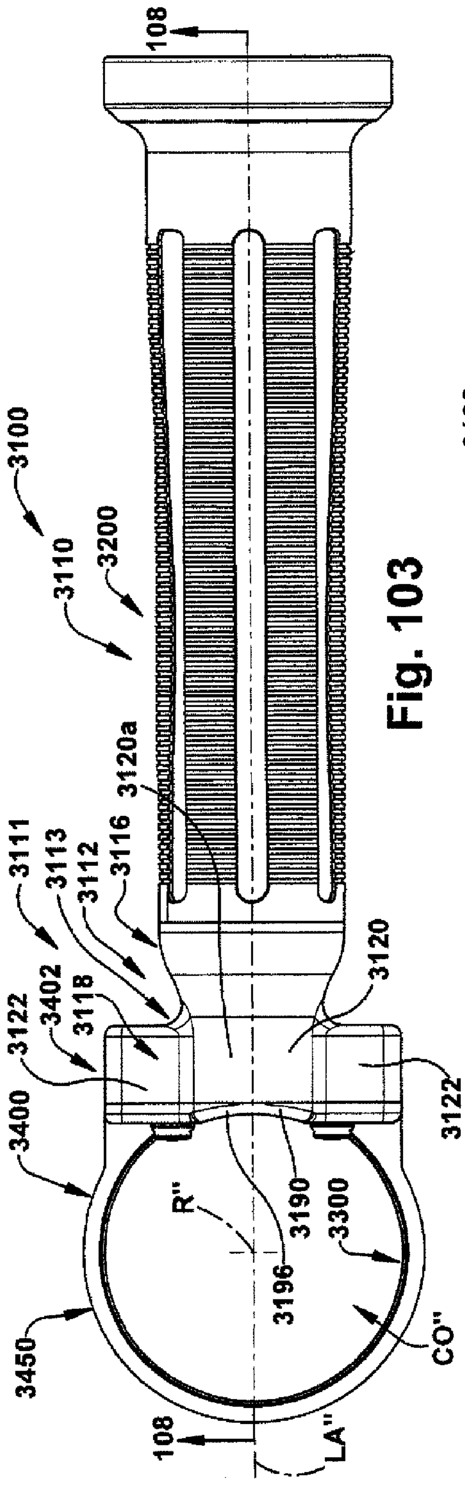
FIG. 103 is a schematic top plan view of the power operated rotary knife of FIG. 101.
Figure 104:
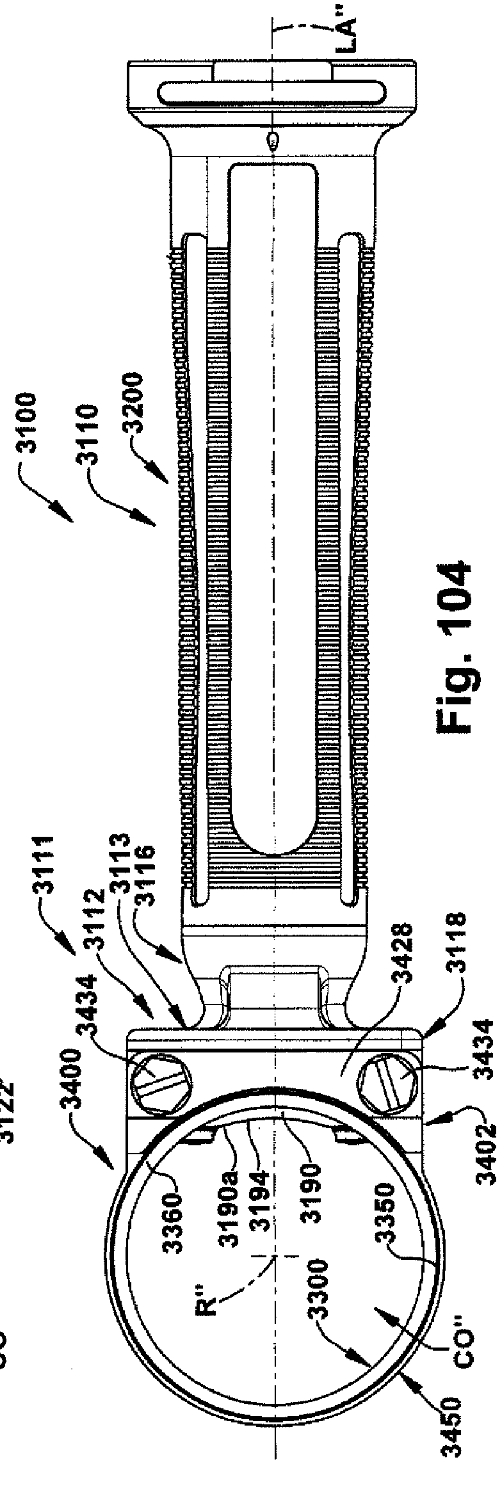
FIG. 104 is a schematic bottom plan view of the power operated rotary knife of FIG. 101.
Figure 125:
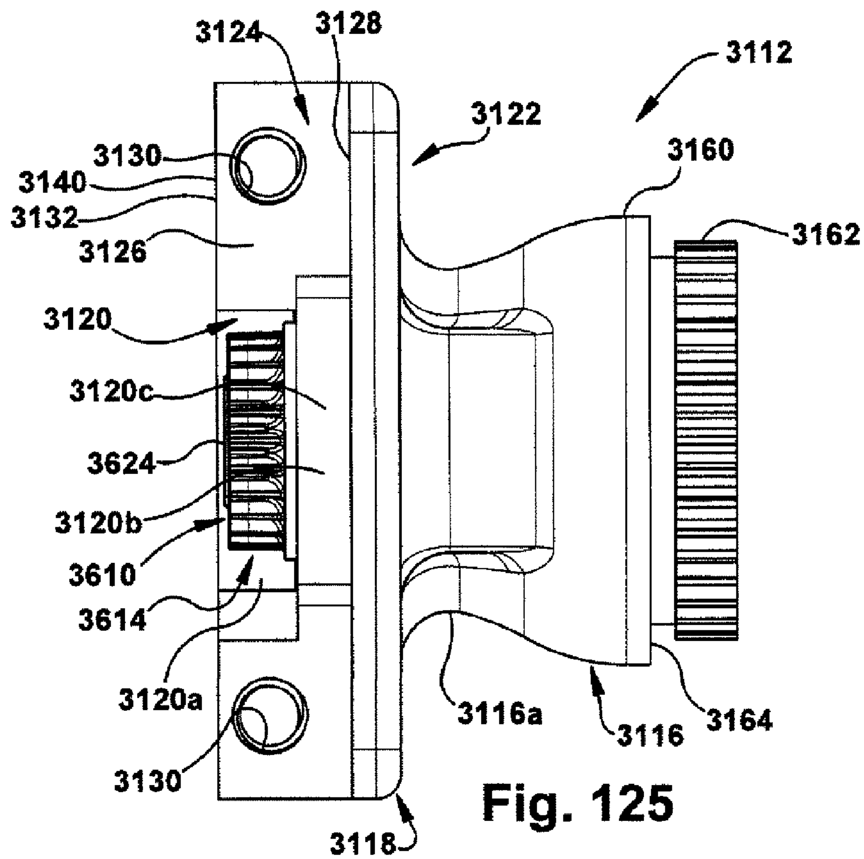
Figure 126:
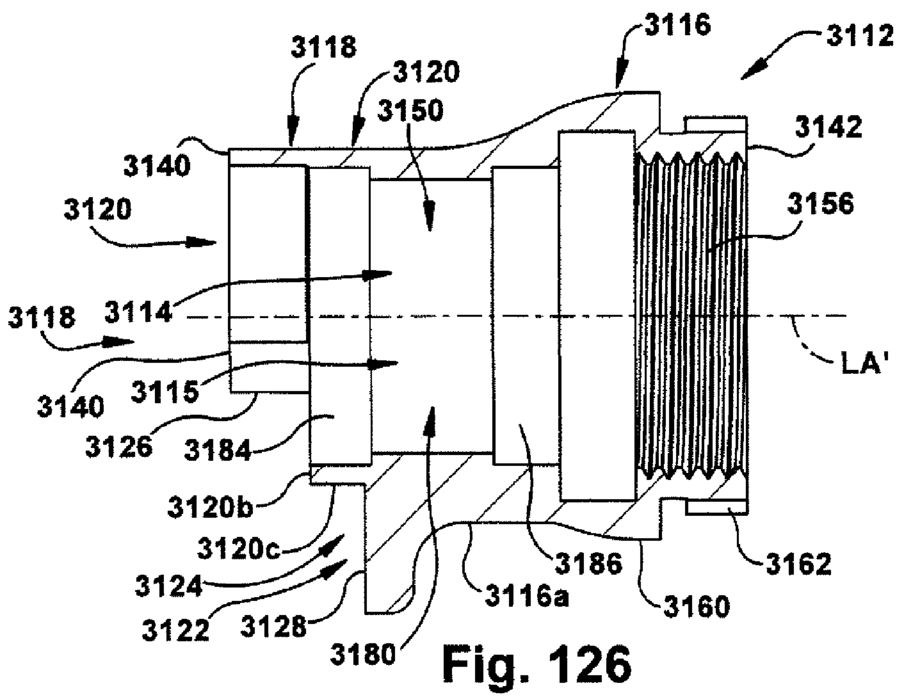
Figure 127:
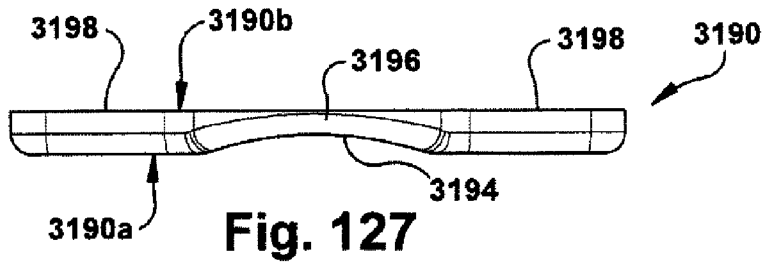
Figure 128:
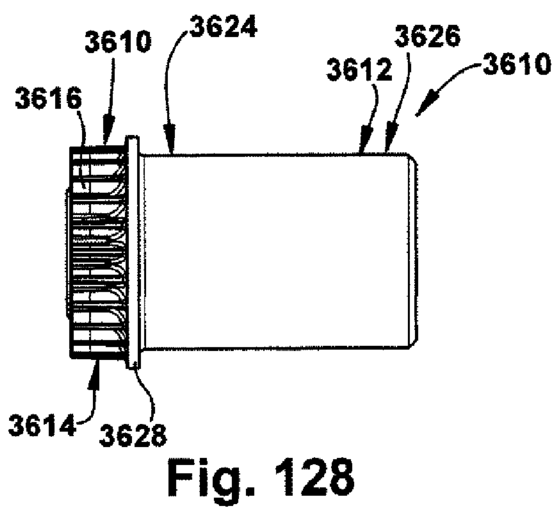
Figure 129:
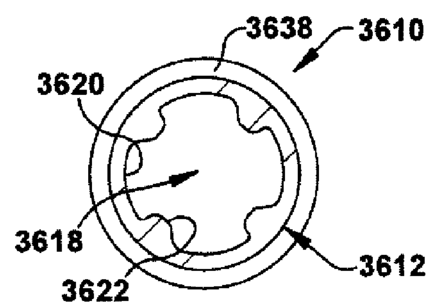
Figure 130:
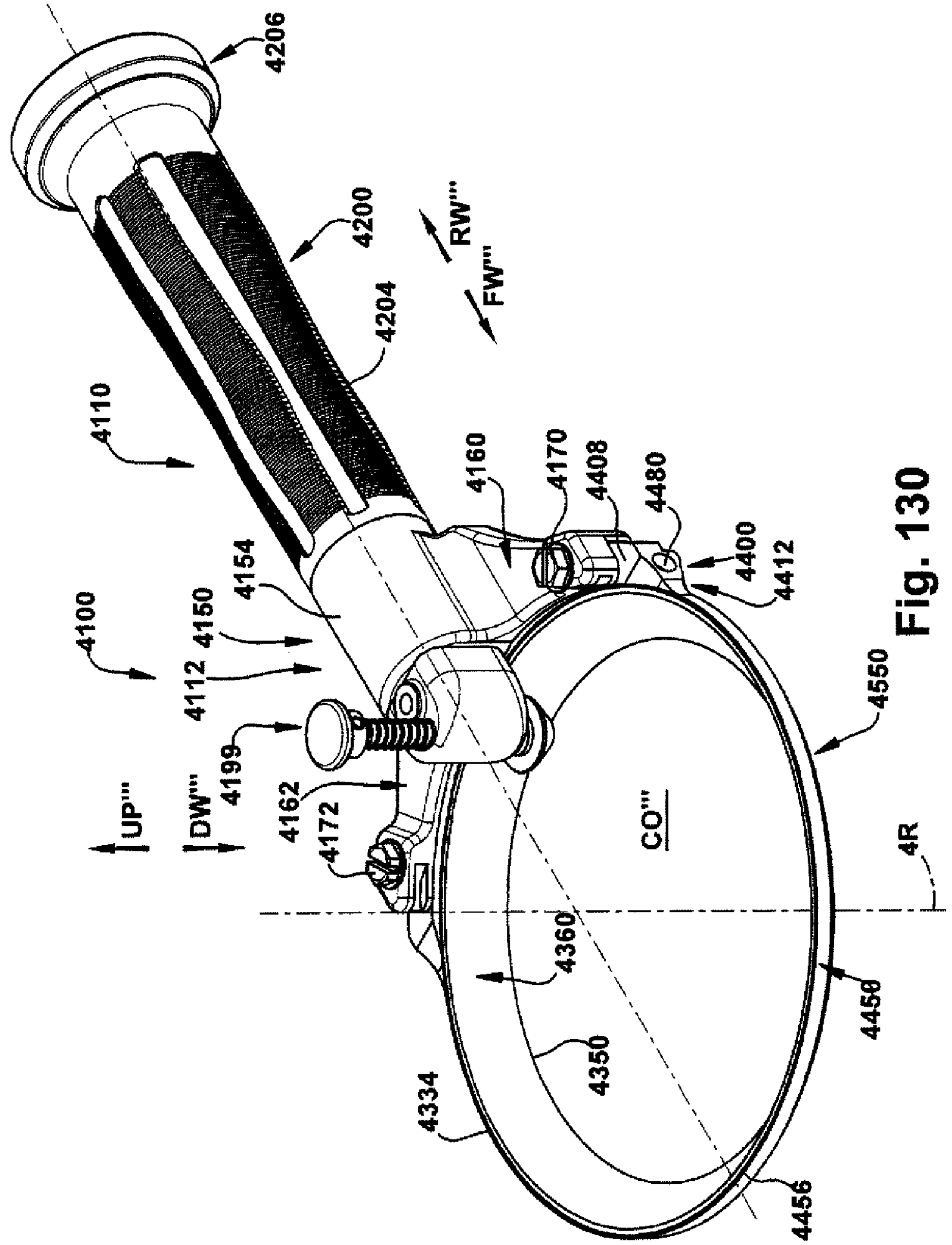
Figure 131:
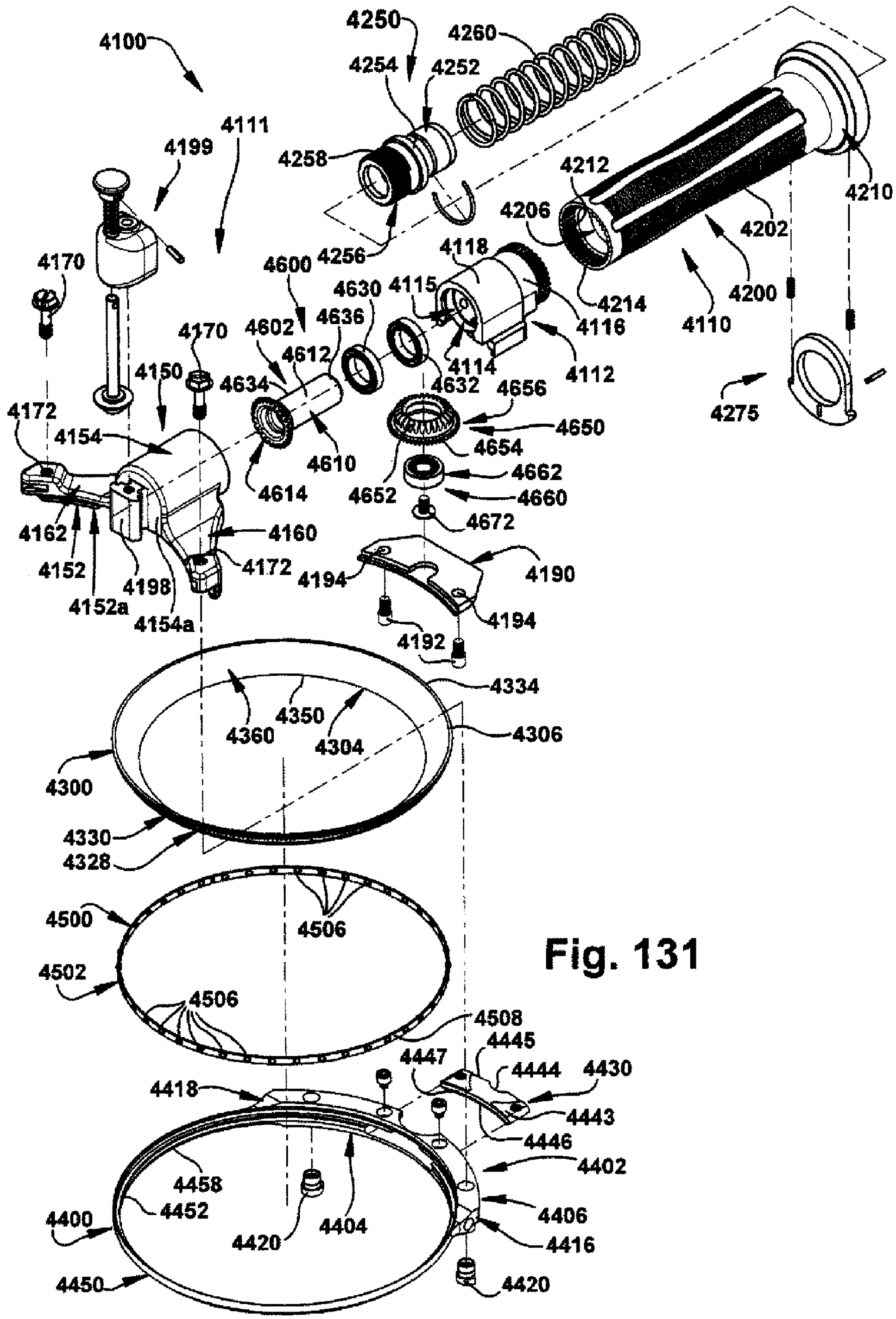
Figure 132:
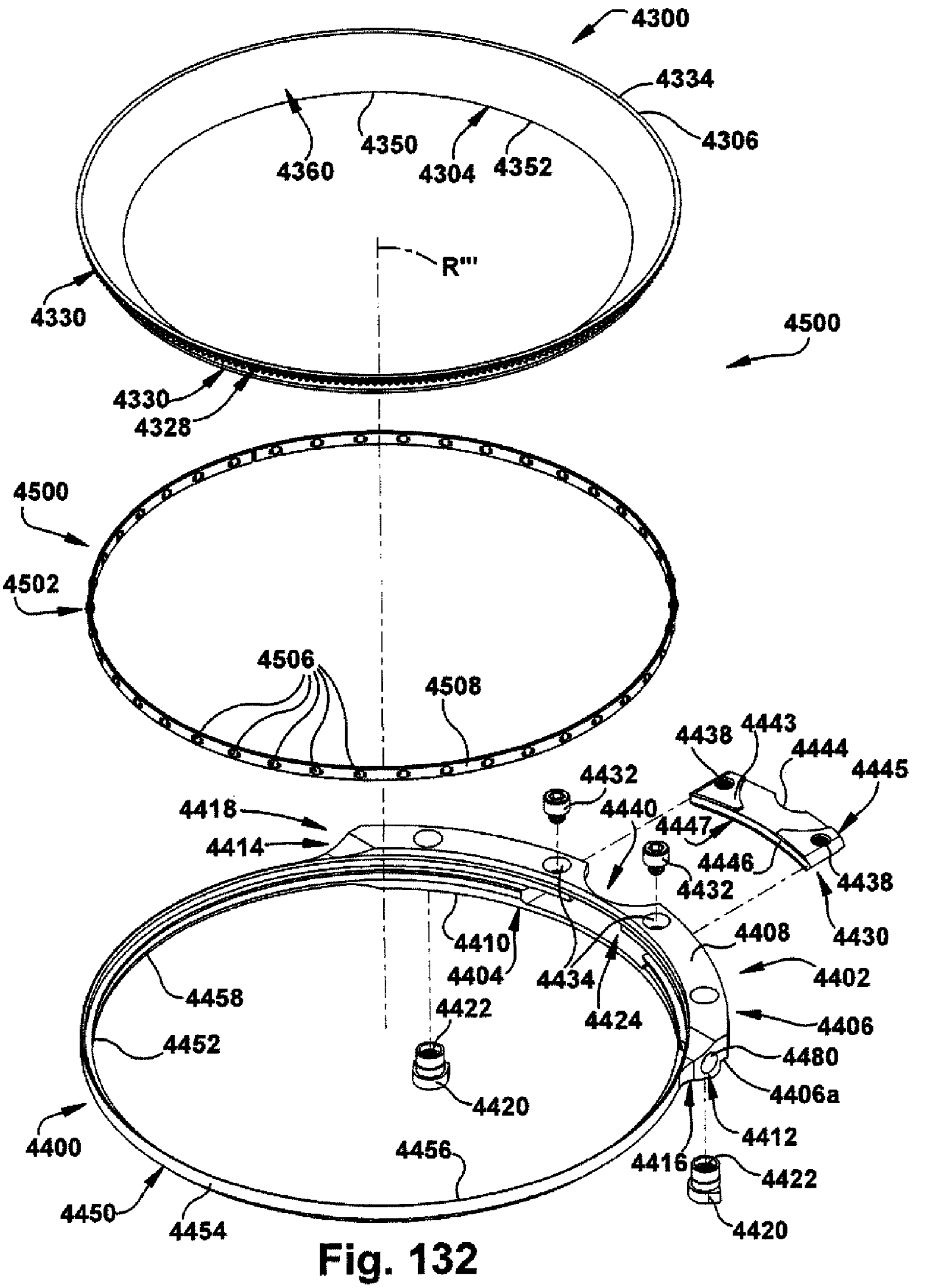
Figure 133:
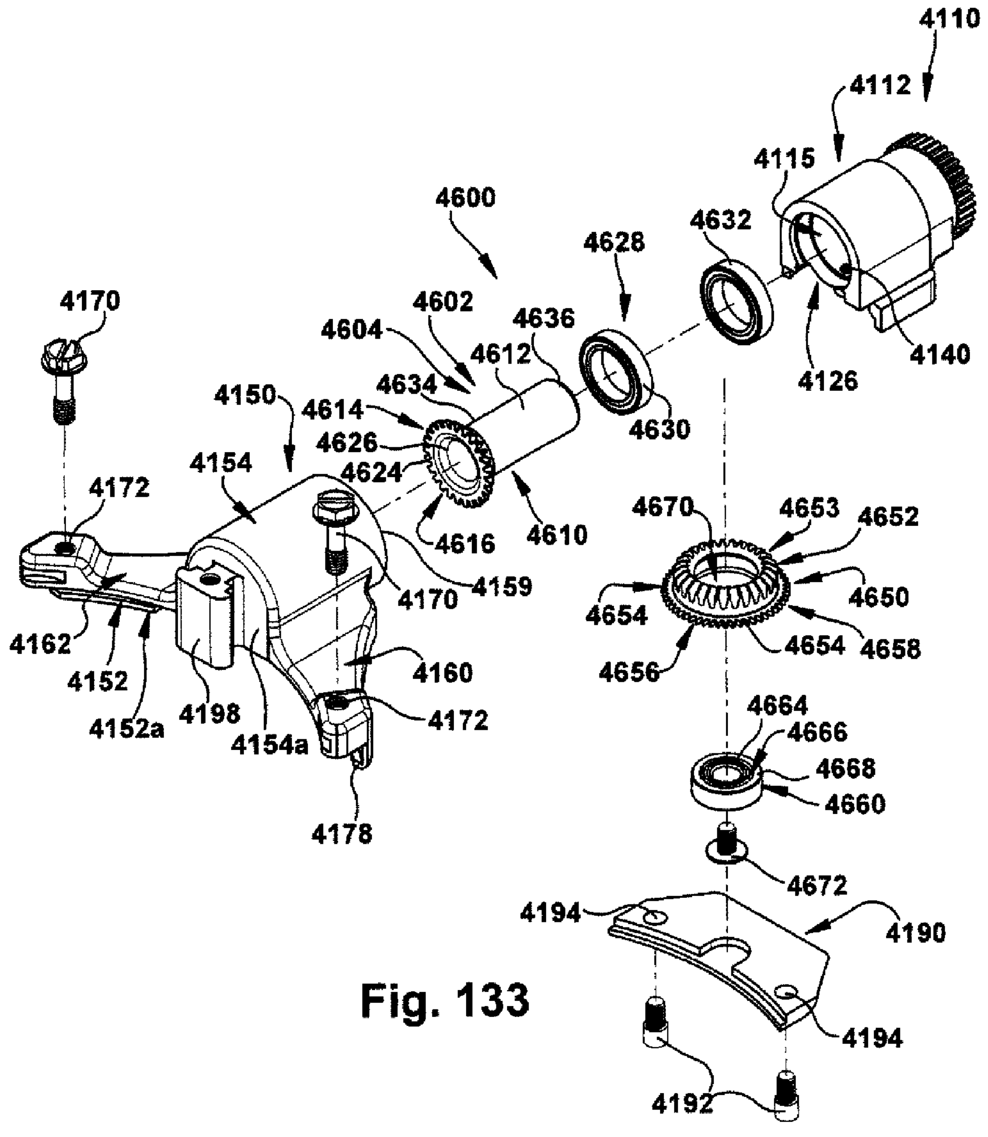
Figure 134:
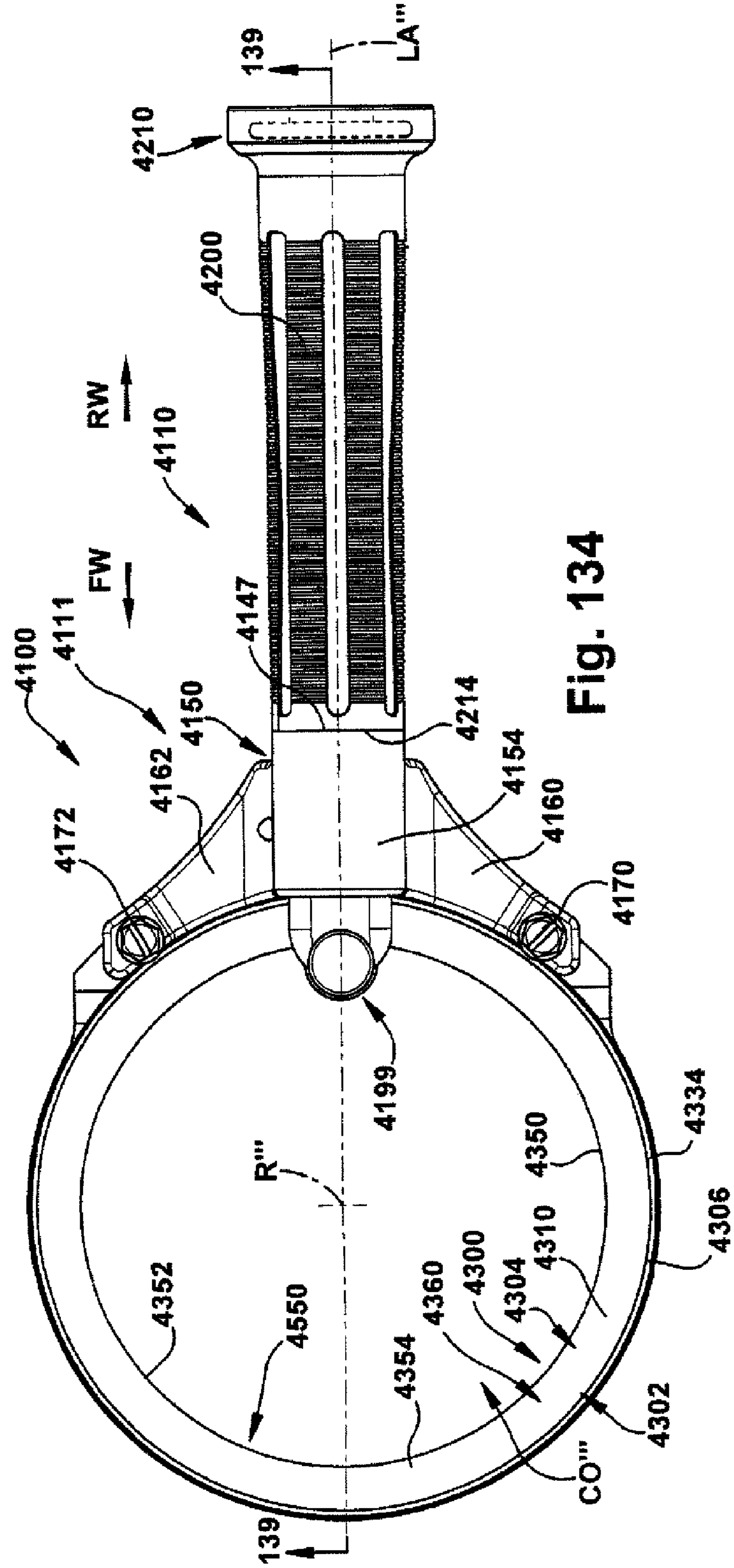
Figure 135:
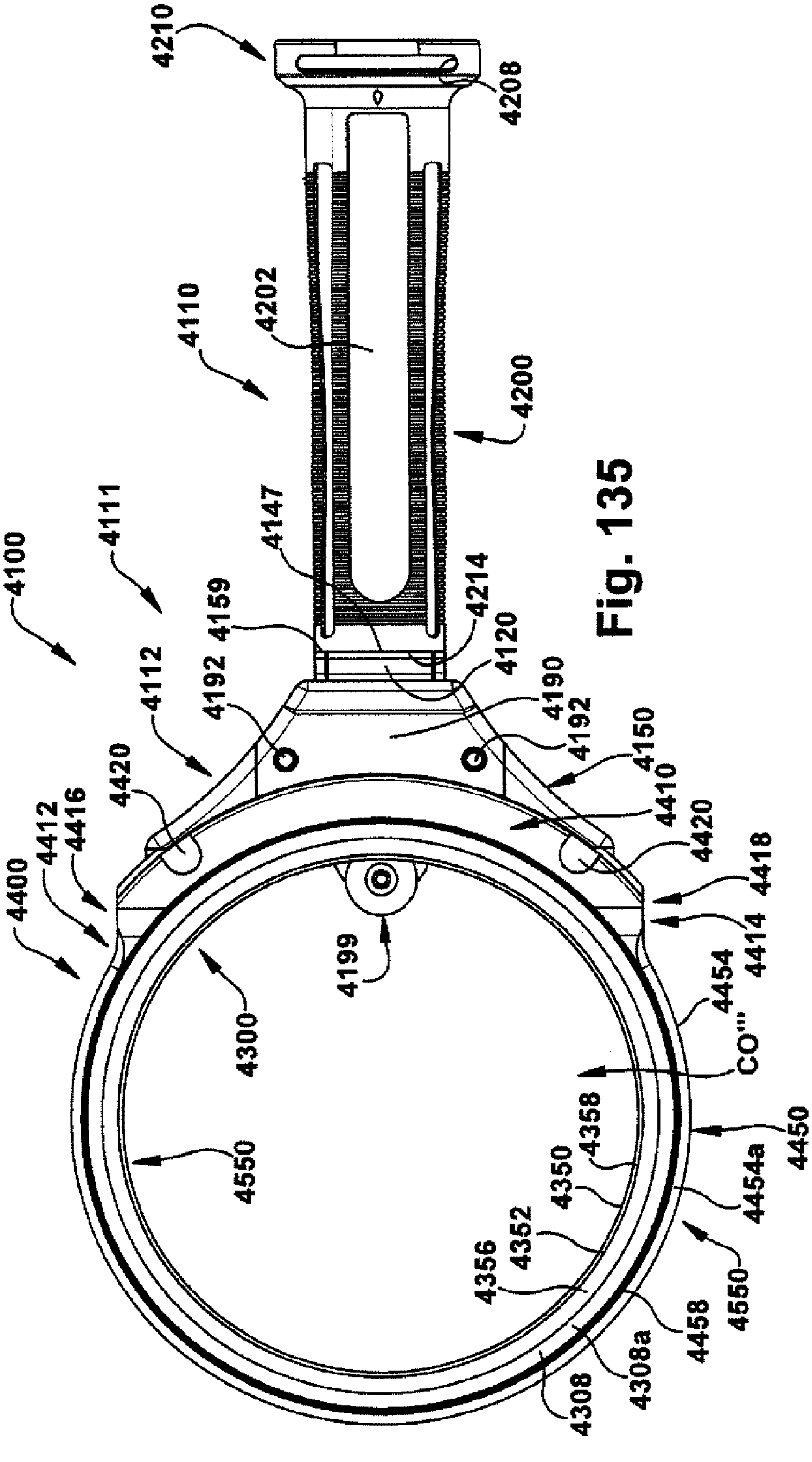
Figure 137:
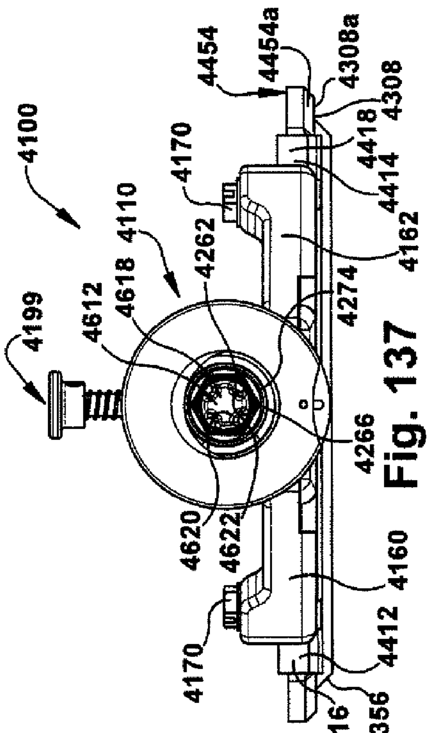
Figure 136:
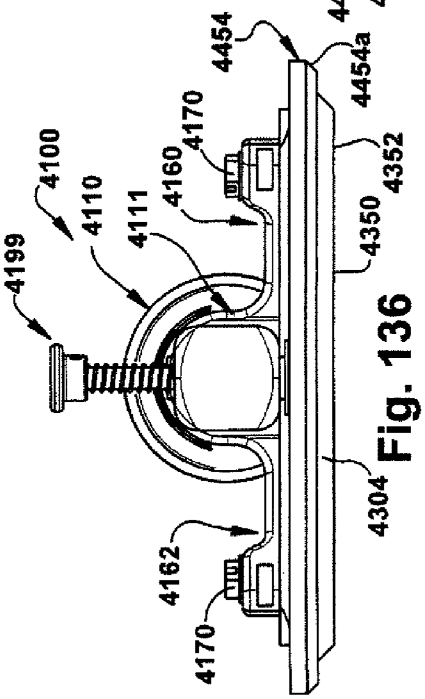
Figure 138:
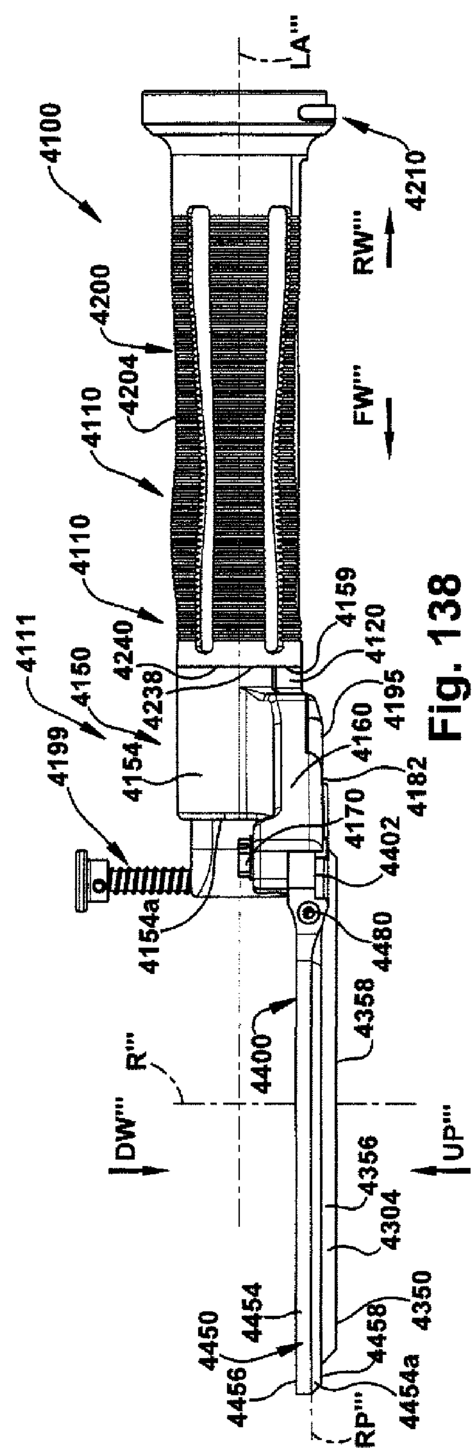
Figure 139:
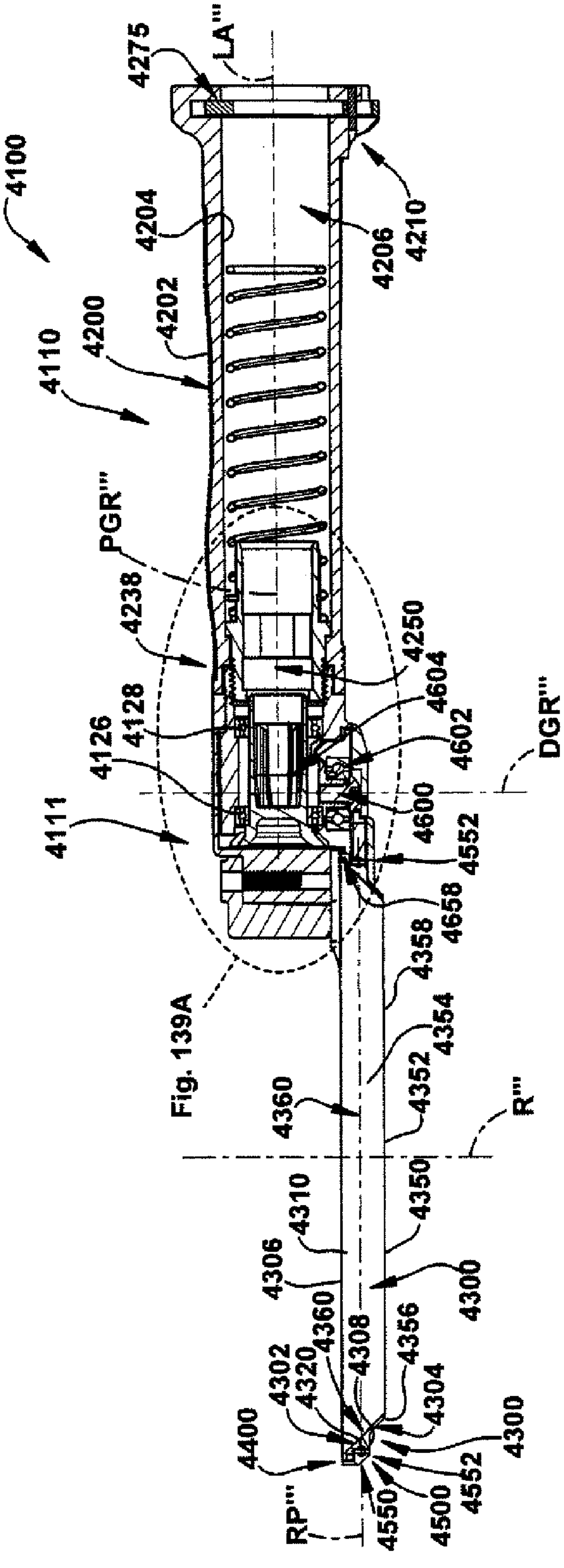
Figure 139A:
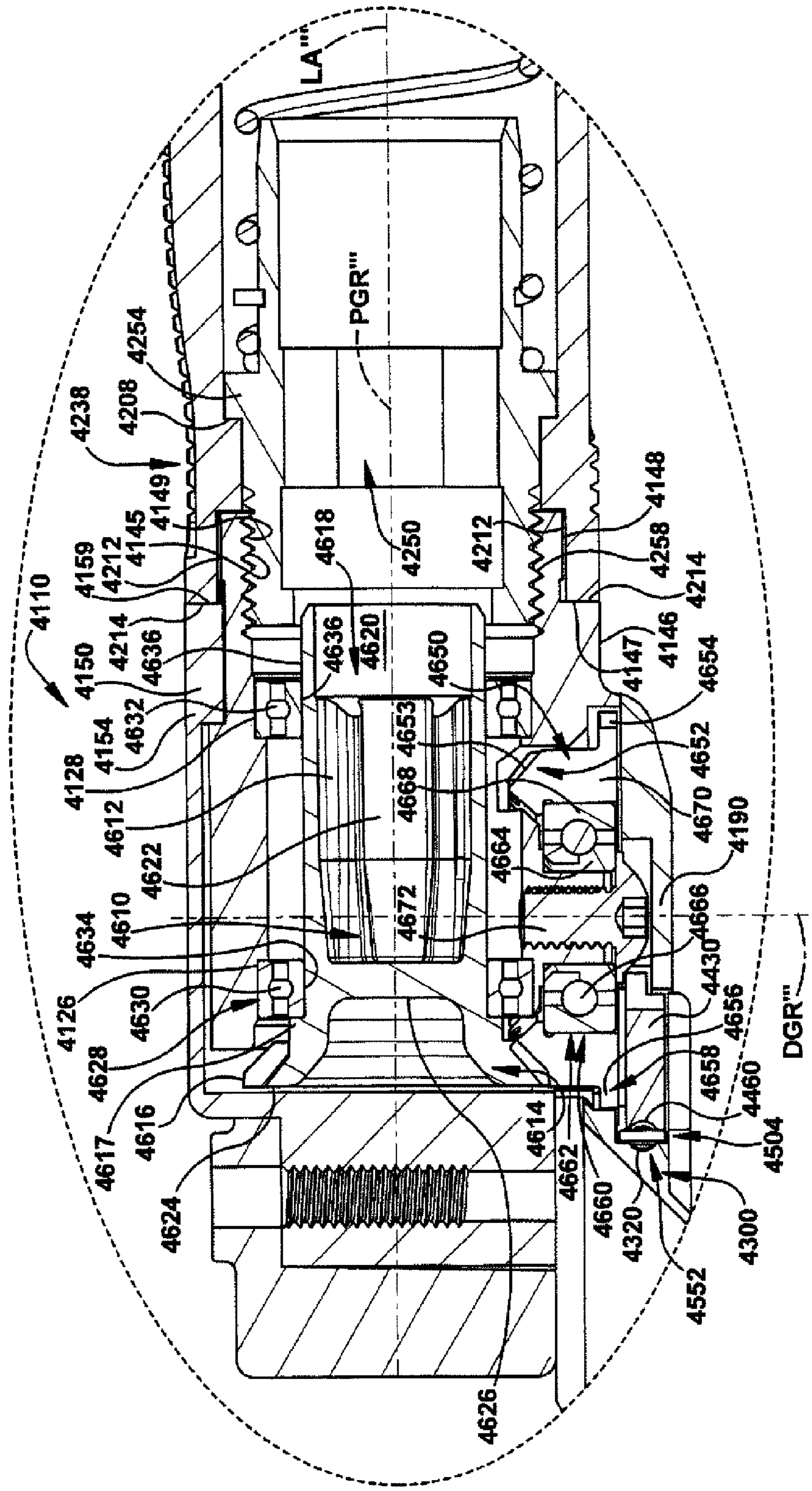
Figure 140:
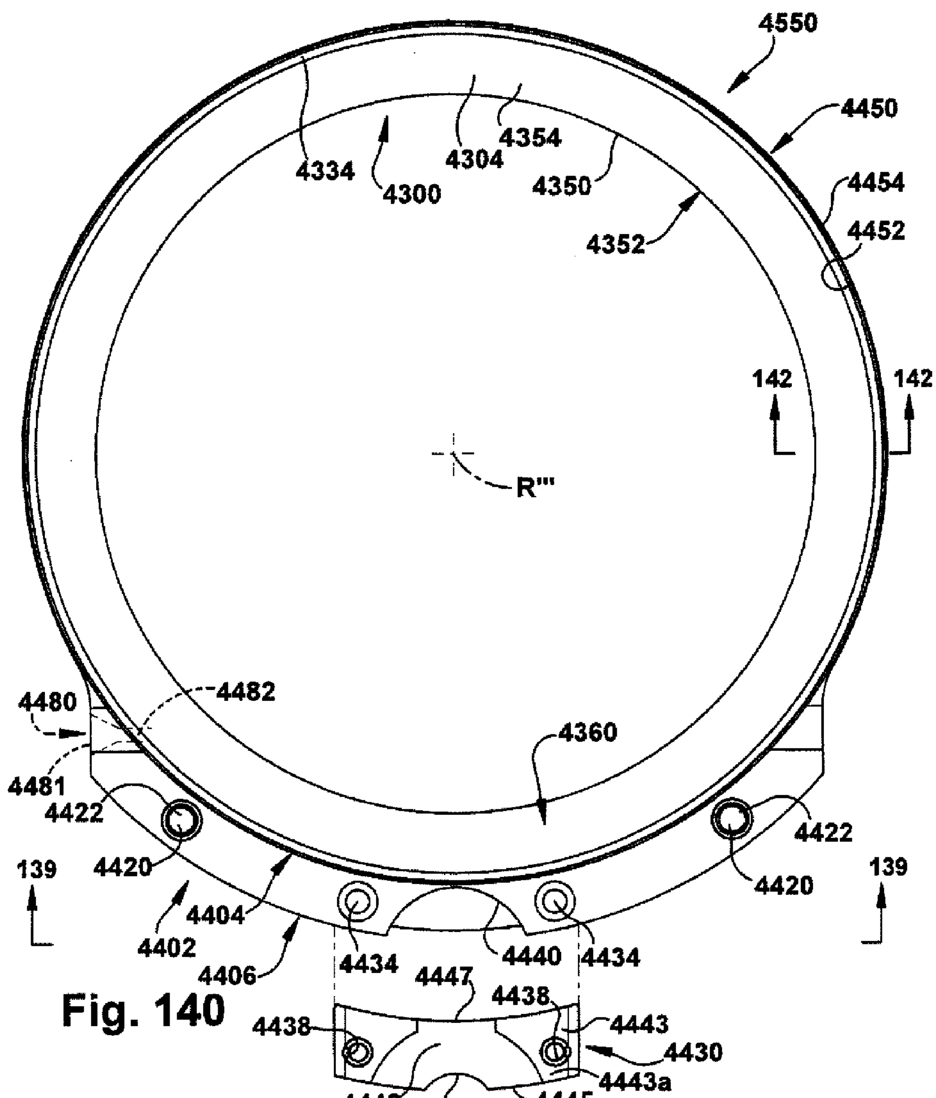
Figure 141:
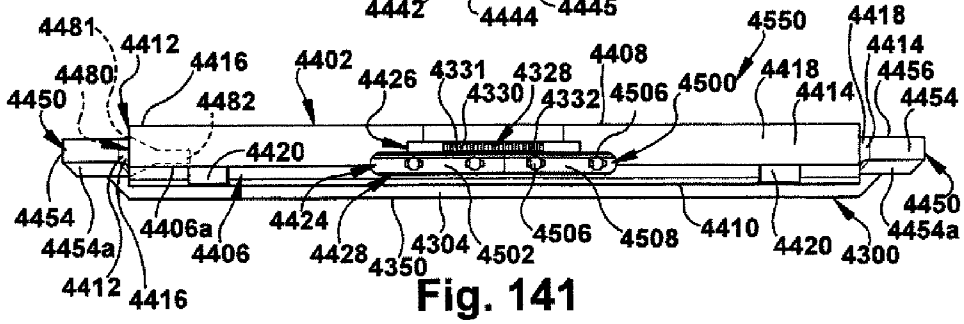
Figure 142:
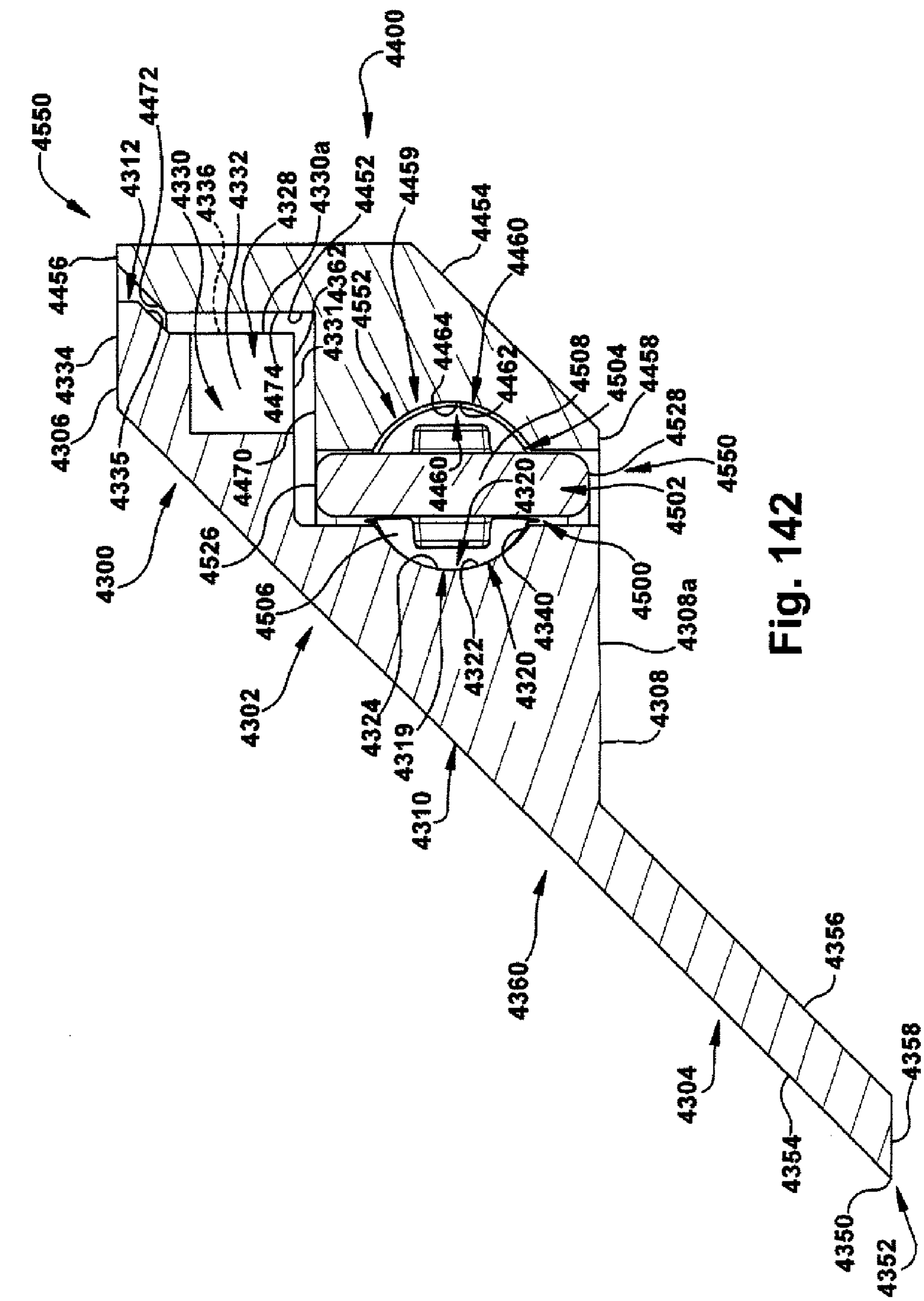
Figure 143:
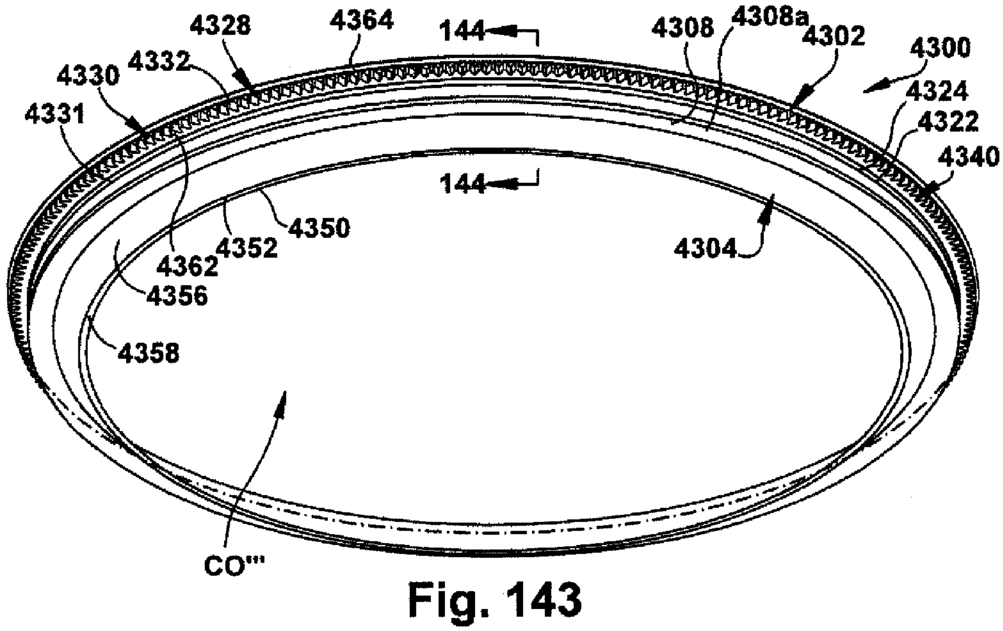
Figure 144:
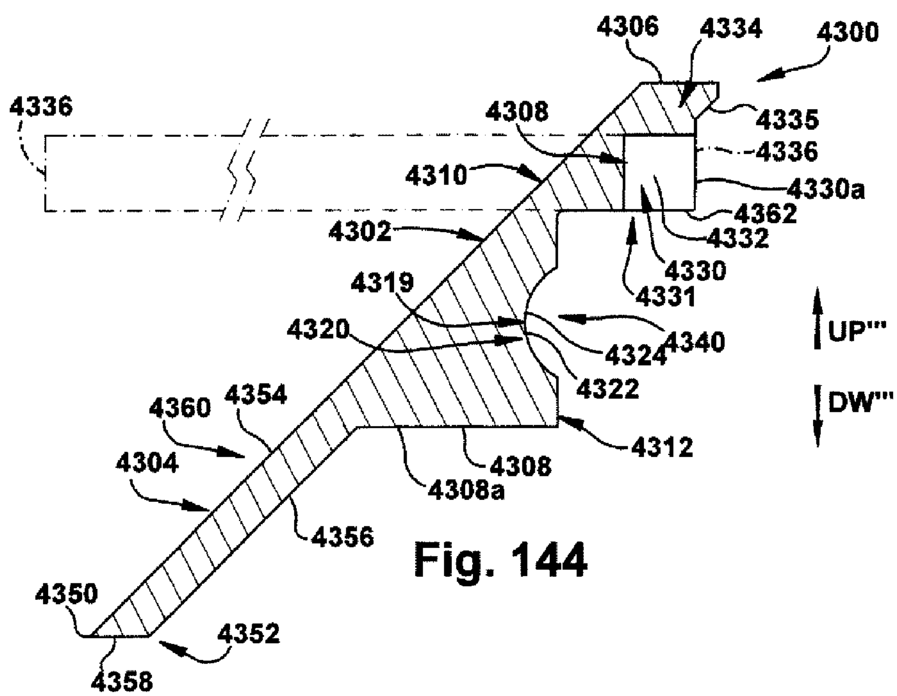
Figures 145, 146, 147:
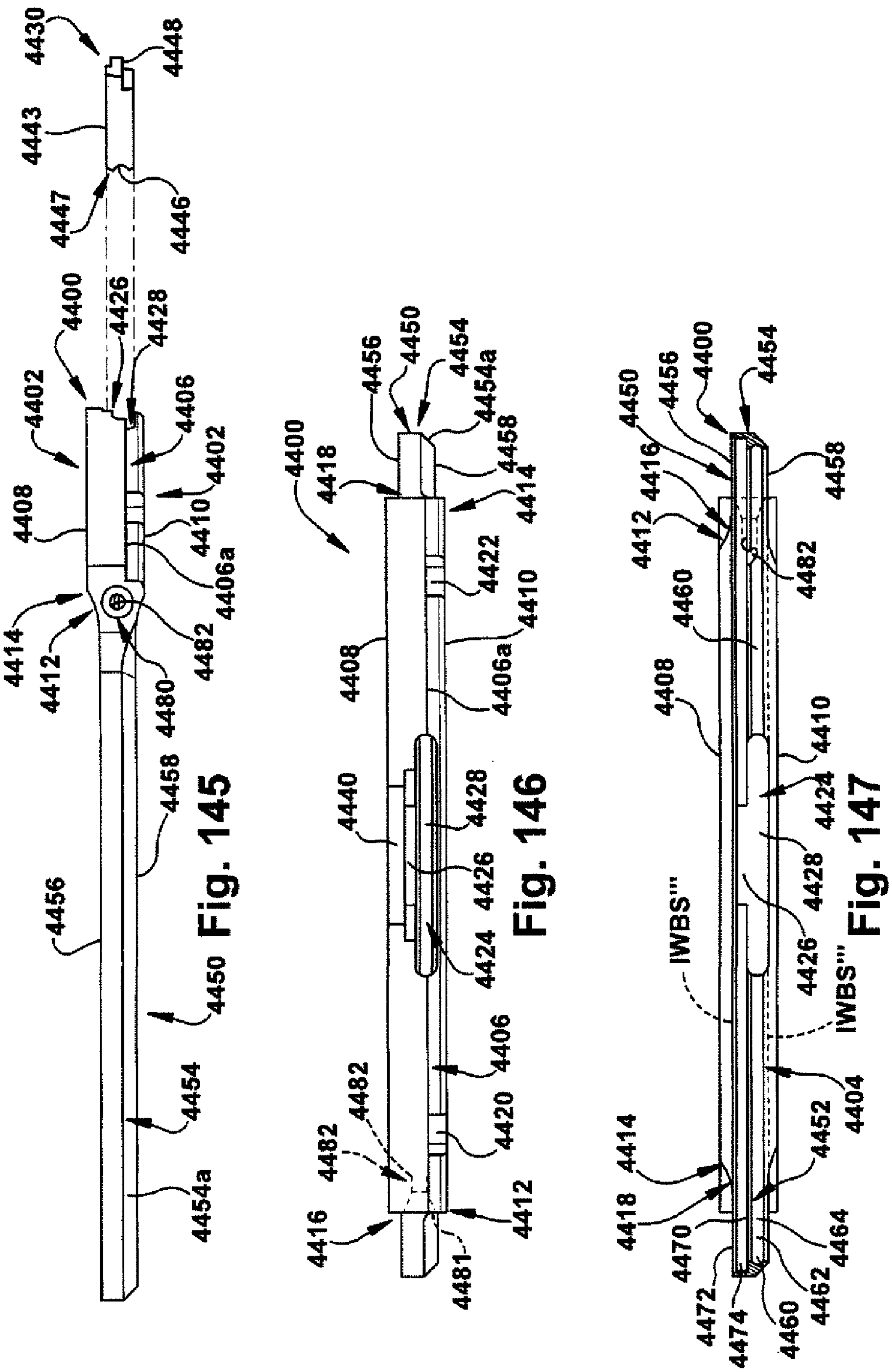
Figure 148:
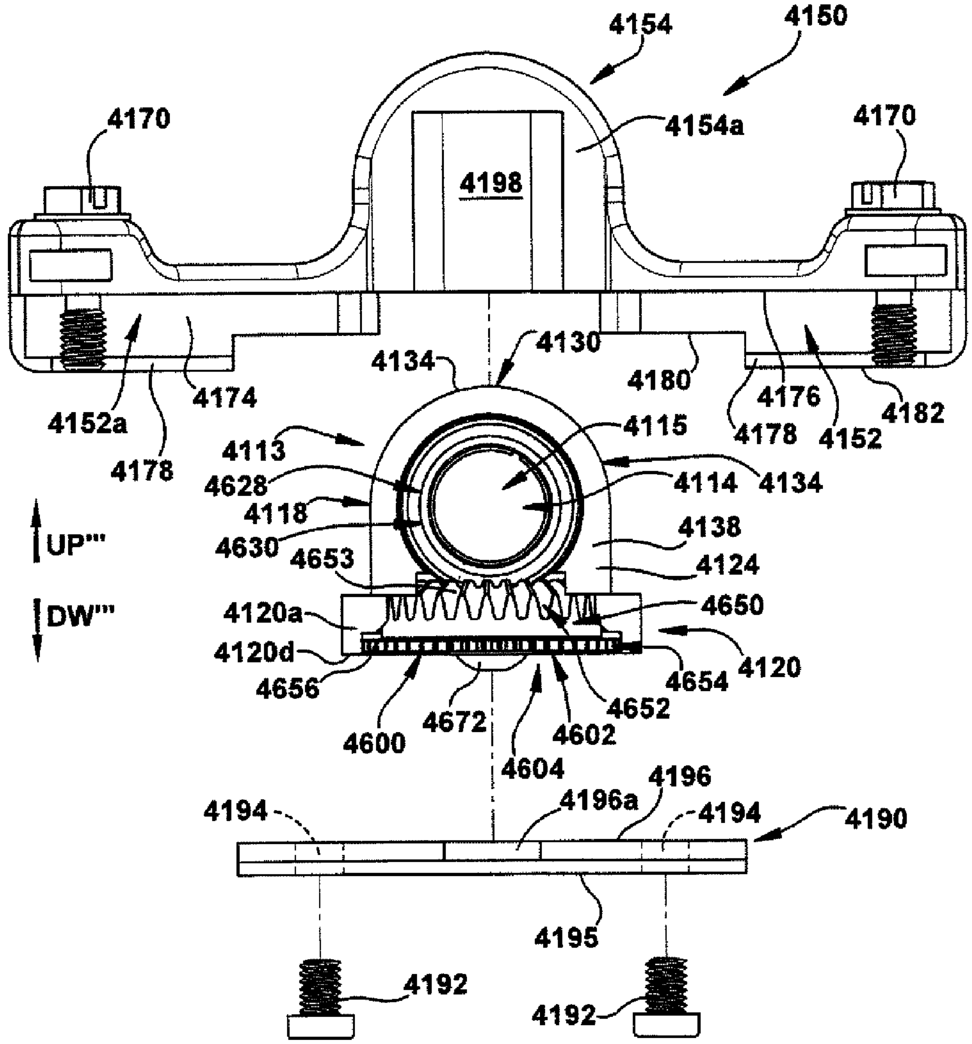
Figure 149:
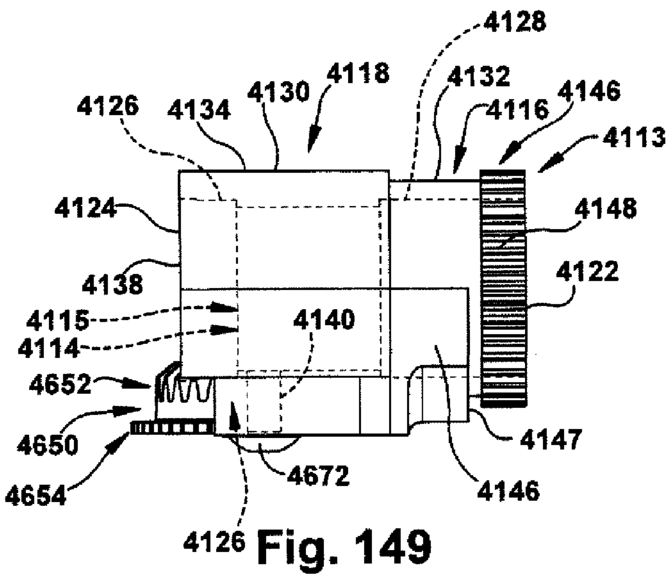
Figure 150:
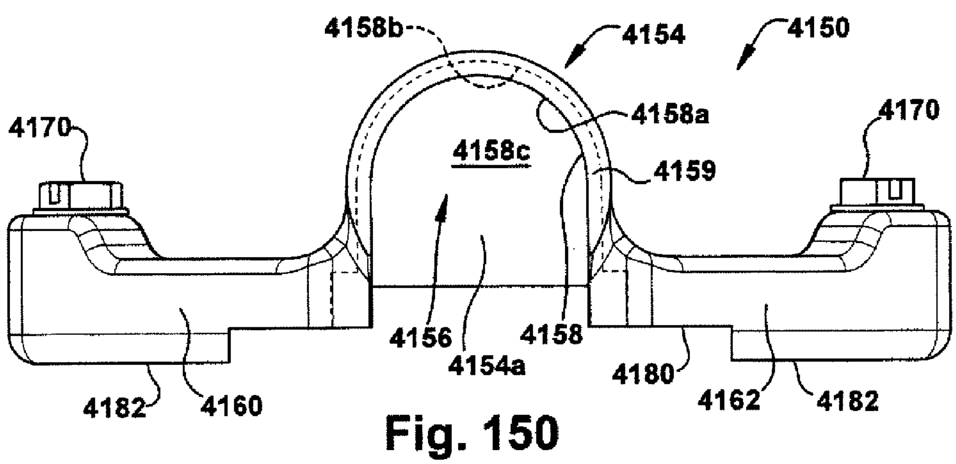
Figure 151:
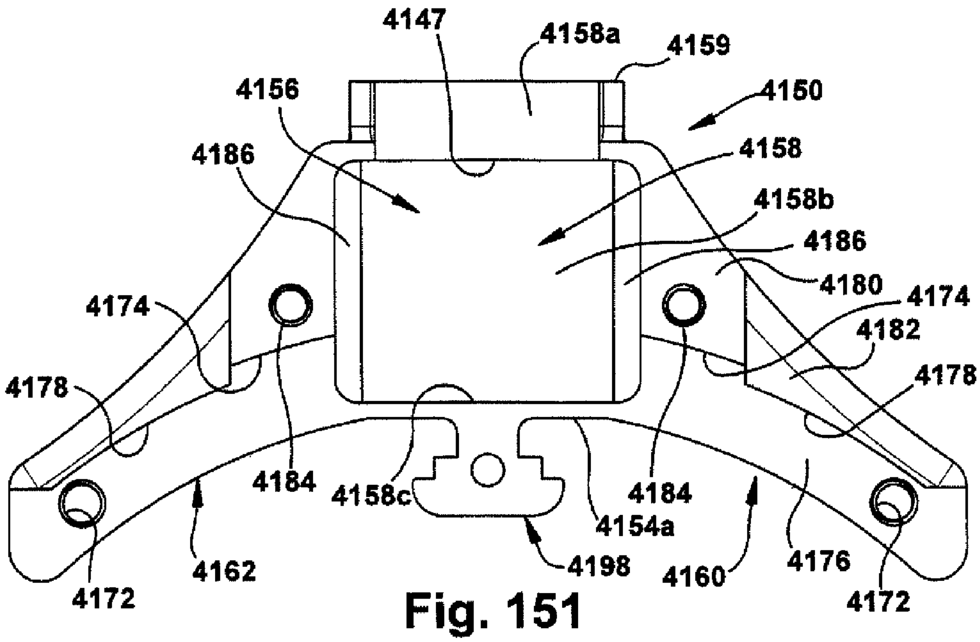
Figure 152:
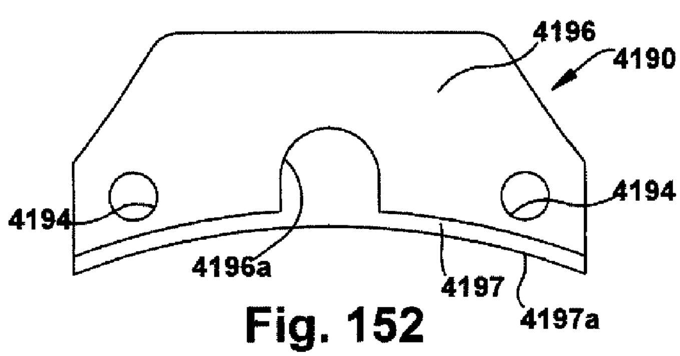
Figure 153:
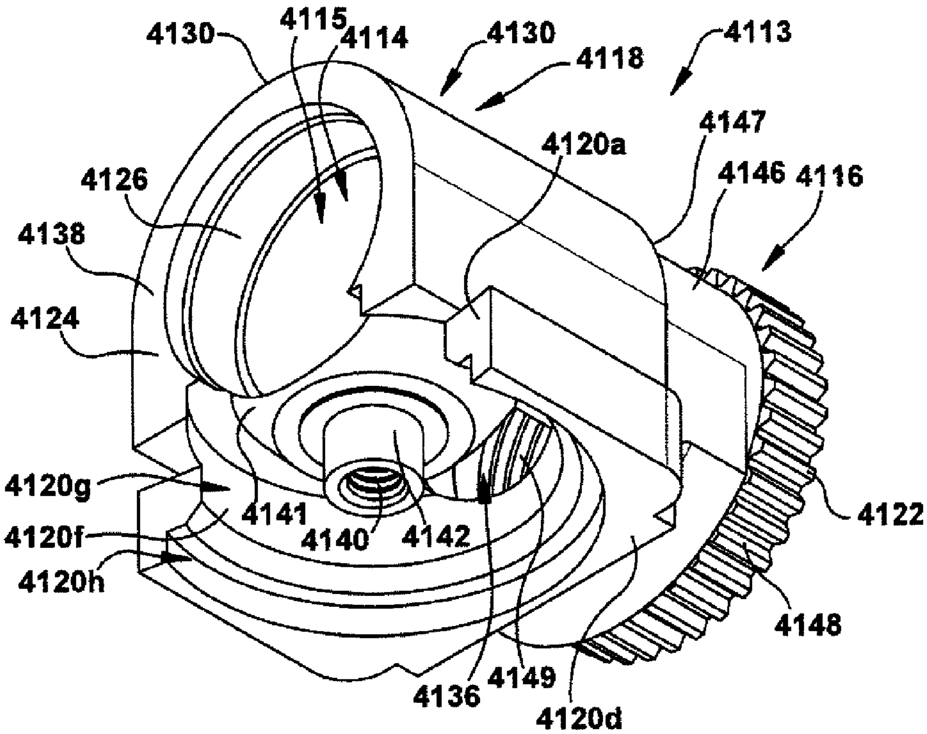
Figure 154:
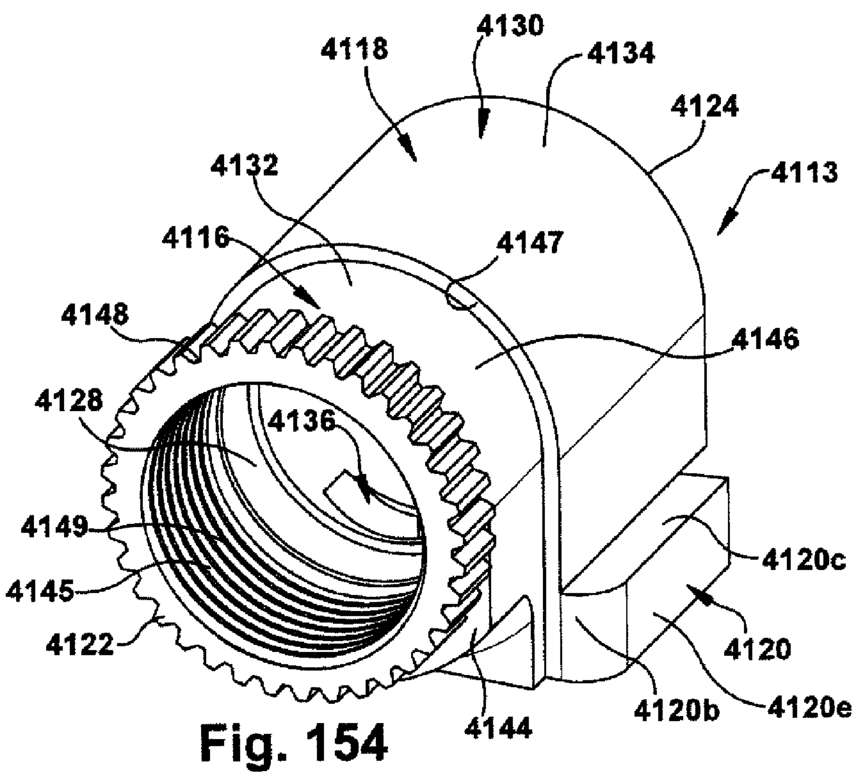
Figure 155:
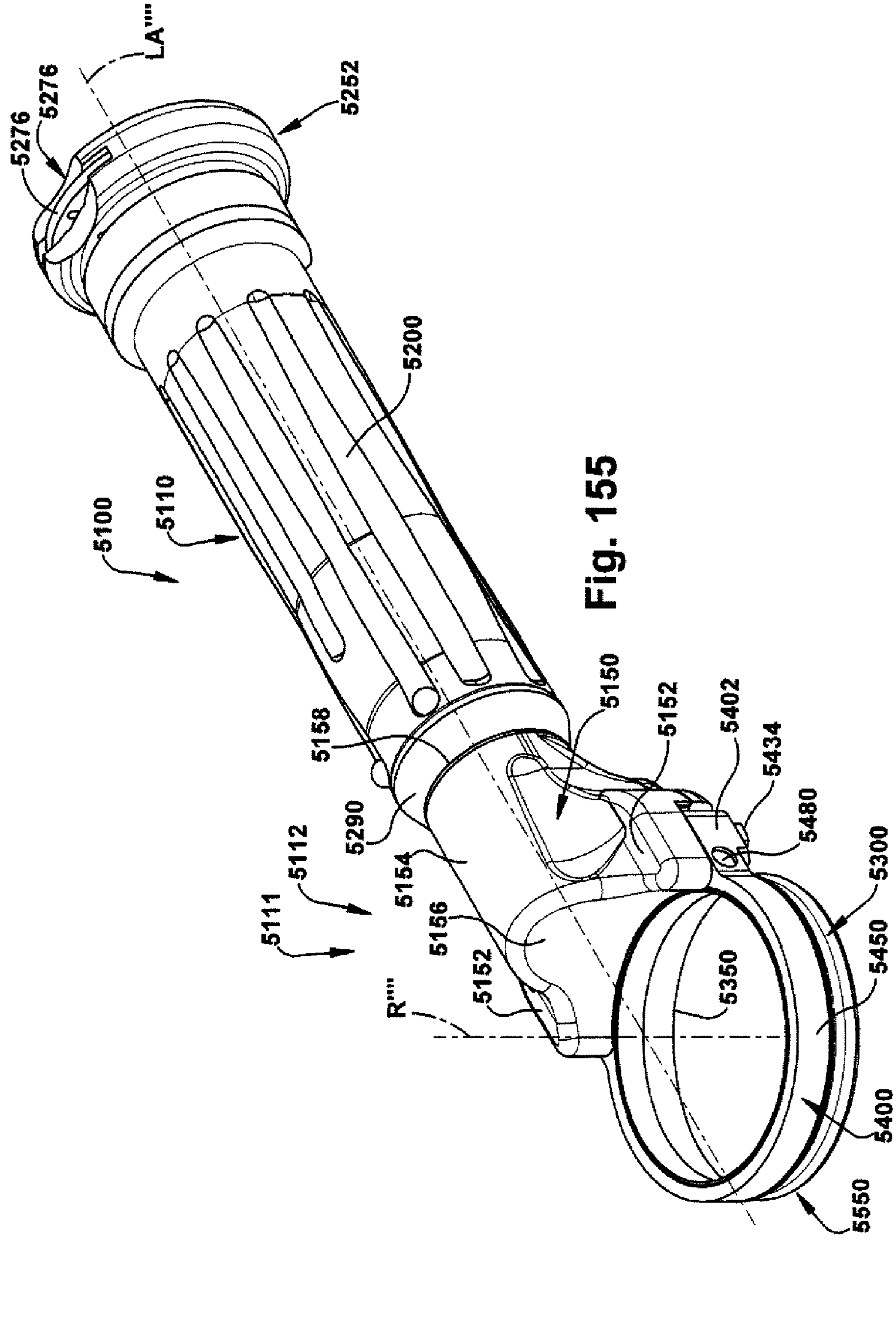
Figure 156:
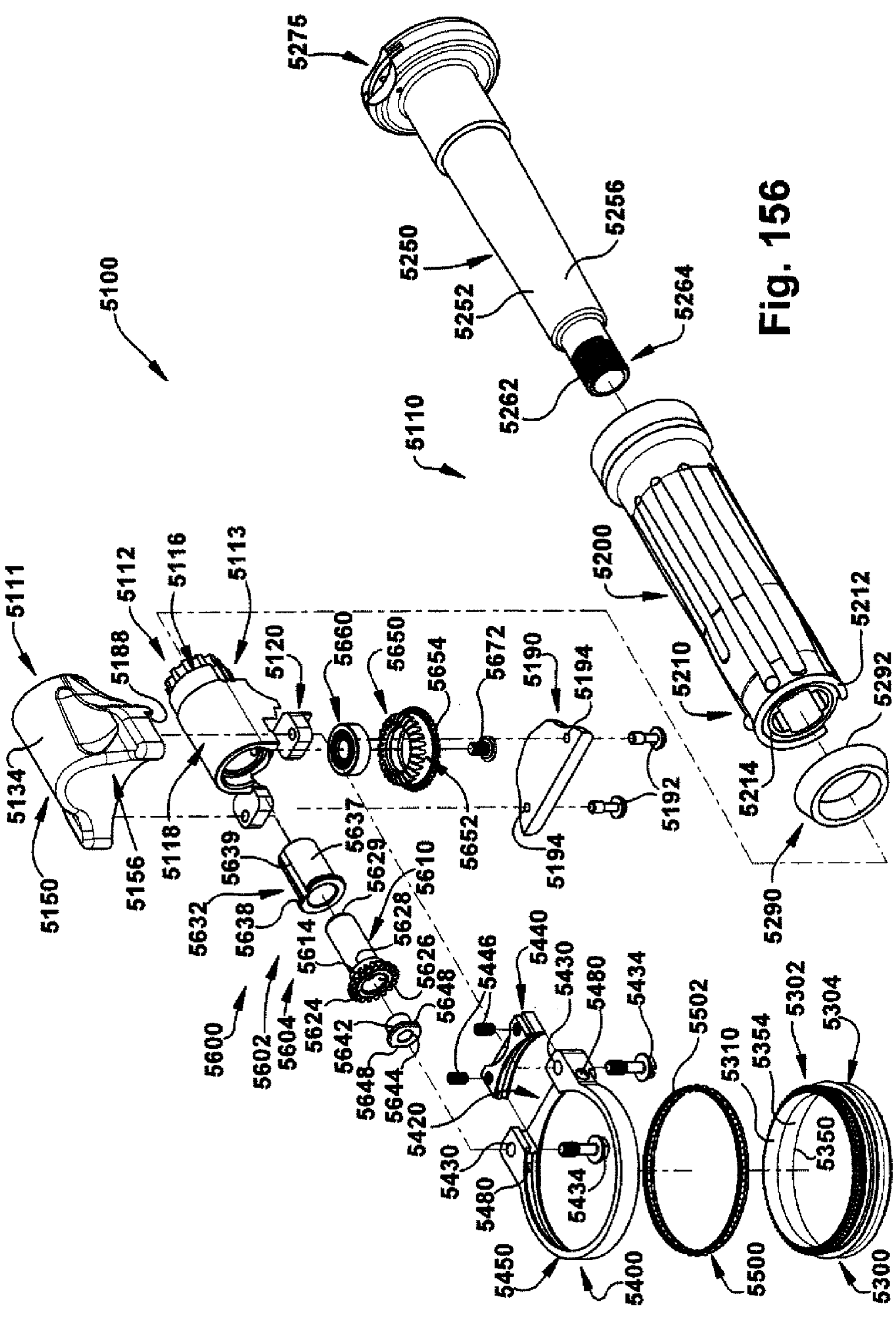
Figure 157:
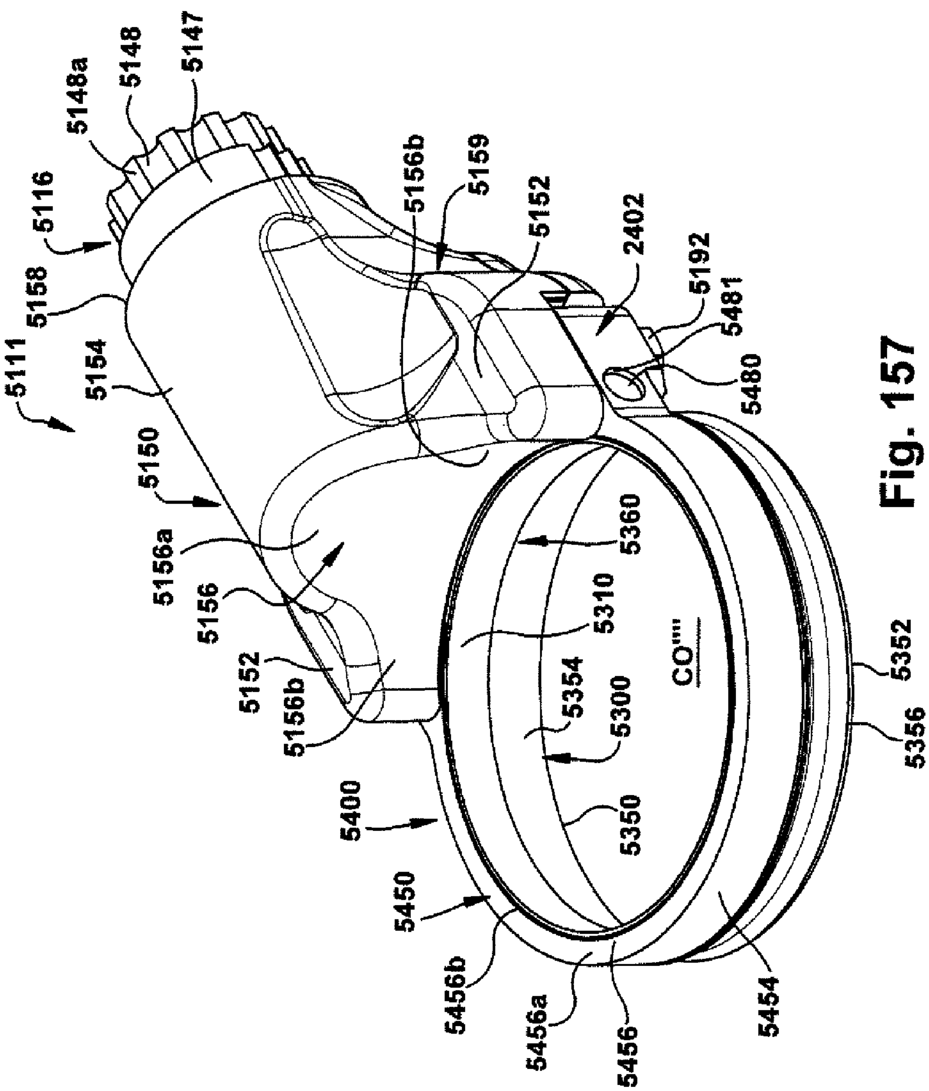
Figure 158:
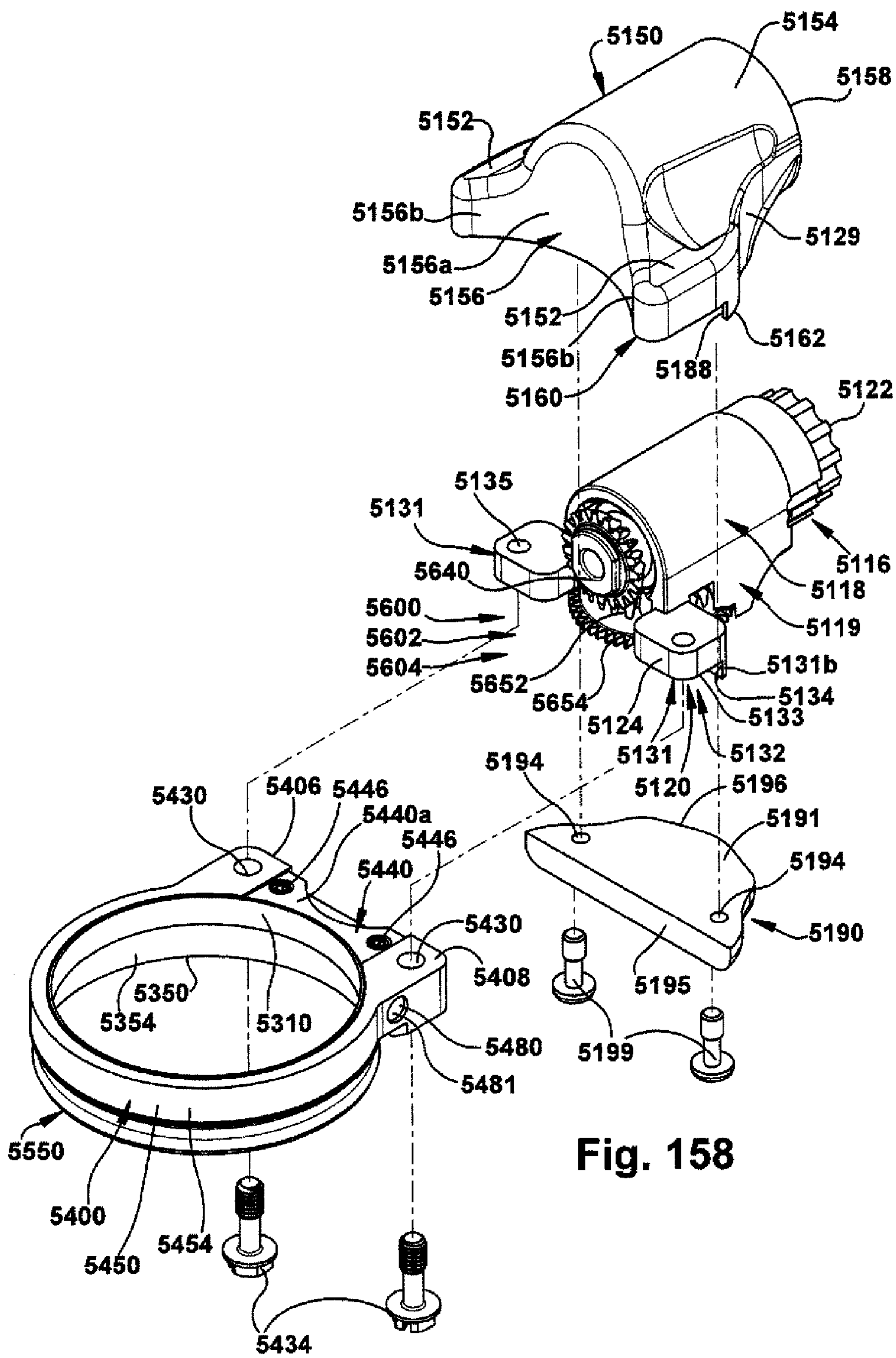
Figure 159:
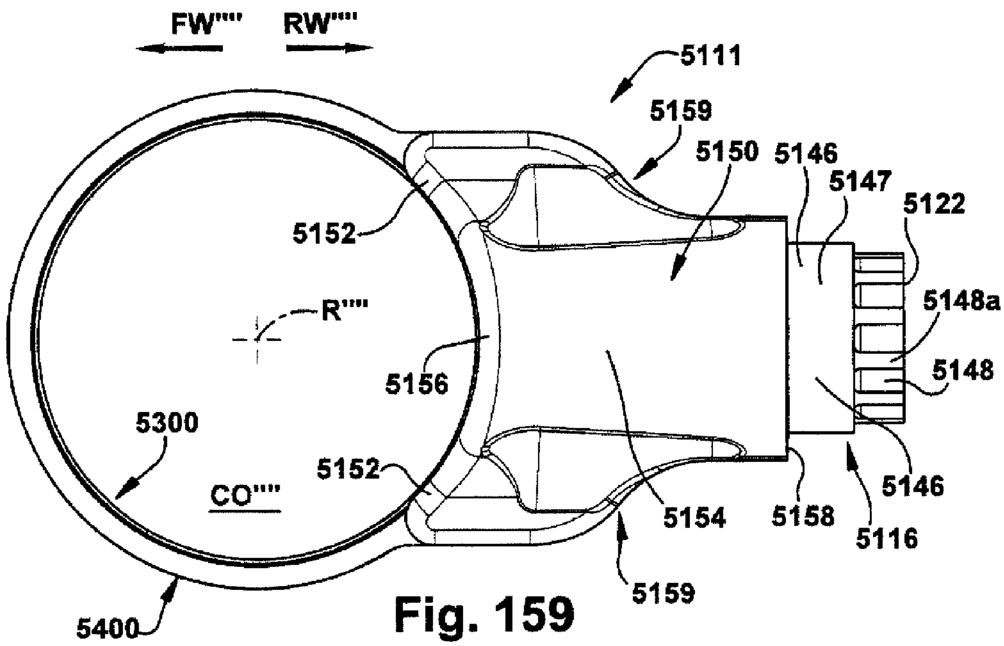
Figure 160:
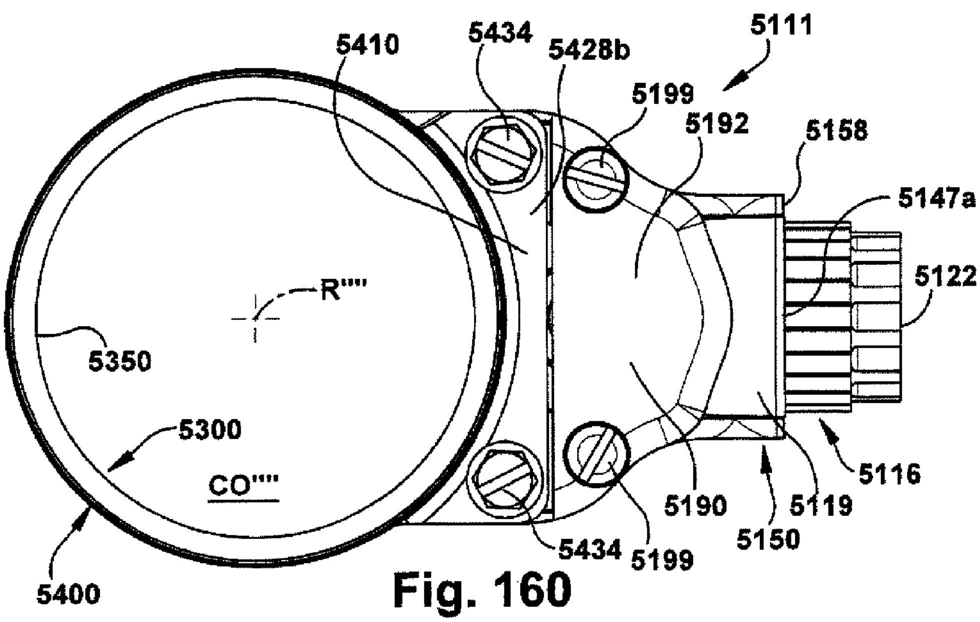
Figure 161:
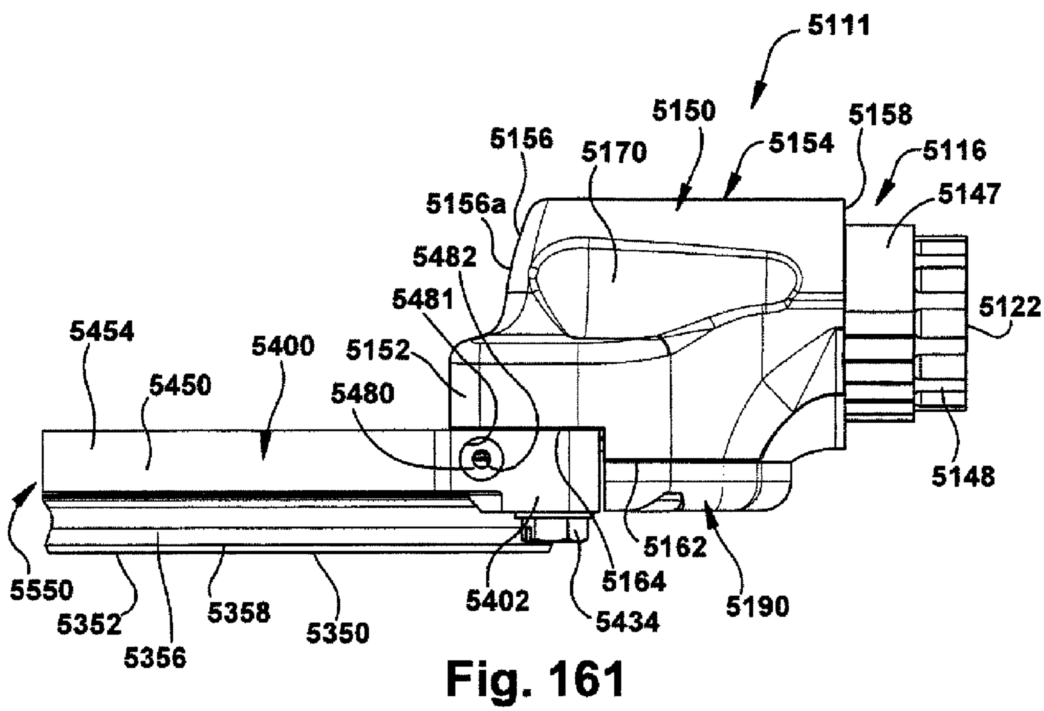
Figure 162:
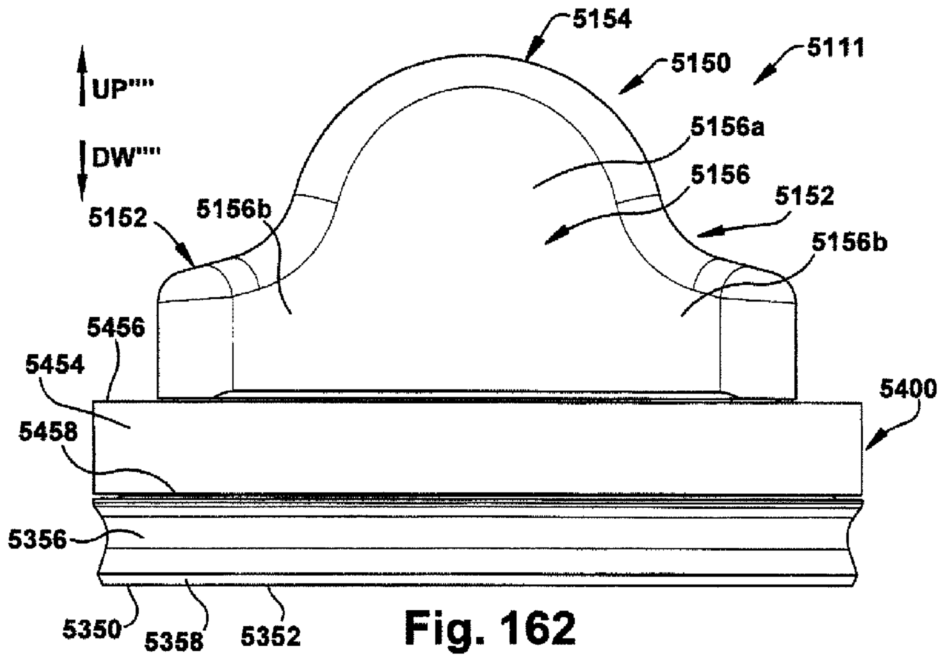
Figure 163:
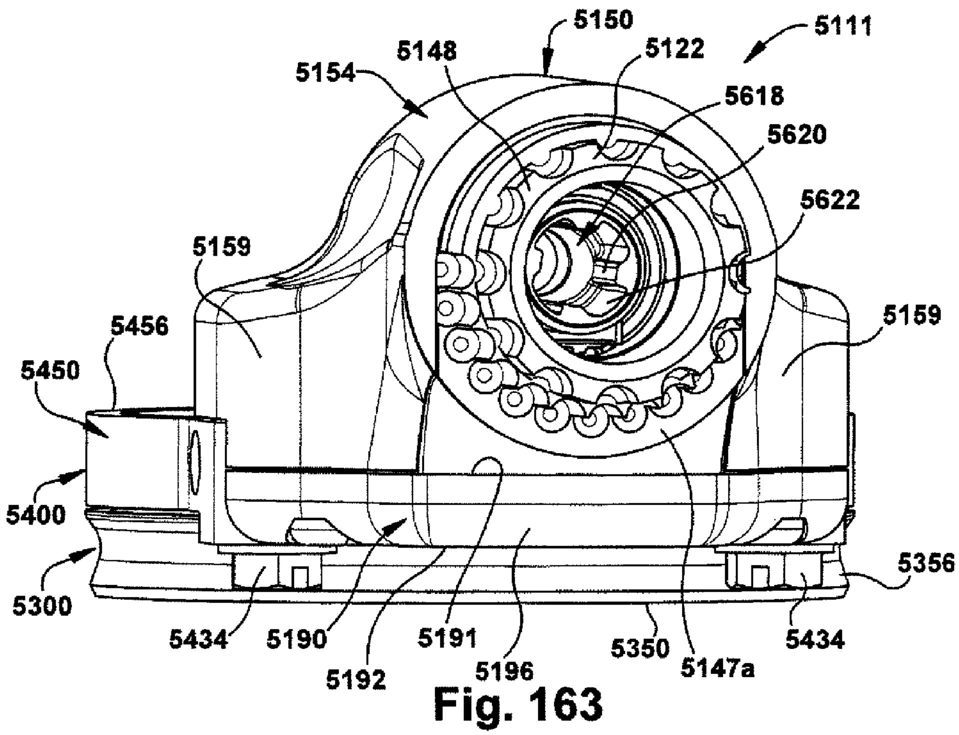
Figure 164:
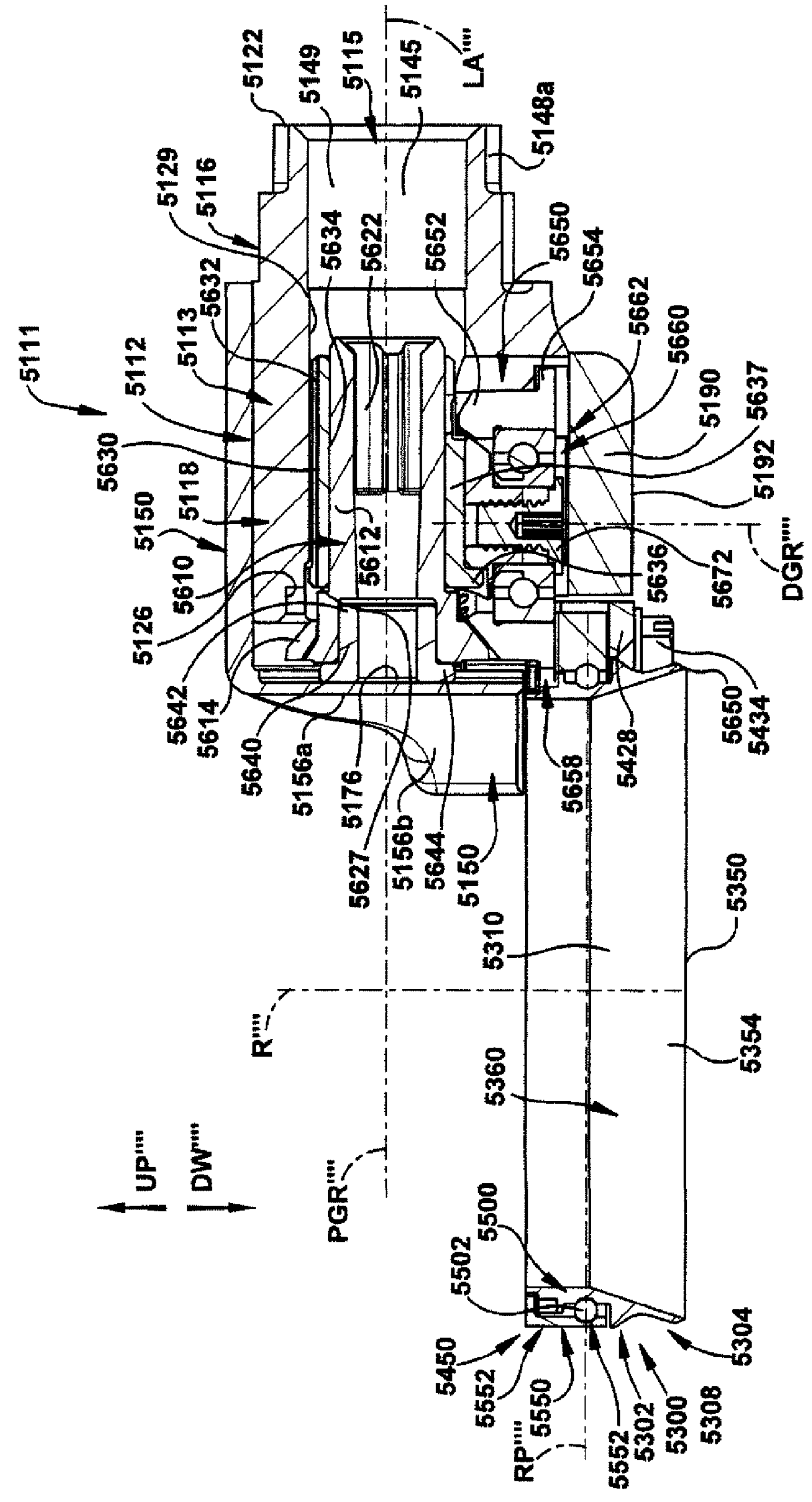
Figure 165:
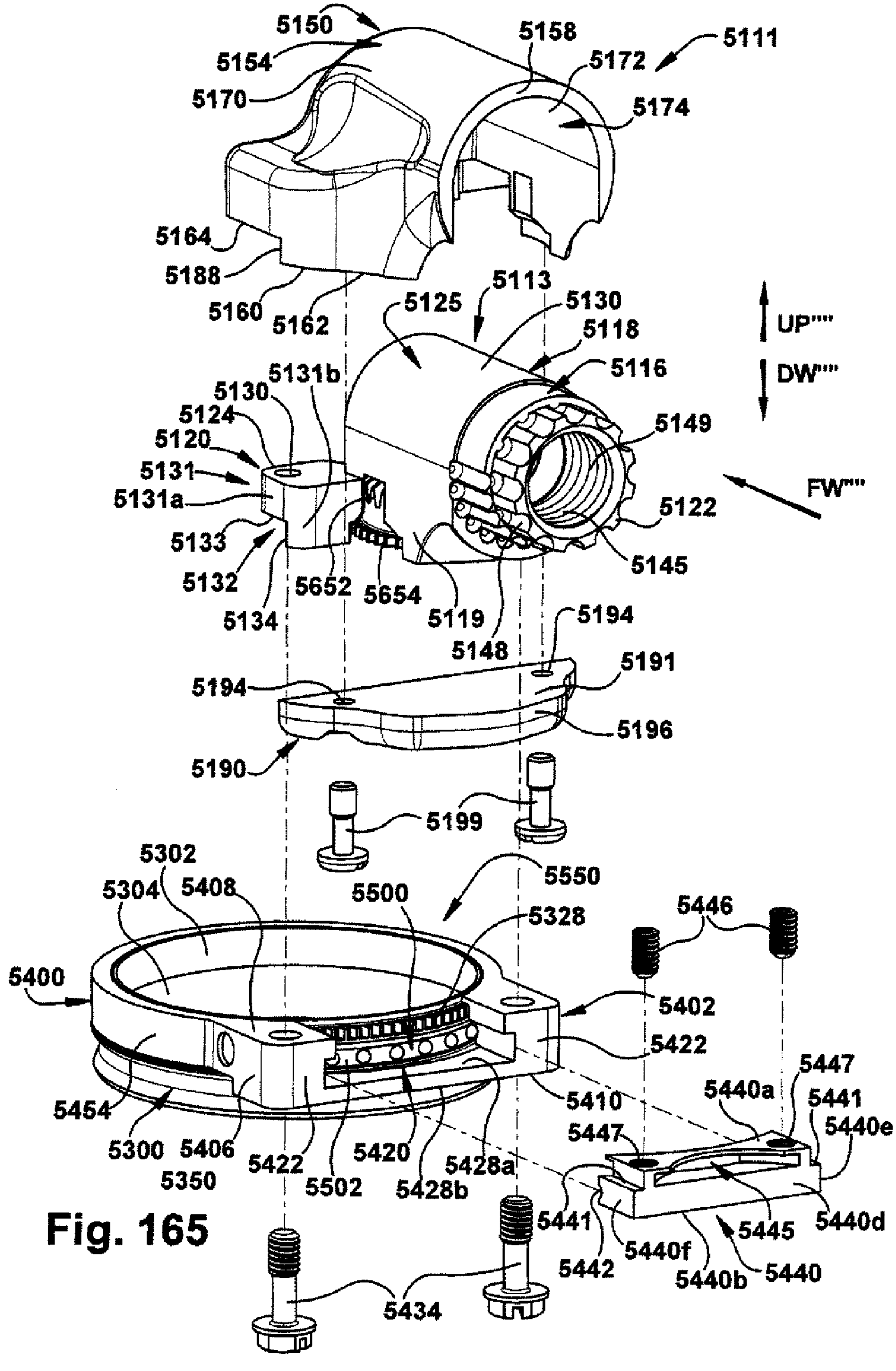
Figure 166:
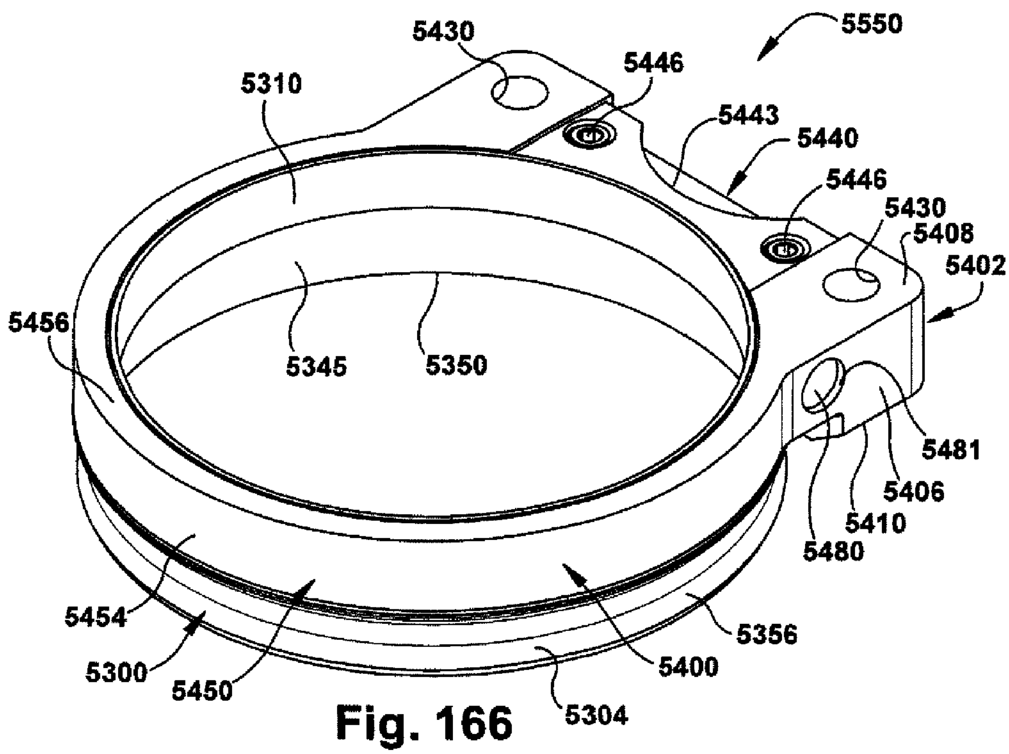
Figure 167:
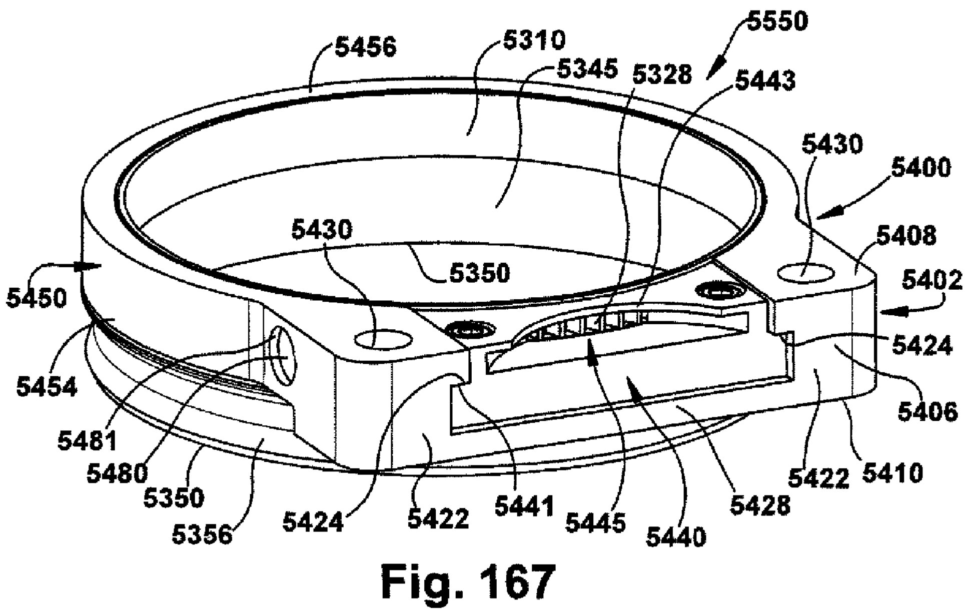
Figure 168:
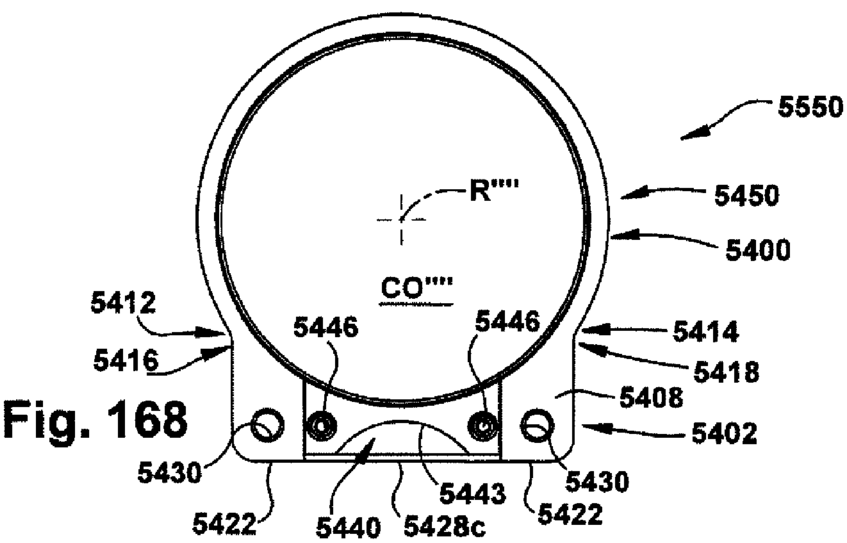
Figure 169:
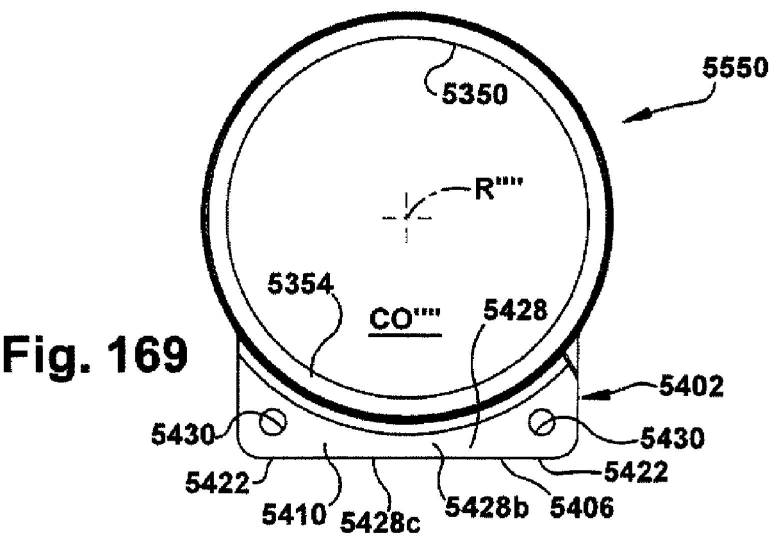
Figure 170:
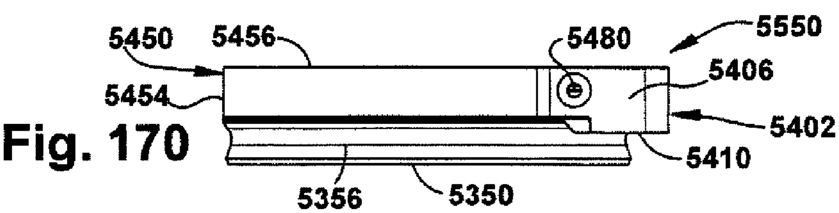
Figure 171:
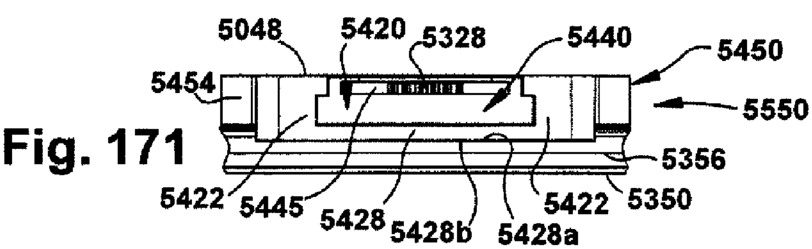
Figure 172:
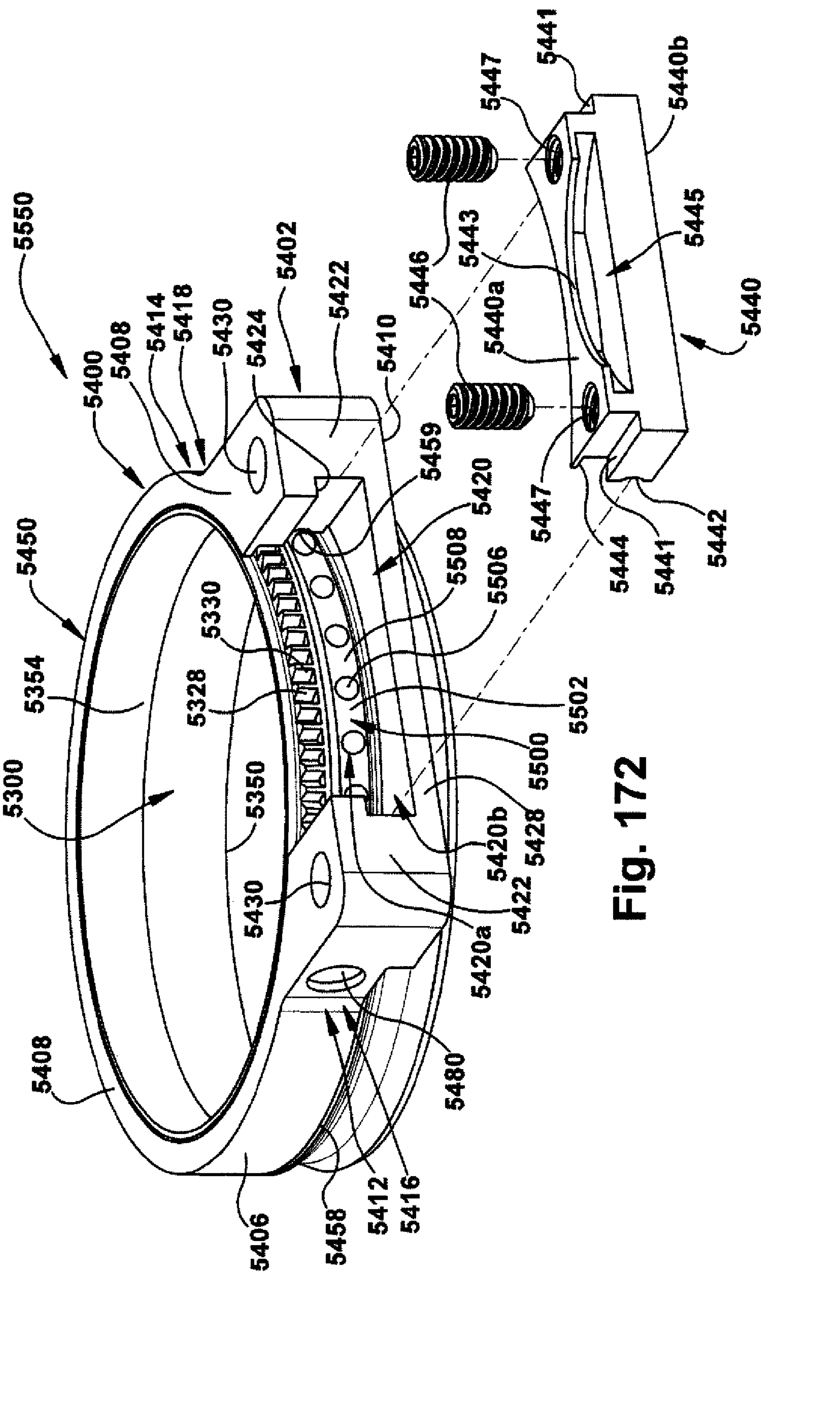
Figure 173:
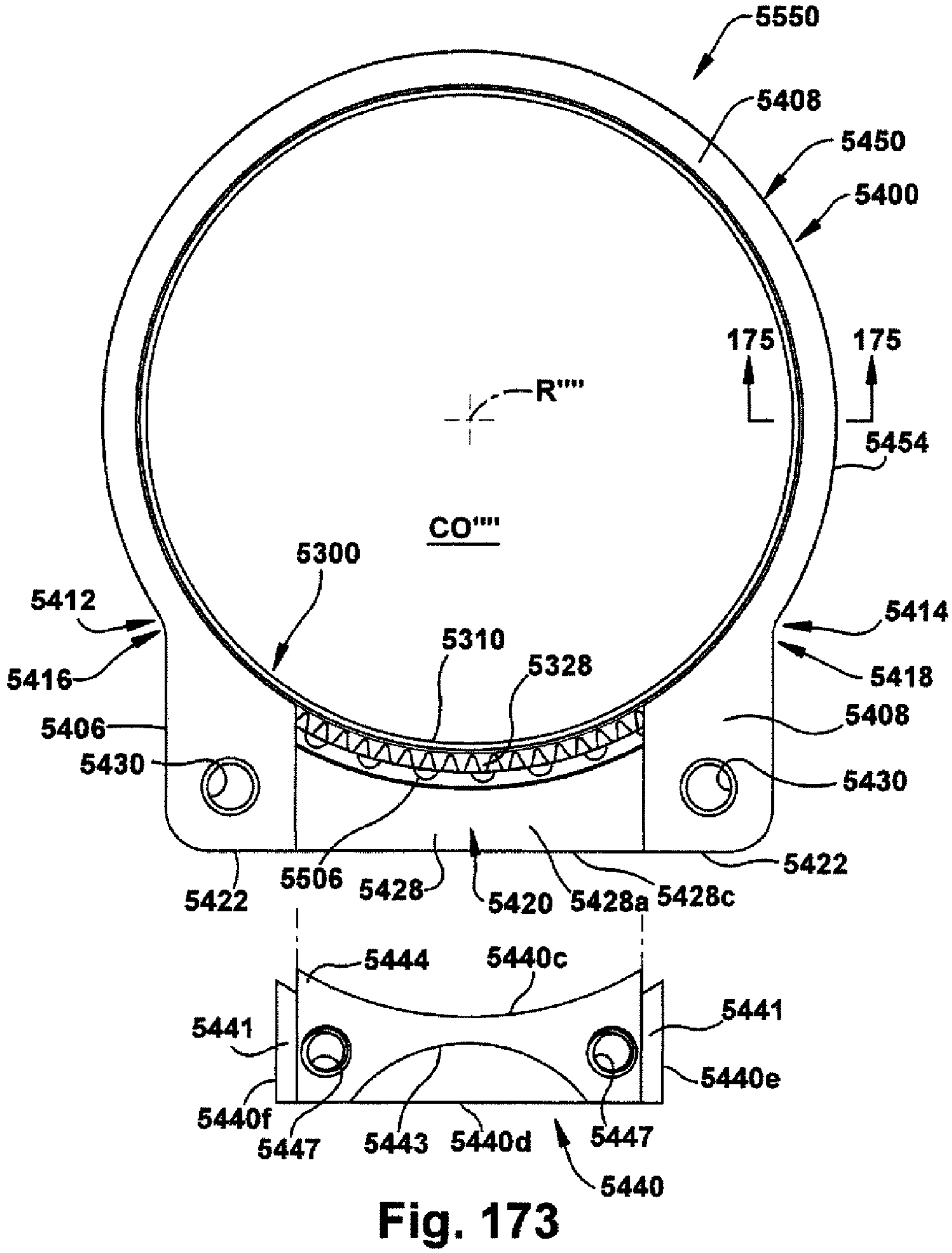
Figure 174:
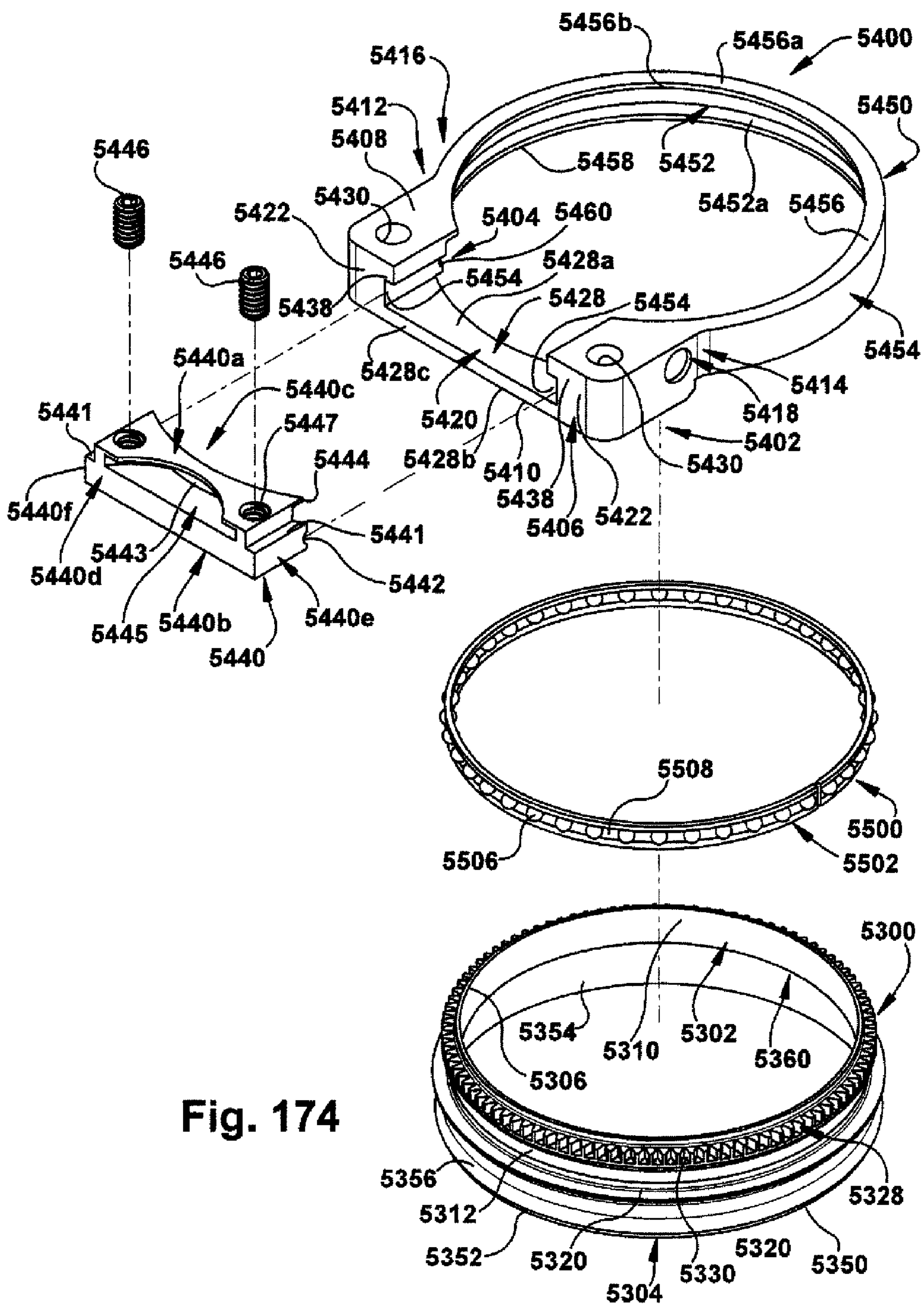
Figure 175:
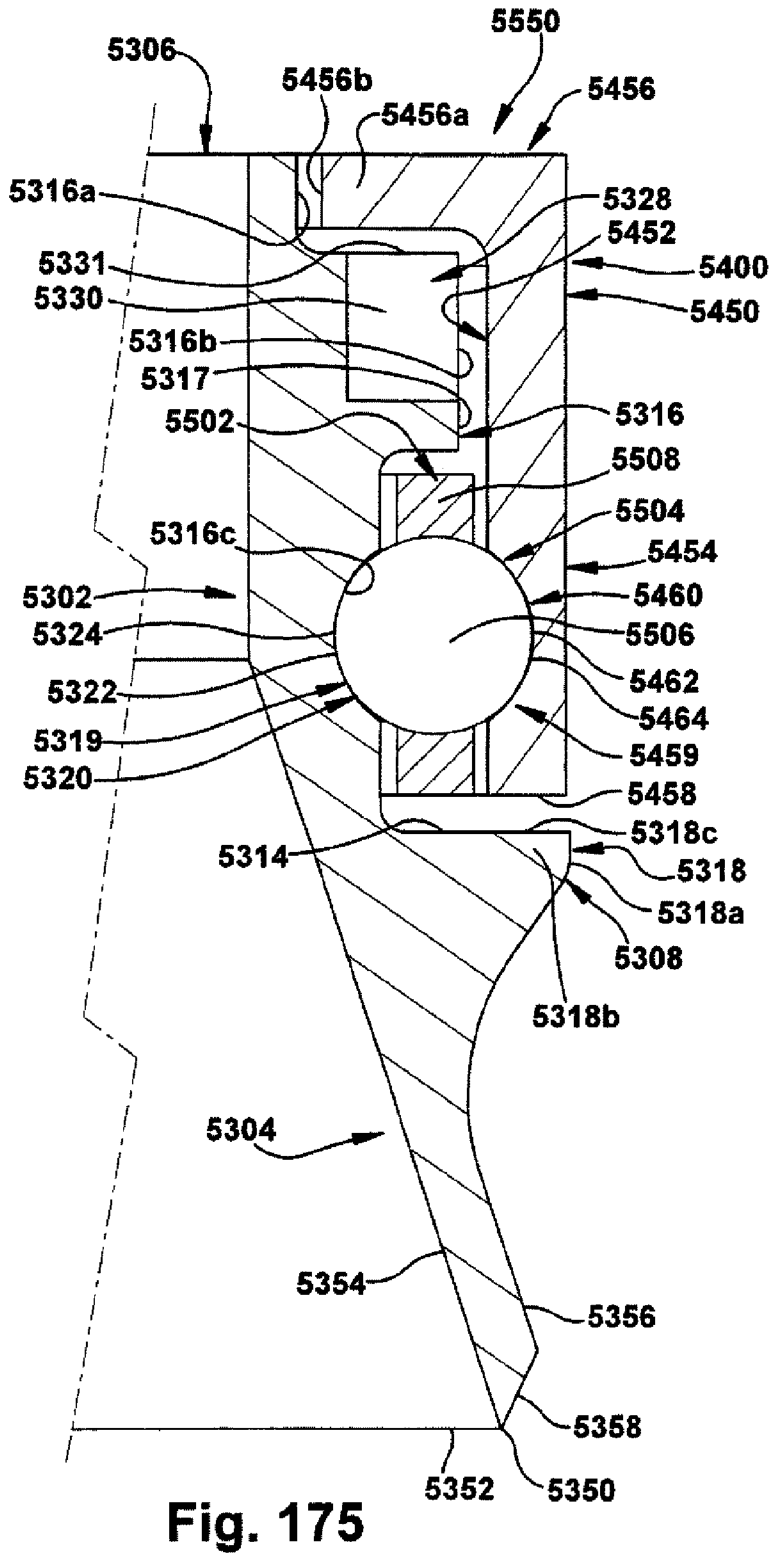
Figure 176:
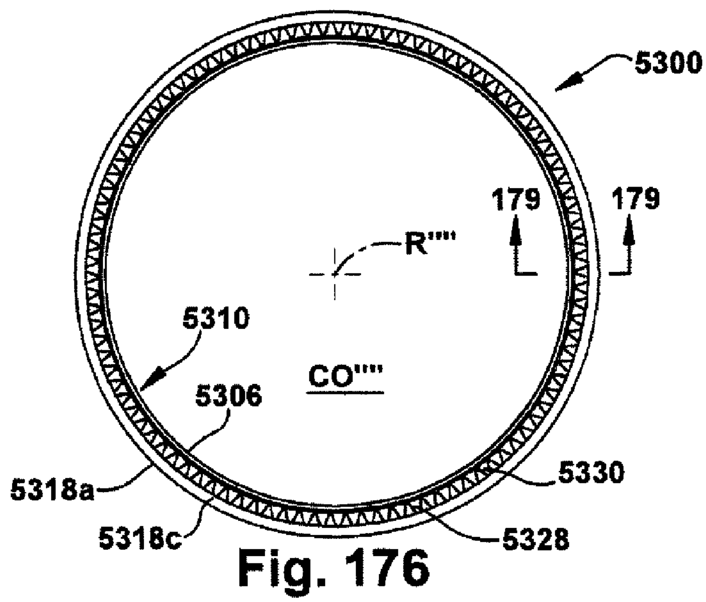
Figure 177:
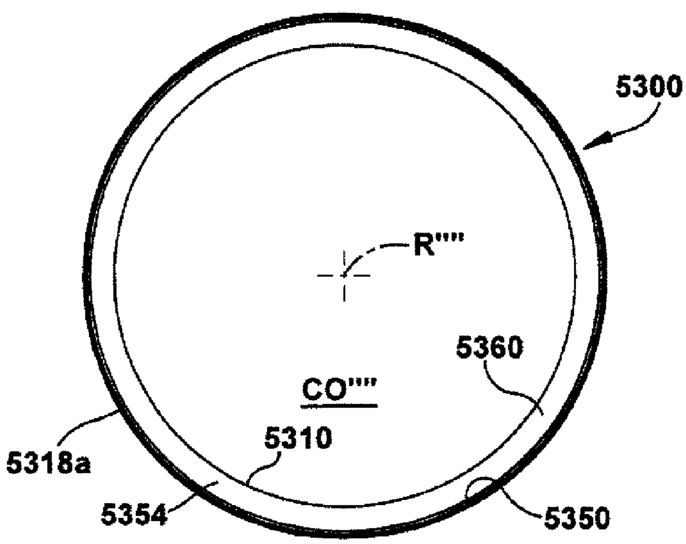
Figure 178:
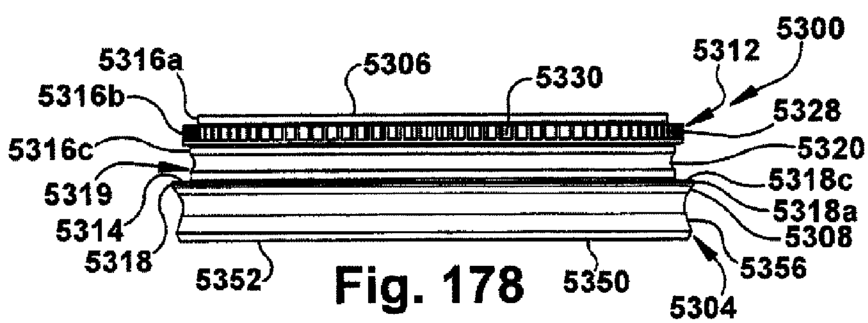
Figure 179:
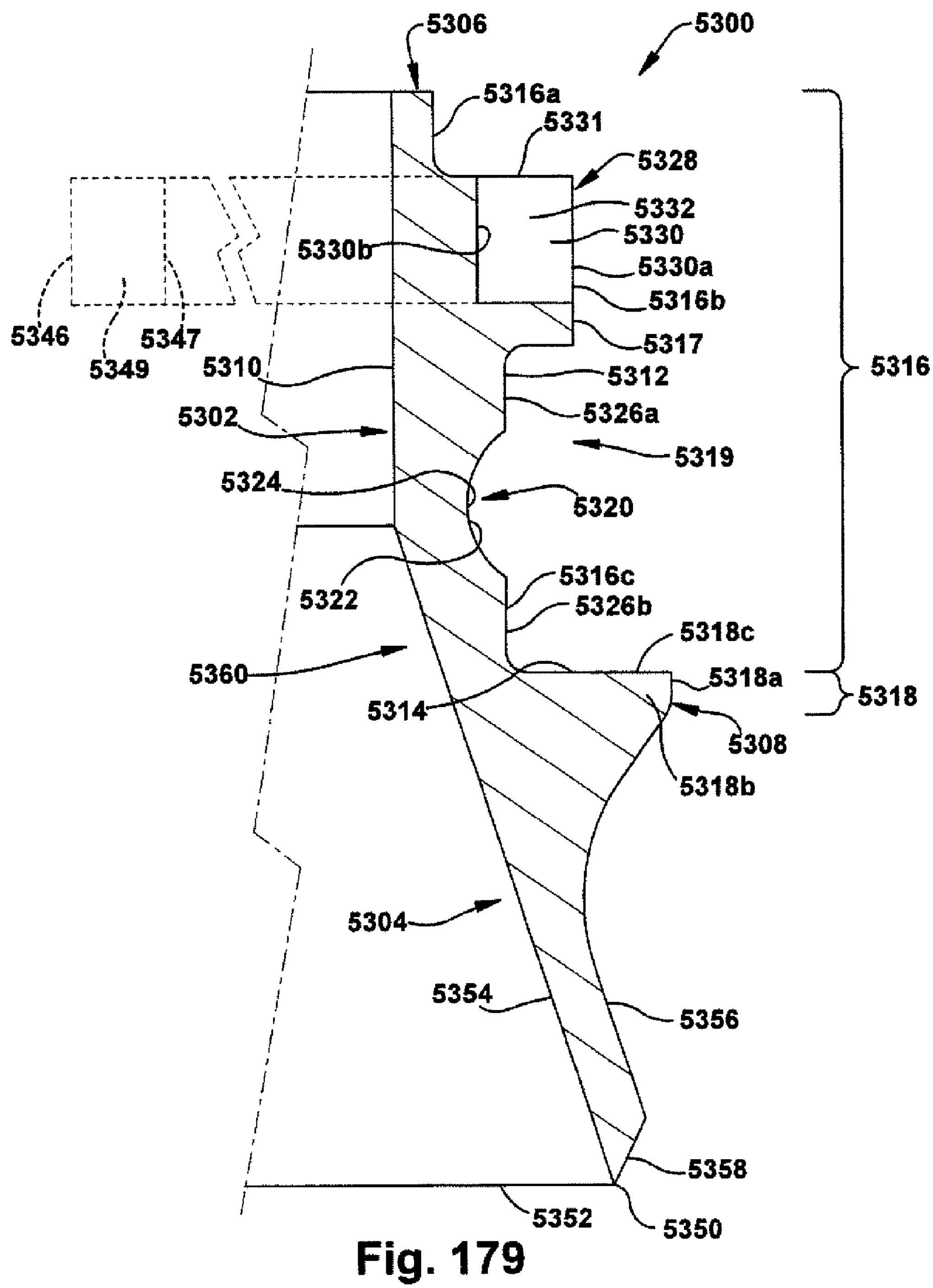
Figure 180:
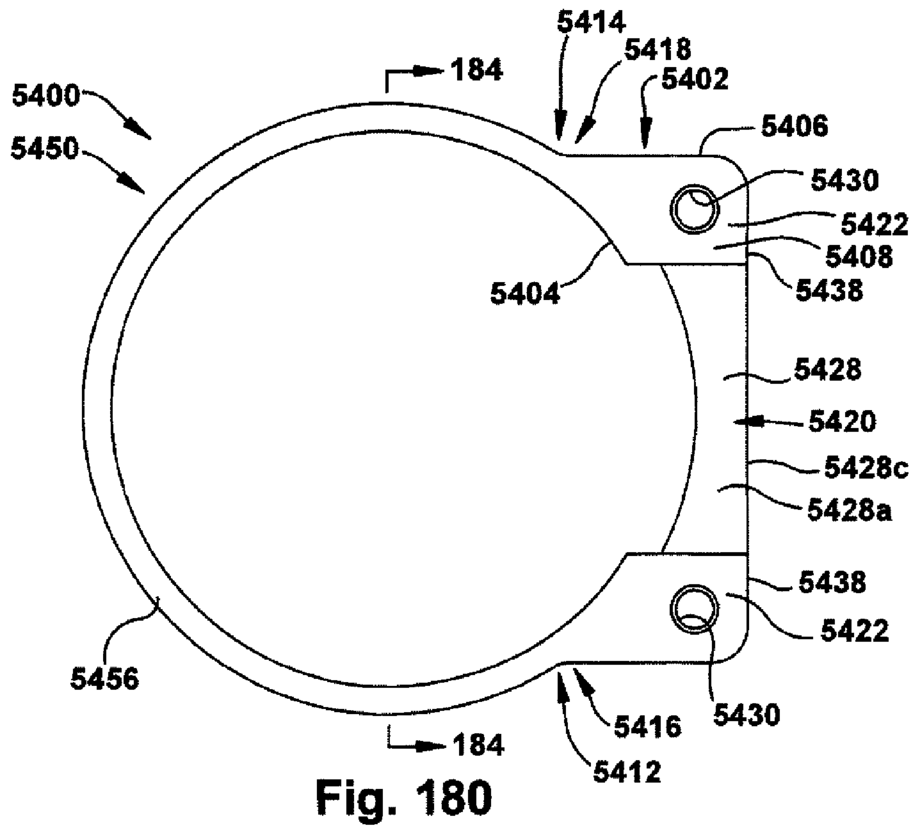
Figure 181:
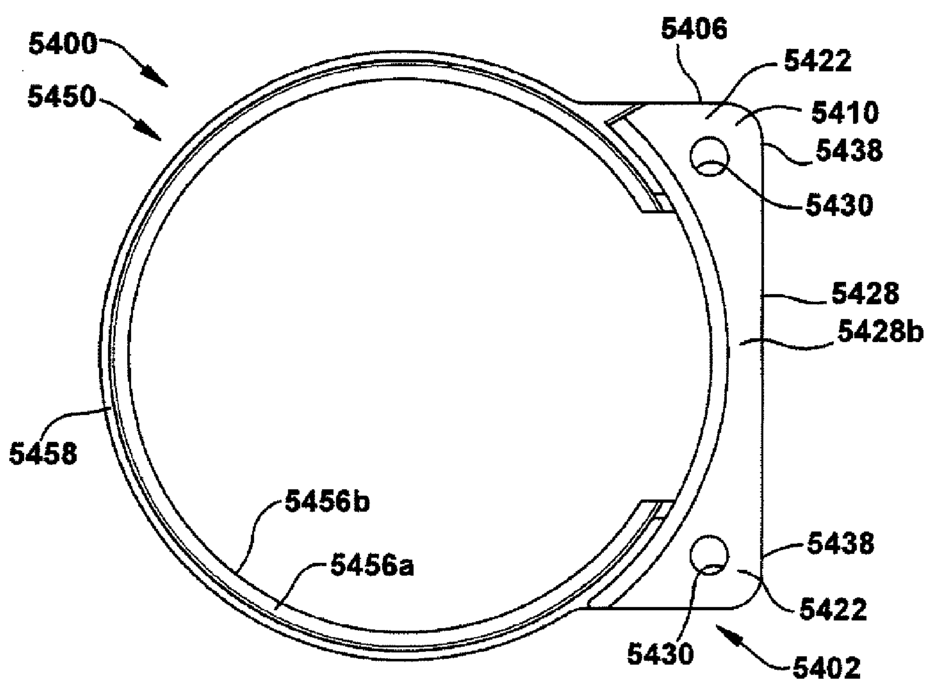
Figure 182:
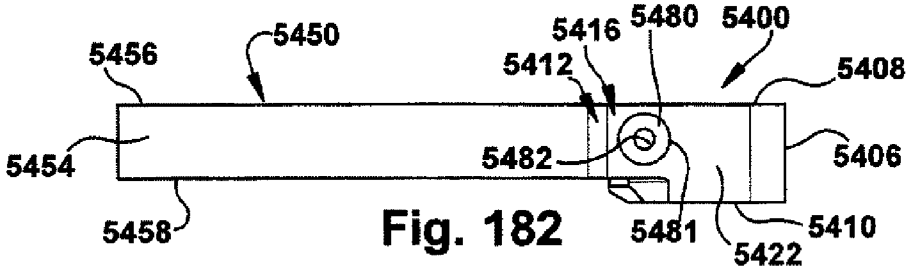
Figure 183:
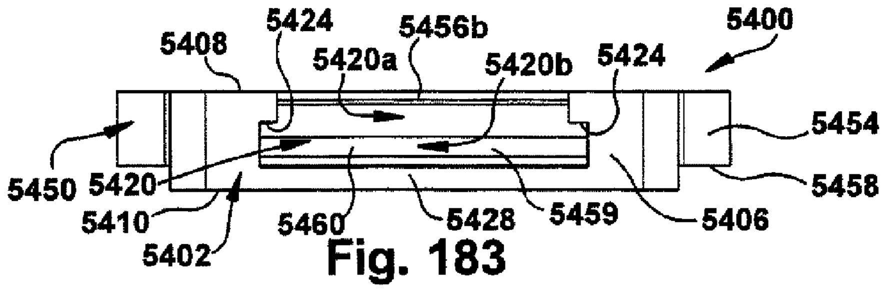
Figure 184:
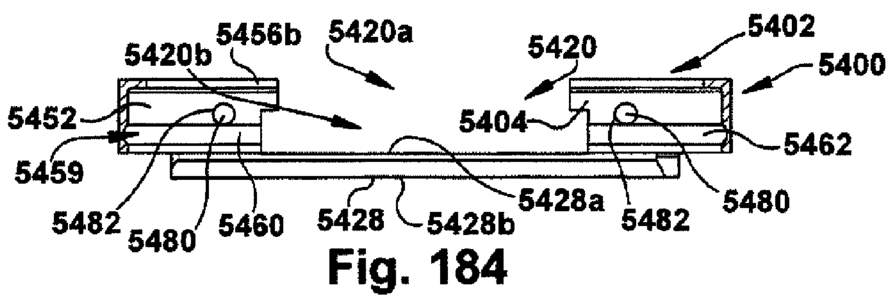
Figure 185:
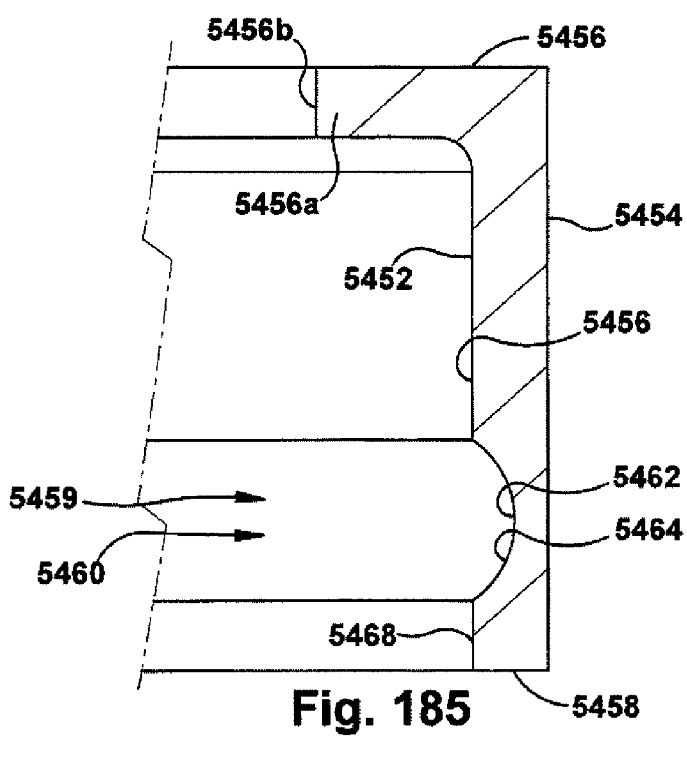
Figure 186:
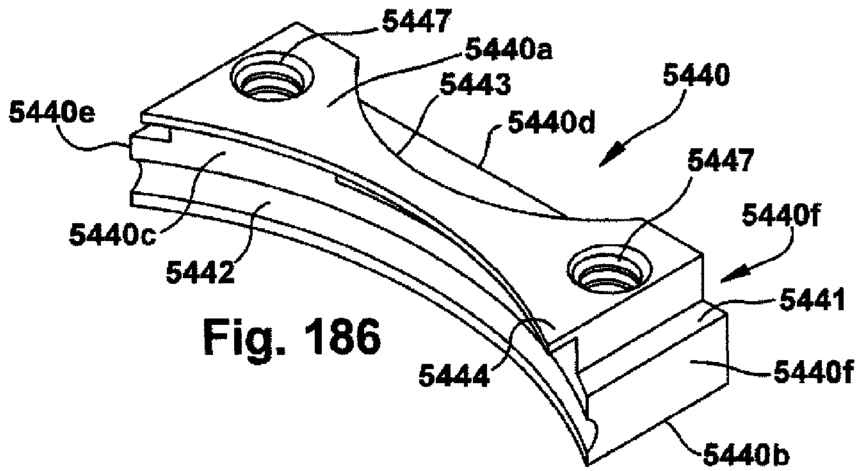
Figure 187:
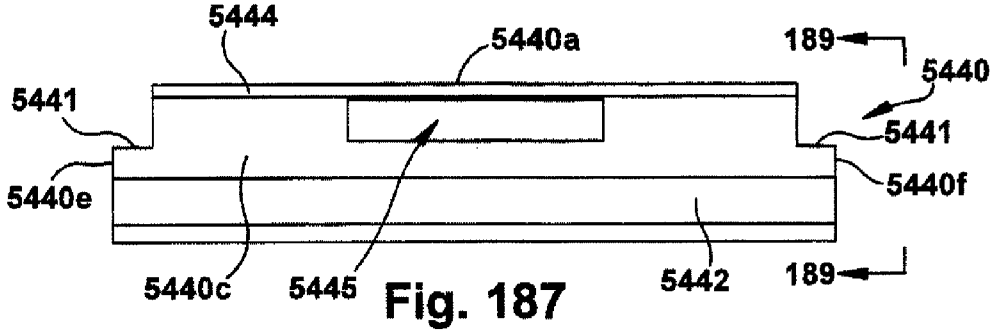
Figure 188:
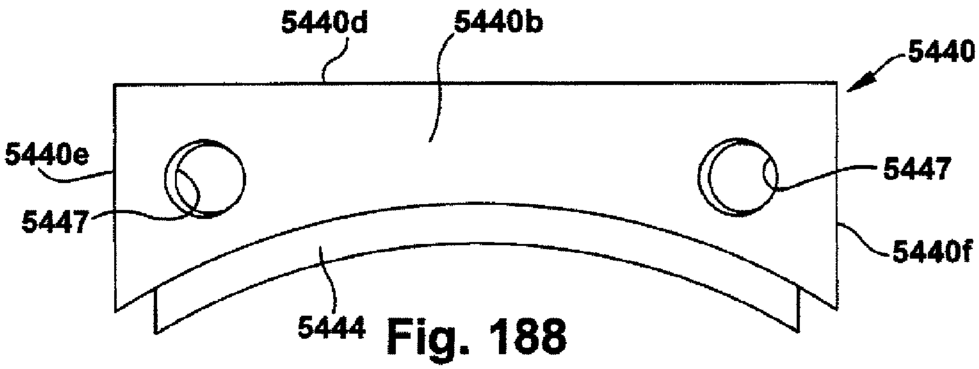
Figure 189:
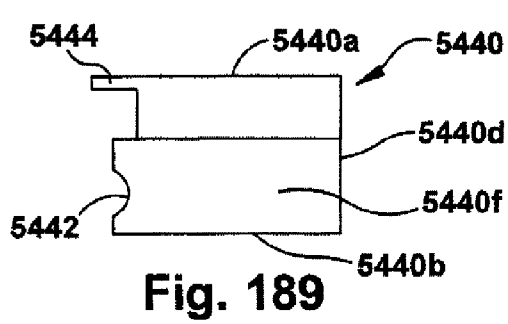
Figure 190:
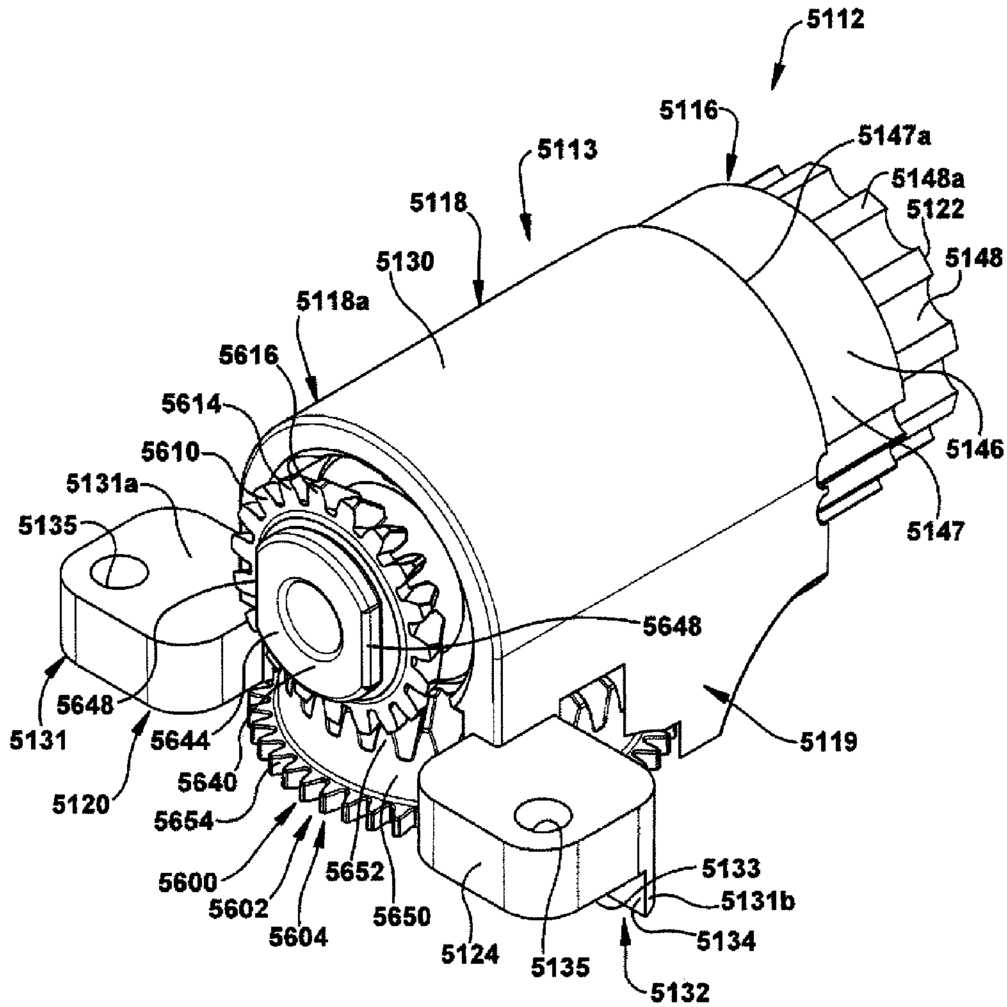
Figure 194:
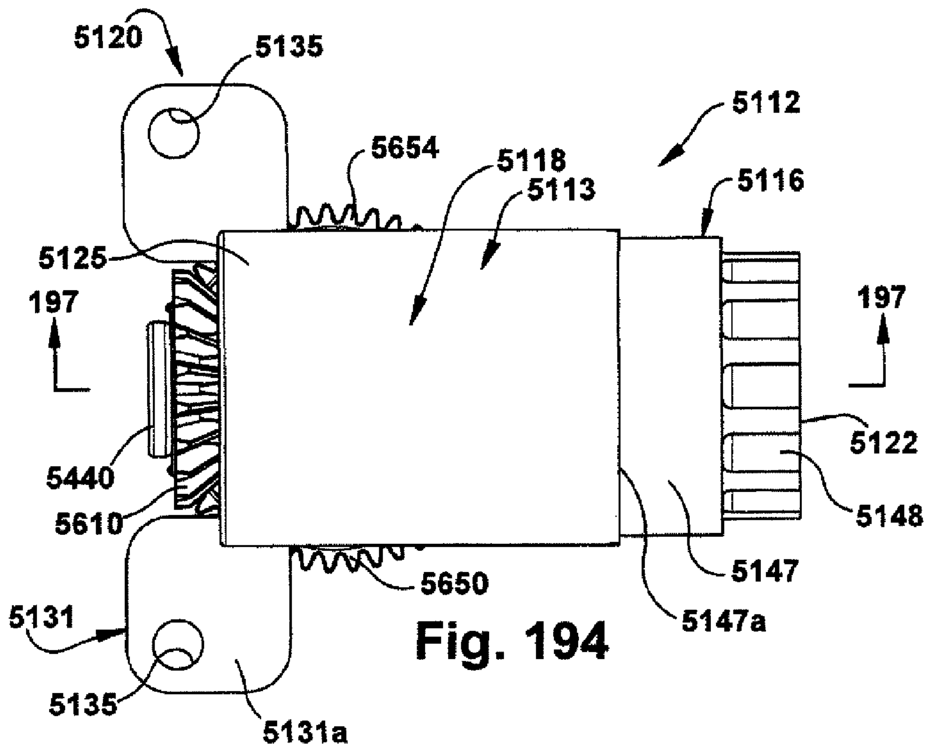
Figure 195:
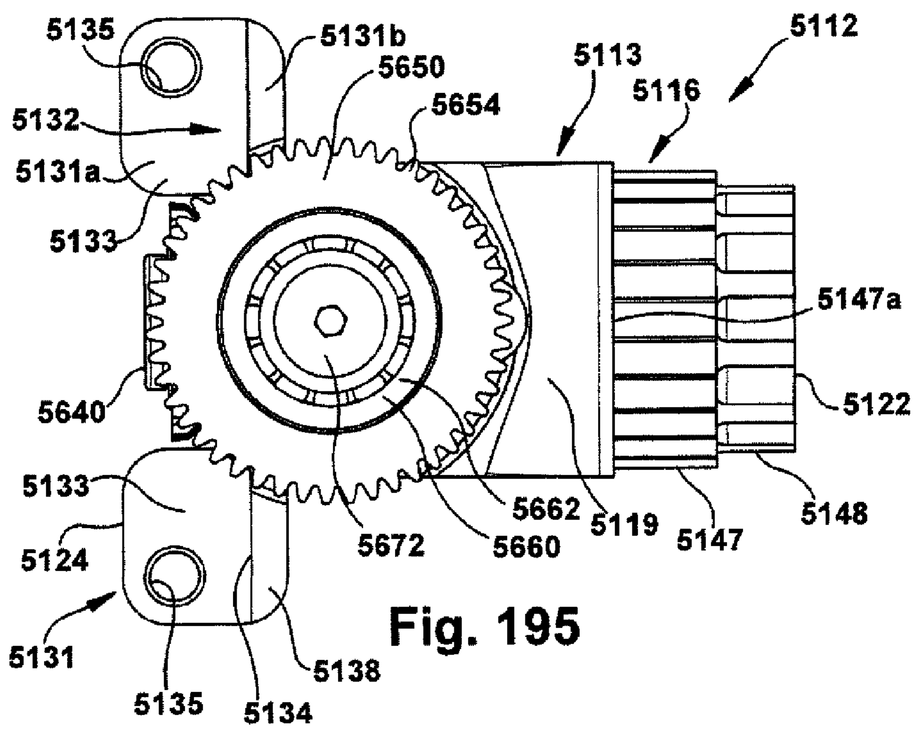
Figure 196:
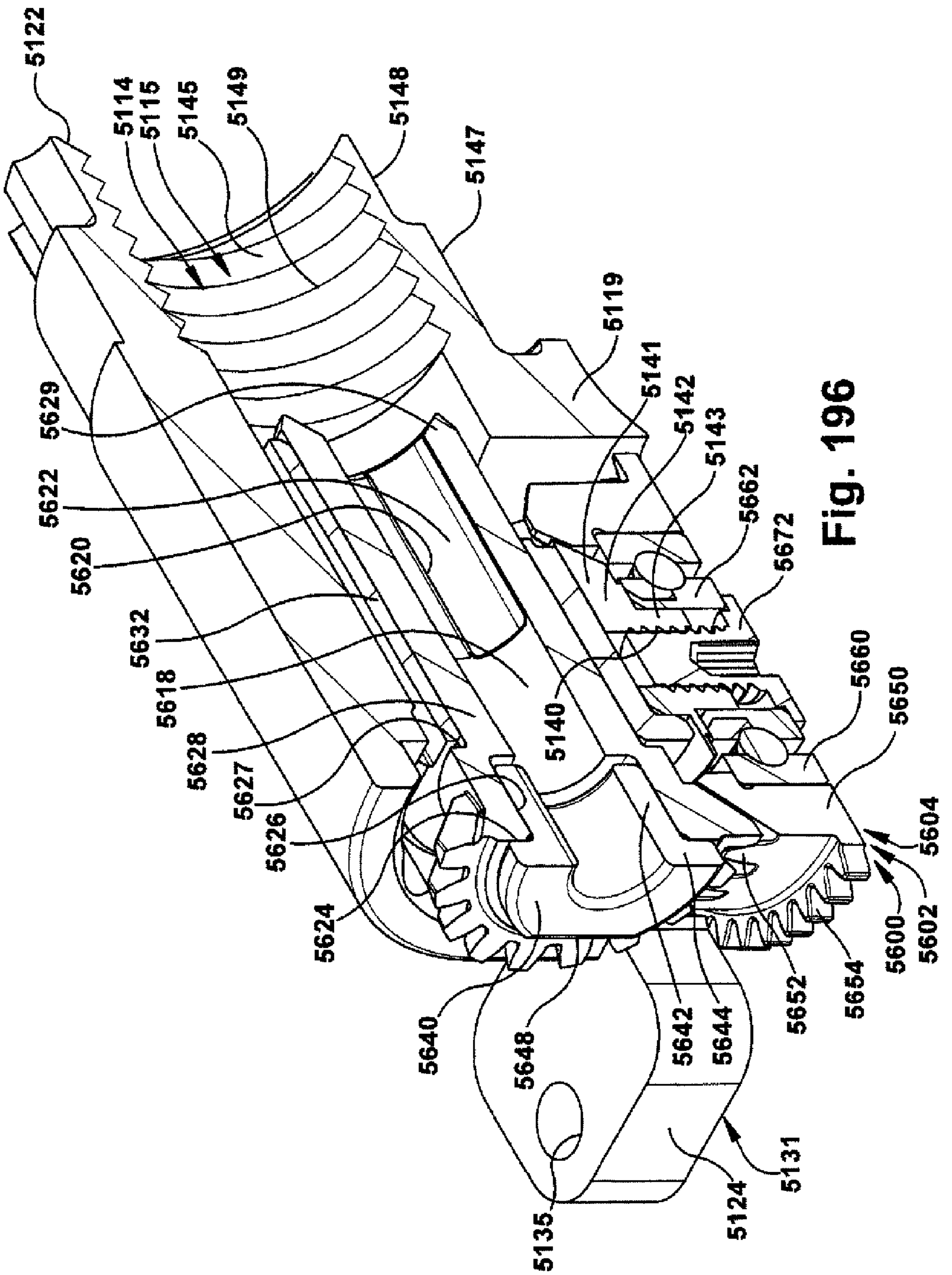
Figure 197:
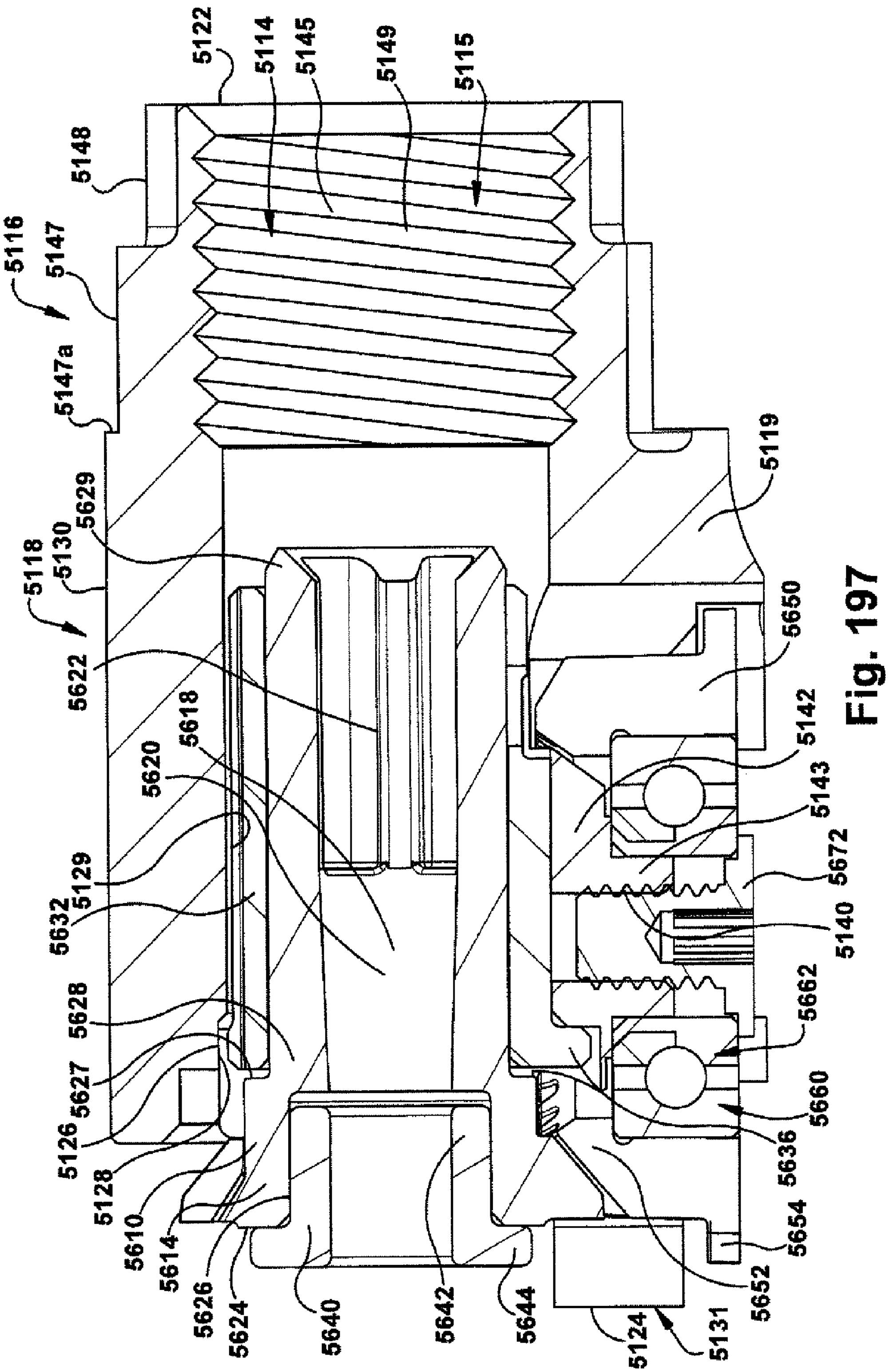
Figure 198:
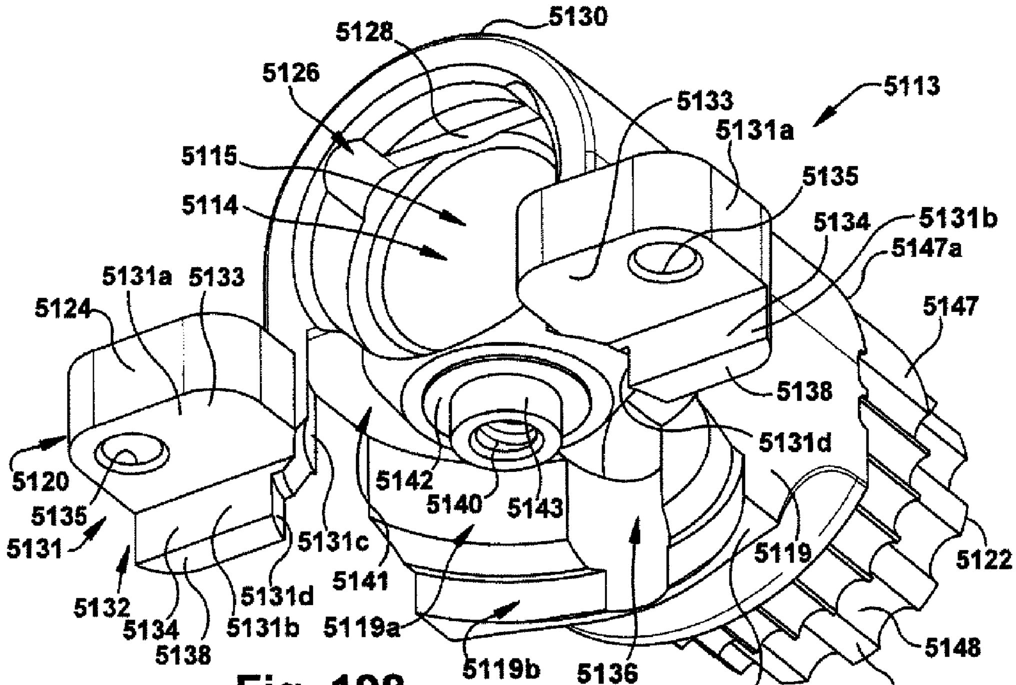
Figure 199:
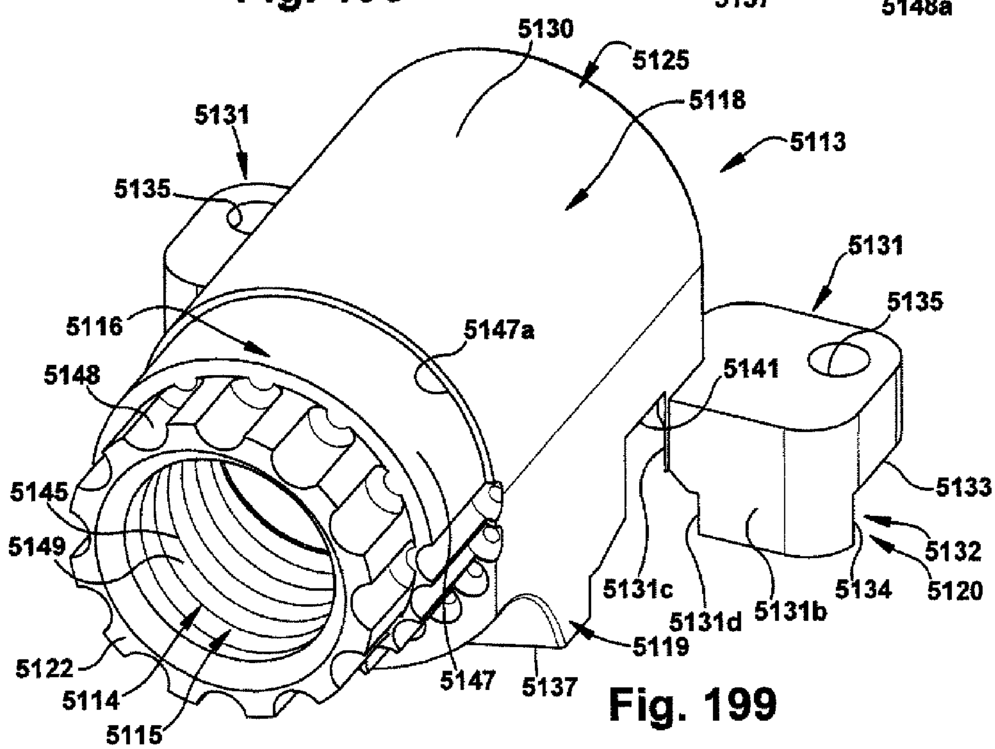
Figure 200:
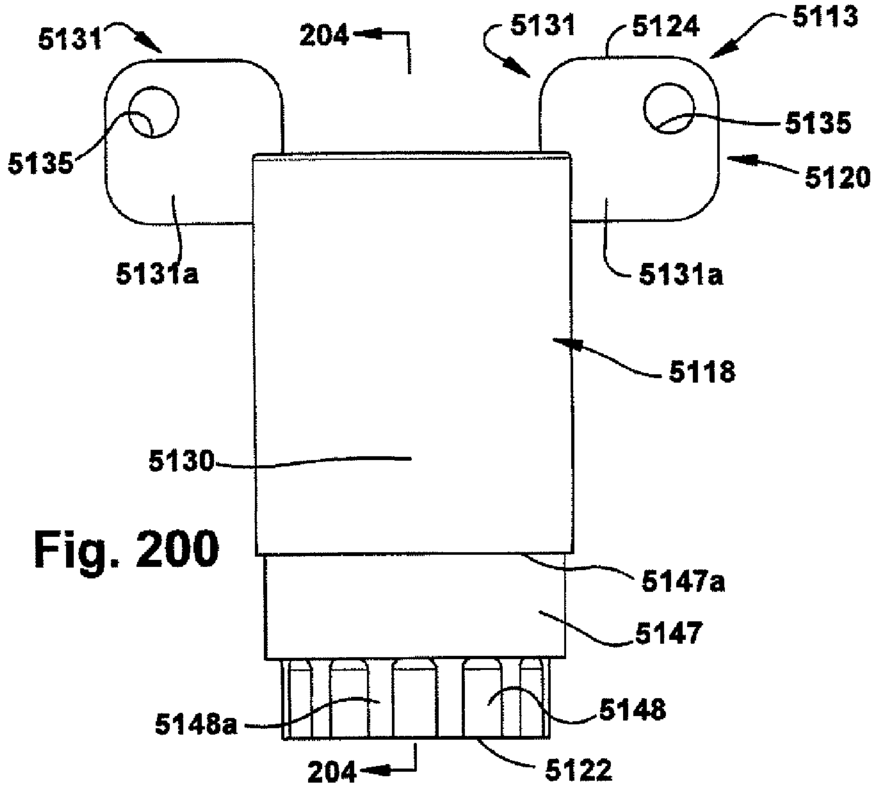
Figure 201:
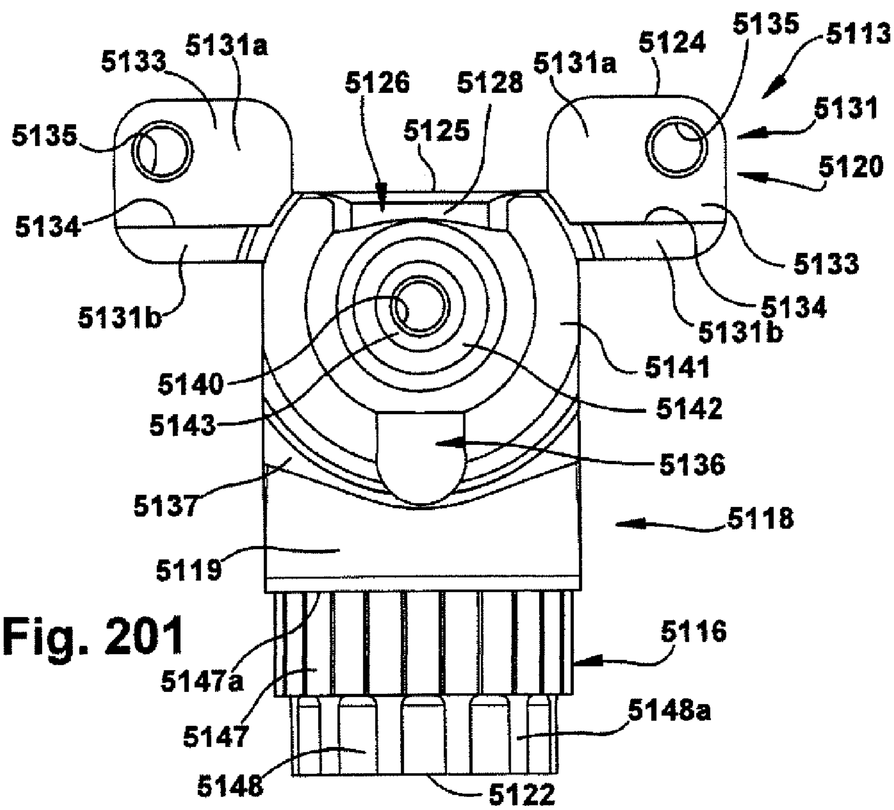
Figure 202:
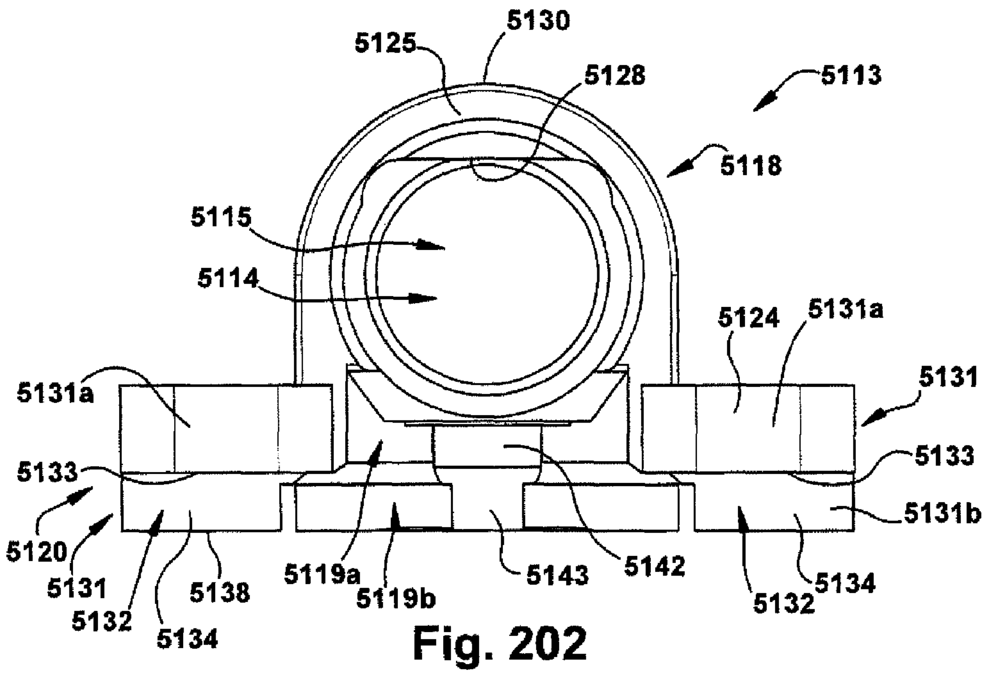
Figure 203:
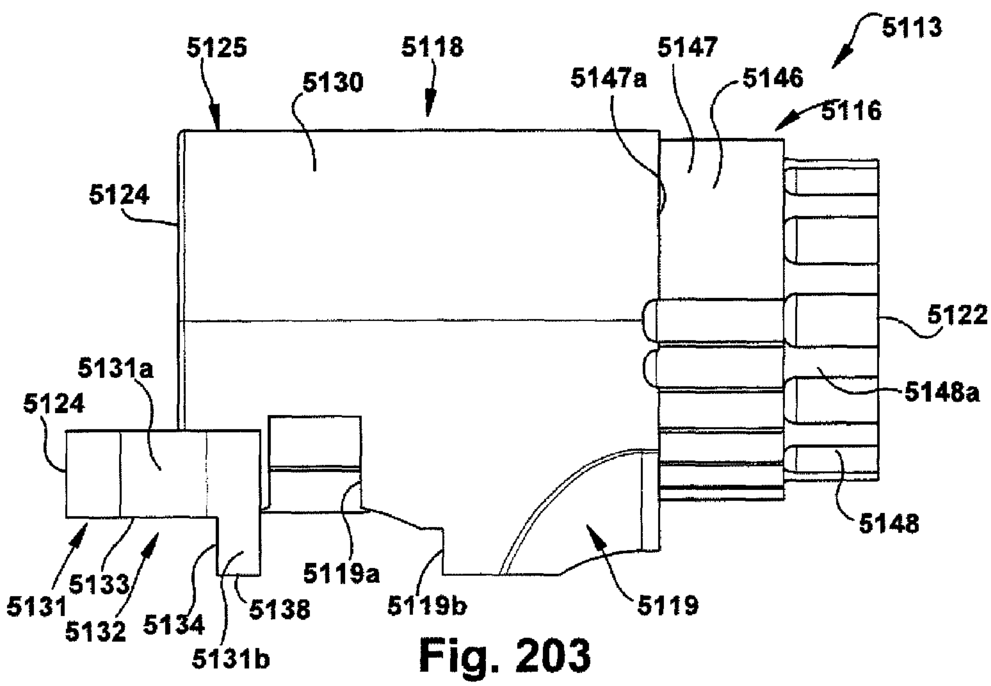
Figure 204:
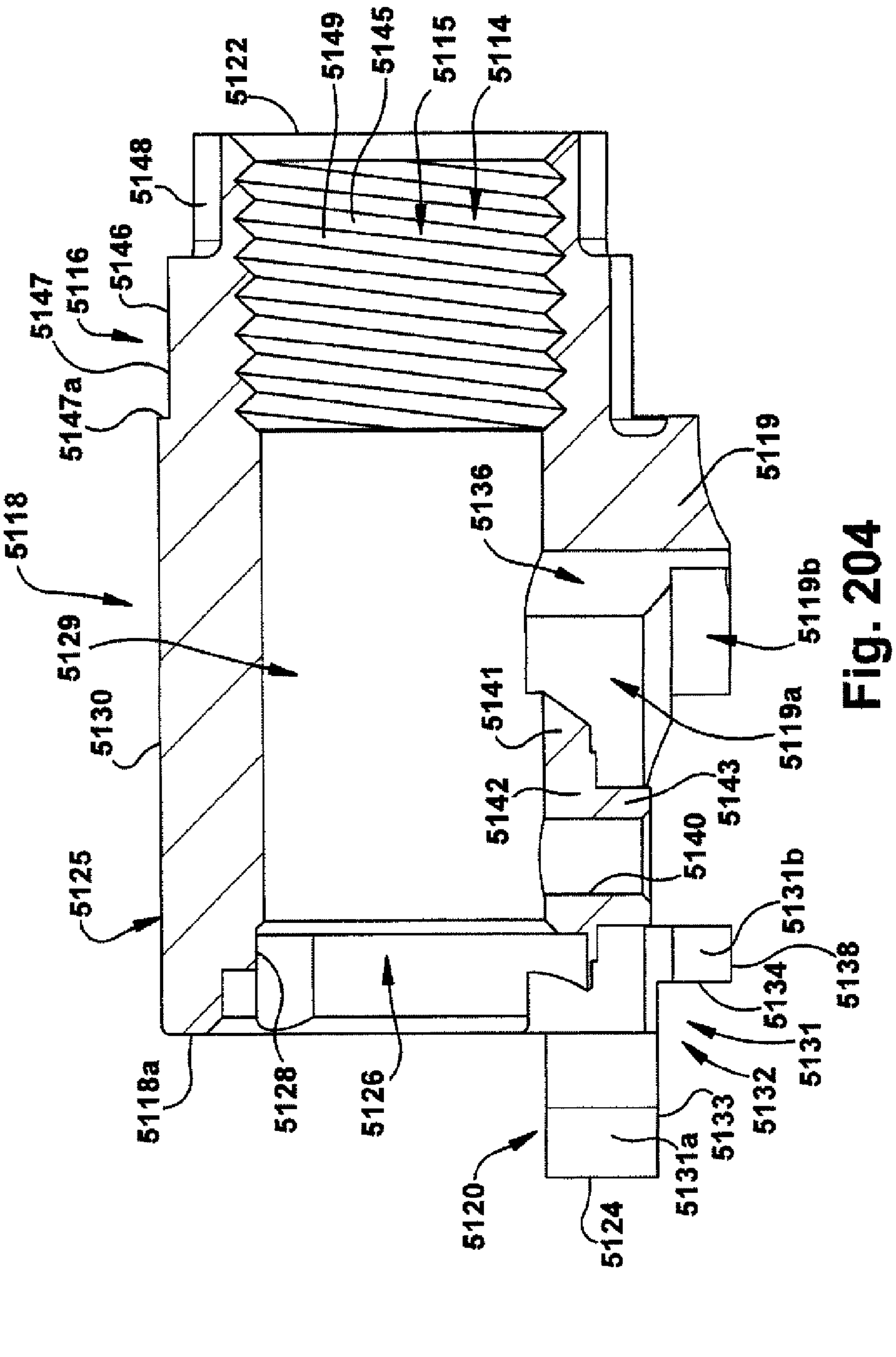
Figure 205:
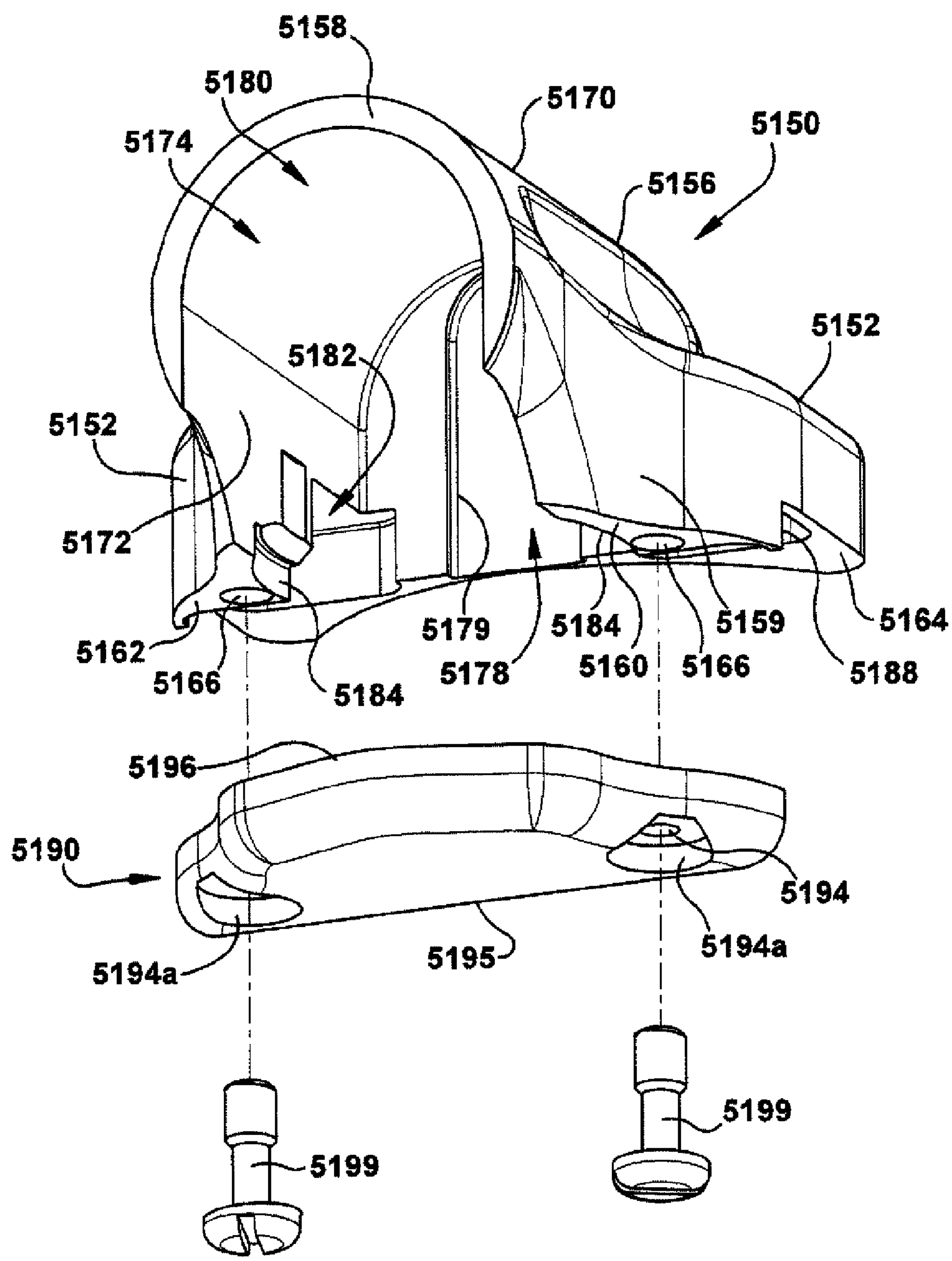
Figure 206:
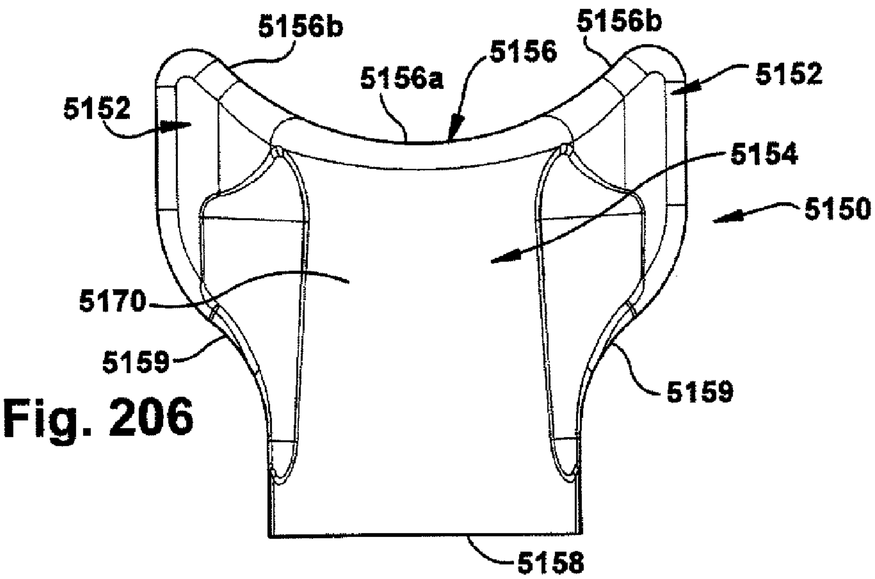
Figure 207:
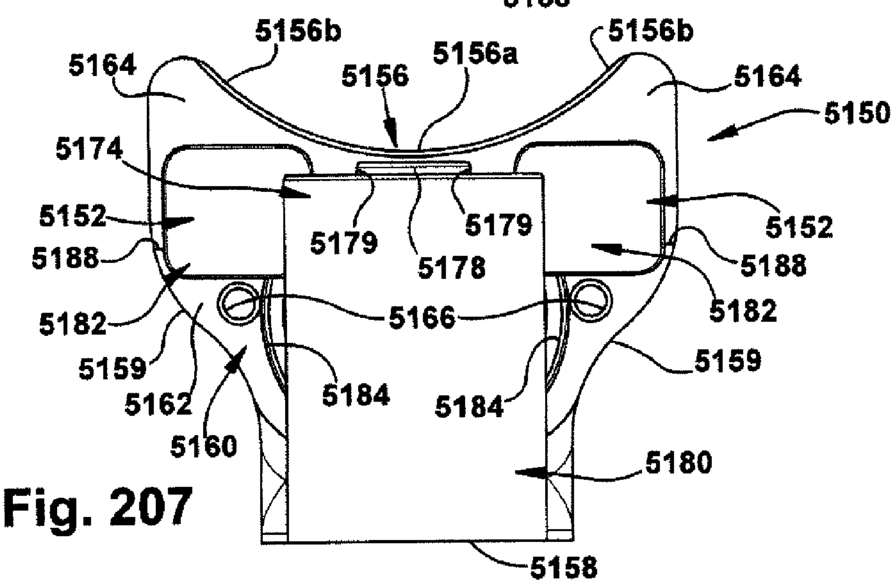
Figure 208:
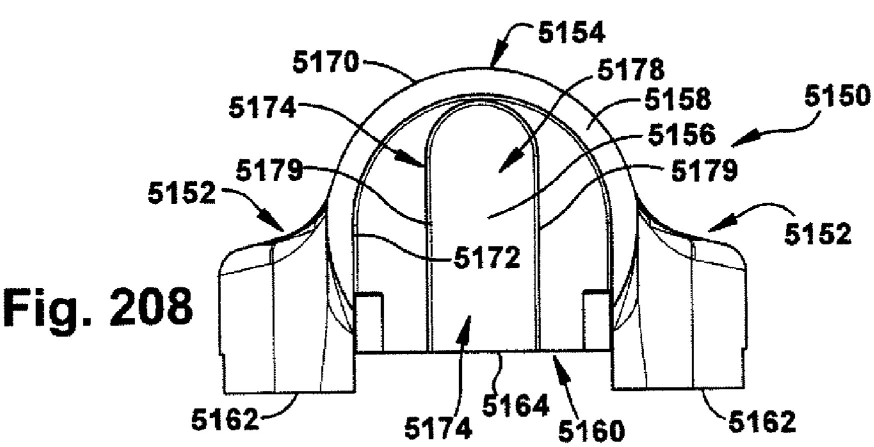
Figure 209:
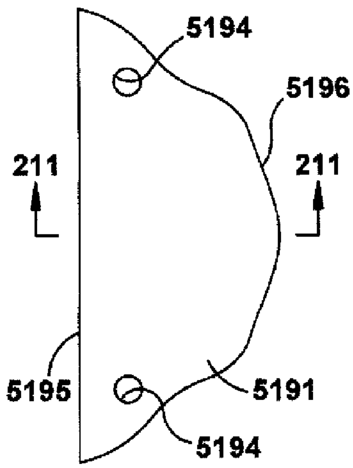
Figure 210:
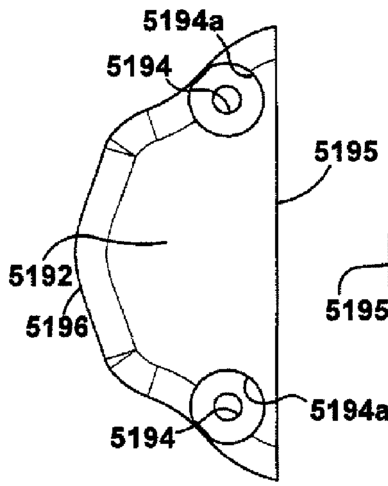
Figure 211:
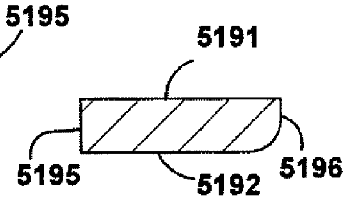
Figure 212:
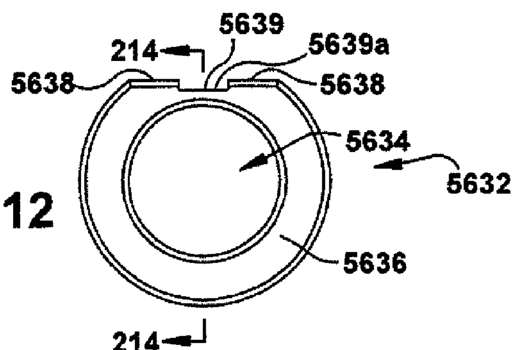
Figure 213:
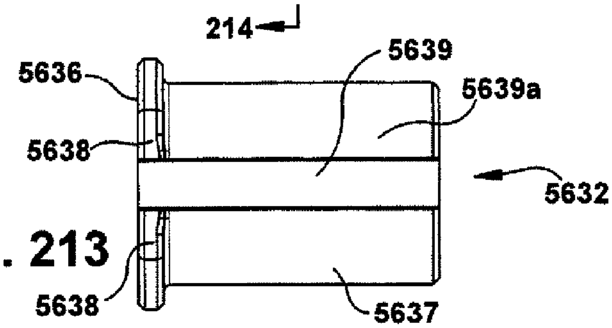
Figure 214:
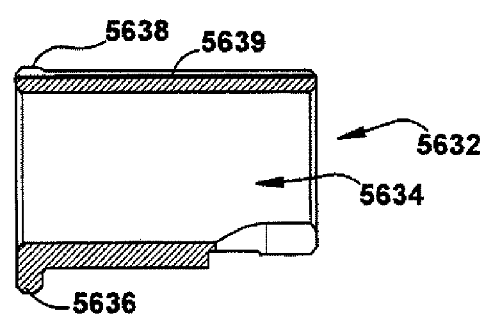

FIG. 125 is a schematic bottom plan view of the gearbox assembly of the power operated rotary knife of FIG. 101;

FIG. 126 is a schematic longitudinal section view of the gearbox housing of the power operated rotary knife of FIG. 101;

FIG. 127 is a schematic top plan view of the pinion gear cover of FIG. 103 as seen from a plane indicated by the line 105-105 in FIG. 104;

FIG. 128 is a schematic side elevation view of the pinion gear of the gearbox assembly of the operated rotary knife of FIG. 101;

FIG. 129 is a schematic rear elevation view of the pinion gear of FIG. 128;

FIG. 130 is a schematic front perspective view of a fourth exemplary embodiment of a power operated rotary knife of the present disclosure including a head assembly, a handle assembly and a drive mechanism, the head assembly including a gearbox assembly, an annular rotary knife blade, a blade housing, and a blade-blade housing support or bearing structure;

FIG. 131 is a schematic exploded perspective view of the power operated rotary knife of FIG. 130;

FIG. 132 is a schematic exploded perspective view of a blade-blade housing combination of the head assembly of the power operated rotary knife of FIG. 130 including the rotary knife blade, the blade housing and the blade-blade housing bearing structure;

FIG. 133 is a schematic exploded perspective view of the gearbox assembly of the head assembly of the power operated rotary knife of FIG. 130 including a gearbox, a gearbox housing, a frame body and a frame body cover;

FIG. 134 is a schematic top plan view of the power operated rotary knife of FIG. 130;

FIG. 135 is a schematic bottom plan view of the power operated rotary knife of FIG. 130;

FIG. 136 is a schematic front elevation view of the power operated rotary knife of FIG. 130;

FIG. 137 is a schematic rear elevation view of the power operated rotary knife of FIG. 130;

FIG. 138 is a schematic right side elevation view of the power operated rotary knife of FIG. 130;

FIG. 139 is a schematic section view along a longitudinal axis of the power operated rotary knife of FIG. 130 as seen from a plane indicated by the line 139-139 in FIG. 134;

FIG. 139A is a schematic enlarged section view of portions of the head assembly and the handle assembly shown in FIG. 139 that are within a dashed circle labeled FIG. 139A in FIG. 139;

FIG. 140 is a schematic top plan view of a blade-blade housing combination of the head assembly of the power operated rotary knife of FIG. 130 including the rotary knife blade, the blade housing, and the blade-blade housing bearing structure, with a blade housing plug removed from a blade housing plug opening of the blade housing;

FIG. 141 is a schematic rear elevation view of the blade-blade housing combination of FIG. 140;

FIG. 142 is a schematic section view of the blade-blade housing combination of FIG. 140 as seen from a plane indicated by the line 142-142 in FIG. 140;

FIG. 143 is a schematic bottom perspective view of the rotary knife blade of the power operated rotary knife of FIG. 130;

FIG. 144 is a schematic section view of the knife blade of FIG. 143;

FIG. 145 is a schematic right side elevation view of the blade housing and blade housing plug of the power operated rotary knife of FIG. 130;

FIG. 146 is a schematic rear elevation view of the blade housing of FIG. 145 showing a blade housing plug opening of a mounting section of the blade housing;

FIG. 147 is a schematic section view of the blade housing of FIG. 145 looking toward the mounting section from an interior of the blade housing;

FIG. 148 is a schematic exploded front elevation view of the gearbox assembly of the power operated rotary knife of FIG. 130 with a pinion gear of the gearbox assembly removed;

FIG. 149 is a schematic right side elevation view of the gearbox assembly with the pinion gear, the frame body and a frame body bottom cover of the gearbox assembly removed;

FIG. 150 is a schematic rear elevation view of the frame body of the gearbox assembly of the power operated rotary knife of FIG. 130;

FIG. 151 is a schematic bottom plan view of the frame body of FIG. 150;

FIG. 152 is a top plan view of a frame body bottom cover of the head assembly of the power operated rotary knife of FIG. 130;

FIG. 153 is a schematic front, bottom perspective view of the gearbox housing of the gearbox assembly of the power operated rotary knife of FIG. 150;

FIG. 154 is a schematic rear, top perspective view of the gearbox housing of FIG. 153;

FIG. 155 is a schematic front perspective view of a fifth exemplary embodiment of a power operated rotary knife of the present disclosure including a head assembly, a handle assembly and a drive mechanism, the head assembly including a gearbox assembly, an annular rotary knife blade, a blade housing, and a blade-blade housing support or bearing structure;

FIG. 156 is a schematic exploded perspective view of the power operated rotary knife of FIG. 155;

FIG. 157 is a schematic perspective view of the head assembly of the power operated rotary knife of FIG. 155, including the gearbox assembly, the rotary knife blade, the blade housing, and the blade-blade housing support or bearing structure;

FIG. 158 is a schematic exploded perspective view of the head assembly of FIG. 157;

FIG. 159 is a schematic top plan view of the head assembly of FIG. 157;

FIG. 160 is a schematic bottom plan view of the head assembly of FIG. 157;

FIG. 161 is a schematic right side elevation view of the head assembly of FIG. 157;

FIG. 162 is a schematic front elevation view of the head assembly of FIG. 157;

FIG. 163 is a schematic rear perspective view of the head assembly of FIG. 157;

FIG. 164 is a schematic longitudinal section view of the head assembly of FIG. 157 as seen from a plane indicated by the line 164-164 in FIG. 159;

FIG. 165 is a schematic exploded rear perspective view of the head assembly of FIG. 157;

FIG. 166 is a schematic front perspective view of a blade-blade housing combination of the head assembly of the power operated rotary knife of FIG. 155 including an assembled combination of the rotary knife blade, the blade housing, and the blade-blade housing bearing structure;

FIG. 167 is a schematic rear perspective view top plan view of a blade-blade housing combination of FIG. 166;

FIG. 168 is a schematic top plan view of the blade-blade housing combination of FIG. 166;

FIG. 169 is a schematic bottom plan view of the blade-blade housing combination of FIG. 166;

FIG. 170 is a schematic right side elevation view of the blade-blade housing combination of FIG. 166;

FIG. 171 is a schematic rear elevation view of the blade-blade housing combination of FIG. 166;

FIG. 172 is a schematic rear perspective view of the blade-blade housing combination of FIG. 166 with a blade housing plug removed from the blade housing to show portions of the rotary knife blade and the blade-blade housing bearing structure;

FIG. 173 is a schematic top plan view of the blade-blade housing combination of FIG. 166 with the blade housing plug removed from the blade housing to show portions of the rotary knife blade and the blade-blade housing support structure;

FIG. 174 is a schematic exploded rear perspective view of the blade-blade housing combination of FIG. 166;

FIG. 175 is a schematic enlarged section view of the assembled combination of the blade-blade housing combination of FIG. 166 as seen from a plane indicated by the line 175-175 in FIG. 173;

FIG. 176 is a schematic top plan view of the annular rotary knife blade of the power operated rotary knife of FIG. 155;

FIG. 177 is a schematic bottom plan view of the annular rotary knife blade of FIG. 176;

FIG. 178 is schematic front elevation view of the annular rotary knife blade of FIG. 176;

FIG. 179 is a schematic section view of the annular rotary knife blade of FIG. 176, as seen from a plane indicated by the line 179-179 in FIG. 176;

FIG. 180 is a schematic top plan view of the blade housing of the power operated rotary knife of FIG. 155, with the blade housing plug removed;

FIG. 181 is a schematic bottom plan view of the blade housing of FIG. 180;

FIG. 182 is a schematic right side elevation view of the blade housing of FIG. 180;

FIG. 183 is a schematic rear elevation view of the blade housing of FIG. 180 showing the mounting section of the blade housing, FIG. 184 is a schematic section view of the blade housing of FIG. 180 looking toward the mounting section from an interior of the blade housing, as seen from a plane indicated by the line 184-184 in FIG. 180;

FIG. 185 is a schematic enlarged section view of a portion of the blade housing of FIG. 180 that is within a dashed circle labeled FIG. 185 in FIG. 184;

FIG. 186 is a schematic that is removably secured to the blade housing of FIG. 180;

FIG. 187 is a schematic front elevation view of the blade housing plug of FIG. 186;

FIG. 188 is a schematic bottom plan view of the blade housing plug of FIG. 186;

FIG. 189 is a schematic side elevation view of the blade housing plug of FIG. 186 as seen from a plane indicated by the line 189-189 in FIG. 187;

FIG. 190 is a schematic front perspective view of the gearbox assembly of the power operated rotary knife of FIG. 155, including a gearbox housing and a gear train, with a gearbox housing cover removed;

FIG. 191 is a schematic front elevation view of the gearbox assembly of FIG. 190;

FIG. 192 with a schematic rear elevation view of the gearbox assembly of FIG. 190;

FIG. 193 is a schematic right side elevation view of the gearbox assembly of FIG. 190;

FIG. 194 is a schematic top elevation view of the gearbox assembly of FIG. 190;

FIG. 195 is a schematic bottom elevation view of the gearbox assembly of FIG. 190;

FIG. 196 is a schematic front perspective section view of the gearbox assembly of FIG. 190, as seen from a plane indicated by the line 196-196 in FIG. 194;

FIG. 197 is a schematic longitudinal perspective view of the gearbox assembly of FIG. 190, as seen from a plane indicated by the line 196-196 in FIG. 194;

FIG. 198 is a schematic front, bottom perspective view of a gearbox housing of the gearbox assembly of the power operated rotary knife of FIG. 155;

FIG. 199 is a schematic rear, top perspective view of the gearbox housing of FIG. 198;

FIG. 200 is a schematic top plan view of the gearbox housing of FIG. 198;

FIG. 201 is a schematic bottom plan view of the gearbox housing of FIG. 198;

FIG. 202 is a schematic front elevation view of the gearbox housing of FIG. 198;

FIG. 203 is a schematic right side elevation view of the gearbox housing of FIG. 198;

FIG. 204 is a schematic longitudinal section view of the gearbox housing of FIG. 198, as seen from a plane indicated by the line 204-204 in FIG. 200;

FIG. 205 is a schematic rear, bottom perspective view of the frame body and frame body bottom cover of the head assembly of the power operated rotary knife of FIG. 155;

FIG. 206 is a schematic top plan view of the frame body of FIG. 205;

FIG. 207 is a schematic bottom plan view of the frame body of FIG. 205;

FIG. 208 is a schematic rear elevation view of the frame body of FIG. 205;

FIG. 209 is a schematic top plan view of the frame body bottom cover of FIG. 205;

FIG. 210 is a schematic bottom plan view of the frame body bottom cover of FIG. 205;

FIG. 211 is a schematic section view of the frame body bottom cover of FIG. 205 as seen from a plane indicated by the line 211-211 in FIG. 209;

FIG. 212 is a schematic front elevation view of a sleeve bushing of a pinion gear bearing support assembly of the gearbox assembly of the power operated rotary knife of FIG. 155;

FIG. 213 is a schematic top plan view of the sleeve bushing of FIG. 212; and FIG. 214 is a schematic longitudinal section view the sleeve bushing of FIG. 212, as seen from a plane indicated by the line 214-214 in FIG. 213.

DETAILED DESCRIPTION

First Exemplary Embodiment

Power Operated Rotary Knife 100

Overview

Designers of power operated rotary knives are constantly challenged to improve the design of such knives with respect to multiple objectives. For example, there is a desire for increasing the rotational speed of the rotary knife blade of a power operated rotary knife. Generally, increasing blade rotational speed reduces operator effort required for cutting and trimming operations. There is also a desire for reducing the heat generated during operation of the power operated rotary knife. One source of generated heat is the blade-blade housing bearing interface, that is, heat generated at the bearing interface between the rotating knife blade and the stationary blade housing. Reducing generated heat during power operated rotary knife operation will tend to increase the useful life of various knife components. Additionally, reducing generated heat during knife operation will tend to reduce undesirable "cooking" of the product being cut or trimmed. If sufficient heat is generated in the bearing region of the rotary knife blade and blade housing, dislodged pieces or fragments of a product being cut or trimmed (e.g., small pieces or fragments of fat, gristle or meat dislodged during a trimming or cutting operations) in proximity to the bearing region may become so hot that the pieces "cook". The cooked materials tend to gum up the blade and blade housing bearing region resulting in even more undesirable heating.

There is further a desire for reducing the vibration of a power operated rotary knife during operation for purposes of improved operator ergonomics and, consequently, improved operator productivity. There is also a desire for increasing the useful life of components of a power operated rotary knife. Areas of potential improvement include the design of the rotary knife blade, the blade housing, the blade-blade housing bearing interface or bearing structure that supports the knife blade for rotation in the blade housing, and the gearing that rotatably drives the rotary knife blade in the blade housing.

Many conventional power operated rotary knives include a so-called split ring, annular blade housing. A split ring or split annular blade housing is one that includes a split through a diameter of the blade housing. The split allows for expansion of a circumference of the blade housing for purposes of removing a rotary knife blade that needs to be sharpened or is at the end of its useful life and inserting a new rotary knife blade. A split ring blade housing has several inherent disadvantages. Because of the split, a split ring blade housing is weaker than a blade housing without a split. Further, the split, which defines a discontinuity along the rotational path of the knife blade, is often a collection point for fragments of meat, fat, gristle and/or bones that are created during a cutting or trimming operation. Accumulation of such fragment or debris in the region of the split may generate heat and/or potentially result in increased vibration of the power operated rotary knife, both of which are undesirable results.

Additionally, a split ring blade housing requires operator adjustment of the blade housing circumference as the rotary knife blade wears. Given the large loading forces applied to the blade when cutting and trimming meat, wear will occur between the bearing structure of the blade and the corresponding bearing structure of the blade housing that support the blade for rotation within the blade housing. In some power operated rotary knives, the blade-blade housing bearing structure includes a portion of a radial outer surface of the rotary knife blade which serves as a bearing structure of the blade and a portion of a radial inner surface of the blade housing which serves as the corresponding or mating bearing structure of the blade housing. In such power operated rotary knifes, the outer radial surface of the blade and the corresponding radial inner surface of the blade housing will wear over time resulting in a gradual loosening of the rotary knife blade within the blade housing.

In certain power operated rotary knives, the blade-blade housing bearing structure comprises an inwardly extending bead of the blade housing that extends into a bearing race formed in a radial outer surface of the rotary knife blade to support the blade for rotation in the blade housing. Again, the bearing race of the blade and the bearing bead of the blade housing will wear over time resulting in looseness of the rotary knife blade within the blade housing. As the rotary knife blade becomes looser within the blade housing, the power operated rotary knife will typically experience increased vibration. An inexperienced operator may simply accept the increased vibration of the power operated rotary knife as a necessary part of using such a knife and will reduce his or her productivity by cutting or trimming at a slower pace, turning the knife off, taking additional time between cuts, etc.

An experienced operator may recognize that a potential solution to the problem of increased vibration is to adjust, that is, reduce the blade housing circumference, i.e., reduce the effective blade housing diameter, to account for the blade and blade housing bearing interface wear. Such an adjustment of the blade housing circumference is a trial and error technique that requires the operator to find a suitable operating clearance. Operating clearance can be viewed as striking a proper balance between providing sufficient blade-blade housing bearing clearance, that is, having the bearing diameter of the blade housing sufficiently larger than the corresponding mating bearing diameter of the knife blade such that the knife blade freely rotates in the blade housing while at the same time not having too much clearance that would cause the knife blade to have excessive play and/or vibrate in the blade housing.

However, even for an experience operator, adjustment of the blade housing circumference may be problematic. If the operator fails to appropriately adjust the blade housing circumference, i.e., find a suitable operating clearance, the power operated rotary knife may not function properly. If the operator's adjustment leads to insufficient operating clearance, the knife blade will not rotate freely in the blade housing, that is, the knife blade will tend to bind in the blade housing thereby generating heat and tending to increase the wear of the rotary knife blade, blade housing and drive gear components, all undesirable results. Depending on the degree of binding, the rotary knife blade may lock-up within the housing. On the other hand if the operator adjusts the blade housing circumference such that the operating clearance is too large, the knife blade will be loose in the blade housing. This may result in excessive movement of the knife blade within the blade housing and attendant problems of excessive vibration of the power operated rotary knife during operation.

Further, even if the operator is successful in adjusting the blade housing to an acceptable circumference, adjustment of the blade housing circumference necessarily requires the operator to cease cutting/trimming operations with the power operated rotary knife during the trial and error adjustment process. The adjustment process results in downtime and lost operator productivity. Finally, since wear of the rotary knife blade and blade housing bearing interface is ongoing as the power operated rotary knife continues to be used for cutting and trimming operations, the blade housing circumference adjustment undertaken by the operator is only a temporary fix as further wear occurs.

The present disclosure relates to a power operated rotary knife that addresses many of the problems associated with conventional power operated rotary knives and objectives of power operated rotary knife design. One exemplary embodiment of a power operated rotary knife of the present disclosure is schematically shown generally at 100 in FIGS. 1-9. The power operated rotary knife 100 comprises an elongated handle assembly 110 and a head assembly or head portion 111 removably coupled to a forward end of the handle assembly 110. The handle assembly 110 includes a hand piece 200 that is secured to the head assembly 111 by a hand piece retaining assembly 250.

In one exemplary embodiment, the head assembly 111 includes a continuous, generally ring-shaped or annular rotary knife blade 300, a continuous, generally ring-shaped or annular blade housing 400, and a blade-blade housing support or bearing structure 500. Annular, as used herein, means generally ring-like or generally ring-shaped in configuration. Continuous annular, as used herein, means a ring-like or ring-shape configuration that is continuous about the ring or annulus, that is, the ring or annulus does not include a split extending through a diameter of the ring or annulus. The head assembly 111 further includes a gearbox assembly 112 and a frame or frame body 150 for securing the rotary knife blade 300 and the blade housing 400 to the gearbox assembly 112.

The rotary knife blade 300 rotates in the blade housing 400 about a central axis of rotation R. In one exemplary embodiment, the rotary knife blade 300 includes a bearing surface 319 and a driven gear 328. Both the bearing race 319 and the driven gear 328 are axially spaced from an upper end 306 of a body 302 of the blade 300 and from each other. The rotary knife blade 300 is supported for rotation in the blade housing 400 by the blade-blade housing support or bearing structure 500 of the present disclosure (best seen in FIGS. 2A and 14). The blade-blade housing bearing structure 500 advantageously both supports the rotary knife blade 300 for rotation with respect to the blade housing 400 and releasably secures the rotary knife blade 300 to the blade housing 400.

In one exemplary embodiment, the blade-blade housing bearing structure 500 includes an elongated rolling bearing strip 502 (FIG. 14) having a plurality of spaced apart rolling bearings 506 supported in a flexible separator cage 508. The elongated rolling bearing strip 502 is disposed in an annular passageway 504 (FIG. 13) formed between opposing bearing surfaces 319, 459 of the rotary knife blade 300 and the blade housing 400, respectfully. The blade-blade housing bearing structure 500 defines a plane of rotation RP (FIGS. 7 and 8) of the rotary knife blade 300 with respect to the blade housing 400, the rotational plane RP being substantially orthogonal to the rotary knife blade central axis of rotation R.

In one exemplary embodiment, the plurality of rolling bearings 506 comprises a plurality of generally spherical ball bearings. The plurality of ball or rolling bearings 506 are in rolling contact with and bear against the opposing bearing surfaces 319, 459 of the rotary knife blade 300 and the blade housing 400 to support the knife blade 300 for rotation with respect to the blade housing 400 and secure the knife blade 300 with respect to the blade housing 400. The flexible separator cage 508 rotatably supports and locates the plurality of rolling bearings 506 in spaced apart relation within the annular passageway 504. The flexible separator cage 508 does not function as a bearing structure or provide a bearing surface with respect to the rotary knife blade 300 and the blade housing 400. The function of rotatably supporting the rotary knife blade 300 with respect to the blade housing 400 is solely provided by the rolling bearing support of the plurality of spaced apart ball bearings 506. This rolling bearing support can be contrasted with power operated rotary knives utilizing a sliding bearing structure. For example, U.S. Pat. No. 6,769,184 to Whited, discloses a sliding bearing structure comprising a blade housing having a plurality of circumferentially spaced, radially inwardly extending bead sections that extend into and bear against a bearing race or groove of a rotary knife blade and U.S. Published Application Pub. No. US 2007/0283573 to Levsen, which discloses a sliding bearing structure comprising an annular bushing having an elongated bushing body disposed along a groove in a blade housing and in contact with opposing bearing surfaces of a rotary knife blade and the blade housing.

Figure 13:
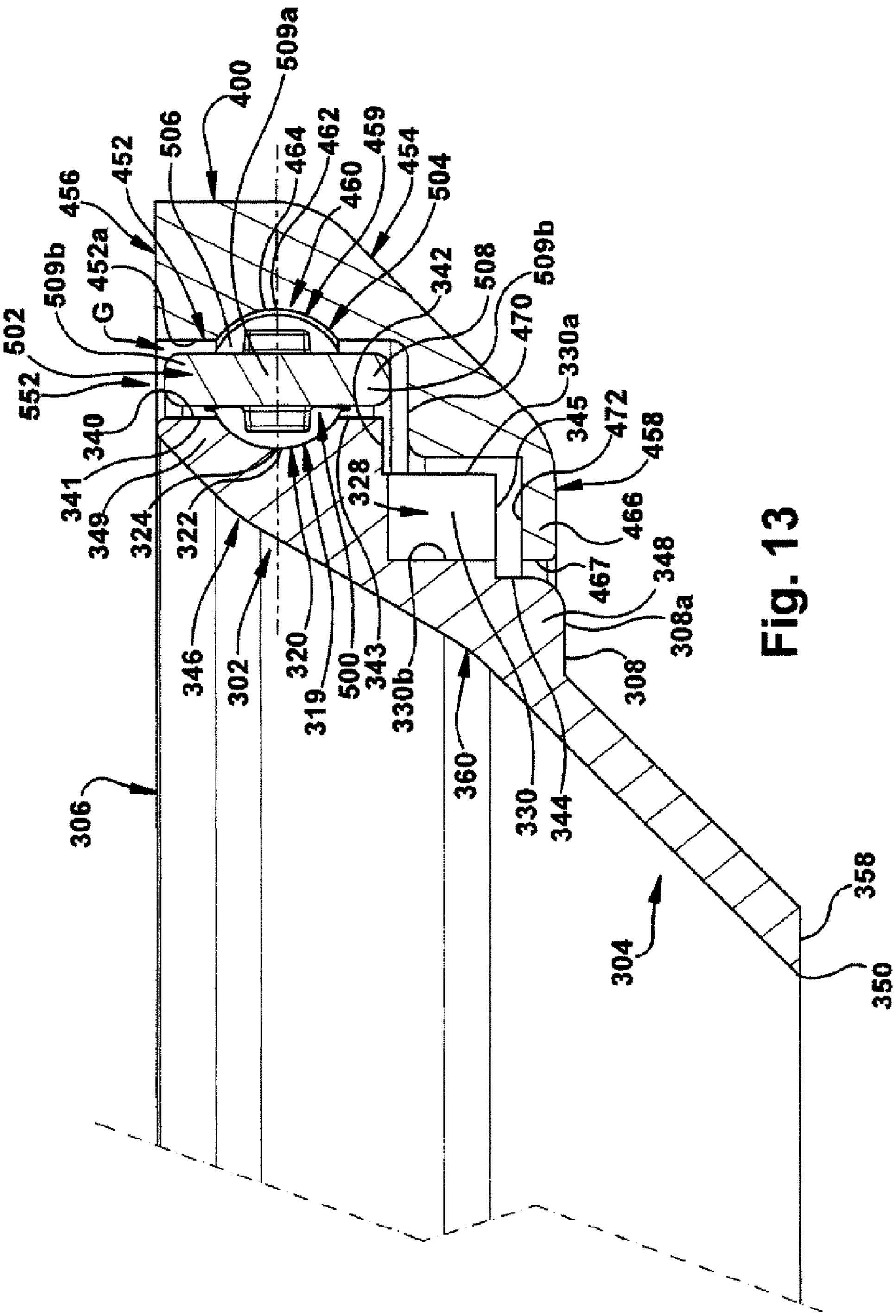
FIG. 13 is a schematic enlarged section view of the assembled combination of the rotary knife blade, the blade housing and the blade-blade housing bearing structure of the power operated rotary knife of FIG. 1 as seen from a plane indicated by the line 13-13 in FIG. 10.

As can best be seen in the sectional view of FIG. 13, the flexible separator cage 508 is configured to ride in the annular passageway 504 without substantial contact with either the knife blade 300 or the blade housing 400 or the opposing bearing surfaces 319, 459 of the knife blade 300 and blade housing. Indeed, it would not be desired for the flexible separator cage 508 to be in contact with or in bearing engagement with either the rotary knife blade 300 or the blade housing 400 as this would resulting in undesirable sliding friction. The blade-blade housing bearing structure 500 rotatably supports the knife blade 300 with respect to the blade housing 400 via rolling bearing support provided by the plurality of ball bearings 506 of the rolling bearing strip 502 bearing against the opposing bearing surfaces 319, 459 of the rotary knife blade 300 and the blade housing 400.

The rotational speed of a specific rotary knife blade 300 in the power operated rotary knife 100 will depend upon the specific characteristics of a drive mechanism 600 (shown schematically in FIG. 53) of the power operated rotary knife 100, including an external drive motor 800, a flexible shaft drive assembly 700, a gear train 604, and a diameter and gearing of the rotary knife blade 300. Further, depending on the cutting or trimming task to be performed, different sizes and styles of rotary knife blades may be utilized in the power operated rotary knife 100 of the present disclosure. For example, rotary knife blades in various diameters are typically offered ranging in size from around 1.4 inches in diameter to over 7 inches in diameter. Selection of a blade diameter will depend on the task or tasks being performed.

Increasing the rotational speed of the rotary knife blade of a power operated rotary knife is an important objective of designers of power operated rotary knives. The rolling bearing structure of the blade-blade housing bearing structure 500 of the present disclosure results in reduced friction, less generated heat and less surface wear than would be the case with a sliding or journal bearing structure. Because of the reduced friction and heat resulting from a rolling bearing structure, the rolling blade-blade housing bearing structure 500 permits increased rotational speed of the rotary knife blade 300 compared to the sliding bearing structures disclosed or used in prior power operated rotary knives.

By way of example only and without limitation, the following table compares blade rotational speed of two exemplary power operated rotary knives of the present disclosure versus the assignee's previous versions of those same models of power operated rotary knives. Of course, it should be appreciated the blade rotational speed increase will vary by model and will be dependent upon the specific characteristics of each particular model and blade size.

| Model | Approx. Blade Diameter | Approximate Blade Rotational Speed % Increase |
|---|---|---|
| 1000/1500 | 5.0 inches | 51% (930 RPM vs. 1,400 RPM) |
| 620 | 2.0 inches | 57% (1,400 RPM vs. 2,200 RPM) |

There are also significant advantages to using the flexible separator cage 508 to support and locate the plurality of rolling bearings 506, as opposed to, for example, using only a plurality of rolling bearings, such as ball bearings, inserted into a gap or passageway between the rotary knife blade and the blade housing. The flexible separator cage 508 facilitates insertion of and removal of, as a group, the plurality of rolling bearings 506 into and from the annular passageway 504. That is, it is much easier to insert the rolling bearing strip 502 into the annular passageway 504, as opposed to attempting to insert individual rolling bearings into the annular passageway 504 in a one-at-a-time, sequential order, which would be both time consuming and fraught with difficulty. This is especially true in a meat processing environment where a dropped or misplaced rolling bearing could fall into a cut or trimmed meat product. Similarly, removal of the plurality of rolling bearings 506, as a group, via removal of the rolling bearing strip 502 is much easier and less prone to dropping or losing rolling bearings than individually removing rolling bearings from the annular passageway 504.

Additionally, from the viewpoints of friction, bearing support and cost, utilizing the plurality of rolling bearings 506 supported in a predetermined, spaced apart relationship by the flexible separator cage 508, is more efficient and effective than utilizing a plurality of rolling bearings disposed loosely in a gap or passageway between the rotary knife blade and the blade housing. For example, the separator cage 508 allows for the plurality of rolling bearings 506 to be appropriately spaced to provide sufficient rolling bearing support to the rotary knife blade 300 given the application and characteristics of the product or material to be cut or trimmed with the power operated rotary knife 100, while at the same time, avoids the necessity of having more rolling bearings than required for proper bearing support of the rotary knife blade 500 and the application being performed with the power operated rotary knife 100.

For example, if the individual rolling bearings are tightly packed in a one-adjacent-the-next relationship in the annular passageway 504, more rolling bearings than needed for most applications would be provided, thereby unnecessarily increasing cost. Further, having more rolling bearings than needed would also increase total friction because of the friction between each pair of adjacent, in-contact, rolling bearings. If, on the other hand, the individual rolling bearings are loosely packed in the annular passageway 504, there is no control over the spacing between adjacent rolling bearings. Thus, there may be instances where a large gap or space may occur between two adjacent rolling bearings resulting in insufficient bearing support in a particular region of the annular passageway 504, given the cutting forces being applied to the rotary knife blade 300 during a specific cutting or trimming application or operation.

Figure 1:
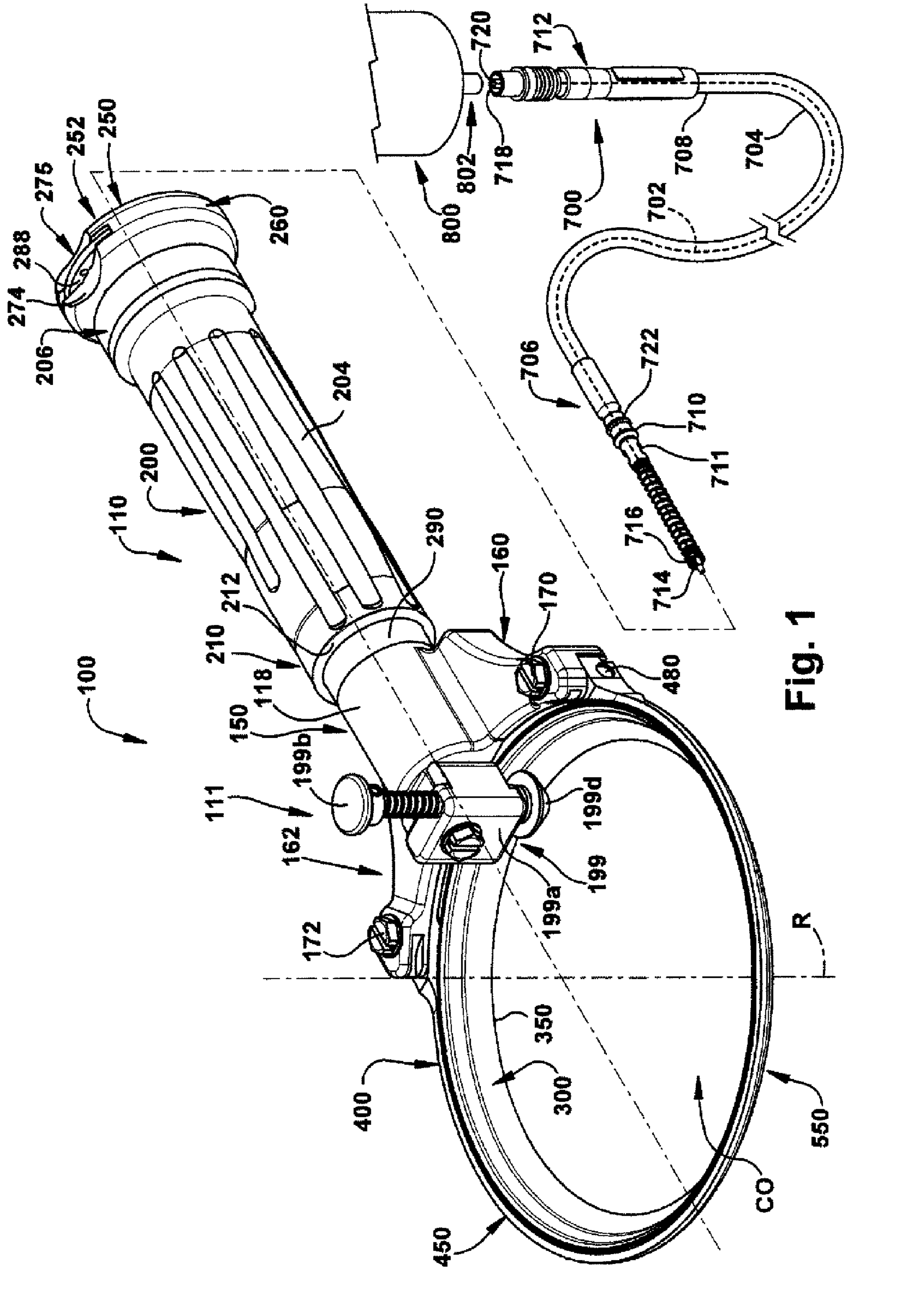
FIG. 1 is a schematic front perspective view of a first exemplary embodiment of a power operated rotary knife of the present disclosure including a head assembly, a handle assembly and a drive mechanism, the head assembly including a gearbox assembly, an annular rotary knife blade, a blade housing, and a blade-blade housing support or bearing structure and the handle assembly including a hand piece and a hand piece retaining assembly.
Figure 2:
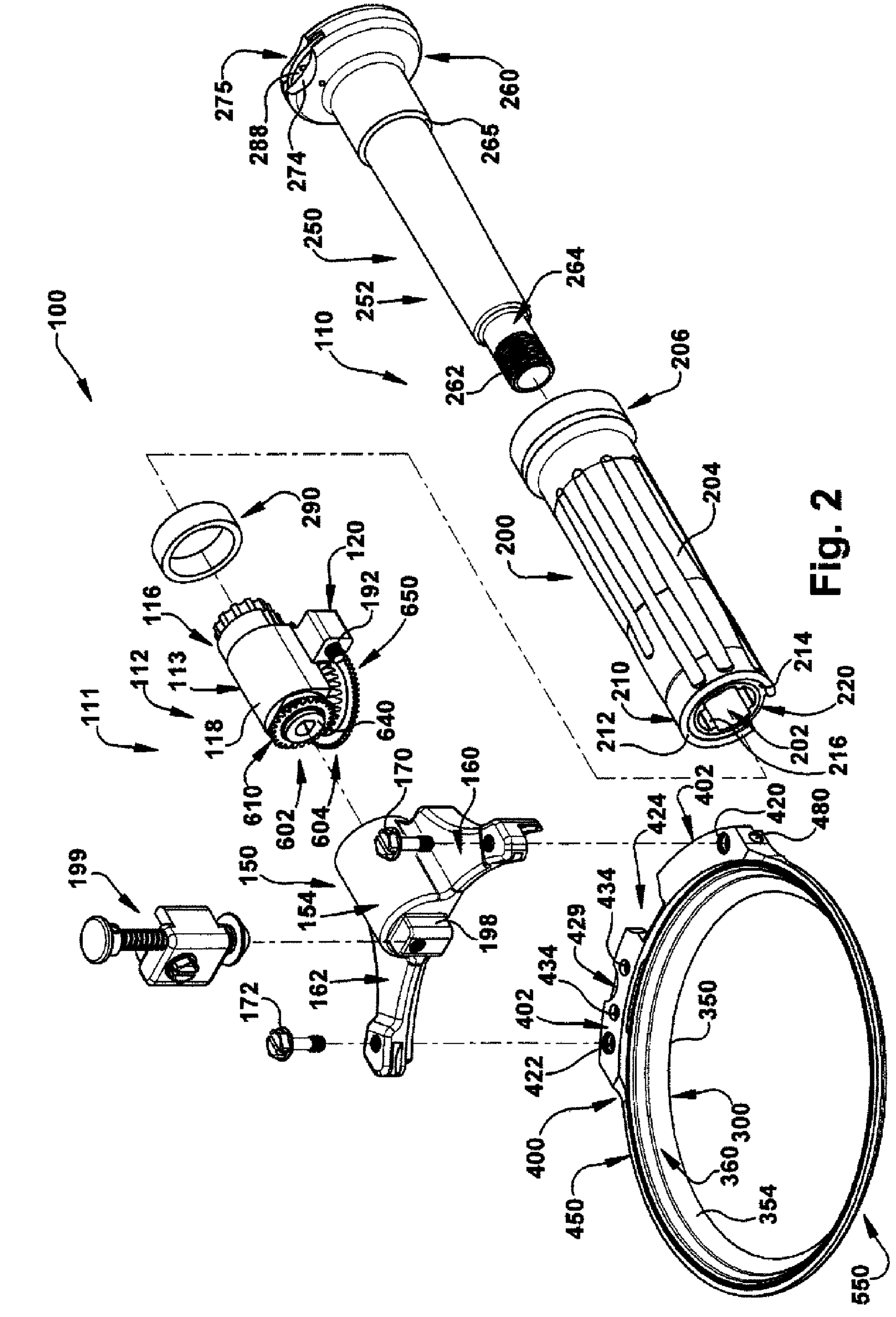
FIG. 2 is a schematic exploded perspective view of the power operated rotary knife of FIG. 1.

As can best be seen in FIG. 2, an assembled combination 550 of the rotary knife blade 300, the blade housing 400 and blade-blade housing bearing structure 500 is releasably secured as a unitary structure to the gearbox assembly 112 by the frame body 150 thereby completing the head assembly 111. For brevity, the assembled combination 550 of the rotary knife blade 300, the blade housing 400 and blade-blade housing bearing structure 500 will hereinafter be referred to as the blade-blade housing combination 550. The handle assembly 110 is releasably secured to the head assembly 111 thereby completing the power operated rotary knife 100. As used herein, a front or distal end of the power operated rotary knife 100 is an end of the knife 100 that includes the blade-blade housing combination 550 (as seen in FIG. 1), while a rear or proximal end of the power operated rotary knife 100 is an end of the knife 100 that includes the handle assembly 110, and specifically, an enlarged end 260 of an elongated central core 252 of the hand piece retaining assembly 250 (as seen in FIG. 1).

Figure 2A:
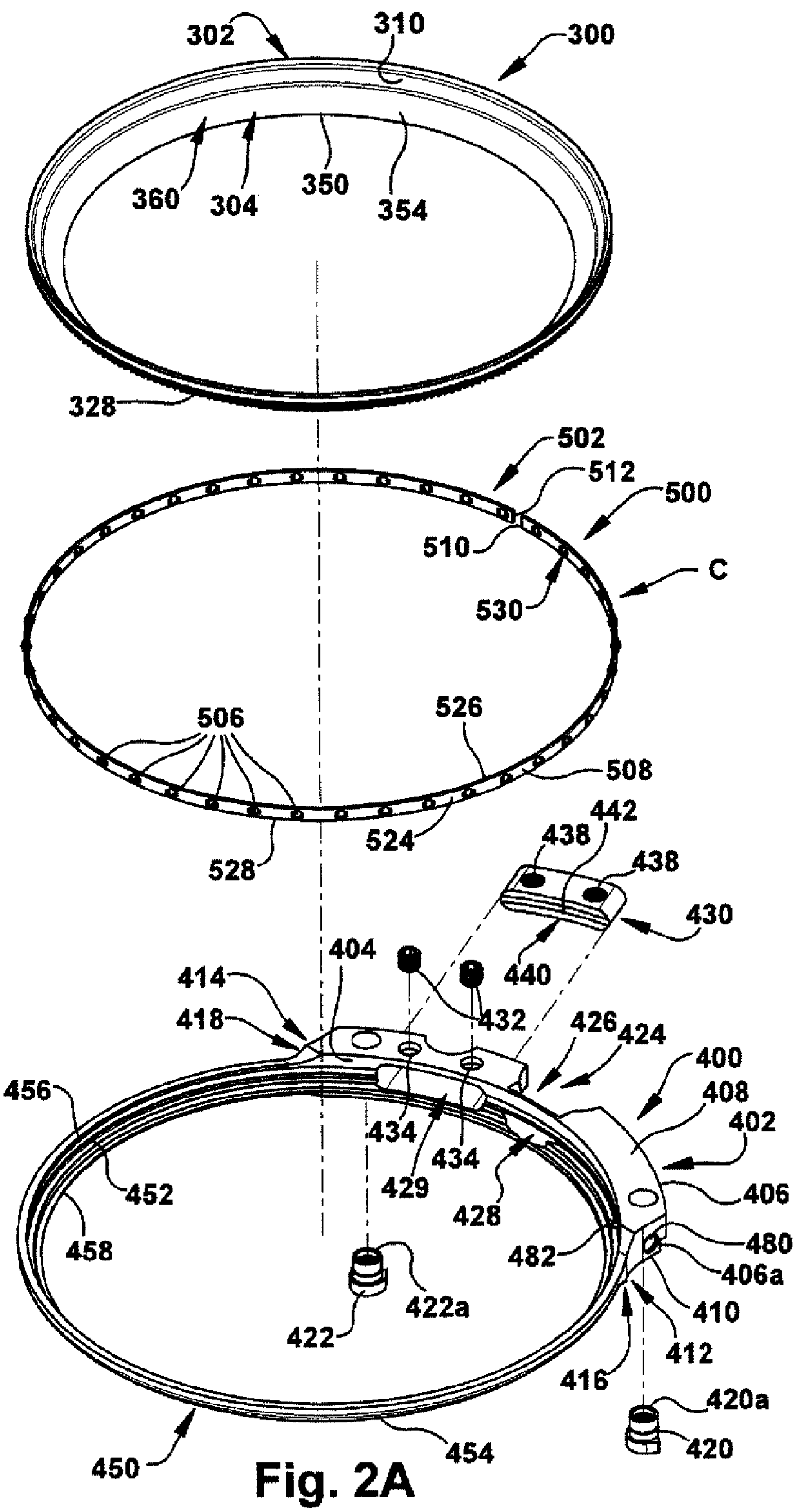
FIG. 2A is a schematic exploded perspective view of a portion of the head assembly of the power operated rotary knife of FIG. 1 including the rotary knife blade, the blade housing and the blade-blade housing bearing structure that, in one exemplary embodiment, includes an elongated rolling bearing strip that secures and rotatably supports the rotary knife blade with respect to the blade housing.
Figure 2B:
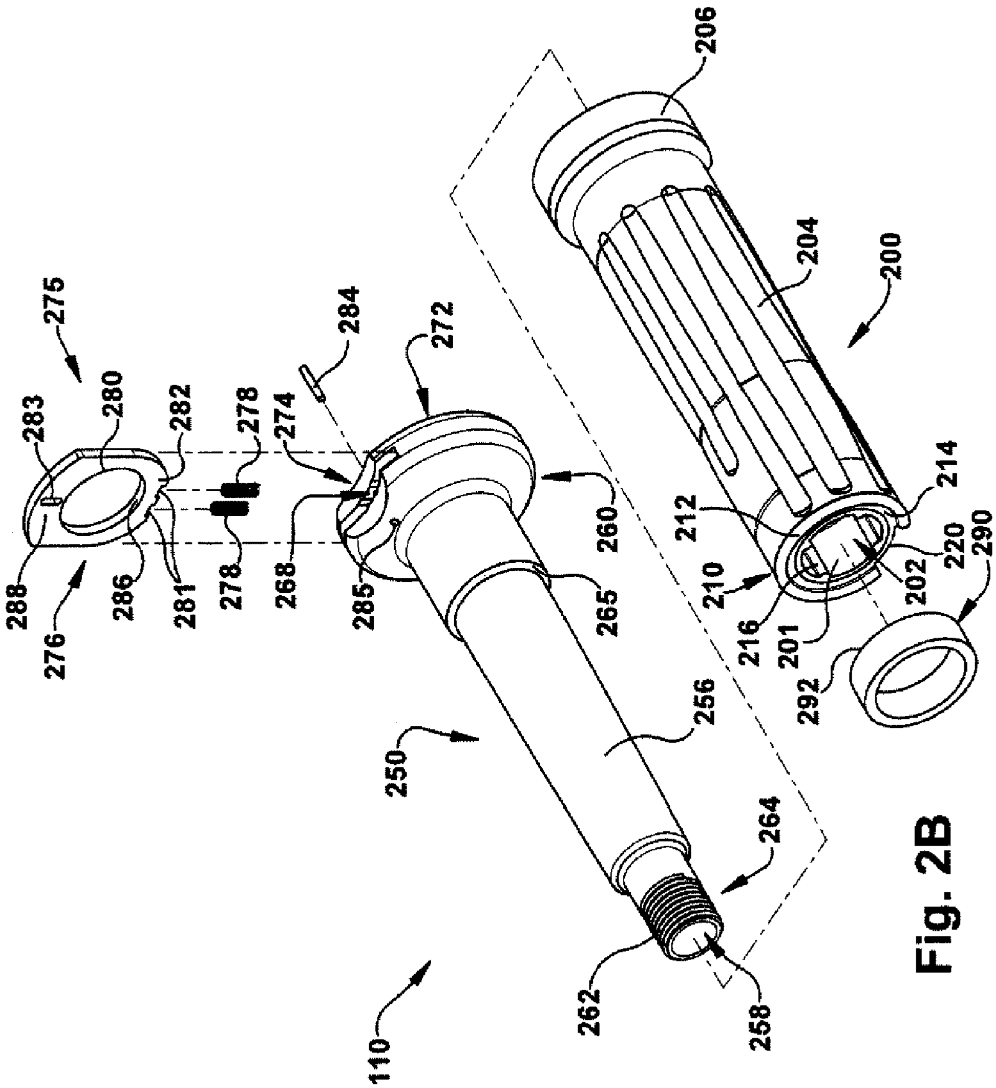
FIG. 2B is a schematic exploded perspective view of the handle assembly of the power operated rotary knife of FIG. 1 including the hand piece, the hand piece retaining assembly and a drive shaft latching assembly supported by the hand piece retaining assembly.
Figure 2C:
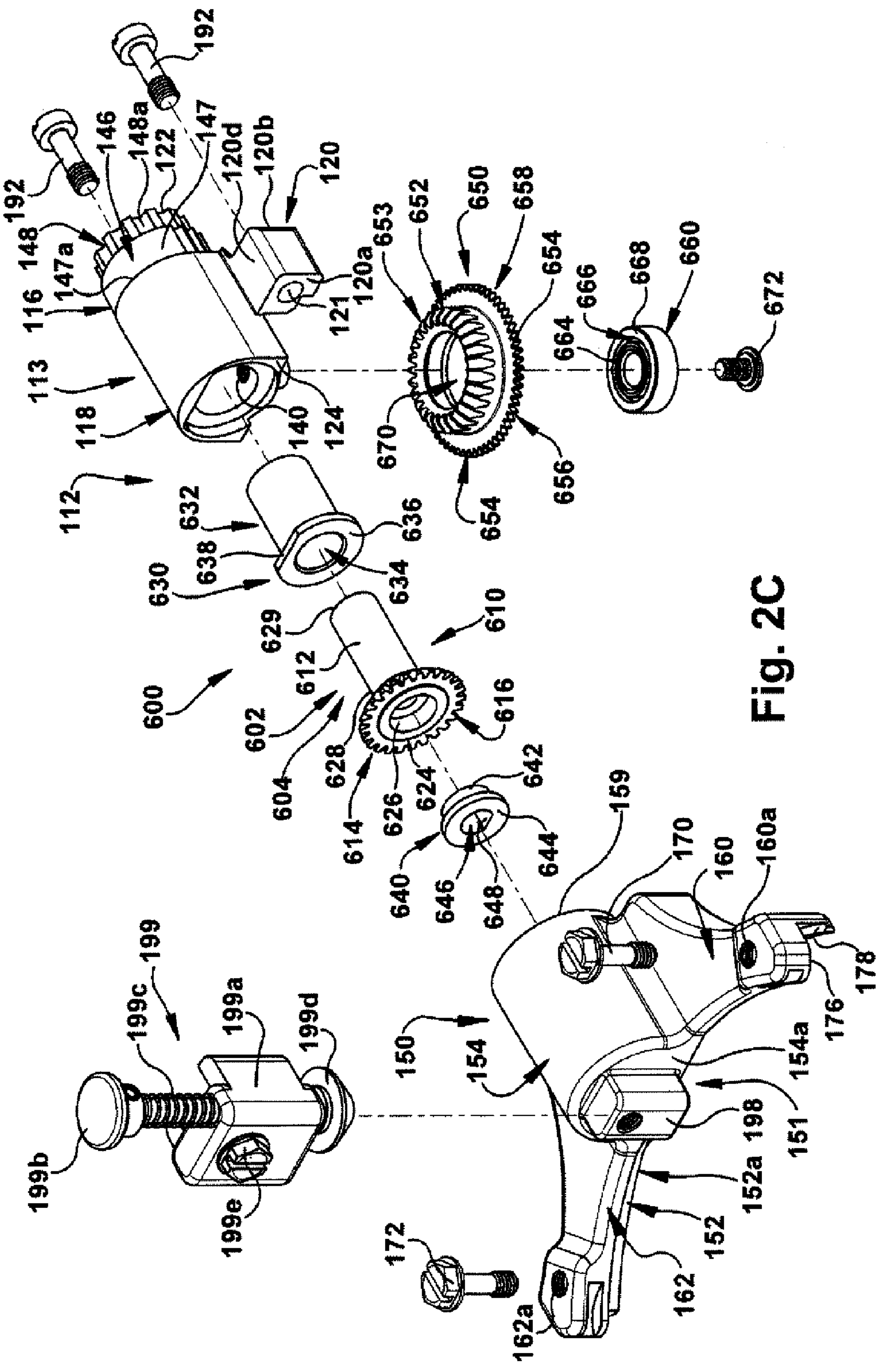
FIG. 2C is a schematic exploded perspective view of a portion of the head assembly of the power operated rotary knife of FIG. 1 including the gearbox assembly, a steeling assembly and a frame body, the gearbox assembly including a gearbox and a gearbox housing.
Figure 3:
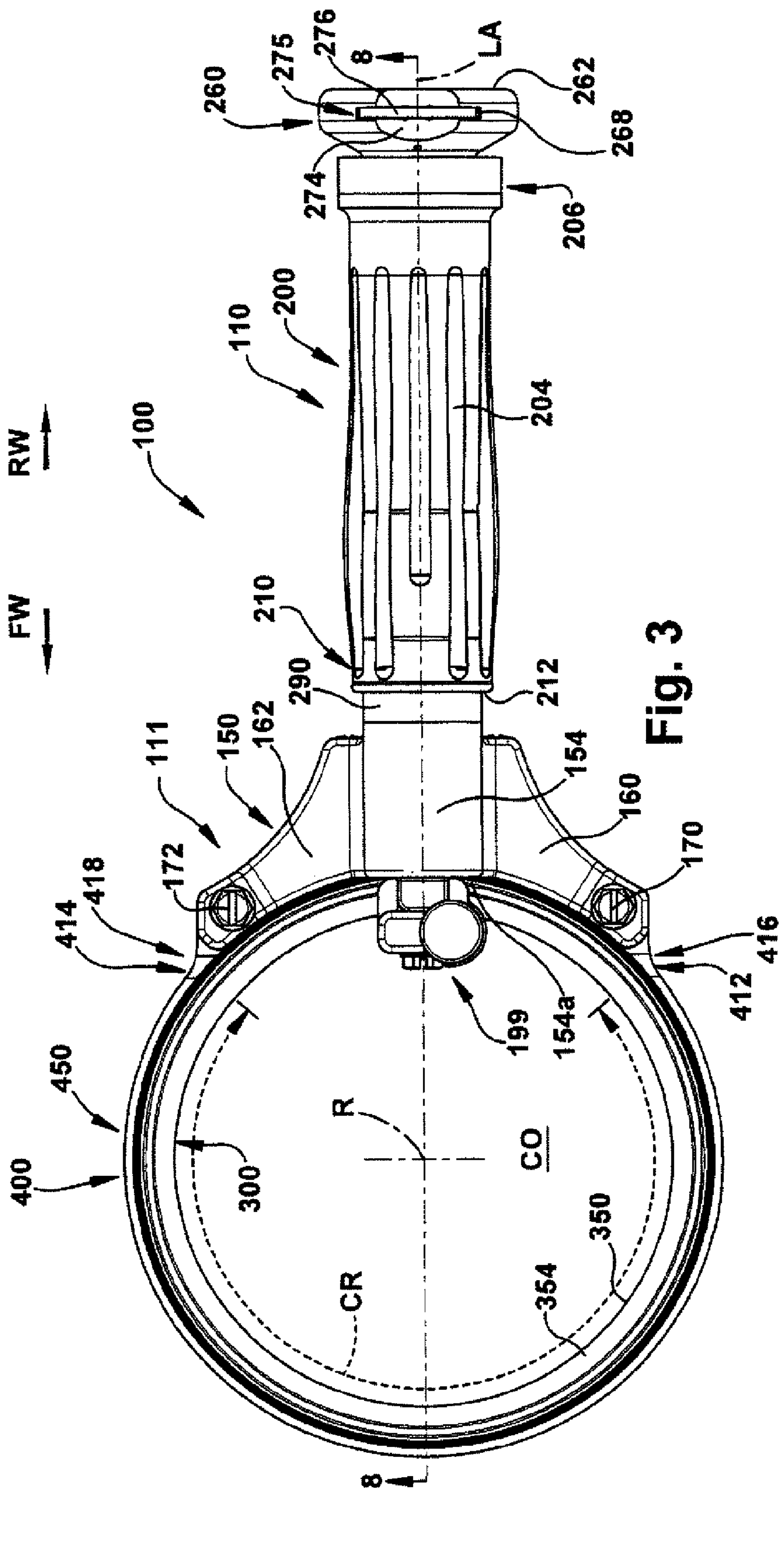
FIG. 3 is a schematic top plan view of the power operated rotary knife of FIG. 1.
Figure 4:
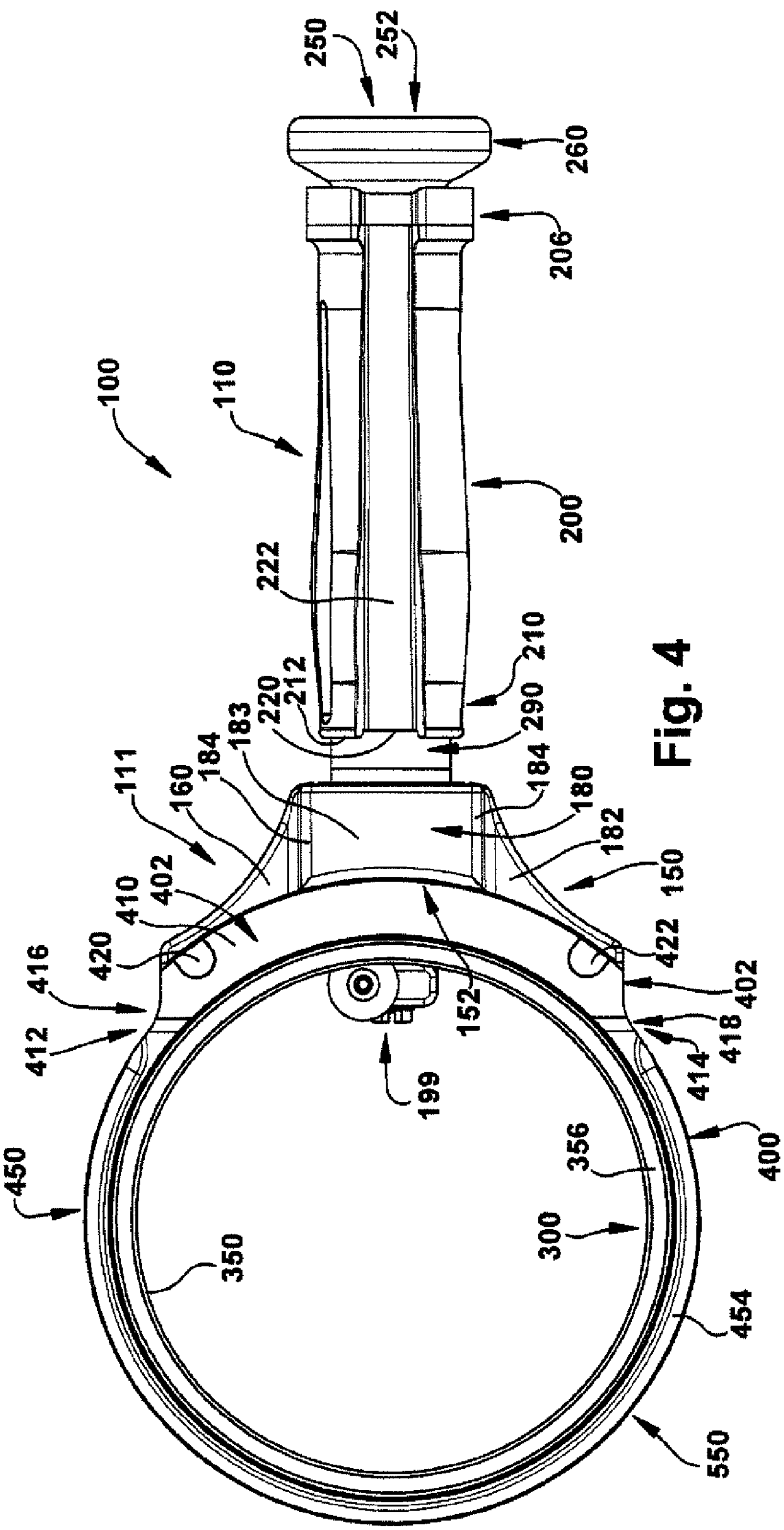
FIG. 4 is a schematic bottom plan view of the power operated rotary knife of FIG. 1.
Figure 5:
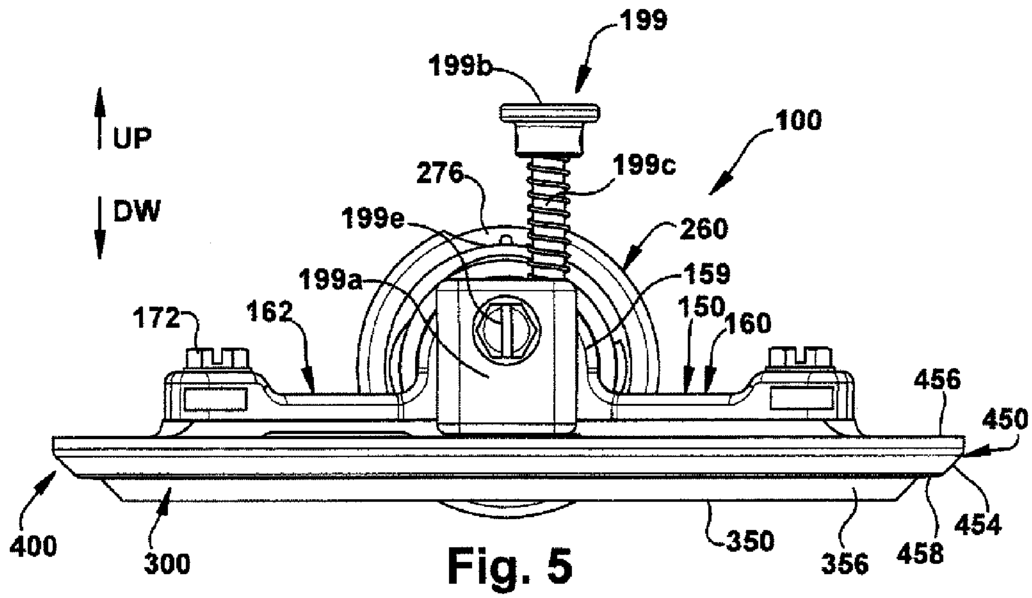
FIG. 5 is a schematic front elevation view of the power operated rotary knife of FIG. 1.
Figure 33:
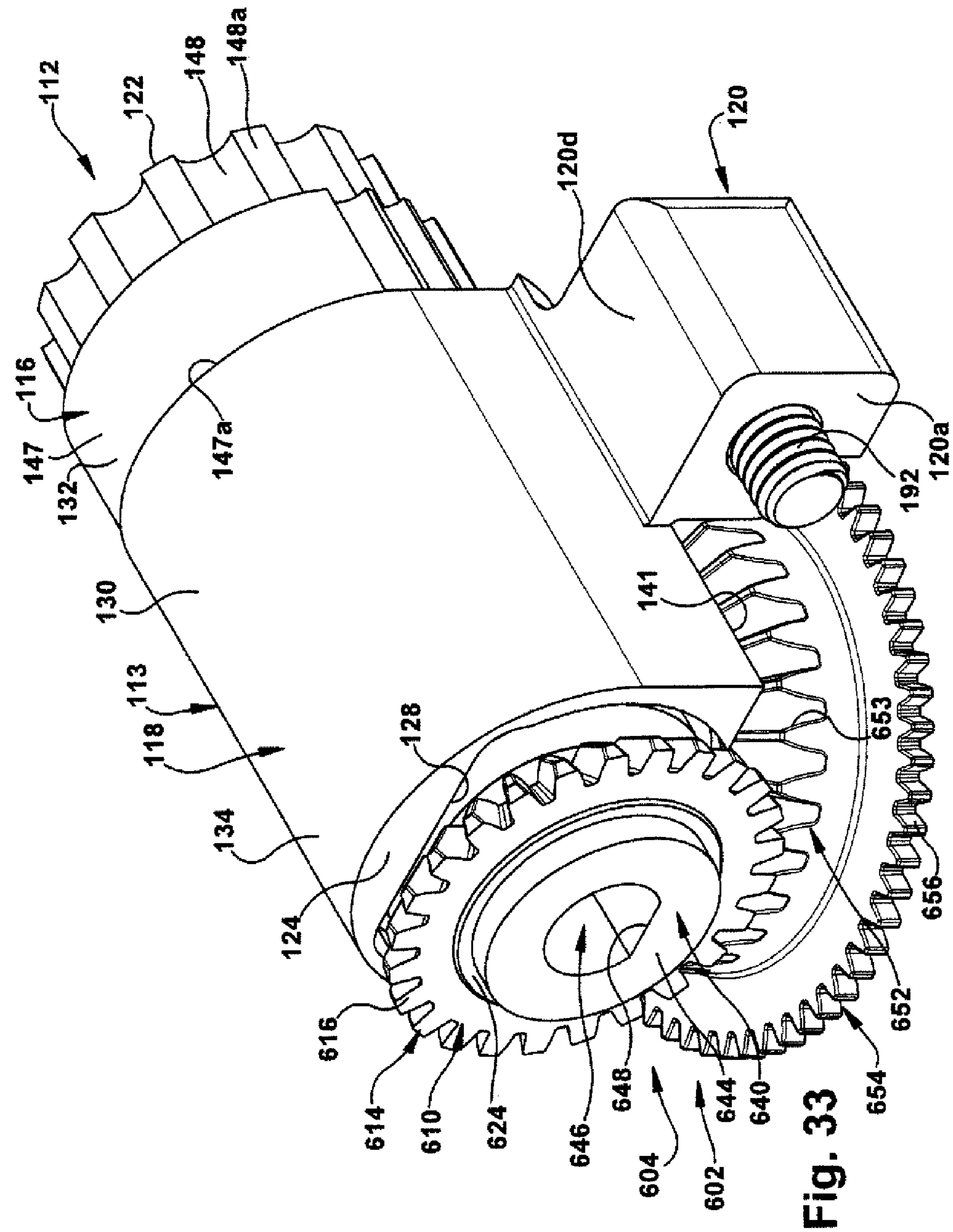
FIG. 33 is a schematic front prospective view of the gearbox assembly of the power operated rotary knife of FIG. 1.
Figure 34:
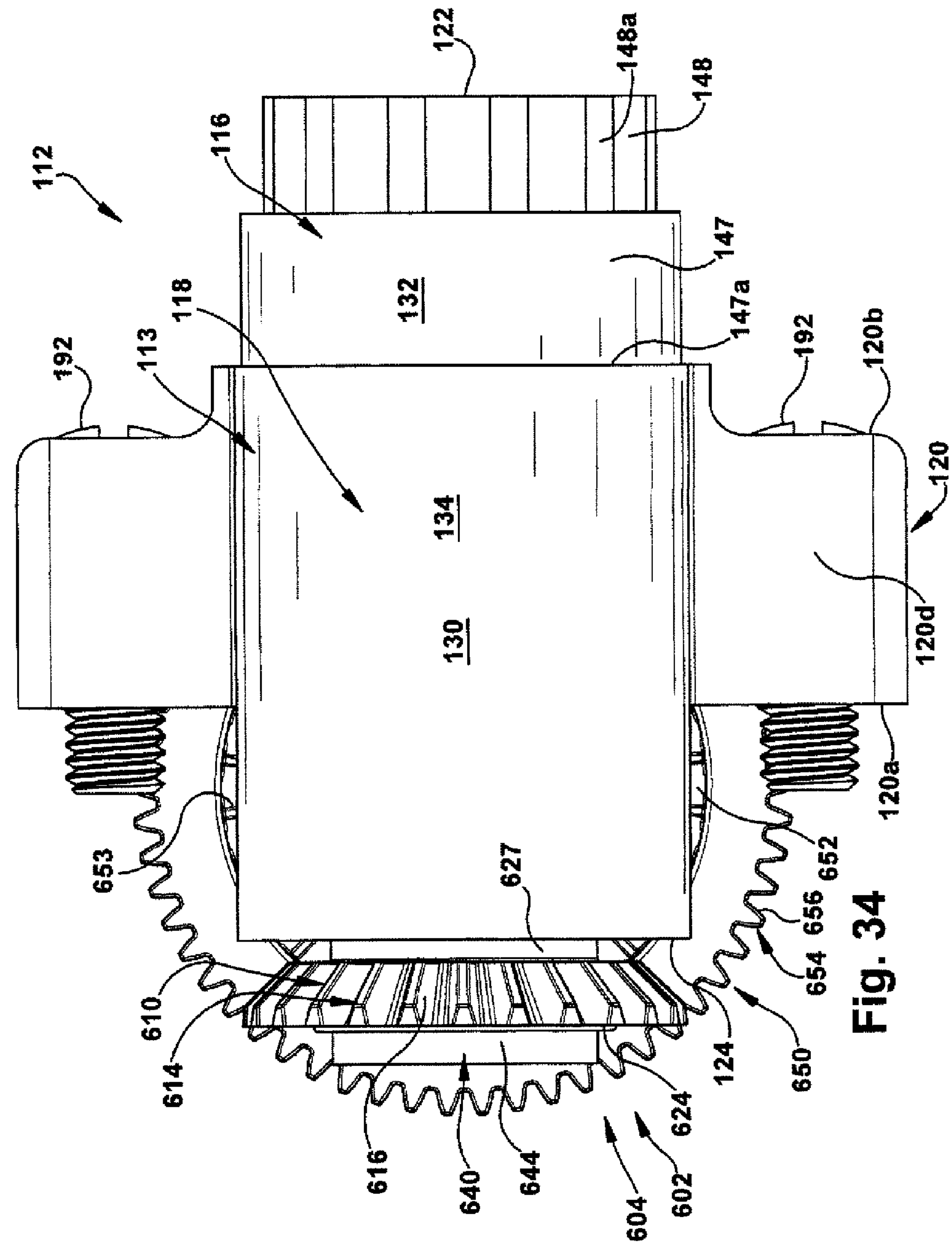
FIG. 34 is a schematic top plan view of the gearbox assembly of FIG. 33.
Figure 35:
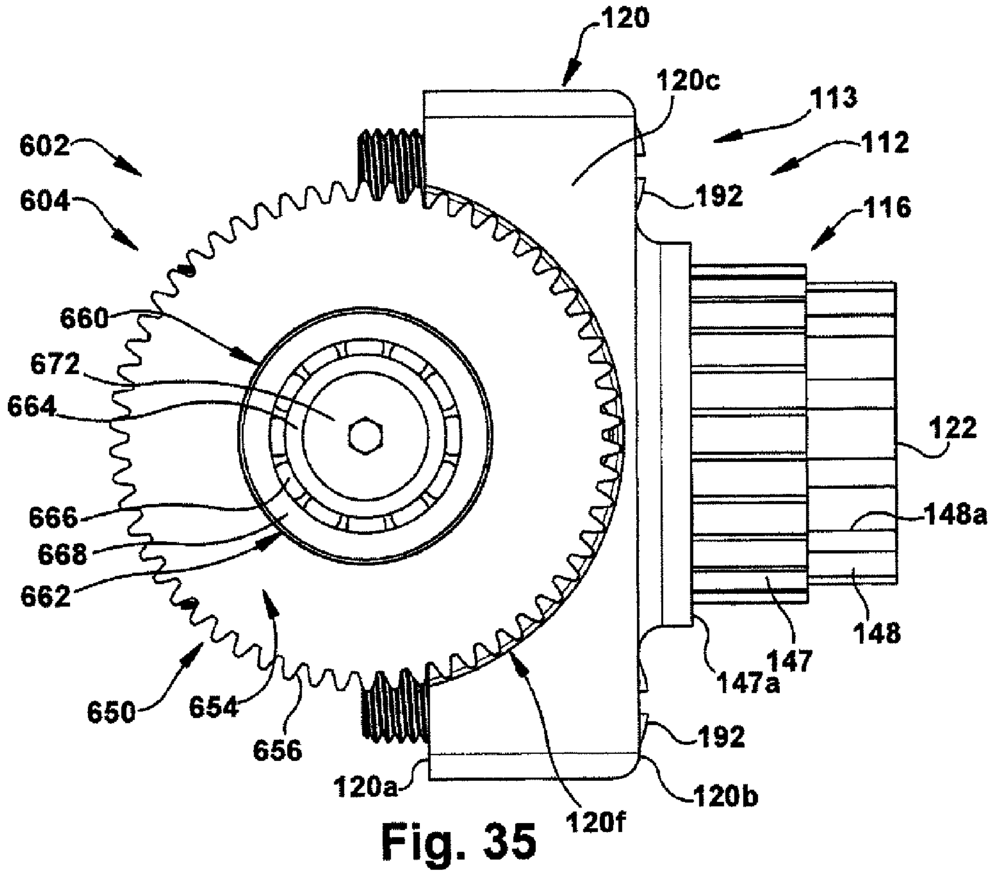
FIG. 35 is a schematic bottom plan view of the gearbox assembly of FIG. 33.
Figure 36:
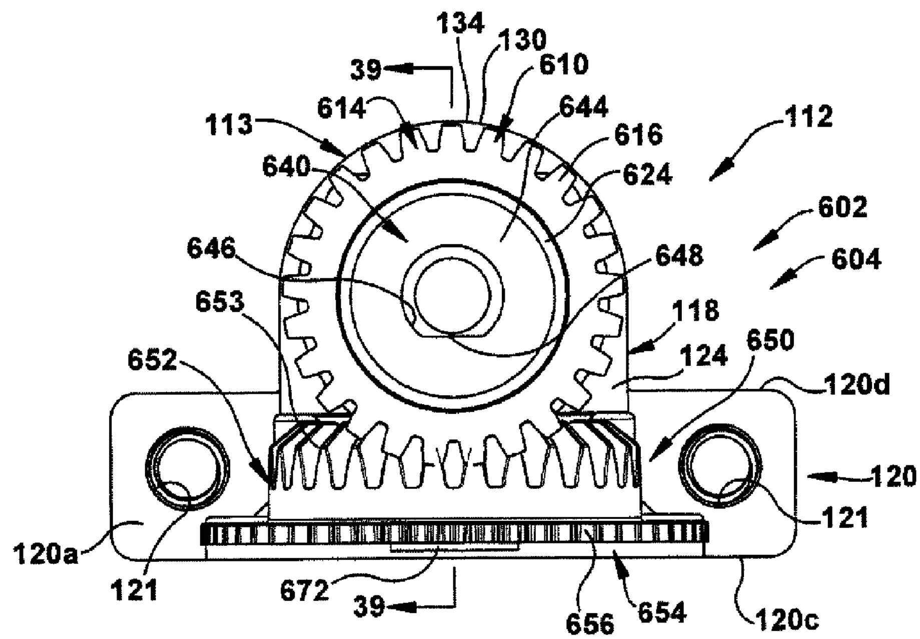
FIG. 36 is a schematic front elevation view of the gearbox assembly of FIG. 33.
Figure 41:
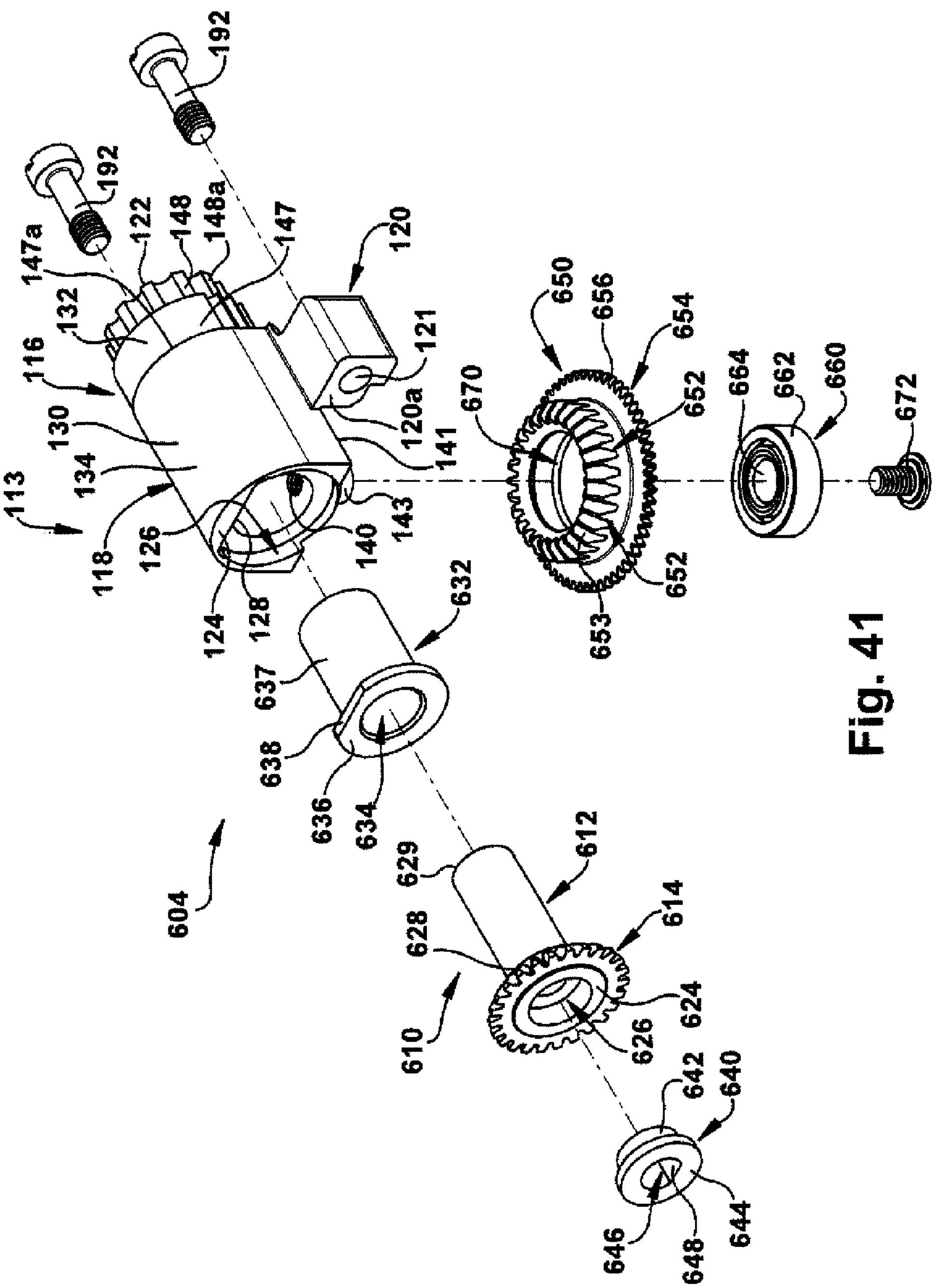
FIG. 41 is a schematic exploded perspective view of the gearbox assembly of FIG. 33.

The head assembly 111 includes the frame 150 and the gearbox assembly 112. As is best seen in FIGS. 2C and 33, the gearbox assembly 112 includes a gearbox housing 113 and a gearbox 602. The gearbox 602 is supported by the gearbox housing 113. The gearbox 602 includes the gear train 604 (FIG. 41). The gear train 604 includes, in one exemplary embodiment, a pinion gear 610 and a drive gear 650. The gearbox 602 includes the gear train 604, along with a bearing support assembly 630 that rotatably supports the pinion gear 610 and a bearing support assembly 660 that rotatably supports the drive gear 650.

The drive gear 650 is a double gear that includes a first bevel gear 652 and a second spur gear 654, disposed in a stacked relationship, about an axis of rotation DGR (FIG. 8A) of the drive gear 650. The drive gear axis of rotation DRG is substantially parallel to the rotary knife blade axis of rotation R. The drive gear first bevel gear 652 meshes with the pinion gear 610 to rotatably drive the drive gear 650 about the drive gear axis of rotation DGR. The second spur gear 654 of the drive gear engages the driven gear 328 of the rotary knife blade 300, forming an involute gear drive, to rotate the knife blade 300 about the blade axis of rotation R.

The gear train 604 is part of the drive mechanism 600 (shown schematically in FIG. 53), some of which is external to the power operated rotary knife 100, that provides motive power to rotate the rotary knife blade 300 with respect to the blade housing 400. The drive mechanism 600 includes the external drive motor 800 and the flexible shaft drive assembly 700, which is releasably secured to the handle assembly 110 by a drive shaft latching assembly 275 (FIG. 2B). The gear train 604 of the power operated rotary knife 100 transmits rotational power from a rotating drive shaft 702 of the flexible shaft drive assembly 700, through the pinion and drive gears 610, 650, to rotate the rotary knife blade 300 with respect to the blade housing 400.

Figure 45:
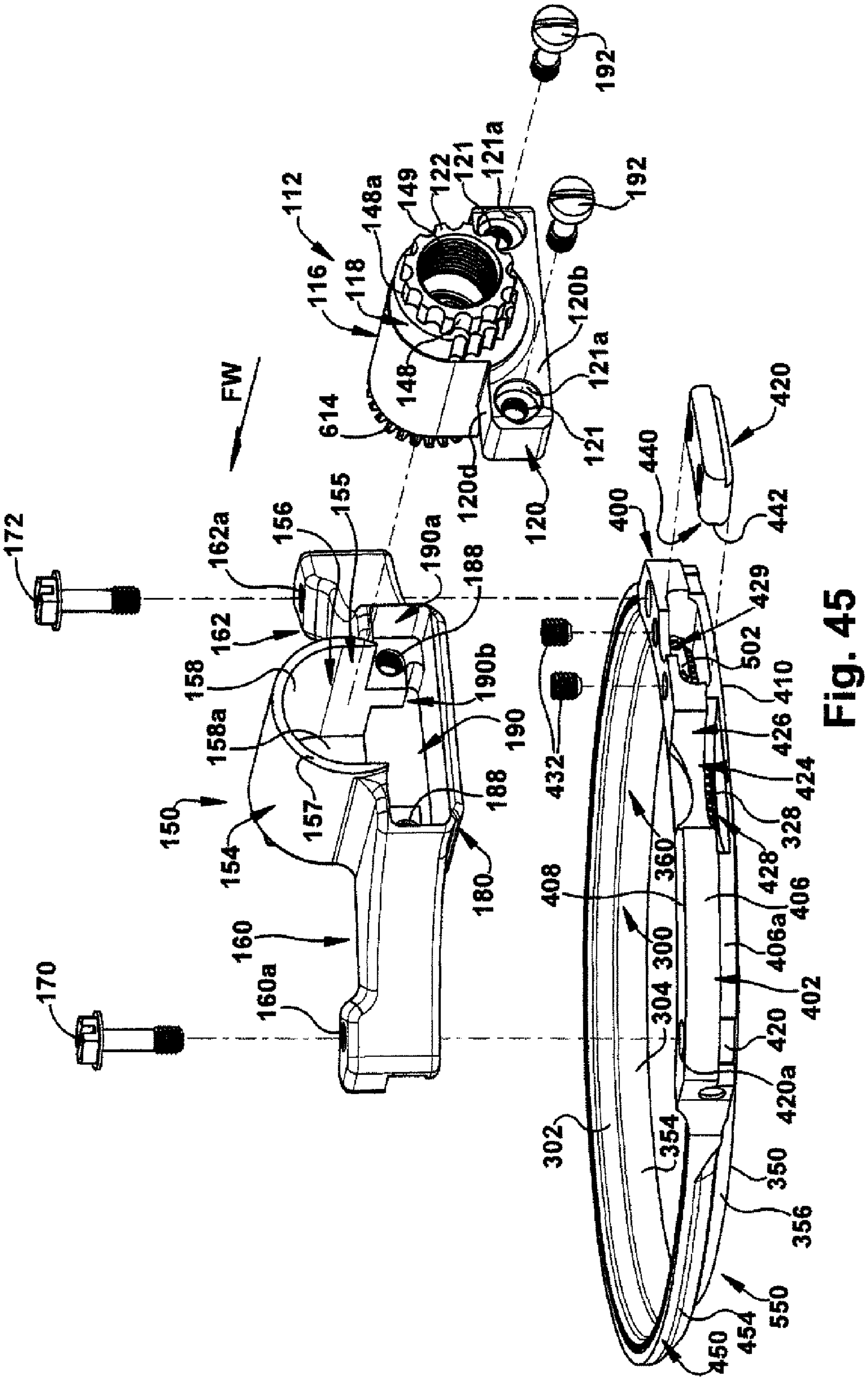
FIG. 45 is a schematic exploded rear perspective view of the head assembly of the power operated rotary knife of FIG. 1 showing the gearbox assembly, the frame body, and the assembled combination of the blade, blade housing and blade-blade housing bearing structure.

The frame body 150 (FIGS. 2C and 49) of the head assembly 111 includes an arcuate mounting pedestal 152 at a front or forward end of the frame body 150. The arcuate mounting pedestal 152 defines a seating region 152*a* for a mounting section 402 of the blade housing 400 such that the blade-blade housing combination 550 may be releasably affixed to the frame body 150. The frame body 150 also defines a cavity or opening 155 (FIG. 49) that slidably receives the gearbox housing 113, as the gearbox housing is moved in a forward direction FW (FIGS. 3, 7 and 45) along the longitudinal axis LA in the direction of the frame body 150. When the gearbox housing 113 is fully inserted into the frame cavity 155 and secured to the frame body 150 by a pair of threaded fasteners 192, as is shown schematically in FIG. 53, the drive gear 650 of the gear train 604 engages and meshes with the driven gear 328 of the rotary knife blade 300 to rotate the blade 300 about its axis of rotation R.

The frame body 150 releasably couples the blade-blade housing combination 550 to the gearbox housing 113 to form the head assembly 111 of the power operated rotary knife 100. The hand piece 200 of the handle assembly 110 is secured or mounted to the head assembly 111 by the hand piece retaining assembly 250 (FIG. 2B) to complete the power operated rotary knife 100. The elongated central core 252 of the hand piece retaining assembly 250 extends through a central throughbore 202 of the hand piece 200 and threads into the gearbox housing 113 to secure the hand piece 200 to the gearbox housing 113.

The handle assembly 110 (FIG. 2B) extends along a longitudinal axis LA (FIGS. 3, 7 and 8) that is substantially orthogonal to the central axis of rotation R of the rotary knife blade 300. The hand piece 200 includes an inner surface 201 that defines the central throughbore 202, which extends along the handle assembly longitudinal axis LA. The hand piece 200 includes a contoured outer handle or outer gripping surface 204 that is grasped by an operator to appropriately manipulate the power operated rotary knife 100 for trimming and cutting operations.

In one exemplary embodiment, the hand piece 200 and the elongated central core 252 of the handle assembly 110 may be fabricated of plastic or other material or materials known to have comparable properties and may be faulted by molding and/or machining. The hand piece 200, for example, may be fabricated of two over molded plastic layers, an inner layer comprising a hard plastic material and an outer layer or gripping surface comprised of a softer, resilient plastic material that is more pliable and easier to grip for the operator. The gearbox housing 113 and the frame body 150 of the head assembly 111 may be fabricated of aluminum or stainless steel or other material or materials known to have comparable properties and may be formed/shaped by casting and/or machining. The blade and blade housing 400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes.

Rotary Knife Blade 300

Figure 24:
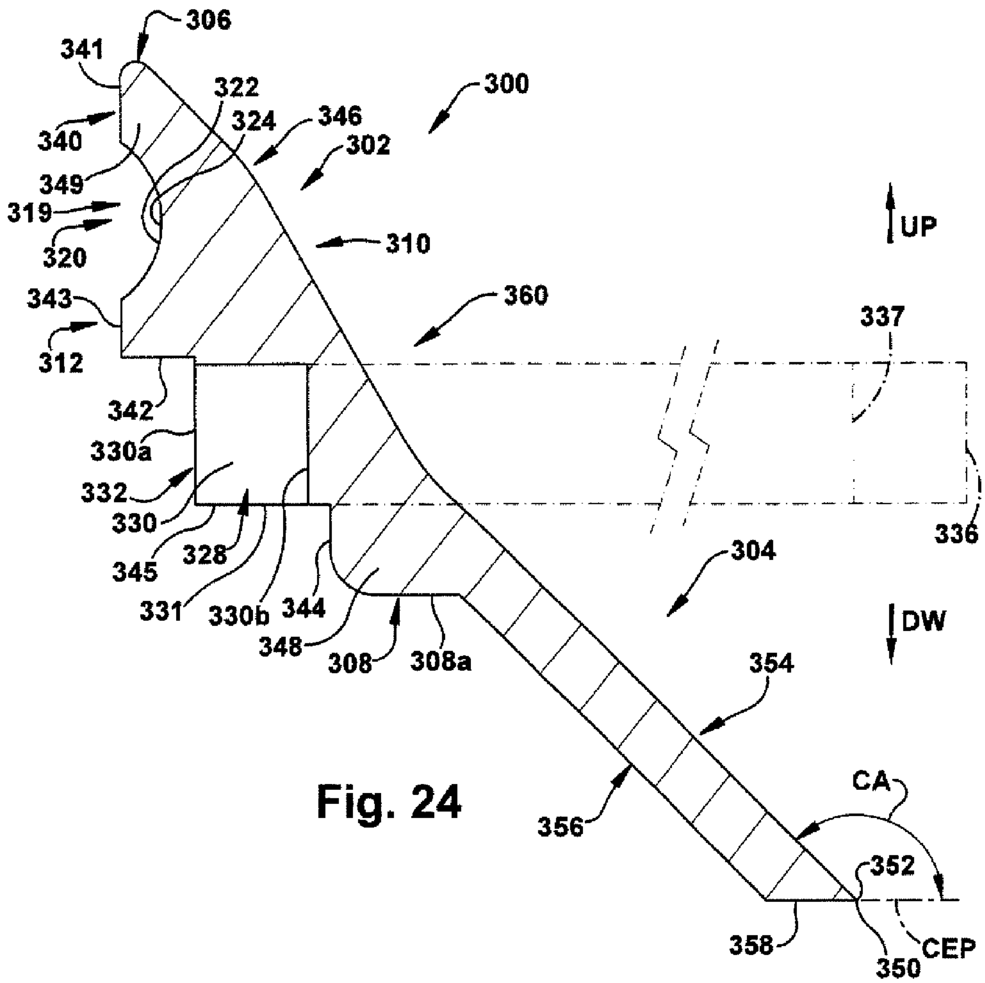
FIG. 24 is a schematic section view of the annular rotary knife blade of FIG. 22, as seen from a plane indicated by the line 24-24 in FIG. 22.
Figure 26:
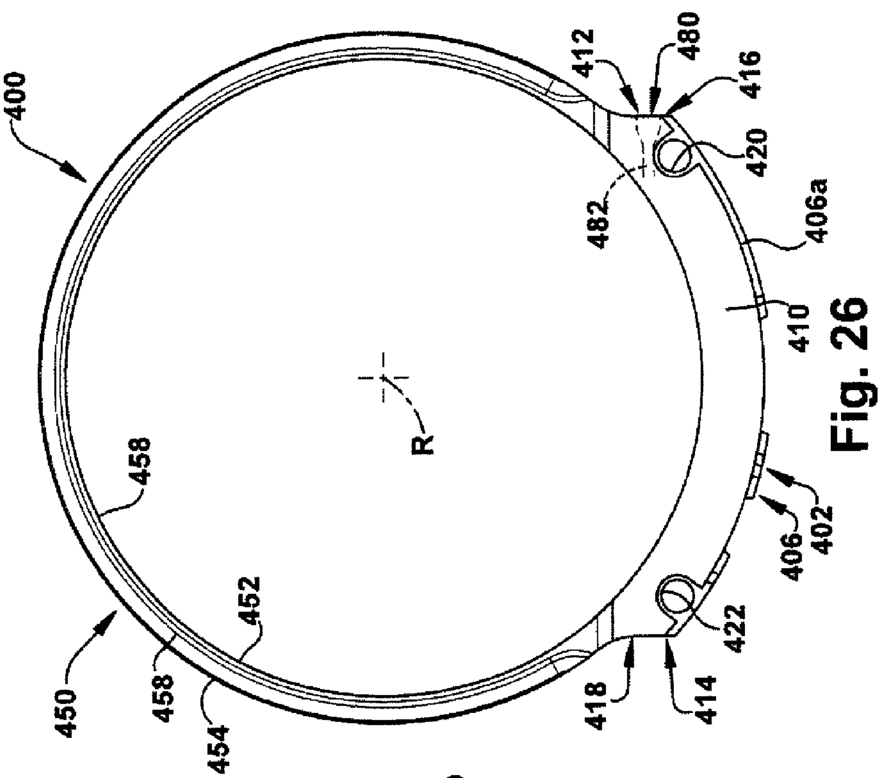
FIG. 26 is a schematic bottom plan view of the blade housing of FIG. 25.

In one exemplary embodiment and as best seen in FIGS. 2A and 22-24, the rotary knife blade 300 of the power operated rotary knife 100 is a one-piece, continuous annular structure. As can best be seen in FIG. 24, the rotary knife blade 300 includes the body 302 and a blade section 304 extending axially from the body 302. The knife blade body 302 includes an upper end 306 and a lower end 308 spaced axially from the upper end 306. The body 302 of the rotary knife blade 300 further includes an inner wall 310 and an outer wall 312 spaced radially apart from the inner wall 310. An upper, substantially vertical portion 340 of the body outer wall 312 defines the knife blade bearing surface 319. In one exemplary embodiment of the power operated rotary knife 100 and as best seen in FIGS. 13 and 24, the knife blade bearing surface 319 comprises the bearing race 320 that extends radially inwardly into the outer wall 312. In one exemplary embodiment, the knife blade bearing race 320 defines a generally concave bearing surface, and, more specifically, a generally arcuate bearing face 322 in a central portion 324 of the bearing race 320. As can be seen in FIG. 24, the knife blade bearing race 320 is axially spaced from an upper end 306 of the knife blade body 302. Specifically, a section 341 of the vertical portion 340 of the body outer wall 312 extends between the knife blade bearing race 320 and the upper end 306 of the knife blade body 302. Stated another way, the knife blade body outer wall 213 includes the vertical section 341 which separates the knife blade bearing race 320 from the upper end 306 of the knife blade body 302. When viewed in three dimensions, the vertical section 341 defines a uniform diameter, cylindrical portion of the knife blade body outer wall 312 which separates the knife blade bearing race 320 from the upper end 306 of the knife blade body 302.

The outer wall 312 of the body 302 of the rotary knife blade 300 also defines the driven gear 328. The driven gear 328 comprises a set of spur gear teeth 330 extending radially outwardly in a stepped portion 331 of the outer wall 312. The blade gear 330 is a spur gear which means that it is a cylindrical gear with a set of gear teeth 328 that are parallel to the axis of the gear, i.e., parallel to the axis of rotation R of the rotary knife blade 300 and a profile of each gear tooth of the set of gear teeth 328 includes a tip or radially outer surface 330*a* (FIG. 13) and a root or radially inner surface 330*b*. The root 330*b* of the gear tooth is sometimes referred to as a bottom land, while the tip 330*a* of the gear tooth is sometimes referred to as a top land. The root 330*b* is radially closer to the axis of rotation R of the blade 300, the root 330*a* and the tip 330*a* are radially spaced apart by a working depth plus clearance of a gear tooth of the set of gear teeth 330. The driven gear 328 of the rotary knife blade 300 is axially spaced from and disposed below the bearing race 320, that is, closer to the second lower end 308 of the knife blade body 302. The knife blade body outer wall 312 includes the vertical portion 340 which separates the set of gear teeth 330 from the upper end 306 of the knife blade body 302. When viewed in three dimensions, the vertical portion 340 defines a uniform diameter, cylindrical portion of the knife blade body outer wall 213 which separates the knife blade bearing race 320 from the upper end 306 of the knife blade body 302. The driven gear 328, in one exemplary embodiment, defines a plurality of involute spur gear teeth 332.

The set of spur gear teeth 330 of the knife blade driven gear 328 are axially spaced from both the upper end 306 of the body 302 and the lower end 308 of the body 302 and are axially spaced from the arcuate bearing race 320 of the body 302. Additionally, the driven gear 328 is also offset radially inwardly with respect to the upper vertical portion 340 of the body outer wall 312 that defines the blade bearing race 320. Specifically, the set of spur gear teeth 330 are disposed radially inwardly of an outermost extent 343 of the outer wall 312 of the knife blade body 302. As can be seen in FIGS. 13 and 24, the upper vertical portion 340 of the body outer wall 312 defines the outermost extent 343 of the outer wall 312. Accordingly, the upper vertical portion 340 of the outer wall 312 extends radially outwardly over the set of gear teeth 330 and form a gear tooth cap 349. The gear tooth cap 349 is axially spaced from and overlies the set of gear teeth 330 and functions to further protect the set of gear teeth 330.

This configuration of the rotary knife blade 300, wherein the set of gear teeth 330 are both axially spaced from the upper end 306 of the knife blade body 302 and inwardly offset from the outermost extent 343 of the blade body outer wall 312 is sometimes referred to as a "blind gear tooth" configuration. Advantageously, the driven gear 328 of the rotary knife blade 300 of the present disclosure is in a relatively protected position with respect to the knife blade body 302. That is, the driven gear 328 is in a position on the knife blade body 302 where there is less likely to be damage to the set of gear teeth 330 during handling of the rotary knife blade 300 and, during operation of the power operated rotary knife 100, there is less ingress of debris, such as small pieces fat, meat, bone and gristle generated during cutting and trimming operations, into the gear teeth region.

Conceptually, the respective gear tips or radially outer surfaces 330*a* of the set of gear teeth 330, when the knife blade 300 is rotated, can be viewed as forming a first imaginary cylinder 336 (shown schematically in FIG. 24). Similarly, the respective roots or radially inner surfaces 330*b* of the set of gear teeth 330, when the knife blade 300 is rotated, can be viewed as forming a second imaginary cylinder 337. A short radially or horizontally extending portion 342 of the outer wall 312 of the blade body 302 extends between the radially outer surfaces 330*a* of the driven gear 328 and the vertical upper portion 340 of the outer wall 312 of the blade body. A second substantially vertical lower portion 344 of the outer wall 312 of the blade body 302 extends between a bottom surface 345 of the driven gear 328 and the lower end 308 of the blade body. As can be seen in FIG. 24, the vertical lower portion 344 of the knife blade body 302 results in a radially extending projection 348 adjacent the lower end 308 of the blade body 302.

Axial spacing of the drive gear 328 from the upper end 306 of the knife blade body 302 advantageously protects the set of gear teeth 330 from damage that they would otherwise be exposed to if, as is the case with conventional rotary knife blades, the set of gear teeth 330 were positioned at the upper end 306 of the blade body 302 of the rotary knife blade 300. Additionally, debris is generated by the power operated rotary knife 100 during the cutting/trimming operations. Generated debris include pieces or fragments of bone, gristle, meat and/or fat that are dislodged or broken off from the product being cut or trimmed by the power operated rotary knife 100. Debris may also include foreign material, such as dirt, dust and the like, on or near a cutting region of the product being cut or trimmed. Advantageously, spacing the set of gear teeth 330 from both axial ends 306, 308 of the knife blade body 302, impedes or mitigates the migration of such debris into the region of the knife blade driven gear 328. Debris in the region of knife blade driven gear 328 may cause or contribute to a number of problems including blade vibration, premature wear of the driven gear 328 or the mating drive gear 650, and "cooking" of the debris.

Similar advantages exist with respect to axially spacing the blade bearing race 320 from the upper and lower ends 306, 308 of the blade body 302. As will be explained below, the rotary knife blade body 302 and the blade housing 400 are configured to provide radially extending projections or caps which provide a type of labyrinth seal to inhibit entry of debris into the regions of the knife blade driven gear 328 and the blade-blade housing bearing structure 500. These labyrinth seal structures are facilitated by the axial spacing of the knife blade drive gear 328 and the blade bearing race 320 from the upper and lower ends 306, 308 of the blade body 302 of the rotary knife blade 300.

As can best be seen in FIG. 24, in the rotary knife blade 300, the second end 308 of the knife blade body 302 transitions radially inwardly between the body 302 and the blade section 304. The second end 308 of the body 302 is defined by a radially inwardly extending step or shoulder 308*a*. The blade section 304 extends from the second end 308 of the body 302 and includes a blade cutting edge 350 at an inner, lower end 352 of the blade section 304. As can be seen, the blade section 304 includes an inner wall 354 and a radially spaced apart outer wall 356. The inner and outer walls 354, 356 are substantially parallel. A bridging portion 358 at the forward end of the rotary knife blade 300 extends between the inner and outer walls 354, 356 and forms the cutting edge 350 at the intersection of the bridging portion 358 and the inner wall 354. Depending on the specific configuration of the blade section 304, the bridging portion 358 may extend generally radially or horizontally between the inner and outer walls 354, 356 or may taper at an angle between the inner and outer walls 354, 356.

The rotary knife blade body inner wall 310 and the blade section inner wall 354 together form a substantially continuous knife blade inner wall 360 that extends from the upper end 306 to the cutting edge 350. As can be seen in FIG. 24, there is a slightly inwardly protruding "humpback" region 346 of the inner wall 310 of the blade body 302 in the region of the bearing race 320. The protruding region 346 provides for an increased width or thickness of the blade body 302 in the region where the bearing race 320 extends radially inwardly into the blade body outer wall 312. The knife blade inner wall 360 is generally frustoconical in shape, converging in a downward direction (labeled DW in FIG. 24), that is, in a direction proceeding away from the driven gear 328 and toward the cutting edge 350. The knife blade inner wall 360 defines a cutting opening CO (FIGS. 1 and 54) of the power operated rotary knife 100, that is, the opening defined by the rotary knife blade 300 that cut material, such as a cut layer CL1 (FIG. 54) passes through, as the power operated rotary knife 100 trims or cut a product P.

Blade Housing 400

In one exemplary embodiment and as best seen in FIGS. 25-29, the blade housing 400 of the power operated rotary knife 100 is a one-piece, continuous annular structure. The blade housing 400 includes the mounting section 402 and a blade support section 450. The blade housing 400 is continuous about its perimeter, that is, unlike prior split-ring annular blade housings, the blade housing 400 of the present disclosure has no split along a diameter of the housing to allow for expansion of the blade housing circumference. The blade-blade housing bearing or support structure 500 of the present disclosure secures the rotary knife blade 300 to the blade housing 400. Accordingly, removal of the knife blade 300 from the blade housing 400 is accomplished by removing a portion of the blade-blade housing structure 500 from the power operated rotary knife 100. The blade-blade housing bearing structure 500 permits use of the continuous annular blade housing 400 because there is no need to expand the blade housing circumference to remove the rotary knife blade 300 from the blade housing 400.

The continuous annular blade housing 400 of the present disclosure provides a number of advantages over prior split-ring annular blade housings. The one-piece, continuous annular structure provides for greater strength and durability of the blade housing 400, as compared to prior split-ring annular blade housings. In addition to greater strength and durability of the blade housing 400, the fact that a circumference of the blade housing 400 is not adjustable eliminates need for and precludes the operator from adjusting the circumference of the blade housing 400 during operation of the power operated rotary knife 100 in an attempt to maintain proper operating clearance. This is a significant improvement over the prior split ring annular blade housings. Advantageously, the combination of the rotary knife blade 300, the blade housing 400 and the blade-blade housing bearing structure 500 of the power operated rotary knife 100 provide for proper operating clearance of the rotary knife blade 300 with respect to the blade housing 400 over the useful life of a given rotary knife blade.

Figure 25:
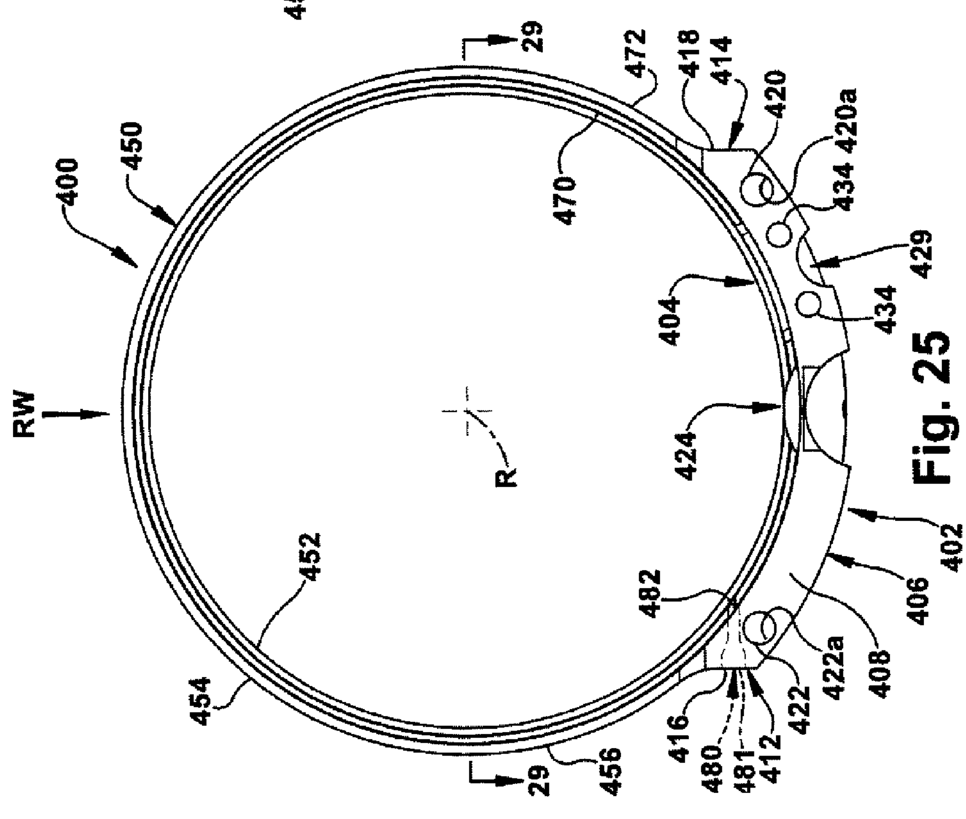
FIG. 25 is a schematic top plan view of the blade housing of the power operated rotary knife of FIG. 1.

As can best be seen in FIG. 25, in the blade housing 400, the blade support section extends around the entire 360 degrees (360°) circumference of the blade housing 400. The mounting section 402 extends radially outwardly from the blade support section 450 and subtends an angle of approximately 120°. Stated another way, the blade housing mounting section 402 extends approximately ⅓ of the way around the circumference of the blade housing 400. In the region of the mounting section 402, the mounting section 402 and the blade support section 450 overlap.

The mounting section 402 is both axially thicker and radially wider than the blade support section 450. The blade housing mounting section 402 includes an inner wall 404 and a radially spaced apart outer wall 406 and a first upper end 408 and an axially spaced apart second lower end 410. At forward ends 412, 414 of the mounting section 402, there are tapered regions 416, 418 that transition between the upper end 408, lower end 410 and outer wall 406 of the mounting section and the corresponding upper end, lower end and outer wall of the blade support section 450.

The blade housing mounting section 402 includes two mounting inserts 420, 422 (FIG. 2A) that extend between the upper and lower ends 408, 410 of the mounting section 402. The mounting inserts 420, 422 define threaded openings 420*a*, 422*a*. The blade housing mounting section 402 is received in the seating region 152*a* defined by the arcuate mounting pedestal 152 of the frame body 150 and is secured to the frame body 150 by a pair of threaded fasteners 170, 172 (FIG. 2C). Specifically, the pair of threaded fasteners 170, 172 extend through threaded openings 160*a*, 162*a* defined in a pair of arcuate arms 160, 162 of the frame body 150 and thread into the threaded openings 420*a*, 422*a* of the blade housing mounting inserts 420, 422 to releasably secure the blade housing 400 to the frame body 150 and, thereby, couple the blade housing 400 to the gearbox assembly 112 of the head assembly 111.

The mounting section 402 further includes a gearing recess 424 (FIGS. 25 and 28) that extends radially between the inner and outer walls 404, 406. The gearing recess 424 includes an upper clearance recess 426 that does not extend all the way to the inner wall and a wider lower opening 428 that extends between and through the inner and outer walls 404, 406. The upper clearance recess 426 provides clearance for the pinion gear 610 and the axially oriented first bevel gear 652 of the gearbox drive gear 650. The lower opening 428 is sized to receive the radially extending second spur gear 654 of the gearbox drive gear 650 and thereby provide for the interface or meshing of the second spur gear 654 and the driven gear 328 of the rotary knife blade 300 to rotate the knife blade 300 with respect to the blade housing 400.

Figure 30:
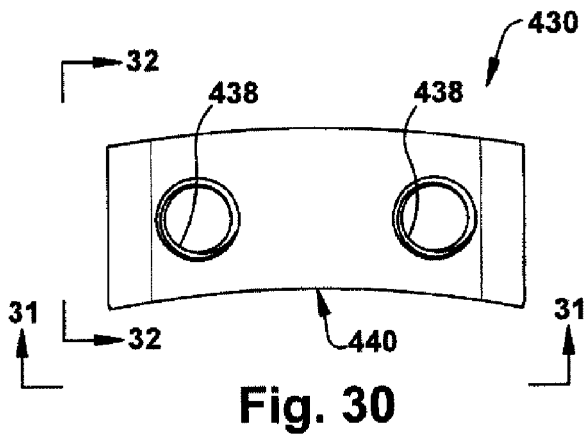
FIG. 30 is a schematic top plan view of the blade housing plug that is removably secured to the blade housing of FIG. 25.
Figure 32:
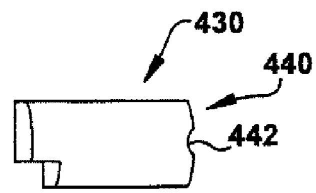
FIG. 32 is a schematic left side elevation view of the blade housing plug of FIG. 30 as seen from a plane indicated by the line 32-32 in FIG. 30.
Figure 31:
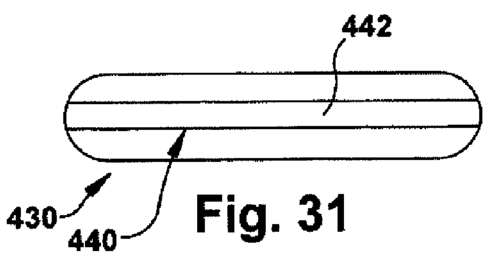
FIG. 31 is a schematic front elevation view of the blade housing plug of FIG. 30 as seen from a plane indicated by the line 31-31 in FIG. 30.

The mounting section 402 of the blade housing 400 also includes a blade housing plug opening 429 extends between the inner and outer walls 404, 406. The blade housing plug opening 429 is generally oval-shaped in cross section and is sized to receive a blade housing plug 430 (FIGS. 30-32). The blade housing plug 430 is removably secured to the blade housing 400 by two screws 432 (FIG. 2A). The screws 432 pass through a pair of countersunk openings 434 that extend from the upper end 408 of the mounting section 402 to the lower portion 428 of the gearing recess 424 and threaded engage a pair of aligned threaded openings 438 of the blade housing plug 430.

Figures 27, 28, 29, 29A:
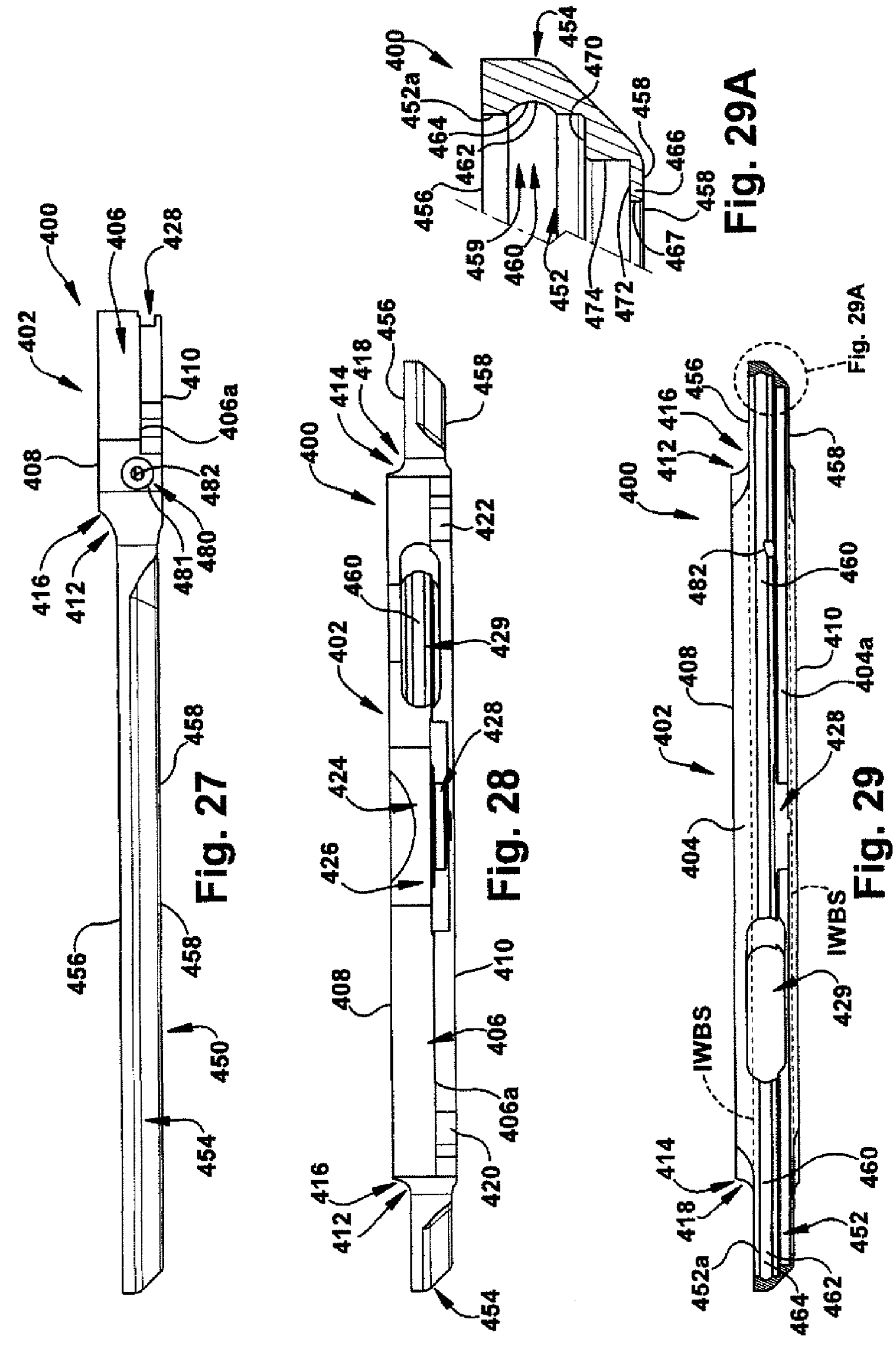
FIG. 27 is a schematic right side elevation view of the blade housing of FIG. 25.
FIG. 28 is a schematic rear elevation view of the blade housing of FIG. 25 showing a blade housing plug opening of a mounting section of the blade housing.
FIG. 29 is a schematic section view of the blade housing of FIG. 25 as seen from a plane indicated by the line 29-29 in FIG. 25.
FIG. 29A is a schematic enlarged section view of a portion of the blade housing of FIG. 25 that is within a dashed circle labeled FIG. 29A in FIG. 29.

As can best be seen in FIG. 29A, the blade support section 450 includes an inner wall 452 and radially spaced apart outer wall 454 and a first upper end 456 and an axially spaced second lower end 458. The blade support section 450 extends about the entire 360° circumference of the blade housing 400. The blade support section 450 in a region of the mounting section 402 is continuous with and forms a portion of the inner wall 404 of the mounting section 402. As can be seen in FIG. 29, a portion 404*a* of the inner wall 404 of the mounting section 402 of the blade housing 400 within the horizontally extending dashed lines IWBS constitutes both a part of the inner wall 404 of the mounting section 402 and a part of the of the inner wall 452 of the blade support section 450. The dashed lines IWBS substantially correspond to an axial extent of the inner wall 452 of the blade support section 450, that is, the lines IWBS correspond to the upper end 456 and the lower end 458 of the blade support section 450. A substantially vertical portion 452*a* of the blade support section inner wall 452 adjacent the first upper end 456 defines the blade housing bearing surface 459. In one exemplary embodiment of the power operated rotary knife 100 and as best seen in FIGS. 13 and 29A, the blade housing bearing surface 459 comprises a bearing race 460 that extends radially inwardly into the inner wall 452. The bearing race 460 is axially spaced from the upper end 456 of the blade support section 450. In one exemplary embodiment, a central portion 462 of the blade housing bearing race 460 defines a generally concave bearing surface, and, more specifically, a generally arcuate bearing face 464.

In one exemplary embodiment of the power operated rotary knife 100, the knife blade bearing surface 319 is concave with respect to the outer wall 312, that is, the knife blade bearing surface 319 extends into the outer wall 312 forming the bearing race 320. It should be appreciated that the knife blade bearing surface 319 and/or the blade housing bearing surface 459 may have a different configuration, e.g., in an alternate embodiment, the knife blade bearing surface 319 and the blade housing bearing surface 459 could, for example, be convex with respect to their respective outer and inner walls 312, 452. The plurality of rolling bearings 506 of the blade-blade housing bearing structure 500 would, of course, have to be configured appropriately.

Though other geometric shapes could be used, the use of arcuate bearing faces 322, 464 for the bearing races 320, 460 of both the rotary knife blade 300 and the blade housing 400 is well suited for use with the power operated knife 100 of the present disclosure. Due to the unpredictable and varying load direction the plurality of ball bearing 506 and the arcuate bearing faces 322, 464 allow the rotary knife blade 300 and blade housing 400 to be assembled in such a way to allow for running or operating clearance. This helps to maintain to the extent possible, the theoretical ideal of a single point of rolling bearing contact between a given ball bearing of the plurality of ball bearings 506 and the rotary knife blade arcuate bearing face 322 and the theoretical ideal of a single point of rolling bearing contact between a given ball bearing of the plurality of ball bearings 506 and the blade housing bearing face 464. (It being understood, of course, that a single point of rolling bearing contact is a theoretical because deformation between a ball bearing and a bearing race necessarily causes deformation of the ball bearing and the bearing race resulting in a small region of contact as opposed to a point of contact.) Nevertheless, the arcuate bearing face configurations 322, 464 provide for reduced frictional torque produced in the bearing region. Due to the thin cross sections of the rotary knife blade 300 and the blade housing 400 of the power operated rotary knife 100, there is a tendency for both the inner or blade bearing race 320 and the outer or blade housing outer race 460 to flex and bend while in use. An arcuate bearing race design of slightly larger radius than the ball of the plurality of ball bearings 506 will allow the balls to move along an arc defined by the annular passageway 504 and still contact the respective bearing races 320, 460 at respective single points thereby maintaining low friction even during bending and flexing of the rotary knife blade 300 and the blade housing 400. The arcuate shape of the blade and blade housing bearing races 320, 460 also helps compensate for manufacturing irregularities within the rotary knife blade 300 and the blade housing 400 and thereby helps maintain theoretical ideal of the single point of bearing contact between a ball bearing of the plurality of ball bearings 506 and the respective bearing races 320, 460, as discussed above, thereby reducing friction.

A radially inner wall 440 (FIGS. 2A, 30 and 31) of the blade housing plug 430 defines a bearing race 442 that is a portion of and is continuous with the bearing race 460 of the blade housing 400. Like the portion 404*a* of the inner wall 404 of the mounting section 402 of the blade housing 400 within the horizontally extending dashed lines IWBS, a portion of the inner wall 440 of the blade housing plug 430 that would be within the horizontally extending dashed lines IWBS of FIG. 29 is both a part of the inner wall 440 of the blade housing plug 430 and a part of the inner wall 452 of the blade support section 450. Thus, when the blade housing plug 430 is inserted in the blade housing plug opening 429 of the blade housing 400, the blade housing bearing race 460 is substantially continuous about the entire 360° circumference of the blade support section 450.

As can best be seen in FIG. 13, when the blade is secured and supported within the blade housing 400 by the blade-blade housing support structure 500, in order to impede the ingress of pieces of meat, bone and other debris into the driven gear 328 of the rotary knife blade 300, a radially outwardly extending driven gear projection or cap 466 at the lower end 458 of the blade support section 450 is axially aligned with and overlies at least a portion of the bottom surface 345 of the set of gear teeth of the knife blade driven gear 328. The driven gear projection or cap 466 defines the lower end 458 of the blade support section 450. The driven gear cap 466 overlies or bridges a gap between the first and second imaginary cylinders 336, 337 (FIG. 24) formed by the driven gear 328 of the rotary knife blade 300. As can be seen in FIG. 13, because of the radial projection 348 of the knife blade body 302 and the driven gear cap 466, only a small radial clearance gap exists between the radially extending end 467 of the driven gear cap 466 of the blade housing 400 and the projection vertical lower portion 344 of outer wall 312 of the knife blade body 302. Advantageously, the combination of the knife blade radial projection 348 and the blade housing cap 466 form a type of labyrinth seal that inhibits ingress of debris into the regions of the driven gear 328 and the bearing race 320 of the rotary knife blade 300.

As can best be seen in FIG. 13, the blade support section inner wall 452 of the blade housing 400 includes a first radially outwardly extending ledge 470 that is located axially below the blade housing bearing race 460. The blade support section inner wall 452 also includes a second radially outwardly extending ledge 472 that forms an upper surface of the driven gear cap portion 466 and is axially spaced below the first radially outwardly extending ledge 470. The first and second ledges 470, 472 provide a seating regions for the horizontally extending portion 342 of the knife blade outer wall 312 and the bottom surface 345 of the set of gear teeth 330, respectively, to support the knife blade 300 when the knife blade 300 is positioned in the blade housing 400 from axially above and the rolling bearing strip 502 of the blade-blade housing bearing structure 500 has not been inserted into a passageway 504 (FIG. 13) between the rotary knife blade 300 and the blade housing 400 defined by opposing arcuate bearing faces 322, 464 of the knife blade bearing race 320 and the blade housing bearing race 460. Of course, it should be understood that without insertion of the rolling bearing strip 502 into the passageway 504, if the power operated rotary knife 100 were turned upside down, that is, upside down from the orientation of the power operated rotary knife 100 shown, for example, in FIG. 7, the rotary knife blade 300 would fall out of the blade housing 400.

As is best seen in FIGS. 25, 27 and 29, the right tapered region 416 (as viewed from a front of the power operated rotary knife 100, that is, looking at the blade housing 400 from the perspective of an arrow labeled RW (designating a rearward direction) in FIG. 25) of the blade housing mounting section 402 includes a cleaning port 480 for injecting cleaning fluid for cleaning the blade housing 400 and the knife blade 300 during a cleaning process. The cleaning port 480 includes an entry opening 481 in the outer wall 406 of the mounting section 402 and extends through to exit opening 482 in the inner wall 404 of the mounting section 402. As can best be seen in FIG. 29, a portion of the exit opening 482 in the mounting section inner wall is congruent with and opens into a region of the bearing race 460 of the blade housing 400. The exit opening 482 in the mounting section inner wall 404 and radial gap G (FIG. 13) between the blade 300 and the blade housing 400 provides fluid communication and injection of cleaning fluid into bearing race regions 320, 460 of the knife blade 300 and blade housing 400, respectively, and the driven gear 328 of the knife blade 300.

Blade-Blade Housing Bearing Structure 500

The power operated rotary knife 100 includes the blade-blade housing support or bearing structure 500 (best seen in FIGS. 2A, 13 and 14) that: a) secures the knife blade 300 to the blade housing 400; b) supports the knife blade for rotation with respect to the blade housing about the rotational axis R; and c) defines the rotational plane RP of the knife blade. As noted previously, advantageously, the blade-blade housing support structure 500 of the present disclosure permits the use of a one-piece, continuous annular blade housing 400. Additionally, the blade-blade housing bearing structure 500 provides for lower friction between the knife blade 300 and blade housing 400 compared to prior power operated rotary knife designs.

The lower friction afforded by the blade-blade housing bearing structure 500 advantageously permits the power operated rotary knife 100 of the present disclosure to be operated without the use of an additional, operator applied source of lubrication. Prior power operated rotary knives typically included a lubrication reservoir and bellows-type manual pump mechanism, which allowed the operator to inject an edible, food-grade grease from the reservoir into the blade-blade housing bearing region for the purpose of providing additional lubrication to the bearing region. When cutting or trimming a meat product, lubrication in the nature of fat/grease typically occurs as a natural by-product or result of cutting/trimming operations, that is, as the meat product is cut or trimmed the rotary knife blade cuts through fat/grease. As cutting/trimming operations continue and the rotary knife blade rotates within the blade housing, fat/grease from the meat product may migrate, among other places, into the blade-blade housing bearing region.

In the power operated rotary knife 100, the fat/grease may migrate into the annular passageway 504 (FIG. 13) defined by the opposing arcuate bearing faces 322, 464 of the rotary knife blade bearing race 320 and the blade housing bearing race 460 as the knife 100 is used for meat cutting/trimming operations. However, in prior power operated rotary knives, this naturally occurring lubrication would typically be supplemented by the operator by using the pump mechanism to apply additional lubrication into the blade-blade housing region in an attempt to reduce blade-blade housing bearing friction, make the blade rotate easier, and reduce heating.

In one exemplary embodiment of the power operated rotary knife 100, there is no reservoir of grease or manual pump mechanism to apply the grease. Elimination of the need for additional lubrication, of course, advantageously eliminates those components associated with providing lubrication (grease reservoir, pump, etc.) in prior power operated rotary knives. Elimination of components will reduce weight and/or reduce maintenance requirements associated with the lubrication components of the power operated rotary knife 100. Lower friction between the knife blade 300 and the blade housing 400 decreases heat generated by virtue of friction between the rotary knife blade 300, the blade-blade housing bearing structure 500 and the blade housing 400. Reducing heat generated at the blade-blade housing bearing region has numerous benefits including mitigation of the aforementioned problem of "cooking" of displaced fragments of trimmed meat, gristle, fat, and bone that migrated into the blade-blade housing bearing region 504. In prior power operated rotary knives, frictional contact between the blade and blade housing, under certain conditions, would generate sufficient heat to "cook" material in the blade-blade housing bearing region. The "cooked" material tended to accumulate in the blade-blade housing bearing region as a sticky build up of material, an undesirable result.

Additionally, the lower friction afforded by the blade-blade housing bearing structure 500 of the power operated rotary knife 100 has the additional advantage of potentially increasing the useful life of one or more of the knife blade 300, the blade housing 400 and/or components of the gearbox 602. Of course, the useful life of any component of the power operated rotary knife 100 is dependent on proper operation and proper maintenance of the power operated knife.

As can best be seen in FIGS. 14-17, the blade-blade housing bearing structure 500 comprises an elongated rolling bearing strip 502 that is routed circumferentially through the annular passageway 504 about the axis of rotation R of the knife blade 300. A rotary knife bearing assembly 552 (FIG. 13) of the power operated rotary knife 100 includes the combination of the blade-blade housing bearing structure 500, the blade housing bearing race 460, the knife blade bearing race 320 and the annular passageway 504 defined therebetween. In an alternate exemplary embodiment, a plurality of elongated rolling bearing strips may be utilized, each similar to, but shorter in length than, the elongated bearing strip 502. Utilizing a plurality of shorter elongated bearing strips in place of the single, longer elongated bearing strip 502 may be advantageous in that shorter elongated bearing strips are less difficult and less expensive to fabricate. If a plurality of elongated bearing strips are used, such strips would be sequentially inserted within the annular passageway 504 in head-to-tail fashion or in spaced apart relationship. The plurality of elongated bearing strips may include slightly enlarged end portions so that two adjacent bearing strips do not run together or to limit an extent of overlapping of two adjacent bearing strips.

Figure 14:
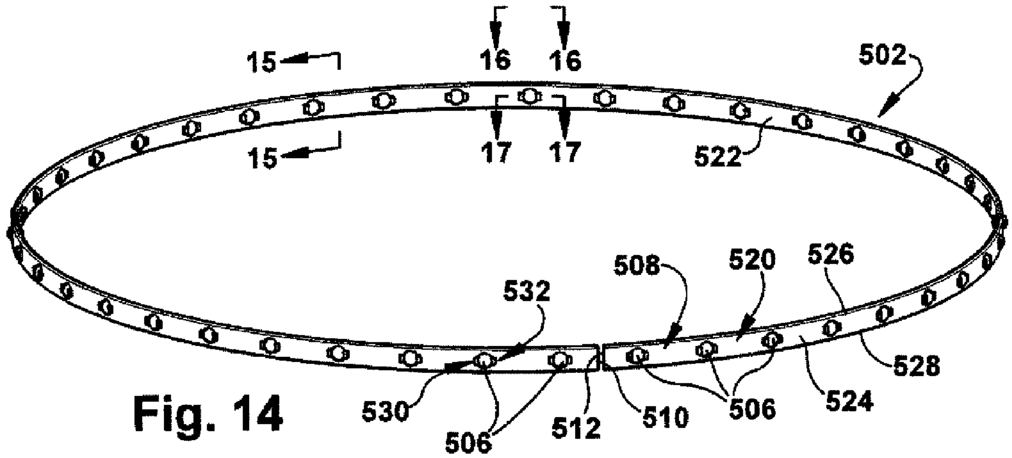
FIG. 14 is a schematic perspective view of the elongated rolling bearing strip of the blade-blade housing bearing structure of the power operated rotary knife of FIG. 1.
Figure 15:
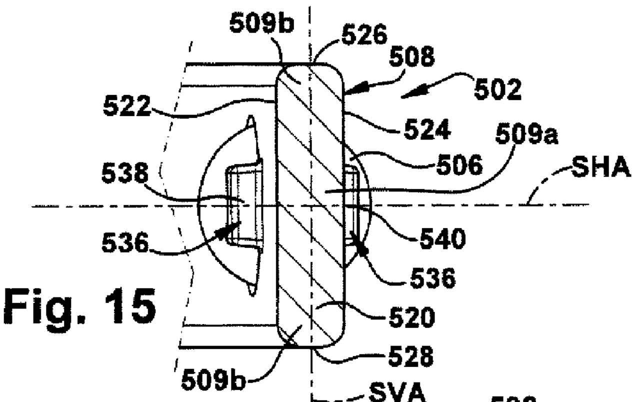
FIG. 15 is a schematic section view of the rolling bearing strip of FIG. 14 taken transverse to a longitudinal axis of the strip, as seen from a plane indicated by the line 15-15 in FIG. 14, to show a schematic section view of an elongated separator cage of the rolling bearing strip at a position where no rolling bearing is located.
Figure 16:
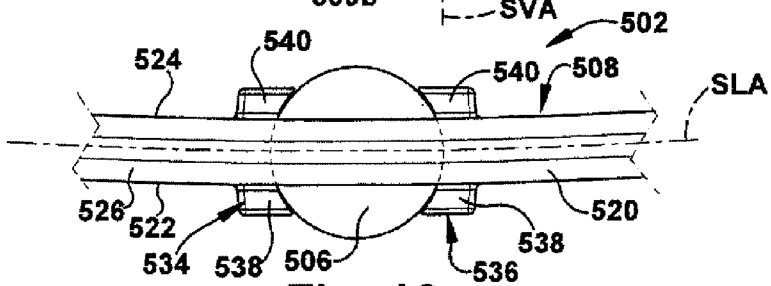
FIG. 16 is a schematic top plan view of a short portion of the rolling bearing strip of FIG. 14 taken along the longitudinal axis of the strip, as seen from a plane indicated by the line 16-16 in FIG. 14, to show a schematic top plan view of the elongated separator cage of the rolling bearing strip at a position where a rolling bearing is located.
Figure 17:
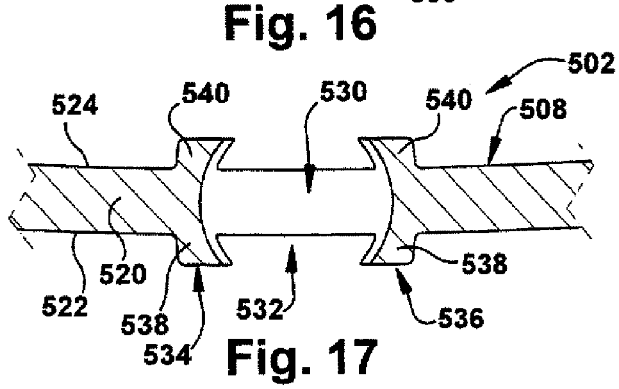
FIG. 17 is a schematic section view of the short portion of the rolling bearing strip of FIG. 14, as seen from a plane indicated by the line 17-17 in FIG. 14, with the rolling bearing removed to show a schematic section view of a pocket of the elongated separator cage.

In one exemplary embodiment, the central portion 462 of the blade housing bearing race 460 defines, in cross section, the substantially arcuate bearing face 464. Similarly, the central portion 324 of the knife blade bearing race 320 defines, in cross section, the substantially arcuate bearing face 322. As can best be seen in FIGS. 14-17, the elongated rolling bearing strip 502, in one exemplary embodiment, comprises the plurality of spaced apart rolling bearings 506 supported for rotation in the flexible separator cage 508. In one exemplary embodiment, the flexible separator cage 508 comprises an elongated polymer strip 520. The elongated polymer strip 520 defines a strip longitudinal axis SLA (FIG. 16) and is generally rectangular when viewed in cross section. The strip 520 includes a first vertical axis SVA (FIG. 15) that is orthogonal to the strip longitudinal axis SVA and a second horizontal axis SHA (FIG. 15) orthogonal to the strip longitudinal axis SLA and the first vertical axis SVA. The strip first vertical axis SVA is substantially parallel to a first inner surface 522 and a second outer surface 524 of the strip 520. As can be seen in FIG. 15, the first inner surface 522 and the second outer surface 524 are generally planar and parallel. The strip second horizontal axis SHA is substantially parallel to a third top or upper surface 526 and a fourth bottom or lower surface 528 of the strip 520.

Each of the plurality of ball bearings 506 is supported for rotation in a respective different bearing pocket 530 of the strip 520. The bearing pockets 530 are spaced apart along the strip longitudinal axis SLA. Each of the strip bearing pockets 530 defines an opening 532 extending between the first inner surface 522 and the second outer surface 524. Each of the plurality of bearing pockets 530 includes a pair of spaced apart support arms 534, 536 extending into the opening 532 to contact and rotationally support a respective ball bearing of the plurality of ball bearings 506. For each pair of support arms 534, 536, the support arms 534, 536 are mirror images of each other. Each of the pairs of support arms 534, 536 defines a pair of facing, generally arcuate bearing surfaces that rotationally support a ball bearing of the plurality of ball bearings 506. Each of the pairs of support arms 534, 536 includes an extending portion 538 that extends outwardly from the strip 520 beyond the first planar inner surface 522 and an extending portion 540 that extends outwardly from the strip 520 beyond the second planar outer surface 524.

The plurality of ball bearings 506 of the elongated rolling bearing strip 502 are in rolling contact with and provide bearing support between the knife blade bearing race 320 and the blade housing bearing race 460. At the same time, while supporting the knife blade 300 for low friction rotation with respect to the blade housing 400, the elongated rolling bearing strip 502 also functions to secure the knife blade 300 with respect to the blade housing 400, that is, the bearing strip 502 prevents the knife blade 300 from falling out of the blade housing 400 regardless of the orientation of the power operated rotary knife 100.

When the rolling bearing strip 502 and, specifically, the plurality of ball bearings 506 are inserted into the passageway 504, the plurality of ball bearings 506 support the knife blade 300 with respect to the blade housing 400. In one exemplary embodiment, the plurality of ball bearings 506 are sized that their radii are smaller than the respective radii of the arcuate bearing surfaces 464, 322. In one exemplary embodiment, the radius of each of the plurality of ball bearings 506 is 1 mm. or approximately 0.039 inch, while radii of the arcuate bearing surfaces 464, 322 are slightly larger, on the order of approximately 0.043 inch. However, it should be recognized that in other alternate embodiments, the radii of the plurality of ball bearings 506 may be equal to or larger than the radii of the arcuate bearing faces 464, 322. That is, the radii of the plurality of ball bearings 506 may be in a general range of between 0.02 inch and 0.07 inch, while the radii of the arcuate bearing surfaces 464, 322 may be in a general range of between 0.03 inch and 0.06 inch. As can best be seen in FIG. 13, when the rolling bearing strip 502 is inserted into the radial, annular gap G, the plurality of ball bearings 506 and a central portion 509*a* of the separator cage 508 are received in the annular passageway 504 defined between the opposing bearing surfaces 319, 459 of the rotary knife blade 300 and the blade housing 400. The annular passageway 504 comprises part of the annular gap G between the opposing outer wall 312 of the rotary knife blade body 302 and the inner wall 452 of the blade housing blade support section 450. In one exemplary embodiment, the annular gap G is in a range of approximately 0.04-0.05 inch and is disposed between the vertical inner wall portion 452*a* of the blade support section 450 of the blade housing 400 and the facing vertical outer wall portion 340 of the outer wall 312 of the body 302 of the knife blade 300, adjacent or in the region of the opposing bearing surfaces 319, 459.

As can be seen in FIG. 13, the annular passageway 504 is generally circular in cross section and receives the plurality of ball bearings 506 and a central portion 509*a* of the separator cage 508 of the elongated rolling bearing strip 502. When positioned in the annular passageway 504, the elongated rolling bearing strip 502 and, specifically, the separator cage 508 of the rolling bearing strip 502, forms substantially a circle or a portion of a circle within the annular passageway 504 centered about an axis that is substantially congruent with the rotary knife blade axis of rotation R. As the separator cage 508 of the rolling bearing strip 502 is vertically oriented in the gap G, the cage 508 includes top and bottom portions 509*b* extending from the central portion 509*a*. As can be seen in FIG. 13, the top and bottom portions 509*b* of the separator cage 508 extend axially slightly above and slightly below the plurality of ball bearings 506. When positioned in the annular passageway 504, the elongated rolling bearing strip 502 forms substantially a circle or a portion of a circle within the annular passageway 504 centered about an axis that is substantially congruent with the rotary knife blade axis of rotation R, while the separator cage 508 forms substantially a cylinder or a portion of a cylinder with the gap G centered about the rotary knife blade axis of rotation R.

As can be seen in FIG. 13, the separator cage 508, in cross section, is rectangular and is oriented in an upright position within the gap G, the separator cage 508 may be viewed as forming substantially a cylinder or a partial cylinder within the gap G centered about the rotary knife blade axis of rotation R. The plurality of ball bearings 506 ride within the annular passageway 504, which is substantially circular in cross section and is centered about the blade axis of rotation R.

To minimize friction, it is not desirable for the flexible separator cage 508 to be in contact with or in bearing engagement with either the rotary knife blade 300 or the blade housing 400 as this would unnecessarily generate sliding friction. What is desired is for the rotary knife blade 300 to be solely supported with respect to the blade housing 400 via rolling bearing support provided by the plurality of ball bearings 506 of the rolling bearing strip 502 bearing against the opposing arcuate bearing faces 322, 464 of the rotary knife blade 300 and the blade housing 400. Accordingly, as can best be seen in the sectional view of FIG. 13, the flexible separator cage 508 is configured to ride in the annular passageway 504 and in the annular gap G without substantial contact with either the knife blade 300 or the blade housing 400 or the opposing bearing surfaces 319, 459 of the knife blade 300 and blade housing 400. In one exemplary embodiment, a width of the upper and lower portions 509*b* of the separator cage 508 is on the order of 0.03 inch and, as mentioned previously, the annular gap G is on the order of 0.04-0.05 inch. Thus, when the rolling bearing strip 502 is inserted into the annular passageway 504, a clearance of approximately 0.005-0.010 inch exists between the separator cage 508 and the facing vertical outer wall portion 340 of the outer wall 312 of the body 302 of the knife blade 300, adjacent the opposing bearing surfaces 319, 459. Depending on the specific length of the separator cage 508 and the circumference of the gap G, the ends 510, 512 of the separator cage 508 may be spaced apart slightly (as is shown in FIG. 14), may be in contact, or may be slightly overlapping.

Figure 10:
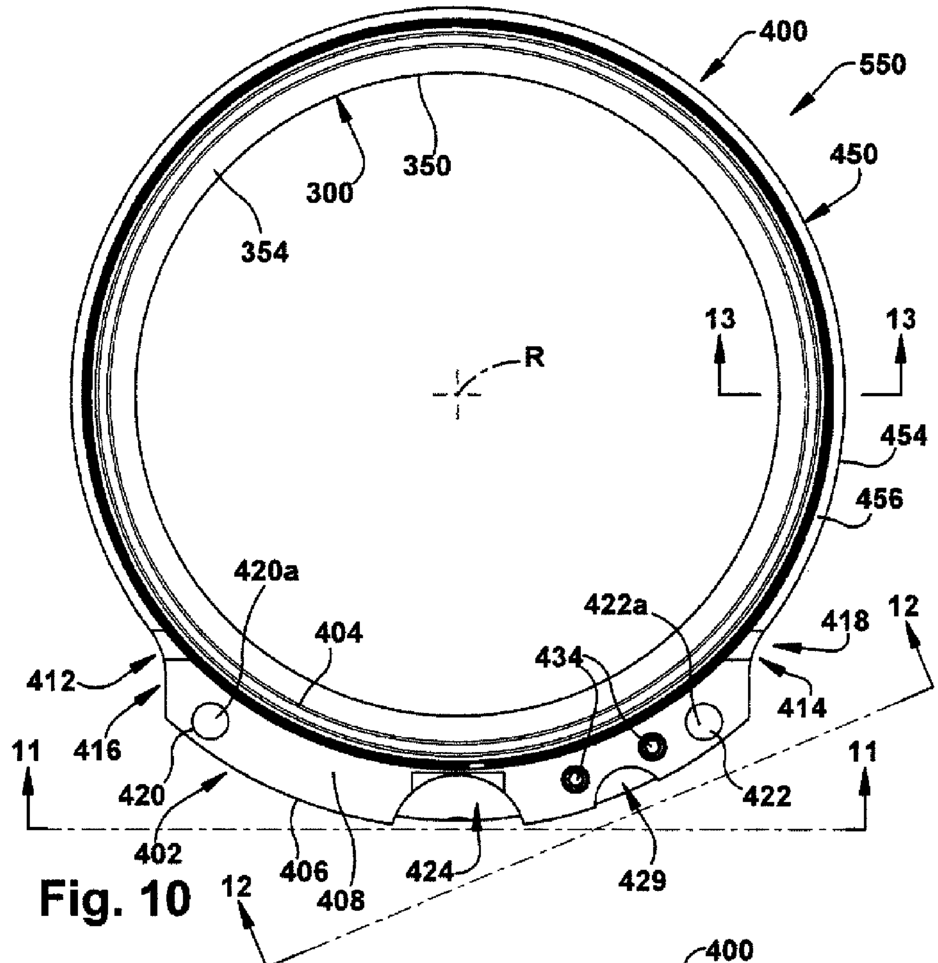
FIG. 10 a schematic top plan view of an assembled combination of the rotary knife blade, the blade housing, and the blade-blade housing bearing structure of the power operated rotary knife of FIG. 1.
Figure 11:
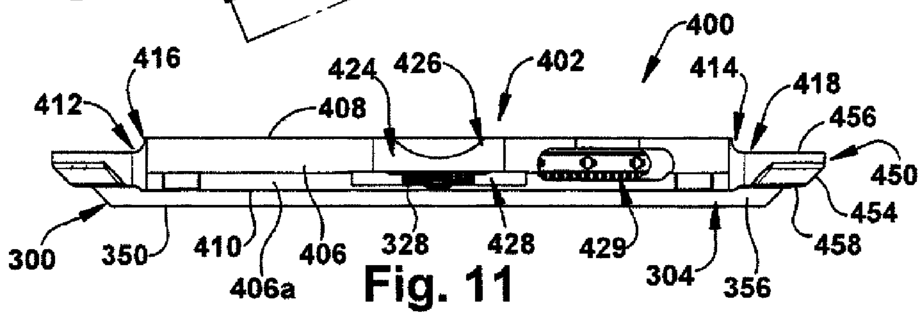
FIG. 11 is a schematic rear elevation view of the assembled combination of the rotary knife blade, blade housing, and blade-blade housing bearing structure of FIG. 10, as seen from a plane indicated by the line 11-11 in FIG. 10, with a blade housing plug removed from the blade housing.
Figure 12:
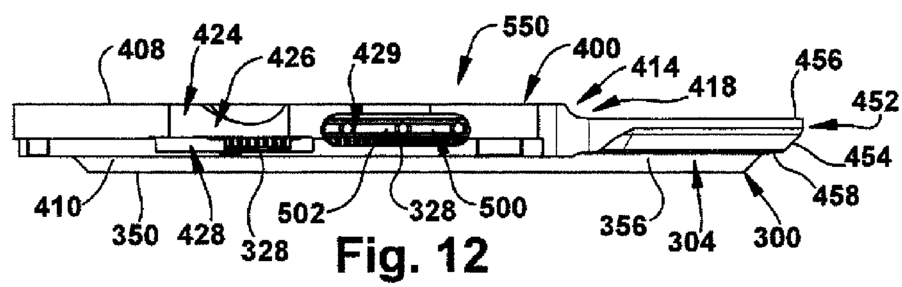
FIG. 12 is a schematic side elevation view of the assembled combination of the rotary knife blade, blade housing, and blade-blade housing bearing structure of FIG. 10, as seen from a plane indicated by the line 12-12 in FIG. 10, with a blade housing plug removed from the blade housing.

It should be appreciated that when the rotary knife blade 300 is rotated by the drive train 604 at a specific, desired RPM, the separator cage 508 also moves or translates in a circle along the annular gap G, although the rotational speed of the separator cage 508 within the gap G is less than the RPM of the rotary knife blade 300. Thus, when the power operated rotary knife 100 is in operation, the elongated rolling bearing strip 502 traverses through the annular passageway 504 forming a circle about the knife blade axis of rotation R. Similarly, when the power operated rotary knife 100 is in operation, the separator cage 508, due to its movement or translation along the annular gap G about the knife blade axis of rotation R, can be considered as forming a complete cylinder within the gap G. Additionally, when the rotary knife blade 300 is rotated, the plurality of ball bearings 506 both rotate with respect to the separator cage 506 and also move or translate along the annular passageway 504 about the knife blade axis of rotation R as the separator cage 508 moves or translates along the annular gap G. Upon complete insertion of the rolling bearing strip 502 into the gap G, the assembled blade-blade housing combination 550 (FIGS. 9 and 10) is then ready to be secured, as a unit, to the frame body 150 of the head assembly 111.

Rolling bearing strips of suitable configuration are manufactured by KMF of Germany and are available in the United States through International Customized Bearings, 200 Forsyth Dr., Step. E, Charlotte, N.C. 28237-5815.

Securing the Knife Blade 300 to the Blade Housing 400

The blade-blade housing bearing structure 500 is utilized to both secure the rotary knife blade 300 to the blade housing 400 and to rotatably support the blade 300 within the blade housing 400. To insert the elongated rolling bearing strip 502 of the blade-blade housing bearing structure 500 the passageway 504 formed between the radially aligned, opposing arcuate bearing faces 322, 464 of the blade bearing race 320 and the blade housing bearing race 460, the blade housing plug 430 is removed from the blade housing plug opening 429 of the blade housing 400. Then, the rolling bearing strip 502 is routed between the knife blade 300 and the blade housing 400 into the annular gap G and through the passageway 504. Next, the blade housing plug 430 is inserted in the blade housing plug opening 429 and the plug 430 is secured to the blade housing 400. The blade-blade housing combination 550 then ready to be secured to the arcuate mounting pedestal 152 of the frame body 150.

Figure 58:
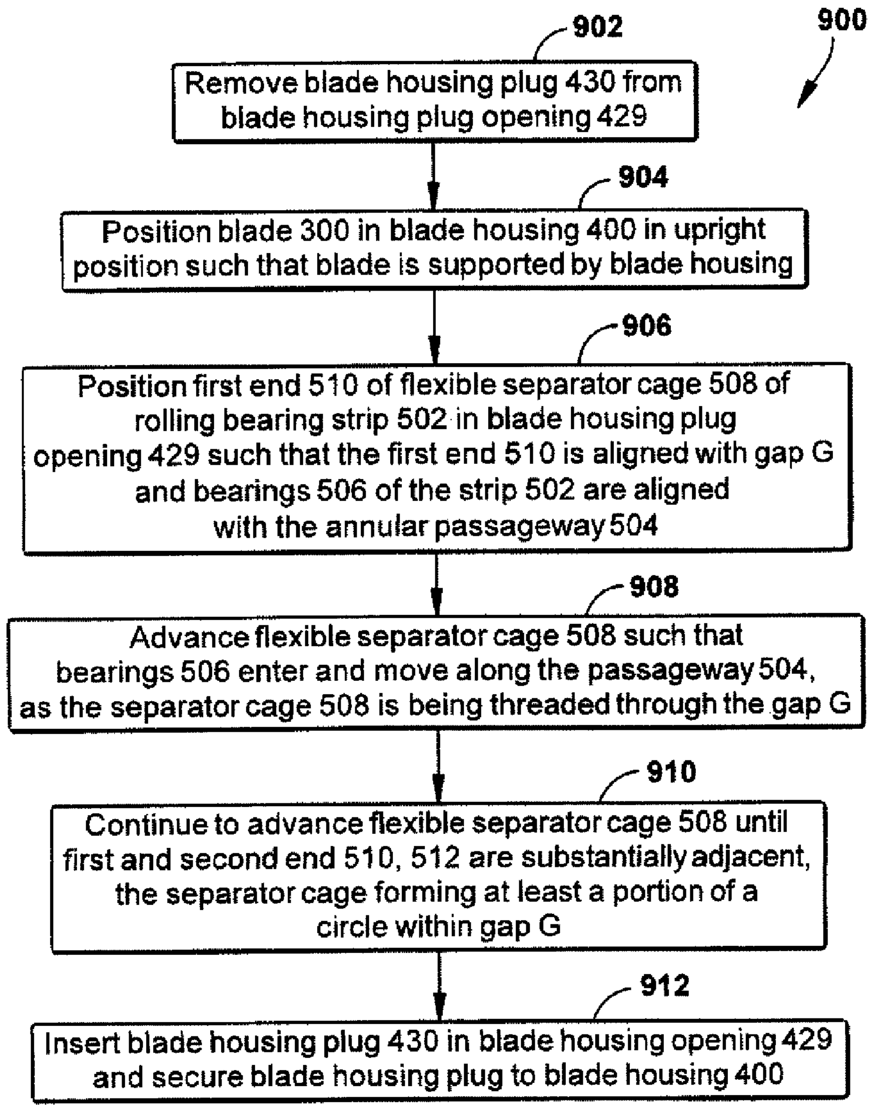
FIG. 58 is a is a schematic flow diagram for a method of securing and rotationally supporting the rotary knife blade with respect to the blade housing utilizing the blade-blade housing bearing structure of the power operated rotary knife of FIG. 1

As can be seen in FIGS. 18-21 and in the flow diagram set forth in FIG. 58, a method of securing the rotary knife blade 300 to the blade housing 400 for rotation with respect to the blade housing 400 about the blade axis of rotation R is shown generally at 900 in FIG. 58. The method 900 includes the following steps. At step 902, remove the blade housing plug 430 from the blade housing plug opening 429. At step 904, position the rotary knife blade 300 in blade housing 400 in an upright position such that blade 300 is supported by blade housing 400. Specifically, the knife blade 300 is positioned in the blade housing 400 in an upright orientation such that the horizontal extending portion 342 of the outer wall 312 of the knife blade 300 and the bottom surface 345 of the knife blade set of gear teeth 330 are disposed on the respective first and second ledges 470, 472 of the blade housing 400. In this upright orientation, the blade housing bearing race 460 and the knife blade bearing race 320 are substantially radially aligned such that the annular passageway 504 is defined between the blade housing bearing race 460 and the knife blade bearing race 320.

Figure 18:
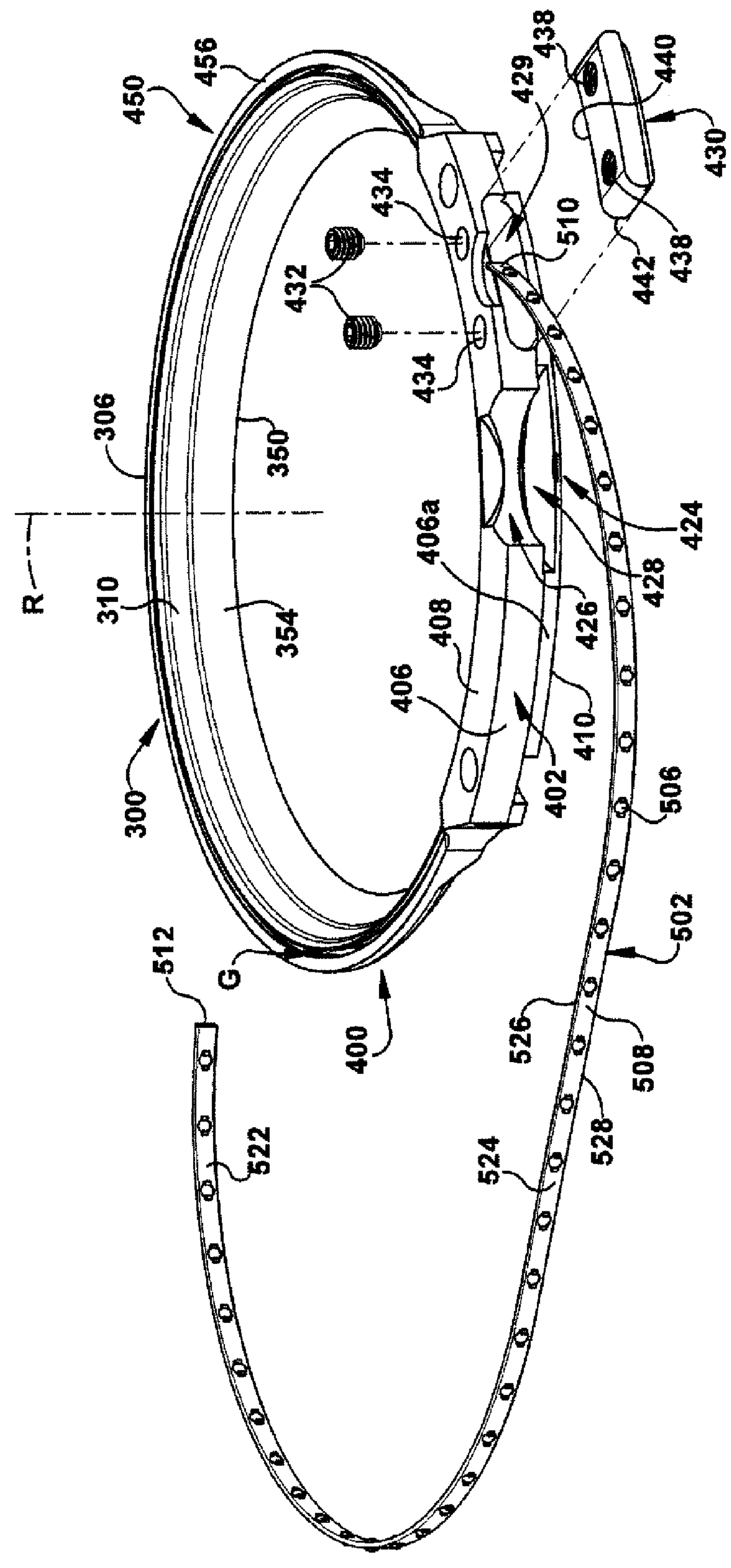
FIG. 18 is a schematic perspective view representation of a method of releasably securing the rotary knife blade to the blade housing utilizing the blade-blade housing bearing structure in the power operated rotary knife of FIG. 1, showing alignment of the elongated rolling bearing strip with an annular passageway defined between the rotary knife blade and the blade housing.
Figure 19:
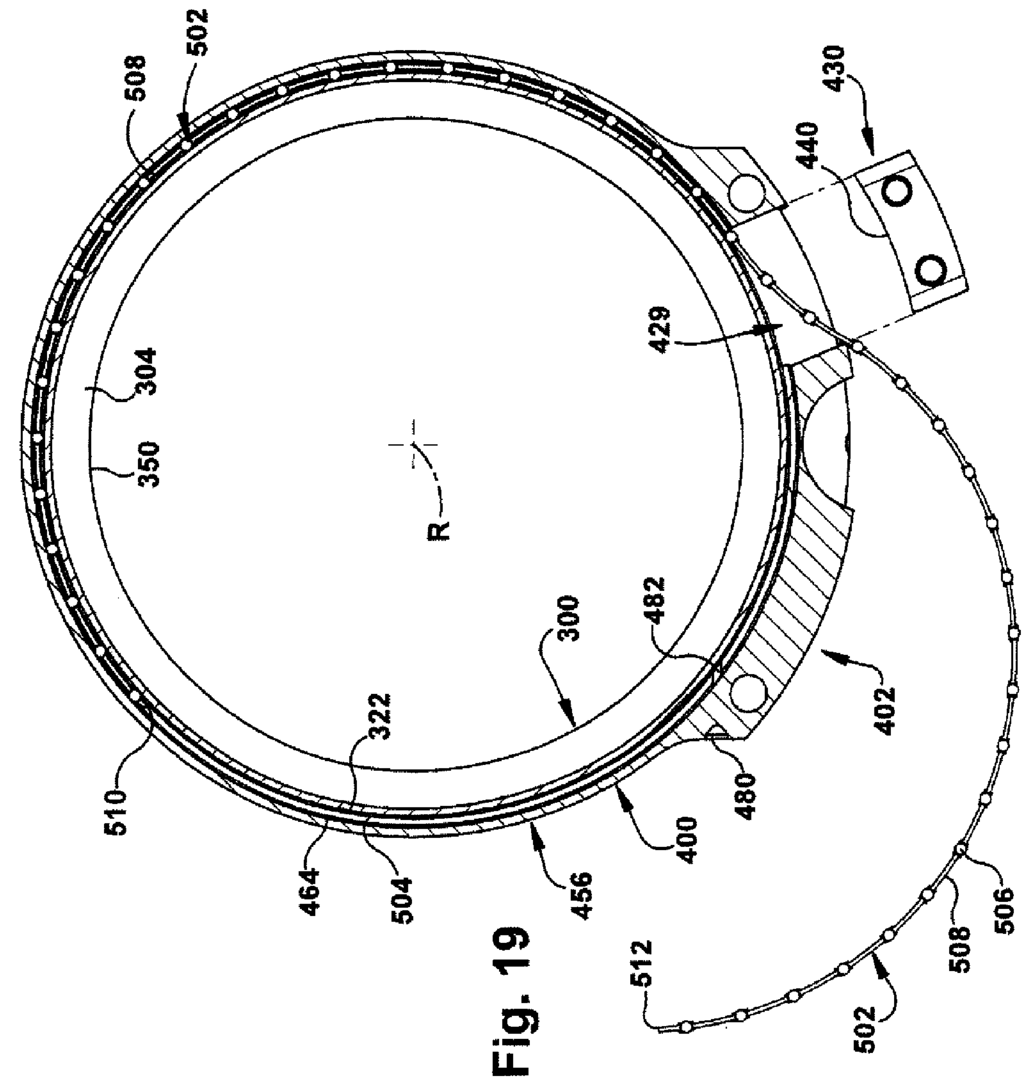
FIG. 19 is a schematic section view representation of a method of releasably securing the rotary knife blade to the blade housing utilizing the blade-blade housing bearing structure in the power operated rotary knife of FIG. 1, showing partial insertion of the elongated rolling bearing strip into the annular passageway between the rotary knife blade and the blade housing.
Figure 21:
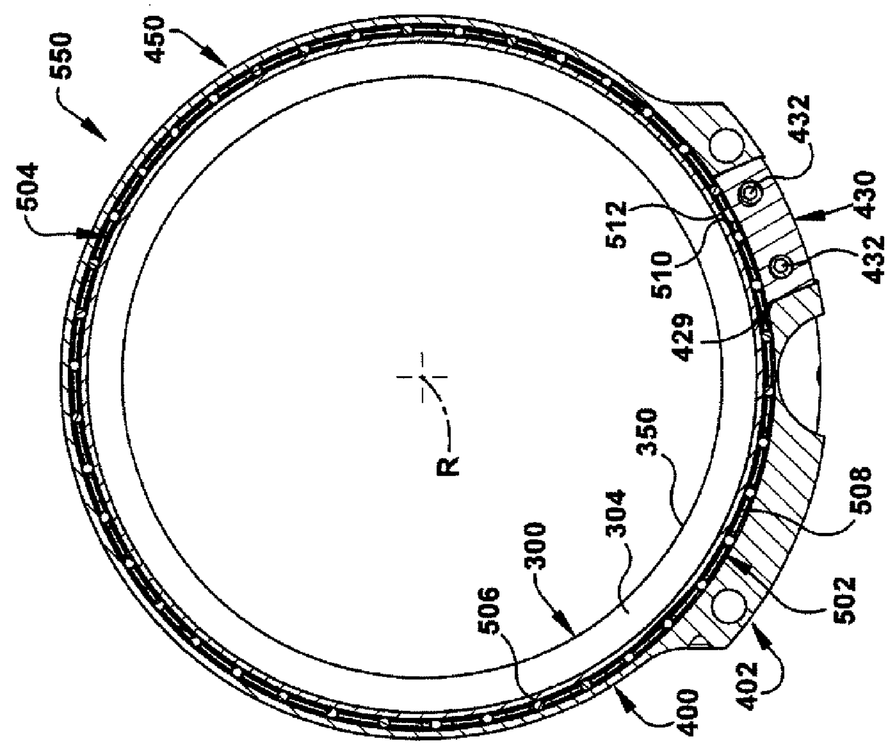
FIG. 21 is a schematic section view representation of a method of releasably securing the rotary knife blade to the blade housing utilizing the blade-blade housing bearing structure in the power operated rotary knife of FIG. 1, showing attachment of the blade housing plug to the blade housing after insertion of the elongated rolling bearing strip into the annular passageway between the knife blade and the blade housing.
Figure 20:
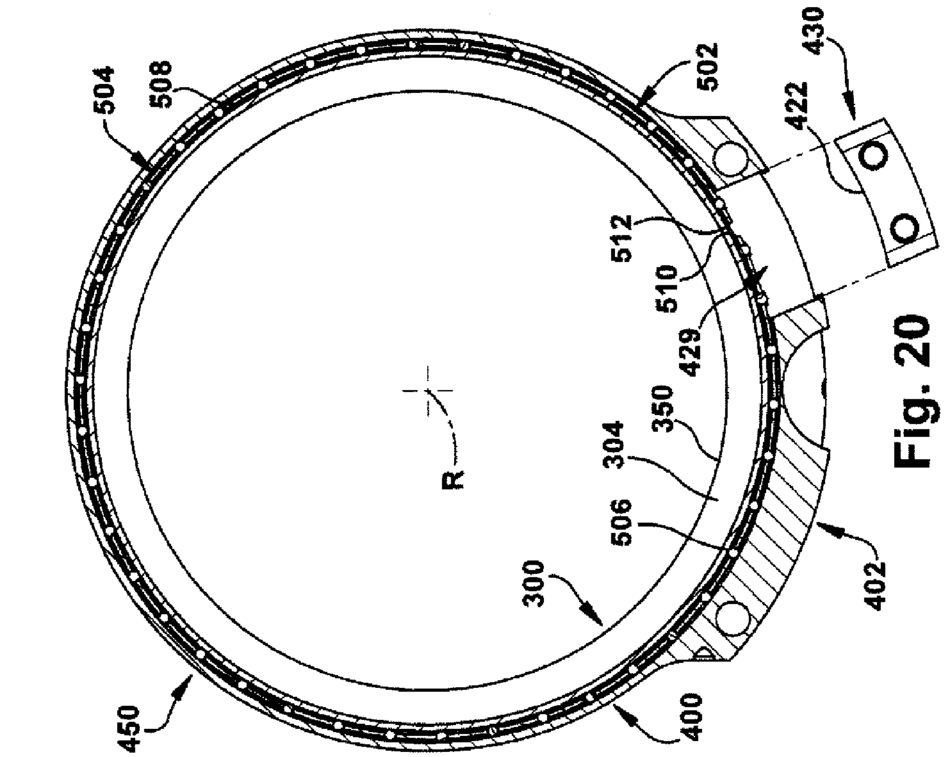
FIG. 20 is a schematic section view representation of a method of releasably securing the rotary knife blade to the blade housing utilizing the blade-blade housing bearing structure in the power operated rotary knife of FIG. 1, showing completion of insertion of the elongated rolling bearing strip into the annular passageway between the knife blade and the blade housing.
Figure 23:
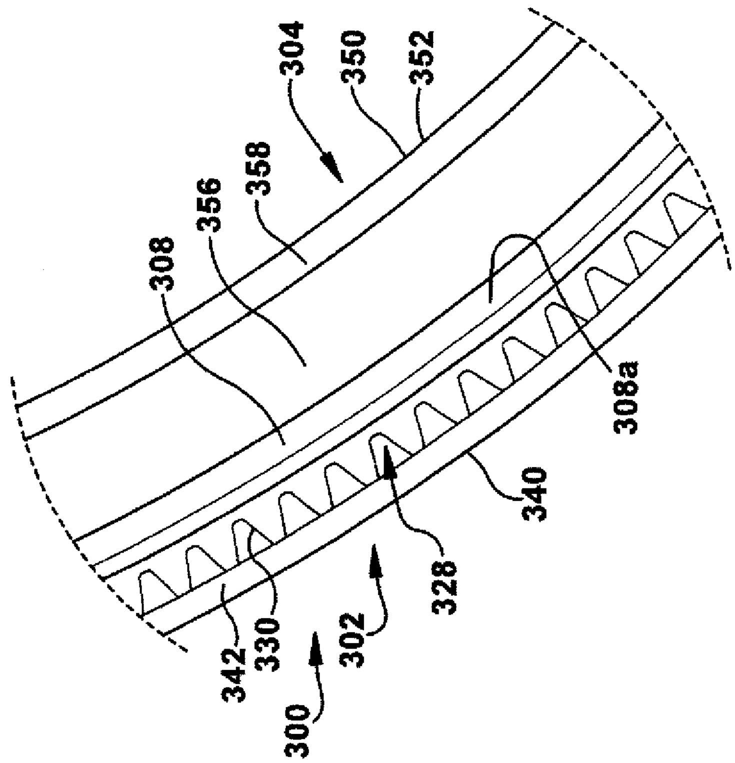
FIG. 23 is schematic enlarged bottom plan view of the portion of the annular rotary knife blade of FIG. 22.
Figure 22:
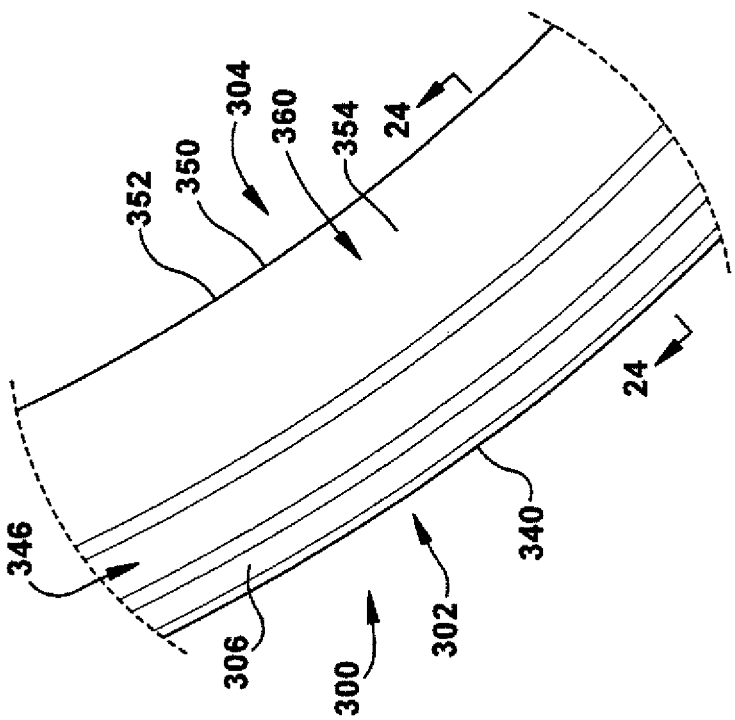
FIG. 22 is a schematic enlarged top plan view of a portion of the annular rotary knife blade of the power operated rotary knife of FIG. 1.

At step 906, as is shown schematically in FIG. 18, position the first end 510 of flexible separator cage 508 of rolling bearing strip 502 in blade housing plug opening 429 such that first end 510 is tangentially aligned with the gap G between the blade 300 and the blade housing 400 and the bearings 506 of the rolling bearing strip 502 are aligned with the annular passageway 504 between the opposing arcuate bearing faces 322, 464 of the blade 300 and blade housing 400. At step 908, advance the flexible separator cage 508 tangentially with respect to the gap G such that bearings 506 of the rolling bearing strip 502 enter and move along the passageway 504. That is, as is shown schematically in FIG. 19, the separator cage 508 is advanced such that the separator cage 508 is effectively threaded through the passageway 504 and the gap G. The separator cage 508 is oriented in an upright position such that the cage fits into the gap G between the knife blade 300 and the blade housing 400.

At step 910, continue to advance the flexible separator cage 508 until first and second ends 510, 512 of the separator cage 508 are substantially adjacent (FIG. 20), that is, the separator cage 508 forms at least a portion of a circle within the passageway 504 and the gap G (like the circle C formed by the separator cage 508 schematically shown in FIG. 2A). A longitudinal extent of the separator cage 508 of the elongated strip 502 along the strip longitudinal axis SLA is sufficient such that when the strip 502 is installed in the passageway 504, the first and second ends 510, 512 of the strip separator cage 508, if not in contact, are slightly spaced apart as shown, for example in FIGS. 2A and 14. That is, the upright strip cage 508 when installed in the passageway 504 forms at least a portion of a cylinder within the passageway 504 and the gap G. At step 912 and as is shown schematically in FIG. 21, insert the blade housing plug 430 in blade housing opening 429 and secure blade housing plug to blade housing 400 with the fasteners 432.

As the rotary knife blade 400 is rotated by the gear train 604, the elongated rolling bearing strip 502 will travel in a circular route or path of travel within the gap G, that is, the plurality of spaced apart ball bearings 506 will move in a circle though the annular passageway 504. However, because the individual bearings are also rotating within the separator cage 508 as the separator cage 508 moves in a circular route in the gap G, the rotational speed or angular velocity of the separator cage 508 is significantly less than the rotation speed or angular velocity of the rotary knife blade 300 with respect to the blade housing 400.

It should be appreciated that not all of the mating or coacting bearing surfaces of the rotary knife bearing assembly 552 including of the plurality of ball bearings 506 of the elongated rolling bearing strip 502, the rotary knife blade bearing race 320, the blade housing bearing race 460, and the blade housing plug bearing race portion 446, as described above, are in contact at any given time because there are necessarily running or operating clearances between the bearing strip rotary knife blade 300, the blade housing 400, and the blade housing plug 430 which allow the blade 300 to rotate relatively freely within the blade housing 400.

These running or operating clearances cause the rotary knife blade 300 to act somewhat akin to a teeter-totter within the blade housing 400, that is, as one region of the blade 300 is pivoted or moved upwardly within the blade housing 400 during a cutting or trimming operation, the diametrically opposite portion of the blade (180° away) is generally pivoted or moved downwardly within the blade housing. Accordingly, the specific mating bearing surfaces of the rotary blade bearing assembly 552 in contact at any specific location of the rotary knife blade 300, the blade housing 400, or the elongated bearing strip 502 will change and, at any given time, will be determined, at least in part, by the forces applied to the rotary knife blade 300 during use of the power operated rotary knife 100. Thus, for any specific portion or region of a bearing surface of the rotary blade bearing assembly 552, there may be periods of non-contact or intermittent contact with a mating bearing surface.

Removal of the rotary knife blade 300 from the blade housing 400 involves the reverse of the procedure discussed above. Namely, the blade housing plug 430 is removed from the blade housing 400. The rotary knife blade 300 is rotated with respect to the blade housing 400 until the adjacent ends 510, 512 of the separator cage 508 are visible within the blade housing plug opening 429. A small instrument, such as a small screwdriver, is used to contact and direct or pry one end of the separator cage 508, say, the first end 510 of the separator cage 508, tangentially away from the gap G. Rotation of the rotary knife blade 300 is continued until a sufficient length of the separator cage 508 is extending tangentially away from the gap G and through the blade housing plug opening 429 such that the end 510 of the separator cage 508 may be grasped by the fingers of the operator. The separator cage 508 is then pulled from the gap G. Once the cage 508 has been completely removed from the gap G between the rotary knife blade 300 and the blade housing 400, the blade housing 400 is turned upside down and the rotary knife blade 300 will fall out of the blade housing 400.

Cutting Profile of Blade-Blade Housing Combination 550

Figure 54:
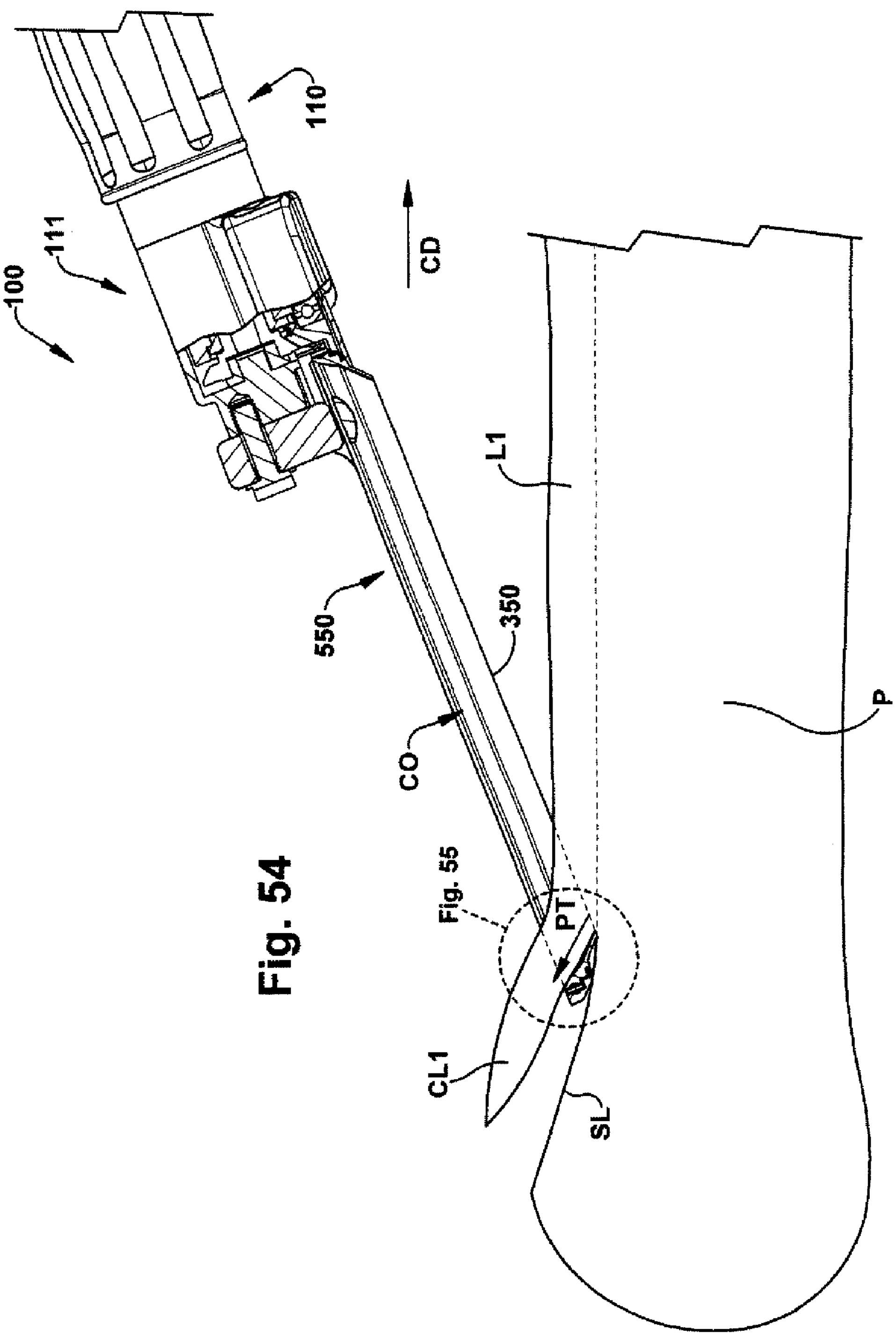
FIG. 54 is a schematic view, partly in side elevation and partly in section, depicting use of the power operated rotary knife of FIG. 1 for trimming a layer of material from a product utilizing the "flat blade" style rotary knife blade, shown, for example, in FIG. 24.
Figure 55:
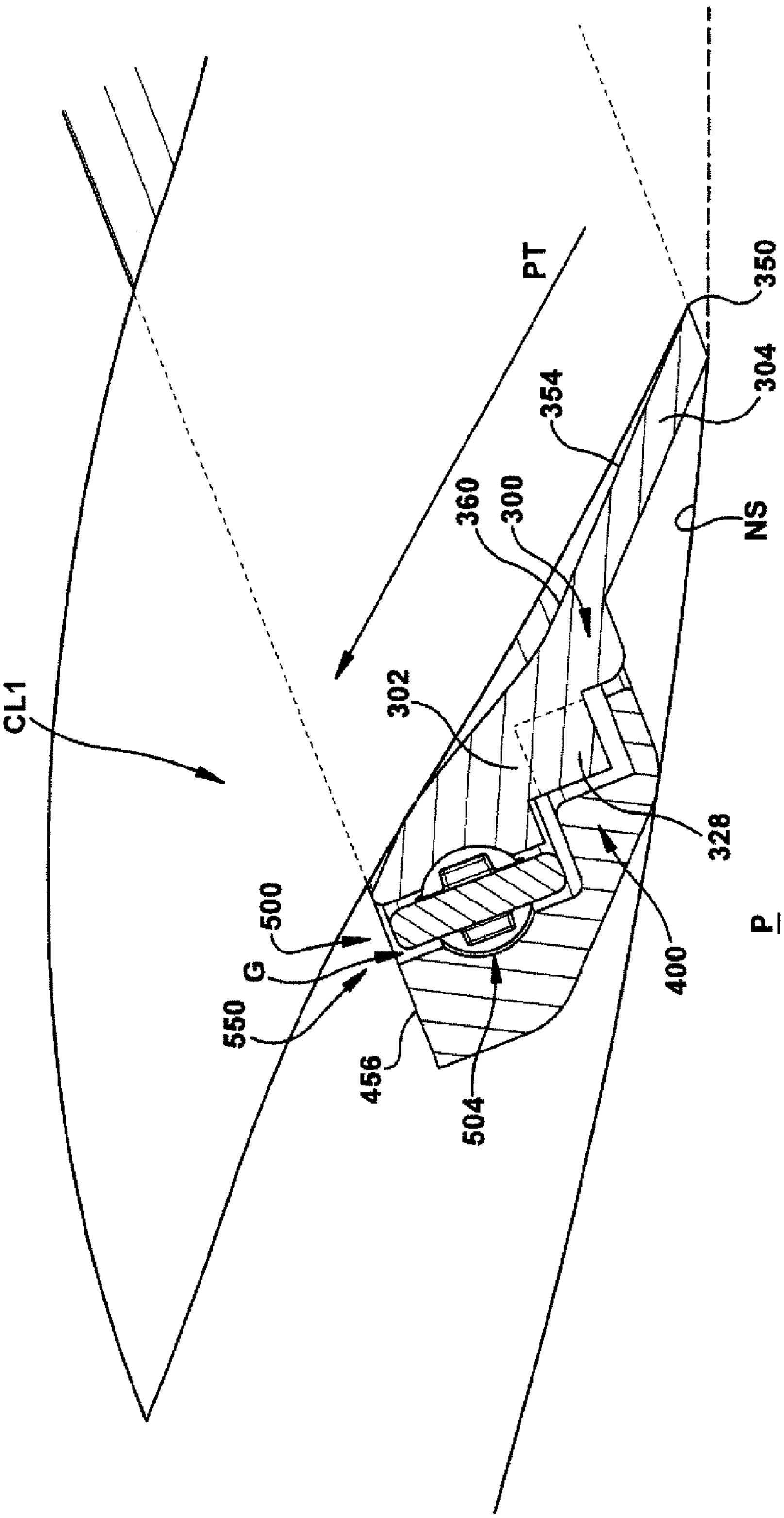
FIG. 55 is a schematic enlarged view, partly in side elevation and partly in section, depicting use of the power operated rotary knife of FIG. 1 for trimming a layer of material from a product utilizing the "flat blade" style rotary knife blade.

The friction or drag experienced by the operator as the power operated rotary knife 100 is manipulated by the operator to move through a product P, as schematically illustrated in FIGS. 54 and 55, is dependent, among other things, on the cross sectional shape or configuration of the blade-blade housing combination 550 in a cutting region CR of the assembled combination 550. As can best be seen in FIG. 3, the cutting region CR of the blade-blade housing combination 550 is approximately 240° of the entire 360° periphery of the combination. The cutting region CR excludes the approximately 120° of the periphery of the blade-blade housing combination 550 occupied by the mounting section 402 of the blade housing 400.

As can best be seen in FIGS. 54 and 55, the blade-blade housing combination 550 is configured and contoured to be as smooth and continuous as practical. As can best be seen in FIG. 54, a layer L1 of material is cut or trimmed from a product P being processed (for example, a layer of tissue, for example, a layer of meat or fat trimmed from an animal carcass) by moving the power operated rotary knife 100 in a cutting direction CD such that the rotating knife blade 300 and blade housing 400 move along and through the product P to cut or trim the layer of material L1. As the power operated rotary knife 100 is moved by the operator, the blade edge 350 cuts the layer L1 forming a cut portion CL1 of the layer L1. The cut portion CL1 moves along a cut or trimmed material path of travel PT through the cutting opening CO of the blade-blade housing combination 550 as the power operated rotary knife 100 advances through the product P.

A new outer surface layer NS (FIG. 55) formed as the layer L1 is cut away from the product P. The cut portion CL1 of the layer L1 slides along the inner wall 360 of the rotary knife blade 300, while new outer surface layer NS slides along the respective outer walls 356, 454 of the blade section 350 of the knife blade 300 and the blade support section 404 of the blade housing 400.

A smooth transition between the blade section outer wall 356 of the knife blade 300 and the blade support section outer wall 454 of the blade housing 400 is provided by the short, radially extending driven gear cap portion 466 of the blade housing 400 and the radially extending shoulder **308*a* of the lower end 308 of the rotary knife blade body 302. The close proximity of the radially extending end 467 of the driven gear cap portion 466 provides a labyrinth seal to impede ingress of foreign materials into the region of the knife blade driven gear 328 and the region of the blade-blade housing bearing structure 500. Finally, the blade-blade housing combination 550** in the cutting region CR is shaped to extent possible to reduce drag and friction experienced by the operator when manipulating the power operated rotary knife in performing cutting or trimming operations.

Gear Train 604

The drive mechanism 600 of the power operated rotary knife 100 includes certain components and assemblies internal to the power operated rotary knife 100 including the gear train 604 and the driven gear 328 of the rotary knife blade 300 and certain components and assemblies external to the power operated rotary knife 100 including the drive motor 800 and the flexible shaft drive assembly 700, which is releasably coupled to the knife 100, via the drive shaft latching assembly 275.

Within the power operated rotary knife 100, the drive mechanism 600 includes the gearbox 602 comprising the gear train 604. In one exemplary embodiment, the gear train 604 includes the pinion gear 610 and the drive gear 650. The drive gear 650, in turn, engages the driven gear 328 of the rotary knife blade 300 to rotate the knife blade 300. As noted previously, the gearbox drive gear 650, in one exemplary embodiment, is a double gear that includes an upper, vertically or axially oriented bevel gear 652 and a lower, horizontally or radially oriented spur gear 654. The drive gear upper bevel gear 652 engages and is rotatably driven by the pinion gear 610. The drive gear lower spur gear 654 defines a plurality of drive gear teeth 656 that are mating involute gear teeth that mesh with the involute gear teeth 332 of the rotary knife blade driven gear 328 to rotate the rotary knife blade 300. This gearing combination between the drive gear 650 and the rotary knife blade 300 defines a spur gear involute gear drive 658 (FIG. 8A) to rotate the rotary knife blade 300.

In the involute gear drive, the profiles of the rotary knife gear teeth 332 of the rotary knife blade 300 and the gear teeth 656 of the spur gear 654 of the drive gear 650 are involutes of a circle and contact between any pair of gear teeth occurs at a substantially single instantaneous point. Rotation of the drive gear 650 and the knife blade driven gear 328 causes the location of the contact point to move across the respective tooth surfaces. The motion across the respective gear tooth faces is a rolling type of contact, with substantially no sliding involved. The involute tooth form of rotary knife blade gear teeth 332 and the spur gear teeth 656 results in very little wear of the respective meshing gear teeth 332, 656 versus a gearing structure wherein the meshing gear teeth contact with a sliding motion. The path traced by the contact point is known as the line of action. A property of the involute tooth form is that if the gears are meshed properly, the line of action is straight and passes through the pitch point of the gears. Additionally, the involute gear drive 658 is also a spur gear drive which means that an axis of rotation DGR (shown in FIGS. 8 and 8A) of the drive gear 650 is substantially parallel to the axis of rotation R of the knife blade 300. Such a spur drive with parallel axes of rotation DGR, R is very efficient in transmitting driving forces. The spur drive gearing arrangement of the rotary knife blade gear teeth 332 and the spur gear drive teeth 656 also advantageously contributes to reducing the wear of the meshing gears 332, 656 compared with other more complex gearing arrangements.

Figure 37:
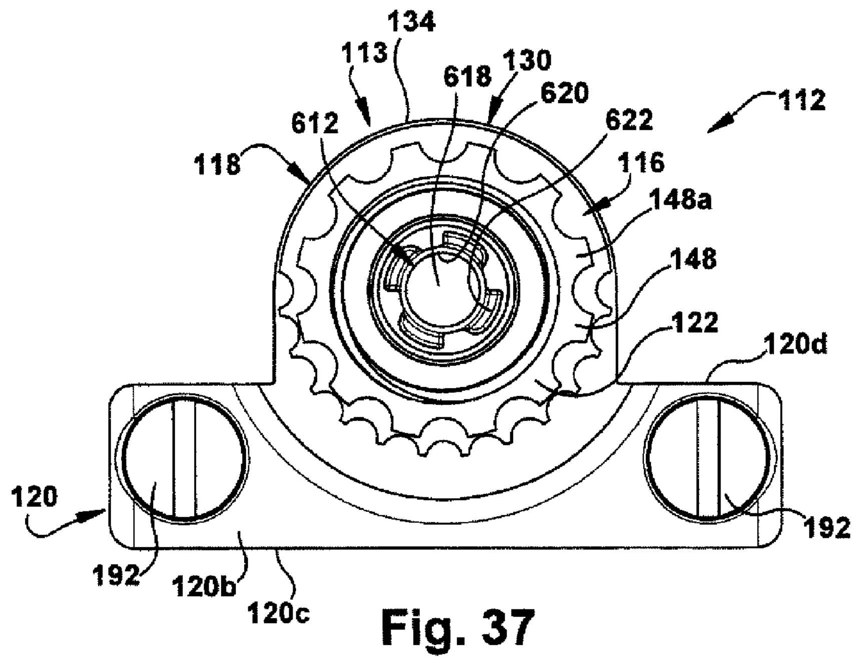
FIG. 37 is a schematic rear elevation view of the gearbox assembly of FIG. 33.
Figure 38:
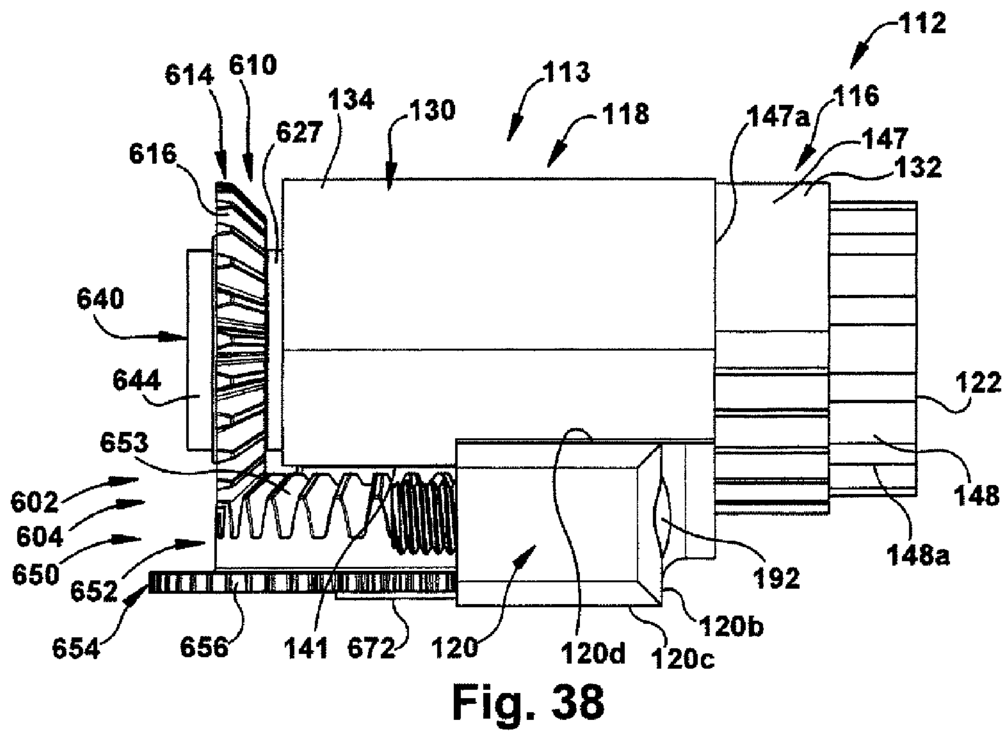
FIG. 38 is a schematic right side elevation view of the gearbox assembly of FIG. 33.

The pinion gear 610 comprises an input shaft 612 and a gear head 614 that extends radially outwardly from the input shaft 612 and defines a set of bevel gear teeth 616. The input shaft 612 extends in a rearward direction RW along the handle assembly longitudinal axis LA and includes a central opening 618 extending in a forward direction FW from a rearward end 629 (FIG. 41) to a forward end 628 of the input shaft 612, the central opening 618 terminating at the gear head 614. An inner surface 620 of the input shaft 612 defines a cross-shaped female socket or fitting 622 (FIGS. 37 and 40) which receives a mating male drive fitting 714 (FIG. 53) of the shaft drive assembly 700 to rotate the pinion gear 610 about an axis of rotation PGR which is substantially congruent with the handle assembly longitudinal axis LA and intersects the knife blade axis of rotation R.

Figure 42:
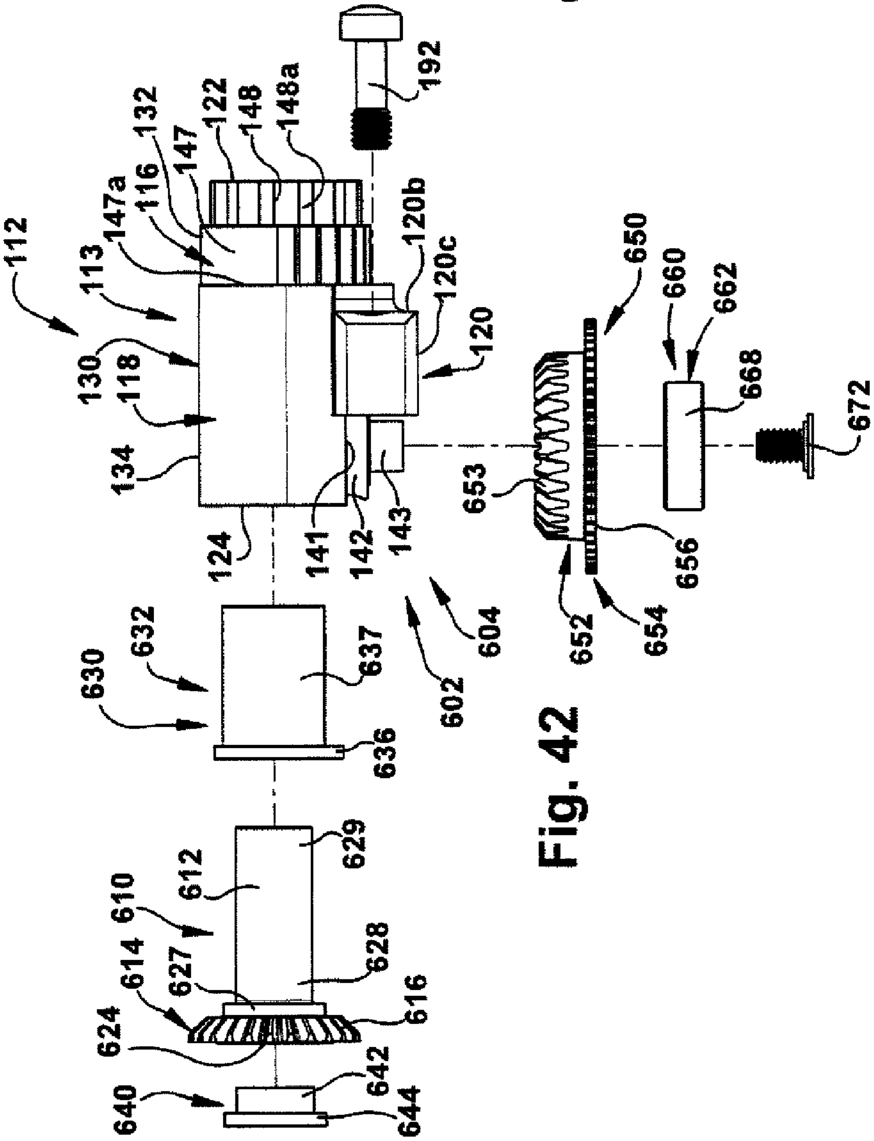
FIG. 42 is a schematic exploded side elevation view of the gearbox assembly of FIG. 33.
Figure 44:
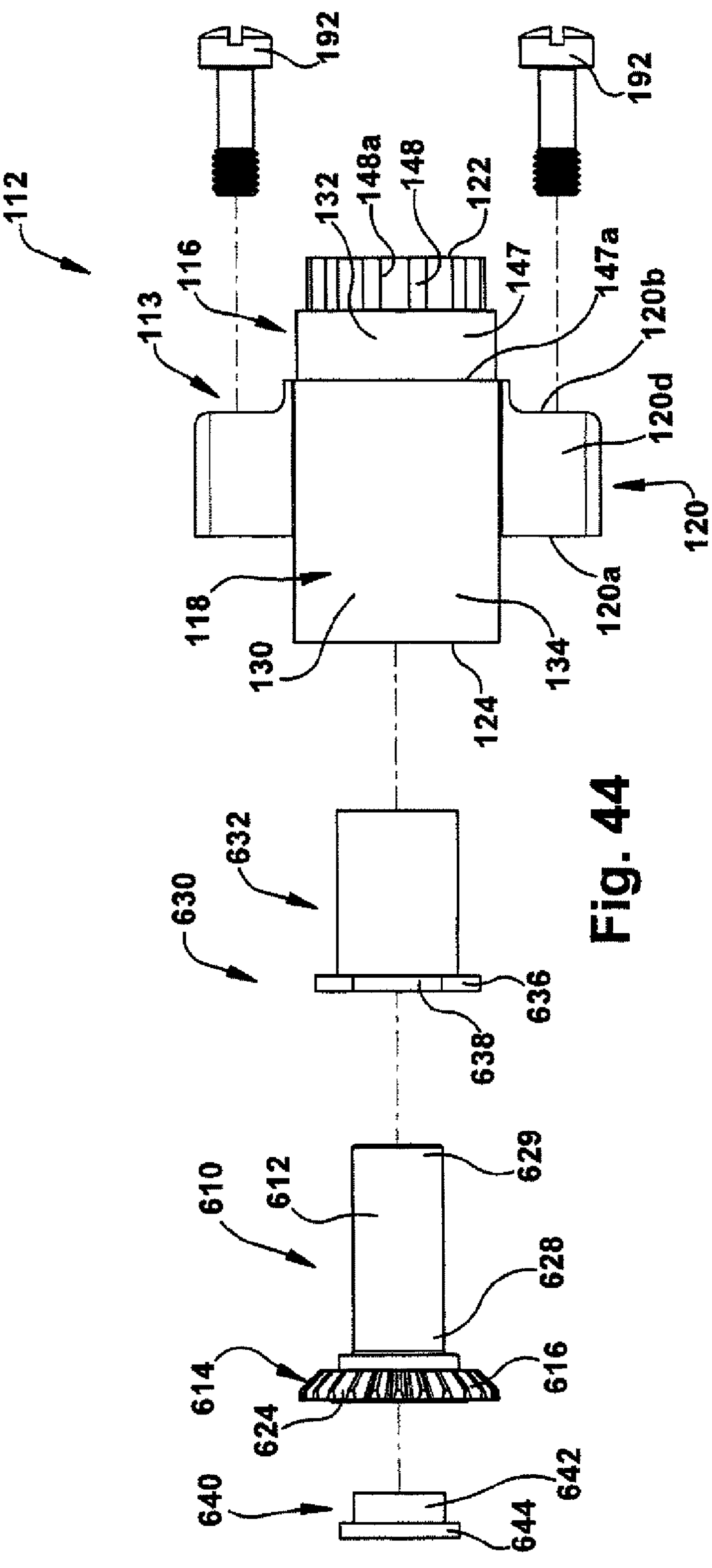
FIG. 44 is a schematic exploded top plan view of the gearbox assembly of FIG. 33.

The pinion gear 610 is supported for rotation about the pinion gear axis of rotation PGR (FIGS. 8 and 8A) by the bearing support assembly 630, which, in one exemplary embodiment, includes a larger sleeve bushing 632 and a smaller sleeve bushing 640 (FIG. 42). As can best be seen in FIG. 41, a forward facing surface 624 of the gear head 614 of the pinion gear 610 includes a central recess 626 which is substantially circular in cross section and is centered about the pinion gear axis of rotation PGR. The pinion gear central recess 626 receives a cylindrical reward portion 642 of the smaller sleeve bushing 640. The smaller sleeve bushing 640 functions as a thrust bearing and includes an enlarged annular head 644 provides a bearing surface for the pinion gear head 614 and limits axial travel of the pinion gear 610 in the forward direction FW, that is, travel of the pinion gear 610 along the pinion gear axis of rotation PGR, in the forward direction FW.

The sleeve bushing 640 is supported on a boss 158*b* (FIGS. 49 and 50) of the frame body 150. Specifically, the boss 158*b* extends rearwardly from an inner surface 158*a* of a forward wall 154*a* of a central cylindrical region 154 of the frame body 150. The boss 158*b* of the frame body central cylindrical region 154 includes a flat 158*c* that interfits with a flat 648 (FIG. 2C) formed in a central opening 646 of the sleeve bushing 640 to prevent rotation of the sleeve bushing 640 as the pinion gear 610 rotates about its axis of rotation PGR.

In one exemplary embodiment, the gear head 614 of the pinion gear 610 includes 25 bevel gear teeth and, at the forward facing surface 624, has an outside diameter of approximately 0.84 inch (measured across the gear from the tops of the gear teeth) and a root diameter of approximately 0.72 inch (measured across a base of the teeth). The bevel gear teeth 616 taper from a larger diameter at the forward facing surface 624 to a smaller diameter in away from the forward facing surface 624.

The larger sleeve bushing 632 of the pinion gear bearing support assembly 630 includes a central opening 634 that receives and rotatably supports the pinion gear input shaft 612. The larger sleeve bushing 632 includes an enlarged forward head 636 and a cylindrical rearward body 637. The cylindrical rearward body 637 of the larger sleeve bushing 632 is supported within a conforming cavity 129 (FIGS. 39 and 48) of the inverted U-shaped forward section 118 of the gearbox housing 113, while the enlarged forward head 636 of the sleeve bushing 632 fits within a conforming forward cavity 126 of the U-shaped forward section 118 of the gearbox housing 113.

A flat 638 (FIG. 41) of the enlarged forward head 636 of the larger sleeve bushing 632 interfits with a flat 128 of the U-shaped forward section 118 of the gearbox housing 113 to prevent rotation of the sleeve bushing 632 within the gearbox housing 113. The cylindrical body 639 of the larger sleeve bushing 632 defining the central opening 634 provides radial bearing support for the pinion gear 610. The enlarged head 636 of the sleeve bushing 632 also provides a thrust bearing surface for the rearward collar 627 of the gear head 614 to prevent axial movement of the pinion gear 610 in the rearward direction RW, that is, travel of the pinion gear 610 along the pinion gear axis of rotation PGR, in the rearward direction RW. Alternatively, instead of a pair of sleeve bushings 632, 640, the bearing support assembly 630 for the pinion gear 610 may comprise one or more roller or ball bearing assemblies or a combination of roller/ball bearing assemblies and sleeve bearings.

Figures 7, 8:
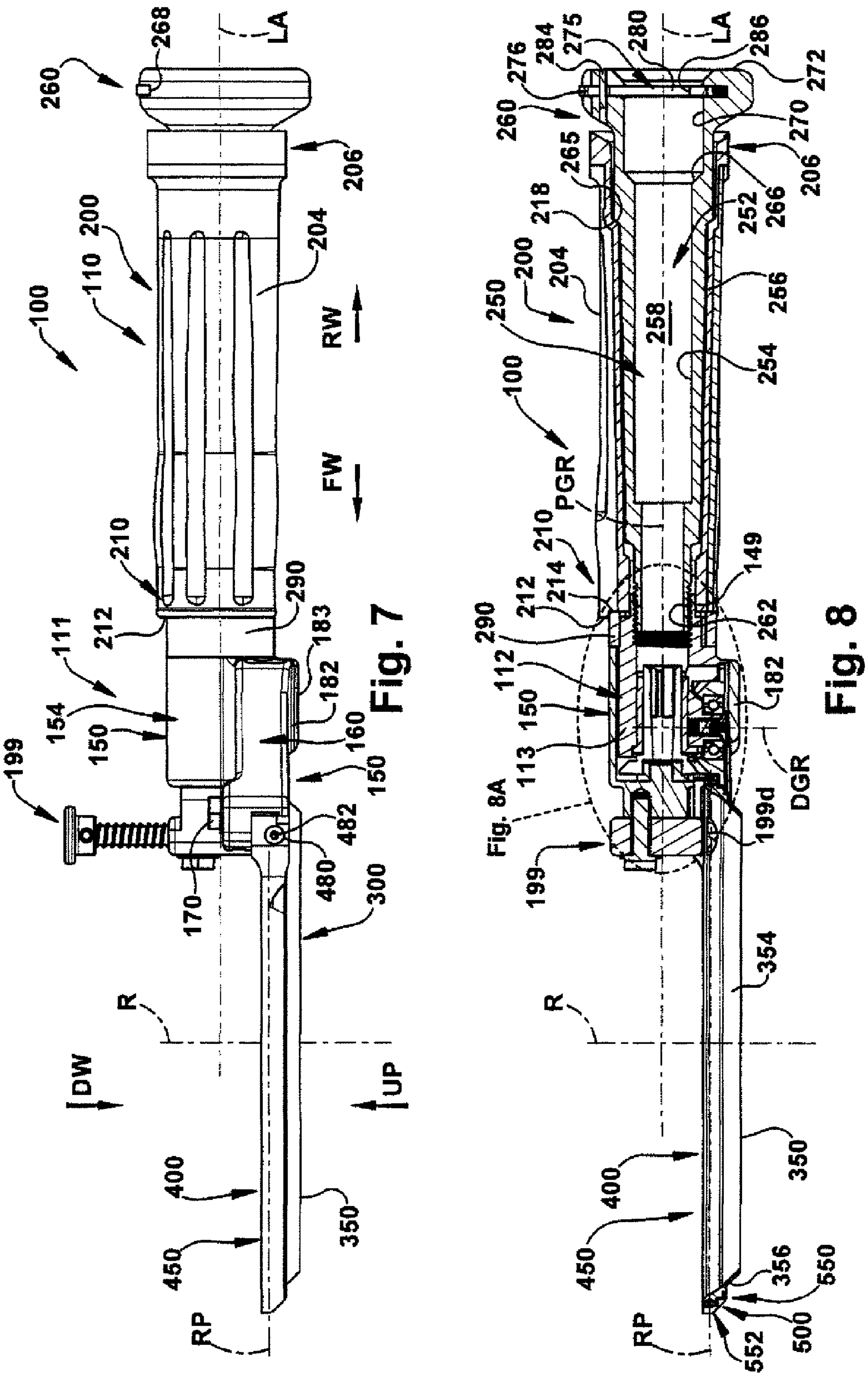
FIG. 7 is a schematic right side elevation view of the power operated rotary knife of FIG. 1, as viewed from a front or rotary knife blade end of the power operated knife.
FIG. 8 is a schematic section view taken along a longitudinal axis of the handle assembly of the power operated rotary knife of FIG. 1, as seen from a plane indicated by the line 8-8 in FIG. 3.
Figure 8A:
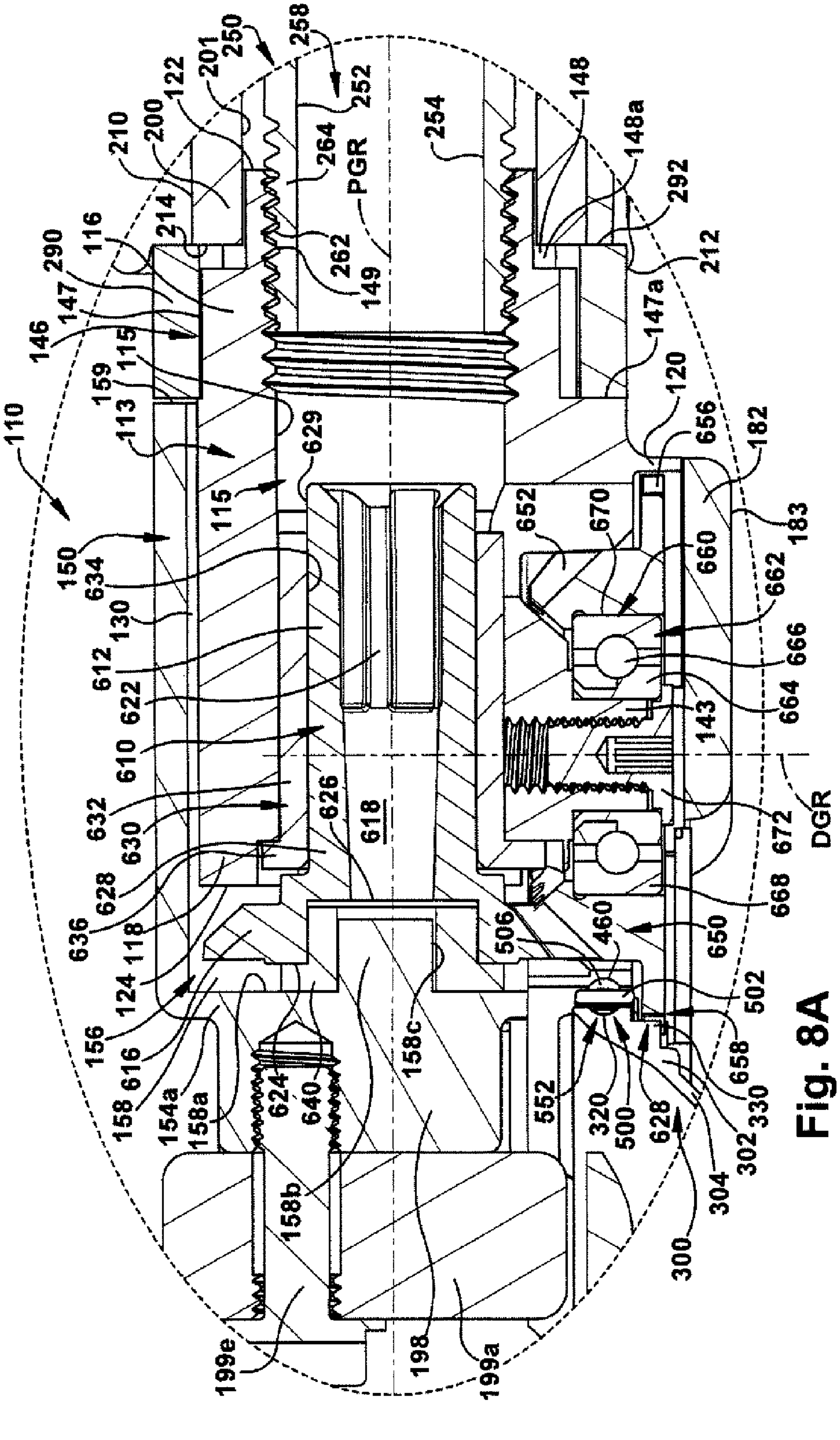
FIG. 8A is a schematic enlarged section view of a portion of the handle assembly shown in FIG. 8 that is within a dashed circle labeled FIG. 8A in FIG. 8.
Figure 9:
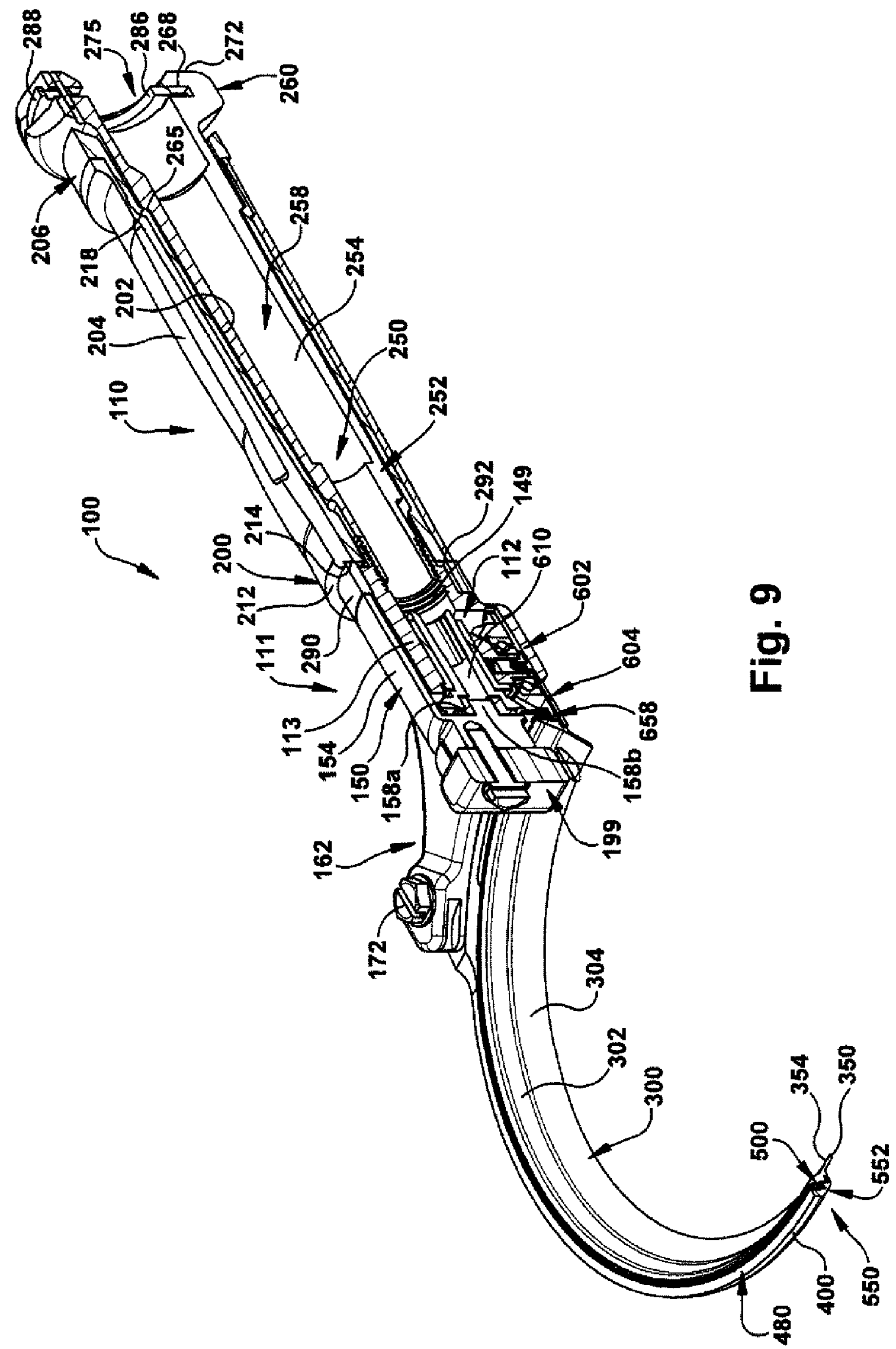
FIG. 9 is a schematic perspective section view along the longitudinal axis of the handle assembly of the power operated rotary knife of FIG. 1, as seen from a plane indicated by the line 8-8 in FIG. 3.

The drive gear 650, in one exemplary embodiment, is a double gear with axially aligned gears including the first bevel gear 652 and the second spur gear 654, both rotating about a drive gear axis of rotation DGR (FIGS. 8 and 8A). The drive gear axis of rotation DGR is substantially orthogonal to and intersects a pinion gear axis of rotation PGR. Further, the drive gear axis of rotation DGR is substantially parallel to the knife blade axis of rotation R. The first gear 652 is a bevel gear and includes a set of bevel gear teeth 653 that mesh with the set of bevel gear teeth 616 of the gear head 614 of the pinion gear 610. As the pinion gear 610 is rotated by the shaft drive assembly 700, the bevel gear teeth 616 of the pinion gear 610, in turn, engage the bevel gear teeth 653 of the first gear 652 to rotate the drive gear 650.

The second gear 654 comprises a spur gear including a set of involute gear teeth 656. The spur gear 654 engages and drives the driven gear 328 of the knife blade 300 to rotate the knife blade about its axis of rotation R. Because the spur gear 654 of the gearbox 602 and the driven gear 328 of the knife blade 300 have axes of rotation DGR, R that are parallel (that is, a spur gear drive) and because the gears 654, 328 comprise an involute gear drive 658, there is less wear of the respective gear teeth 656, 332 than in other gear drives wherein the axes of rotation are not parallel and wherein a non-involute gear drive is used. In one exemplary embodiment, the first gear 652 includes 28 bevel gear teeth and has an outside diameter of approximately 0.92 inch and an inside diameter of approximately 0.66 inch and the second gear 654 includes 58 spur gear teeth and has an outside diameter of approximately 1.25 inches and a root diameter of approximately 1.16 inches.

Figure 39:
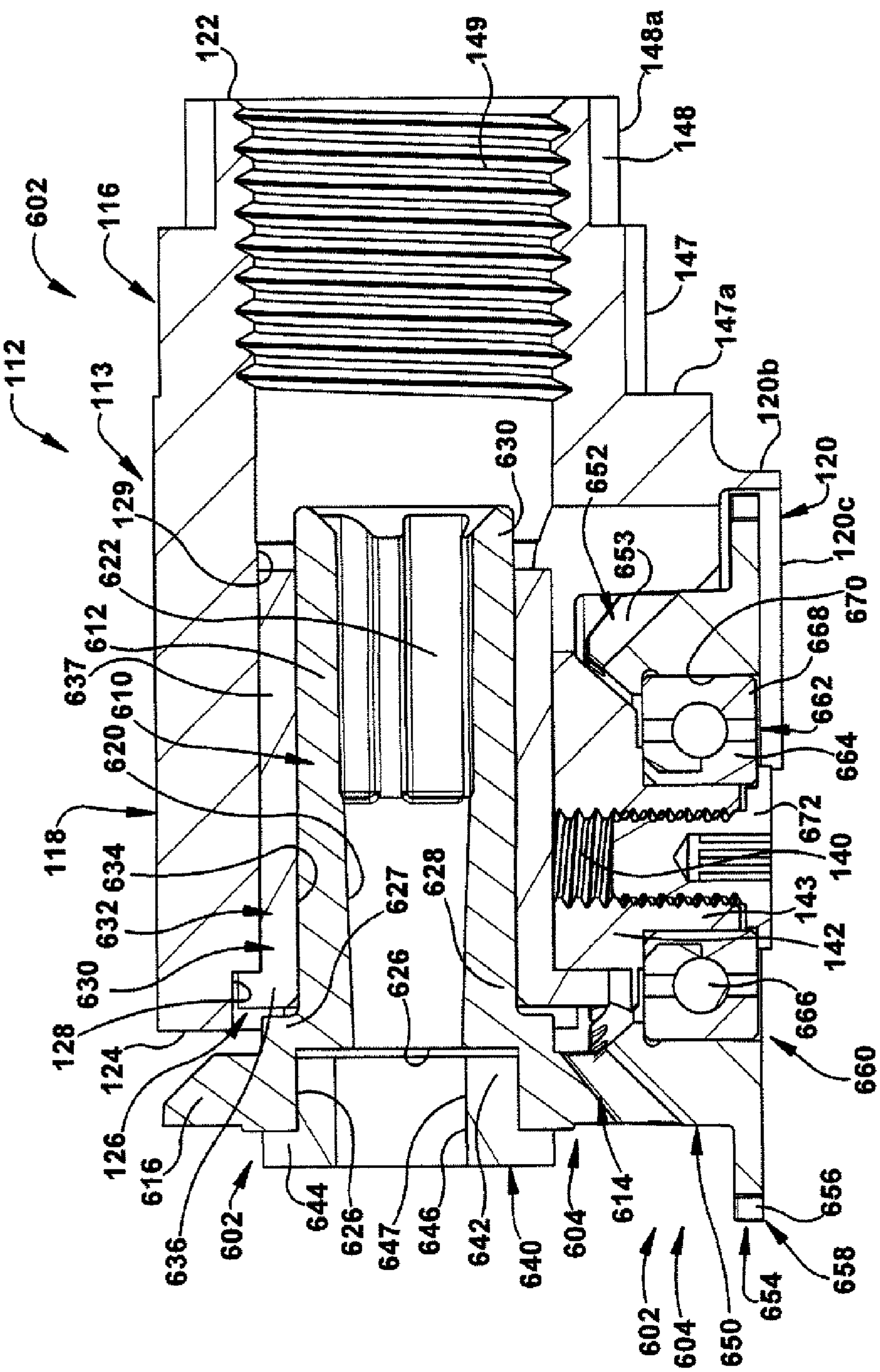
FIG. 39 is a schematic longitudinal section view of the gearbox assembly of FIG. 33, as seen from a plane indicated by the line 39-39 in FIG. 36.

The drive gear 650 is supported for rotation by the bearing support assembly 660 (FIGS. 39-43). The bearing support assembly 660, in one exemplary embodiment, comprises a ball bearing assembly 662 that supports the drive gear 650 for rotation about the drive gear rotational axis DGR. The drive gear bearing support assembly 660 is secured to a downwardly extending projection 142 (FIGS. 47 and 48) of the inverted U-shaped forward section 118 of the gearbox housing 113. As can be seen in FIG. 39, the ball bearing assembly 662 includes a plurality of ball bearings 666 trapped between an inner race 664 and an outer race 668. The outer race 668 is affixed to the drive gear 650 and is received in a central opening 670 of the drive gear 650. The inner race 664 is supported by the fastener 672. A threaded end portion of the fastener 672 and screws into a threaded opening 140 (FIGS. 41 and 47) defined in a stem 143 of the downwardly extending projection 142 of the inverted U-shaped forward section 118 of the gearbox housing 113. The fastener 672 secures the ball bearing assembly 662 to the gearbox housing 113. Alternatively, instead of a ball bearing assembly, the bearing support assembly 660 may comprise one or more sleeve bearings or bushings.

Gearbox Housing 113

As is best seen in FIGS. 2C, and 33-44, the gearbox assembly 112 includes the gearbox housing 113 and the gearbox 602. As can best be seen in FIGS. 41-48, the gearbox housing 113 includes a generally cylindrical rearward section 116 (in the rearward direction RW away from the blade housing 400), an inverted U-shaped forward section 118 (in the forward direction FW toward the blade housing 400) and a generally rectangular base section 120 disposed axially below the forward section 118. The gearbox housing 113 includes the gearbox cavity or opening 114 which defines a throughbore 115 extending through the gearbox housing 113 from a rearward end 122 to a forward end 124. The throughbore 115 extends generally along the handle assembly longitudinal axis LA. The inverted U-shaped forward section 118 and the cylindrical rearward section 116 combine to define an upper surface 130 of the gearbox housing 113.

Figure 43:
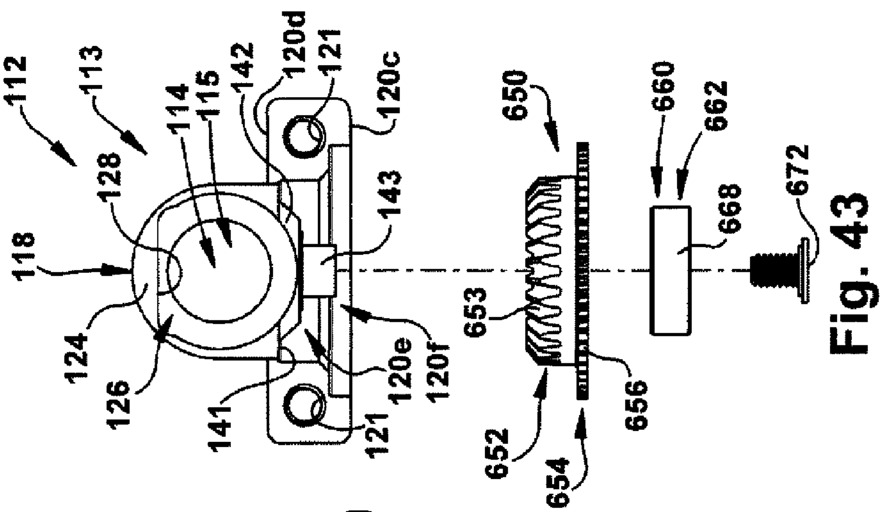
FIG. 43 is a schematic exploded front elevation view of the gearbox assembly of FIG. 33.
Figure 47:
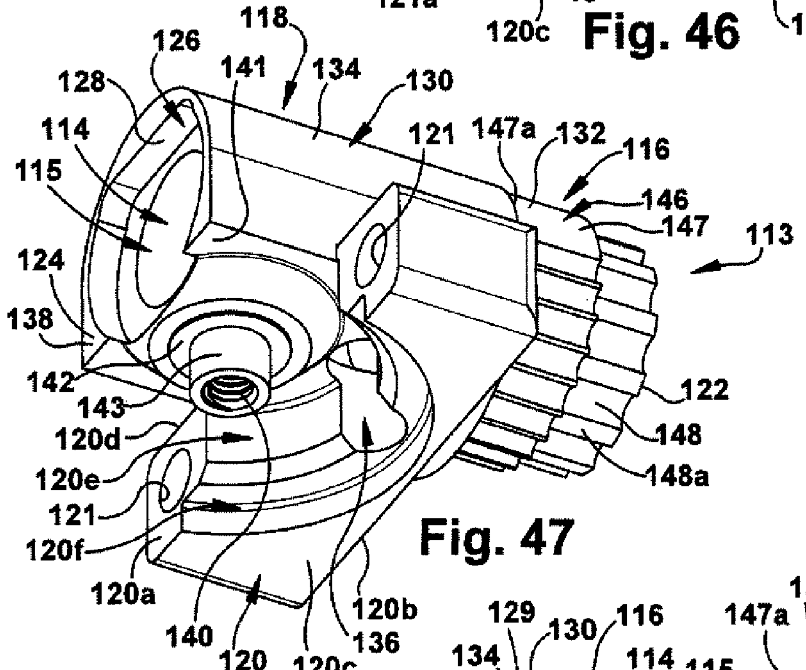
FIG. 47 is a schematic front, bottom perspective view of the gearbox housing of FIG. 46.
Figure 48:
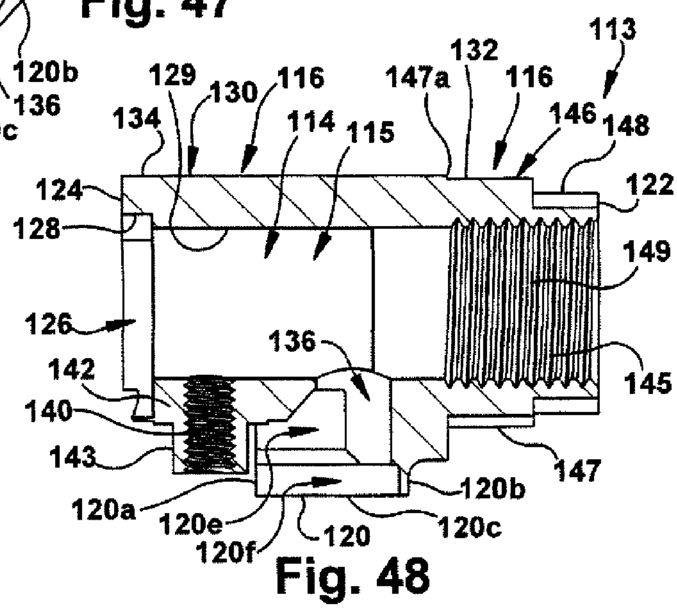
FIG. 48 is a schematic longitudinal section view of the gearbox housing of FIG. 46, as seen from a plane indicated by the line 48-48 in FIG. 46.

The gearbox housing 113 also includes a generally rectangular shaped base 120 which extends downwardly from the inverted U-shaped forward section 118, i.e., away from the upper surface 130. The rectangular base 120 includes a front wall 120*a* and a rear wall 120*b*, as well as a bottom wall 120*c* and an upper wall 120*d*, all of which are generally planar. As is best seen in FIGS. 47 and 48, extending radially inwardly into the front wall 120*a* of the rectangular base 120 are first and second arcuate recesses 120*e*, 120*f*. The first arcuate recess 120*e* is an upper recess, that is, the upper recess 120*e* is adjacent a bottom portion 141 of the inverted U-shaped forward section 118 and, as best seen in FIG. 43, is offset slightly below the upper wall 120*d* of the rectangular base 120. The second arcuate recess 120*f* is a lower recess and extends through the bottom wall 120*c* of the rectangular base 120.

The bottom portion 141 of the inverted U-shaped forward section 118 includes a downwardly extending projection 142 (FIG. 47). The downwardly extending projection 142 includes a cylindrical stem portion 143 and defines a threaded opening 140 extending through the projection 142. A central axis through the threaded opening 140 defines and is coincident with the axis of rotation DGR of the drive gear 650. The upper and lower arcuate recesses 120*e*, 120*f* are centered about the drive gear axis of rotation DGR and the central axis of the threaded opening 140.

The throughbore 115 of the gearbox housing 113 provides a receptacle for the pinion gear 610 and its associated bearing support assembly 630 while the upper and lower arcuate recesses 120*e*, 120*f* provide clearance for the drive gear 650 and its associate bearing support assembly 660. Specifically, with regard to the bearing support assembly 630, the cylindrical body 637 of the larger sleeve bushing 632 fits within the cylindrical cavity 129 of the inverted U-shaped forward section 118. The enlarged forward head 636 of the sleeve bushing 632 fits within the forward cavity 126 of the forward section 118. The cylindrical cavity 129 and the forward cavity 126 of the inverted U-shaped forward section 118 are both part of the throughbore 115.

With regard to the upper and lower arcuate recesses 120*e*, 120*f*, the upper recess 120*e* provides clearance for the first bevel gear 652 of the drive gear 650 as the drive gear 650 rotates about its axis of rotation DGR upon the first bevel gear 652 being driven by the pinion gear 610. The wider lower recess 1201 provides clearance for the second spur gear 654 of the drive gear 650 as the spur gear 654 coacts with the driven gear 328 to rotate the rotary knife blade 300 about its axis of rotation R. As can best be seen in FIGS. 39 and 40, the downwardly extending projection 142 and stem 143 provide seating surfaces for the ball bearing assembly 662, which supports the drive gear 650 for rotation within the rectangular base 120 of the gearbox housing 113. A cleaning port 136 (FIGS. 47 and 48) extends through the bottom portion 141 of inverted U-shaped forward section 118 and a portion of the base 120 of the gearbox housing 113 to allow cleaning fluid flow injected into the throughbore 115 of the gearbox housing 113 from the proximal end 122 of the gearbox housing 113 to flow into the upper and lower arcuate recesses 120*e*, 120*f* for purpose of cleaning the drive gear 650.

Figure 40:
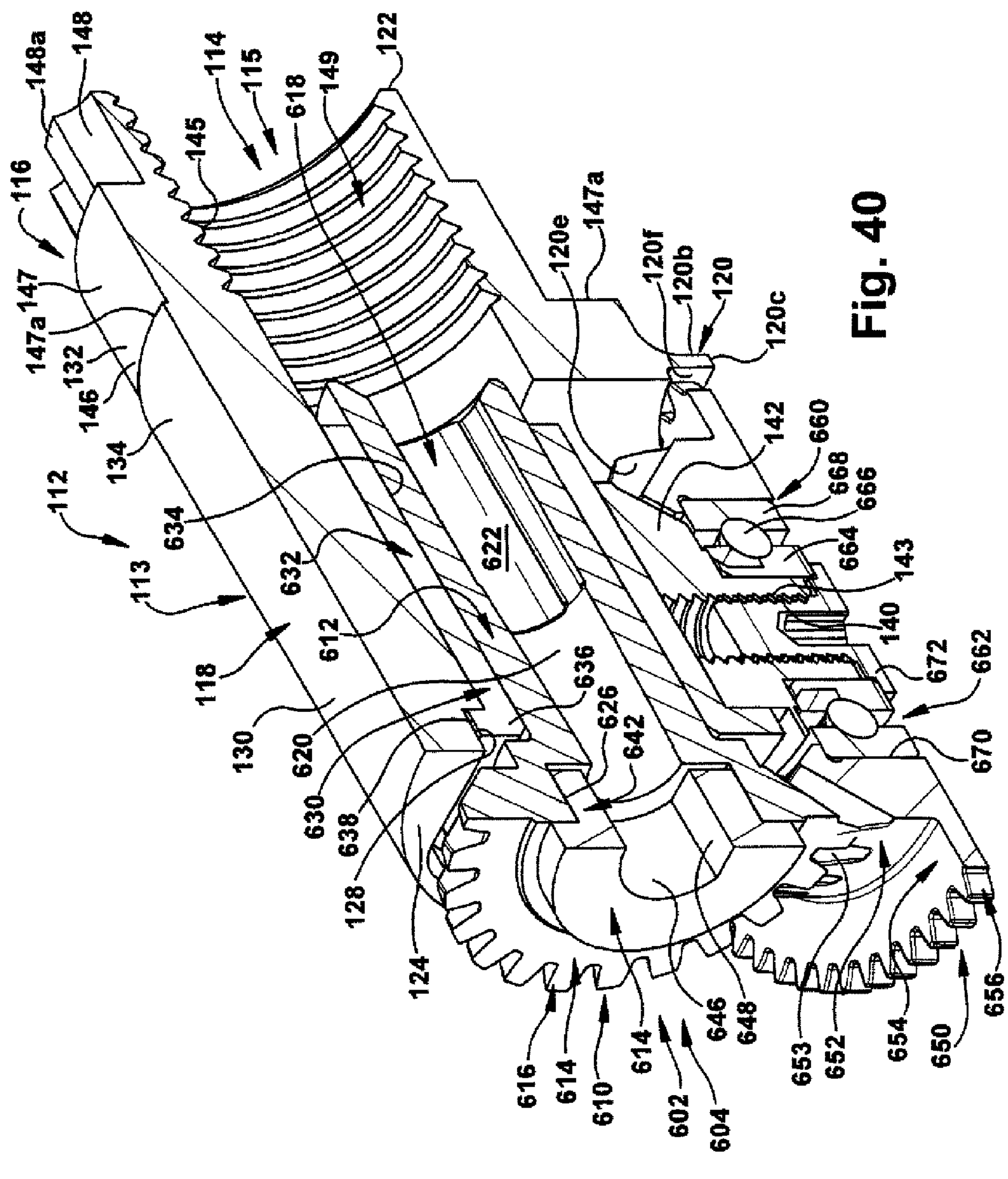
FIG. 40 is a schematic longitudinal perspective section view of the gearbox assembly of FIG. 33, as seen from a plane indicated by the line 39-39 in FIG. 36.

As can be seen in FIGS. 39 and 40, an inner surface 145 of the cylindrical rearward section 116 of the gearbox housing 113 defines a threaded region 149, adjacent the proximal end 122 of the gearbox housing 113. The threaded region 149 of the gearbox housing 113 receives a mating threaded portion 262 (FIG. 2B) of the elongated central core 252 of the hand piece retaining assembly 250 to secure the hand piece 200 to the gearbox housing 113.

As seen in FIGS. 38-44, an outer surface 146 of the cylindrical rearward section 116 of the gearbox housing 113 defines a first portion 148 adjacent the proximal end 122 and a second larger diameter portion 147 disposed forward or in a forward direction FW of the first portion 148. The first portion 148 of the outer surface 146 of the cylindrical rearward portion 116 of the gearbox housing 113 includes a plurality of axially extending splines 148*a*. The plurality of splines 148*a* accept and interfit with four ribs 216 (FIG. 2B) formed on an inner surface 201 of a distal end portion 210 of the hand piece 200. The coacting plurality of splines 148*a* of the gearbox housing 113 and the four ribs 216 of the hand piece 200 allow the hand piece 200 to be oriented at any desired rotational position with respect to the gearbox housing 113.

The second larger diameter portion 147 of the outer surface 146 of the cylindrical rearward section 116 of the gearbox housing 113 is configured to receive a spacer ring 290 (FIG. 2B) of the hand piece retaining assembly 250. As can be seen in FIG. 8A, the spacer ring 290 abuts and bears against a stepped shoulder 147*a* defined between the cylindrical rearward section 116 and the inverted U-shaped forward section 118 of the gearbox housing 113. That is, an upper portion 134 of the inverted U-shaped forward section 118 is slightly radially above a corresponding upper portion 132 of the cylindrical rearward section 116 of the gearbox housing 113. A rear or proximal surface 292 (FIG. 2B) of the spacer ring 290 acts as a stop for an axially stepped collar 214 of the distal end portion 210 of the hand piece 200 when the hand piece 200 is secured to the gearbox housing 113 by the elongated central core 252 of the hand piece retaining assembly 250.

Figure 46:
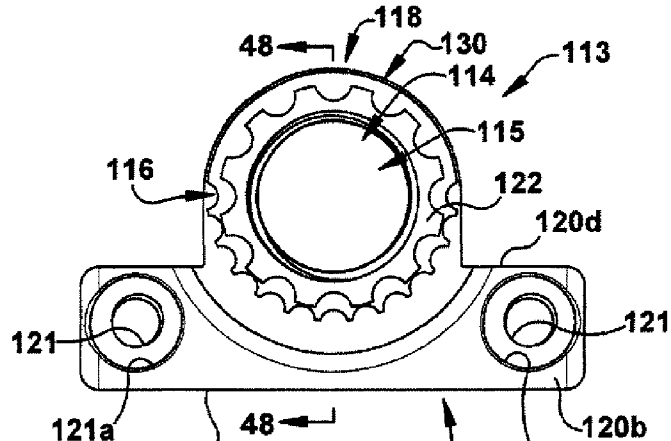
FIG. 46 is a schematic rear elevation view of the gearbox housing of the gearbox assembly of the power operated rotary knife of FIG. 1.

The second larger diameter portion 147 of the outer surface 146 also includes a plurality of splines (seen in FIGS. 41 and 46). The plurality of splines of the second portion 147 are used in connection with an optional thumb support (not shown) that may be used in place of the spacer ring 290. The thumb support provides an angled, outwardly extending support surface for the operator's thumb. The plurality of splines of the second portion 149 are utilized in connection with the optional thumb support to allow the operator to select a desired rotational orientation of the thumb support with respect to the gearbox housing 113 just as the plurality of splines 148*a* of the first portion 148 allow the operator to select a desired rotational orientation of the hand piece 200 with respect to the gearbox housing 113.

Frame Body 150

Also part of the head assembly 111 is the frame or frame body 150, best seen in FIGS. 45 and 49-52. The frame body 150 receives and removably supports both the gearbox assembly 112 and the blade-blade housing combination 550. In this way, the frame body 150 releasably and operatively couples the gearbox assembly 112 to the blade-blade housing combination 550 such that the gear train 604 of the gearbox assembly 112 operatively engages the driven gear 328 of the rotary knife blade 300 to rotate the knife blade 300 with respect to the blade housing 400 about the axis of rotation R.

The frame body 150 includes the arcuate mounting pedestal 152 disposed at a forward portion 151 (FIG. 2C) of the frame 150, the central cylindrical region 154, and a rectangular base 180 (FIG. 48) disposed below the central cylindrical region 154. The arcuate mounting pedestal 152 of the frame body defines the seating region 152*a* (FIGS. 22C and 51) to receive the mounting section 402 of the blade housing 400 and secure the blade-blade housing combination 550 to the frame body 150. The central cylindrical region 154 and the rectangular base 180 of the frame body 150 define a cavity 155 (FIGS. 45 and 49) which slidably receives the gearbox housing 113. The frame body cavity 155 is comprised of an upper socket 156 defined by the central cylindrical region 154 and a lower horizontally extending opening 190 defined by and extending through the central rectangular base 180.

Figure 49:
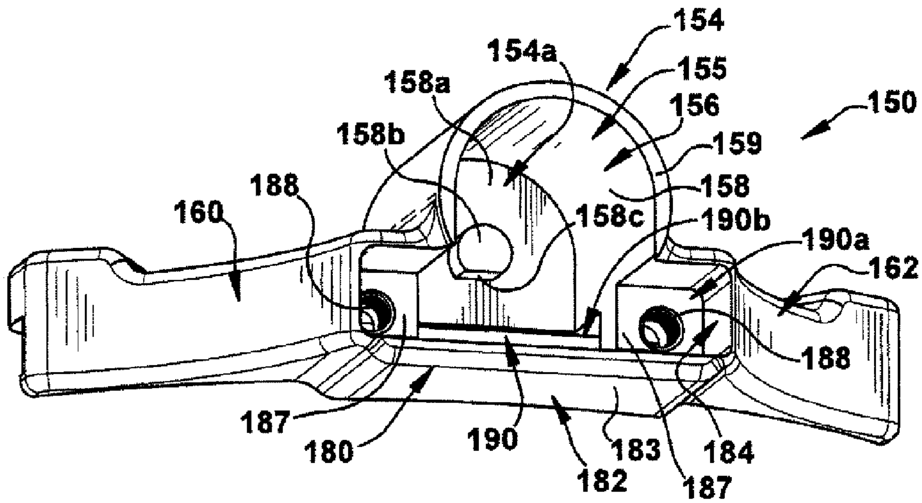
FIG. 49 is a schematic rear perspective view of the frame body of the head assembly of the power operated rotary knife of FIG. 1.
Figure 50:
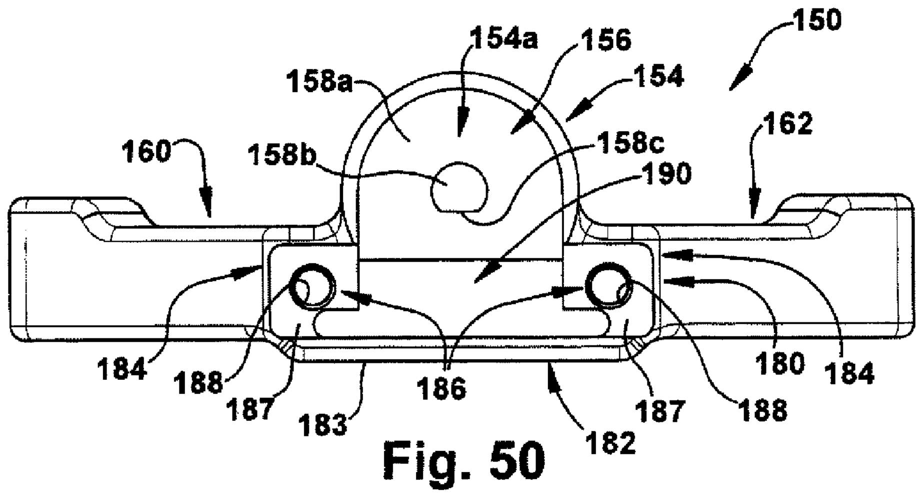
FIG. 50 is a schematic rear elevation view of the frame body of FIG. 49.
Figure 51:
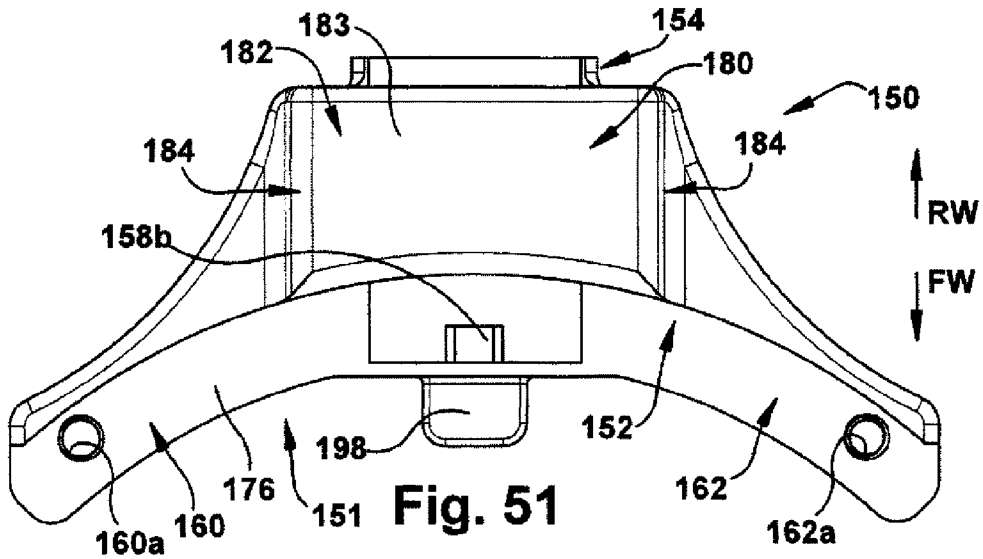
FIG. 51 is a schematic bottom plan view of the frame body of FIG. 49.
Figure 52:
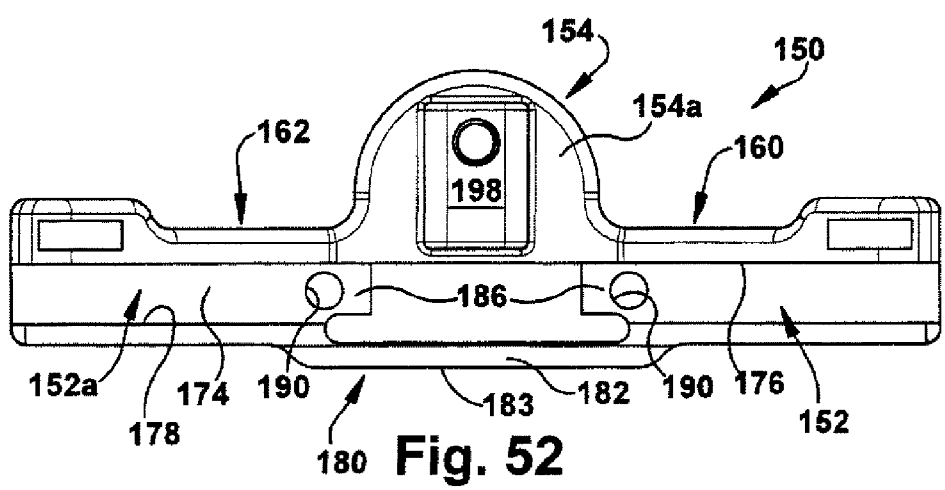
FIG. 52 is a schematic front elevation view of the frame body of FIG. 49.

The central rectangular base 180 of the frame body 150 includes a bottom wall 182 and a pair of side walls 184 that extend upwardly from the bottom wall 182. As is best seen in FIGS. 49 and 50, a pair of bosses 186 extend inwardly from the pair of side walls 184. Rearward facing surfaces 187 of the pair of bosses 186 each include a threaded opening 188. The lower horizontally extending opening 190 defined by the rectangular base 180 includes two parts: a generally rectangular portion 190*a* extending rearwardly from the pair of boss surfaces 187; and a forward portion 190*b* that extends through the rectangular base 180 to the seating region 152*a* of the frame body 150.

To secure the gearbox assembly 112 to the frame body 150, the gearbox assembly 112 is aligned with and moved toward a proximal end 157 of the frame body 150. As can best be seen in FIG. 45, the socket 156 defined by the central cylindrical region 154 of the frame body 150 is configured to slidably receive the inverted U-shaped forward section of the gearbox housing 113 and the rectangular portion 190*a* of the horizontally extending opening 190 of the rectangular base 180 is configured to slidably receive the rectangular base 120 of the gearbox housing 113. The upper surface 130 of the gearbox housing 113 is slidably received within the inner surface 158 of the central cylindrical region 154 of the frame body 150.

When the gearbox assembly 112 is fully inserted into the frame body 150, the front wall 120*a* of the base 120 of the gearbox housing 113 abuts the rearward facing surfaces 187 of the pair of bosses 186 of the rectangular base 180 of the frame body 150. Further, the horizontally extending openings 121 of the gearbox housing base 120 are aligned with the horizontally extending threaded openings 188 of the pair of bosses 186 of the frame body rectangular base 180. A pair of threaded fasteners 192 (FIG. 45) pass through the openings 121 of the gearbox housing base 120 and thread into the threaded openings 188 of the pair of bosses 186 of the frame body rectangular base 180 to releasably secure the gearbox assembly 112 to the frame body 150. The openings 121 of the gearbox housing base 180 are partially threaded to prevent the fasteners 192 from fall out of the openings 121 when the gearbox housing 113 is not coupled to the frame body 150.

The openings 121 of the gearbox housing base 120 include countersunk end portions 121*a* (FIG. 45) to receive the enlarged heads of the pair of threaded fasteners 192 such that the enlarged heads of the fasteners 192, when tightened into the frame body 150, are flush with the rear wall 120*b* of the base 120. The threaded fasteners 192 include narrow body portions relative to the enlarged heads and larger diameter threaded portions such that the fasteners 192 remain captured within their respective gearbox housing openings 121 when the gearbox housing 113 is not coupled to the frame body 150. Relative movement between the gearbox assembly 112 and the frame body 150 is constrained by the threaded interconnection of the gearbox housing 113 to the frame body 150 via the threaded fasteners 192 and the abutting surfaces of the rectangular base 120 of the gearbox housing 113 and the rectangular base 180 of the frame body 150.

Additionally, the frame body 150 releasably receives the blade-blade housing combination 550 and thereby operatively couples the blade-blade housing combination 550 to the gearbox assembly 112. As can best be seen in FIGS. 51 and 52, the pair of arcuate arms 160, 162 of the frame body 150 define the arcuate mounting pedestal 152. The mounting pedestal 152, in turn, defines the seating region 152*a* that releasably receives the mounting section 402 of the blade housing 400. Specifically, the arcuate mounting pedestal 152 includes an inner wall 174, an upper wall 176 extending radially in the forward direction FW from an upper end of the inner wall 174, and a lower wall or ledge 178 extending radially in a forward direction FW from a lower end of the inner wall 174.

When the blade housing mounting section 402 is properly aligned and moved into engagement with the frame body arcuate mounting pedestal 152: 1) the outer wall 406 of the blade housing mounting section 402 bears against the mounting pedestal inner wall 174 of the frame body 150; 2) the first upper end 408 of the blade housing mounting section 402 bears against the mounting pedestal upper wall 176 of the frame body 150; and 3) a radially inwardly stepped portion 406*a* of the outer wall 406 of the blade housing mounting section 402 bears against an upper face and a forward face of the radially outwardly projecting mounting pedestal lower wall or ledge 178 of the frame body 150.

The respective threaded fasteners 170, 172 of the frame body 150 are threaded into the threaded openings 420*a*, 422*a* of the mounting inserts 420, 422 of the blade housing mounting section 402 to secure the combination blade-blade housing 550 to the frame body 150. Assuming that the gearbox assembly 112 is coupled to the frame body 150, when the blade-blade housing combination 550 is secured to the frame body 150, the second spur gear 654 of the drive gear 650 of the gearbox assembly 112 engages and meshes with the driven gear 328 of the rotary knife blade 300 of the blade-blade housing combination 550. Thus, when the gearbox assembly 112 and the blade-blade housing combination 550 are secured to the frame body 150, the gear train 604 of the gearbox assembly 112 is operatively engaged with the driven gear 328 of the rotary knife blade 300 to rotatably drive the blade 300 within the blade housing 400 about the blade axis of rotation R. Like the threaded fasteners 192 of the gearbox housing 113 that secure the gearbox housing 113 to the frame body 150, the threaded fasteners 170, 172 of the frame body 150 include narrow bodies and larger diameter threaded portions such that the fasteners remain captured in the partially threaded openings 160*a*, 162*a* of the arcuate arms 160, 162.

To remove the combination blade-blade housing 550 from the frame body 150, the pair of threaded fasteners 170, 172 of the frame body 150 are unthreaded from the threaded openings 420*a*, 420*b* of the blade housing mounting inserts 420, 422. Then, the blade-blade housing combination 550 is moved is the forward direction FW with respect to the frame body 150 to disengage the blade-blade housing combination 550 from the head assembly 111.

A forward wall 154*a* of the central cylindrical region 154 of the frame body 150 includes a projection 198 that supports a steeling assembly 199 (FIG. 2C). The steeling assembly 199 includes a support body 199*a*, spring biased actuator 199*b*, and a push rod 199*c* with a steeling member 199*d* affixed to a bottom of the push rod 199*c*. The steeling assembly support body 199*a* is affixed to the projection 198. When the actuator 199*b* is depressed by the operator, the push rod 199*c* moves downwardly and the steeling member 199*d* engages the blade edge 350 of the knife blade 300 to straighten the blade edge 350.

Hand Piece 200 and Hand Piece Retaining Assembly 250

The handle assembly 110 includes the hand piece 200 and the hand piece retaining assembly 250. As can be seen in FIG. 2B, the hand piece 200 includes the inner surface 201 and the outer gripping surface 204. The inner surface 201 of the hand piece 200 defines the axially extending central opening or throughbore 202. The outer gripping surface 204 of the hand piece 200 extends between an enlarged proximal end portion 206 and the distal end portion 210. A front face or wall 212 of the hand piece 200 includes an axially stepped collar 214 that is spaced rearwardly and serves an abutment surface for a spacer ring 290 of the hand piece retaining assembly 250. The inner surface 201 of the hand piece 200 defines the four ribs 216, as previously described, which permit the hand piece 200 to be oriented in any desired rotational position with respect to the gearbox housing 113. A slotted radial opening 220 in the front face 212 of the hand piece 200 receives an optional actuation lever (not shown). The optional actuation lever, if used, allows the operator to actuate the power operated rotary knife 100 by pivoting the lever toward the gripping surface 204 thereby engaging the drive mechanism 600 to rotatably drive the rotary knife blade 300.

The hand piece retaining assembly 250, best seen in FIGS. 2 and 2B, releasably secures the hand piece 200 to the gearbox housing 113. The hand piece retaining assembly 250 includes the elongated central core 252 which extends through the central opening 202 of the hand piece 200. The elongated core 252 threads into the threaded opening 149 (FIG. 48) at the proximal or rearward end 122 of the gearbox housing 113 to secure the hand piece 200 to the gearbox housing 113.

The hand piece retaining assembly 250 also includes the spacer ring 290 (FIG. 2B). When the hand piece 200 is being secured to the gearbox housing 113, the spacer ring 290 is positioned on the second cylindrical portion 147 (FIG. 48) of the outer surface 146 of the cylindrical rearward section 116 of the gearbox housing 113. The spacer ring 290 is positioned to abut the stepped shoulder 147*a* defined between the larger second portion 147 of the outer surface 146 of the cylindrical rearward portion 116 and the inverted U-shaped forward section 118 of the gearbox housing 113. When the hand piece 200 is secured to the gearbox housing 113 by the elongated central core 252, the spacer ring 290 is sandwiched between the hand piece 200 and the stepped shoulder 147*a* of the gearbox housing 113.

As can best be seen in FIGS. 2B and 8, the elongated central core 252 of the hand piece retaining assembly 250 includes an inner surface 254 and an outer surface 256 extending between a distal or forward reduced diameter end portion 264 and the enlarged proximal or rearward end portion 260. The inner surface 254 of the elongated central core 252 defines a throughbore 258 extending along the longitudinal axis LA of the handle assembly 110. The elongated central core 252 also includes a threaded portion 262 on the outer surface 256 at the forward reduced diameter end portion 264. The outer surface 256 of the elongated core 252 includes a radially outwardly stepped shoulder 265.

When the elongated central core 252 is inserted through the central throughbore 202 and the threaded portion 262 of the core 252 is threaded into the threaded opening 149 of the gearbox housing 113, the hand piece 200 is secured to the gearbox housing 113. Specifically, the hand piece 200 is prevented from moving in the forward axial direction FW along the handle assembly longitudinal axis LA by the spacer ring 290. The rear surface 292 of the spacer ring 290 acts as a stop for the axially stepped collar 214 of the distal end portion 210 of the hand piece 200 to prevent movement of the hand piece 200 in the forward direction FW. The hand piece 200 is prevented by moving in the rearward axial direction RW along the handle assembly longitudinal axis LA by the radially outwardly stepped shoulder 265 of the elongated central core 252.

As can be seen in FIG. 8, the stepped shoulder 265 of the elongated central core 252 bears against a corresponding inwardly stepped shoulder 218 of the hand piece 200 to prevent movement of the hand piece 200 in the rearward direction RW. As mentioned previously, the spacer ring 290 may be replaced by an optional operator thumb support. Additionally, a strap attachment bracket (not shown) may be disposed between the spacer ring 290 and the gearbox housing 113. The strap attachment bracket, if used, provides an attachment point for an optional operator wrist strap (not shown).

Drive Shaft Latching Assembly 275

The elongated central core 252 of the hand piece retaining assembly 250 includes the enlarged rearward or proximal end portion 260. The enlarged end portion 260 supports a drive shaft latching assembly 275 which engages a first coupling 710 (FIGS. 1 and 53) of an outer sheath 704 of the shaft drive assembly 700 to secure the outer sheath 704 of the shaft drive assembly 700 to the handle assembly 110 and thereby ensures operative engagement of a first male fitting 714 of the inner drive shaft 702 within the female socket 622 of the pinion gear input shaft 612. The inner surface 254 of the elongated central core 252 also includes an inwardly stepped shoulder 266 (FIG. 8) that provides a stop for a distal portion 711 of the first coupling 710 of the shaft drive assembly 700.

Figure 6:
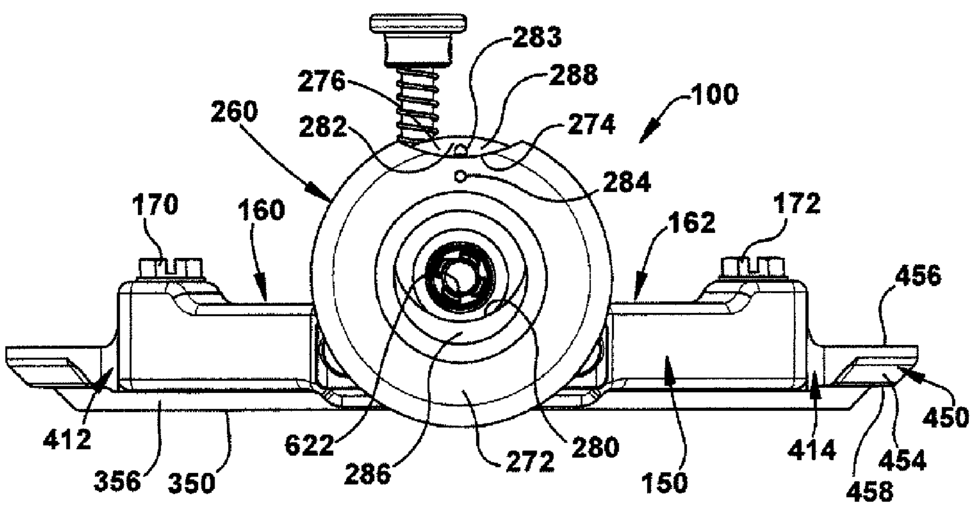
FIG. 6 is a schematic rear elevation view of the power operated rotary knife of FIG. 1.

As is best seen in FIG. 2B, the enlarged rearward end portion 260 of the elongated central core 252 of the hand piece retaining assembly 250 defines a generally U-shaped slot 268 that extends partially through the end portion 260 in a direction orthogonal to the longitudinal axis LA of the handle assembly 110. The rearward end portion 260 also defines a central opening 270 (FIG. 8) that is aligned with and part of the throughbore 258 of the elongated central core 252. The central opening 270 ends at the inwardly stepped shoulder 266. An end wall 272 of the rearward end portion 260 of the elongated central core 252 includes a peripheral cut-out 274. The peripheral cut-out 274 is best seen in FIGS. 2, 2B and 6.

Disposed in the U-shaped slot 268 of the elongated central core 252 is the drive shaft latching assembly 275 (best seen in schematic exploded view in FIG. 2B) that releasably latches or couples the shaft drive assembly 700 to the handle assembly 110. The drive shaft latching assembly 275 includes a flat latch 276 and a pair of biasing springs 278 inserted in the slot 268. The flat latch 276 of the drive shaft latching assembly 275 includes a central opening 280 that is substantially equal to the size of the opening 270 of the enlarged end portion 260 of the elongated central core 252.

The latch 276 is movable between two positions in a direction orthogonal to the longitudinal axis LA of the handle assembly 110: 1) a first, locking position wherein the opening 280 of the latch 276 is offset from the opening 270 defined by the enlarged end portion 260 of the elongated central core 252; and 2) a second release position wherein the opening 280 of the latch 276 is aligned with the opening 270 defined by the enlarged end portion 260 of the elongated central core 252. The biasing springs 278, which are trapped between peripheral recesses 281 in a bottom portion 282 of the latch 276 and the enlarged end portion 260 of the elongated central core 252, bias the latch 276 to the first, locking position.

When the latch 276 is in the first, locking position a lower portion 286 of the latch 276 adjacent the latch opening 280 extends into the opening 270 of the enlarged end portion 260 of the core 252. This can be seen schematically, for example in FIG. 6. Movement of the latch 276 with respect to the enlarged end portion 260 is limited by the engagement of a holding pin 284 extending through a radially extending channel 283 formed in the latch 276. The holding pin 284 bridges the U-shaped slot 268 of the enlarged end portion 260 and extends through the channel 283. The channel 283 constrains and limits an extent of the radial movement of the latch 276 with respect to the enlarged end portion 260 of the elongated central core 252.

Drive Mechanism 600

Figure 53:
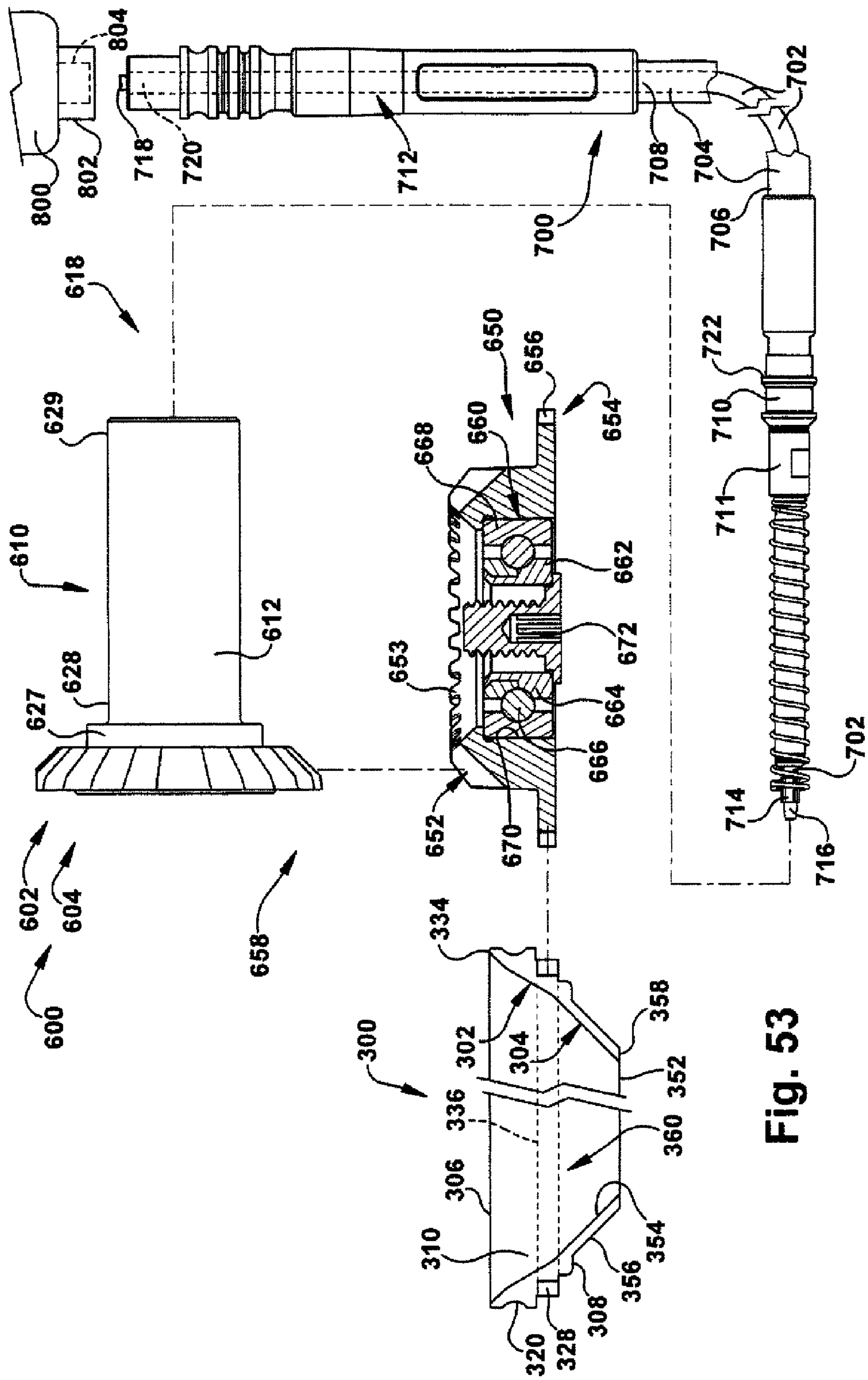
FIG. 53 is a schematic exploded side elevation view of the drive mechanism of the power operated rotary knife of FIG. 1 extending from a drive motor external to the power operated rotary knife to the rotary knife blade of the power operated rotary knife.

As can best be seen in the schematic depiction of FIG. 53, the knife blade 300 is rotatably driven in the blade housing 400 by the drive mechanism 600. Within the power operated rotary knife 100, the drive mechanism 600 includes the gearbox 602 supported by the gearbox housing 113. The gearbox 602, in turn, is driven by the flexible shaft drive assembly 700 and the drive motor 800 that are operatively coupled to the gearbox 602. The flexible shaft drive assembly 700 is coupled to the handle assembly 110 by the drive shaft latching assembly 275. A portion of the flexible shaft drive assembly 700 extends through the elongated central core 252 of the hand piece retaining assembly 250 and engages the pinion gear 610 to rotate the pinion gear about its axis of rotation PGR and thereby rotate the rotary knife blade 300 about its axis of rotation R.

As can best be seen in FIGS. 1 and 53, the drive mechanism 600 includes the flexible shaft drive assembly 700 and the drive motor 800. The shaft drive assembly 700 includes an inner drive shaft 702 and an outer sheath 704, the inner drive shaft 702 being rotatable with respect to the outer sheath 704. Affixed to one end 706 of the outer sheath 704 is the first coupling 710 that is adapted to be releasably secured to the enlarged rearward end portion 260 of the elongated central core 252 of the hand piece retaining assembly 250. Affixed to an opposite end 708 of the outer sheath 704 is a second coupling 712 that is adapted to be releasably secured to a mating coupling 802 of the drive motor 800.

When the first coupling 710 of the shaft drive assembly 700 is affixed to the hand piece 200, the first male drive fitting 714 disposed at one end 716 of the inner drive shaft 702 engages the female socket or fitting 622 of the pinion gear input shaft 612 to rotate the pinion gear 610 about the pinion gear axis of rotation PGR. The rotation of the pinion gear 610 rotates the drive gear 650 which, in turn, rotates the rotary knife blade 300 about it axis of rotation R. When the second coupling 712 of the shaft drive assembly 700 is received by and affixed to the drive motor coupling 802, a second drive fitting 718 disposed at an opposite end 720 of the inner drive shaft 702 engages a mating socket or fitting 804 (shown in dashed line in FIG. 53) of the drive motor 800. Engagement of the second drive fitting 718 of the inner drive shaft 702 and the drive motor fitting 804 provides for rotation of the inner drive shaft 702 by the drive motor 800.

In the first, locking position of the latch 276 of the drive shaft latching assembly 275, the lower portion 286 of the latch 276 extending into the opening 270 of the enlarged end portion 260 of the elongated central core 252 engages the first coupling 710 of the shaft drive assembly 700 to secure the shaft drive assembly 700 to the handle assembly 110 and insure the mating engagement of the first male drive coupling 714 of the drive shaft 702 to the female socket or fitting 622 of the pinion gear input shaft 612. In the second, release position, the latch 276 is moved radially such that the opening 280 of the latch 276 is aligned with and coextensive with the opening 270 of the enlarged end portion 260 of the elongated central core 252 thus allowing for removal of the first coupling 710 of the shaft drive assembly 700 from the hand piece 200.

The drive motor 800 provides the motive power for rotating the knife blade 300 with respect the blade housing 400 about the axis of rotation R via a drive transmission that includes the inner drive shaft 702 of the drive shaft assembly 700 and the gear train 604 of the gear box 602. The drive motor 800 may be an electric motor or a pneumatic motor.

Alternately, the shaft drive assembly 700 may be eliminated and the gear train 604 of the gearbox 602 may be directly driven by an air/pneumatic motor or an electric motor disposed in the throughbore 258 of the elongated central core 252 of the hand piece retaining assembly 250 or in the throughbore 202 of the hand piece 200, if a different hand piece retaining structure is used. A suitable air/pneumatic motor sized to fit within a hand piece of a power operated rotary knife is disclosed in U.S. non-provisional patent application Ser. No. 13/073,207, filed Mar. 28, 2011, entitled “Power Operated Rotary Knife With Disposable Blade Support Assembly”, inventors Jeffrey Alan Whited, David Curtis Ross, Dennis R. Seguin, Jr., and Geoffrey D. Rapp. Non-provisional patent application Ser. No. 13/073,207 is incorporated herein in its entirety by reference.

Securing Shaft Drive Assembly 700 to Handle Assembly 110

To secure the shaft drive assembly 700 to the hand piece 200, the operator axially aligns the first coupling 710 of the drive shaft assembly 700 along the longitudinal axis LA of the handle assembly 110 adjacent the opening 270 defined by the enlarged end portion 260 of the elongated central core 252 of the hand piece retaining assembly 250. The operator positions his or her thumb on the portion 288 of the latch 276 accessible through the peripheral cut-out 274 of the enlarged end portion 260 and slides the latch 276 radially inwardly to the second, release position. When the latch 276 is in the release position, the operator moves a forward portion 711 (FIG. 53) of the first coupling 710 into the throughbore 258 of the elongated central core 252.

After the forward portion 711 of the first coupling 710 is a received in the elongated central core 252 of the hand piece retaining assembly 250, the operator then releases the latch 276 and continues to move the first coupling 710 further into the throughbore 258 of the central core 252 until the latch 276 (which is biased radially outwardly by the biasing springs 278) snap fits into a radial securement groove 722 formed in an outer surface of the first coupling 710 of the shaft drive assembly 700. When the latch 276 extends into the securement groove 722 of the first coupling 710, the first coupling 710 is secured to the handle assembly elongated central core 252 and the first male drive fitting 714 of the inner drive shaft 702 is in operative engagement with the female socket or fitting 622 of the pinion gear input shaft 612.

To release the shaft drive assembly 700 from the handle assembly elongated central core 252, the operator positions his or her thumb on the portion 288 of the latch 276 accessible through the peripheral cut-out 274 of the enlarged end portion 260 of the elongated central core 252 and slides the latch 276 radially inwardly to the second, release position. This action disengages the latch 276 from the securement groove 722 of the first coupling 710 of the drive shaft assembly 700. At the same time, the operator moves the first coupling 710 in the axial rearward direction RW out of the throughbore 258 of the elongated central core 252 and away from the handle assembly 110. This will result in the first male drive fitting 714 of the drive shaft 702 being disengaged from the female fitting 622 of the pinion gear input shaft 612.

Rotary Knife Blade Styles

As previously mentioned, depending on the cutting or trimming task to be performed, different sizes and styles of rotary knife blades may be utilized in the power operated rotary knife 100 of the present disclosure. Also, as previously mentioned, rotary knife blades in various diameters are typically offered ranging in size from around 1.2 inches in diameter to over 7 inches in diameter. Selection of a blade diameter will depend on the task or tasks being performed. Additionally, different styles or configurations of rotary knife blades are also offered. For example, the style of the rotary knife blade 300 schematically depicted in FIGS. 1-53 and discussed above is sometimes referred to as a "flat blade" style rotary knife blade. The term "flat" refers to the profile of the blade section 304 and, in particular, to a cutting angle CA (FIG. 24) of the blade section 304 with respect to a plane CEP that is congruent with a cutting edge 350 of the blade 300. The angle CA of the blade section 304 with respect to the cutting edge plane CEP is relatively large. As can be seen in FIG. 24, the cutting angle CA, that is, the angle between the blade section 304 and the plane CEP, as measured with respect to the blade section inner wall 354 is an obtuse angle, greater than 90°. This large, obtuse cutting angle CA is referred to as a "shallow" blade cutting profile. As can be seen in FIG. 55, the inner wall 360 is generally smooth, frustoconical shape. As the product P is being trimmed or cut by the flat blade 300, the cut material layer CL1 moves easily along the inner wall 360 the flat blade 300. The flat blade 300 is particularly useful for trimming thicker layers of material from a product, e.g., trimming a thicker layer of fat or meat tissue from a piece of meat, as the power operated rotary knife 100 is moved over the product in a sweeping motion. This is true because even thicker layers of cut or trimmed material will flow with minimal drag or friction over the inner wall 360 of the flat blade 300.

Figure 56:
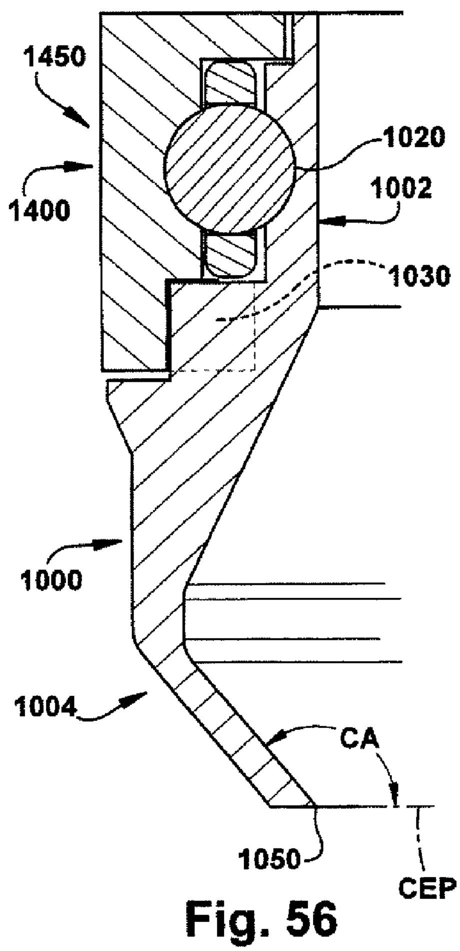
FIG. 56 is a schematic section view of a "hook blade" style rotary knife blade and associated blade housing adapted to be used in the power operated rotary knife of FIG. 1.

Another blade profile is shown in the "hook blade" style rotary knife blade which is schematically depicted at 1000 in FIG. 56. Here the cutting angle CA with respect to the plane CEP defined by the cutting edge 1050, may be about the same or slightly larger or smaller than the cutting angle CA of the rotary knife blade 300 (see FIG. 24). However, the inner profile of the hook blade 1000 is less planar and more V-shaped that the inner profile of the flat blade 300. That is, as the inner surface of the blade curves radially inwardly as one moves from the blade section 1004 to the body section 1002. This inward curvature of the inner surface of the hook blade 1000 results in a less smooth and more curved path of travel for cut or trimmed material, as compared with the flat blade 300. Thus, the hook blade 1000 is particularly useful for trimming relatively thin layers of material from a product, for example, trimming a thin layer of fat or meat tissue from a relatively planar, large piece of meat, as the power operated rotary knife 100 is moved over the product in a sweeping motion. For trimming thicker layers of material from a product, the hook blade 1000 would not be as efficient because the curved path of travel of the cut or trimmed material layer would result in the power operated rotary knife 100 experiencing more drag and resistance during cutting or trimming. Thus, more effort would be required by the operator to move and manipulate the power operated rotary knife 100 to make the desired cuts or trims.

As can also be seen, the shape of the rotary knife blade body 1002 is also different than the body 302 of the flat rotary knife blade 300. Accordingly, the shape of a blade support section 1450 of a blade housing 1400 is also modified accordingly from the shape of the blade support section 450 of the blade housing 400 when used in the power operated rotary knife 100. That is, the shape of a particular rotary knife blade selected to be used in the power operated rotary knife 100 will sometimes require modification of the associated blade housing for the power operated rotary knife 100. However, the blade-blade housing bearing structure 500 and gear train 604, as discussed above, are utilized to support and drive the blade 1000. Additionally, as discussed above, the driven gear 1030 of the knife blade 1000 is spaced axially below the bearing race 1020.

Figure 57:
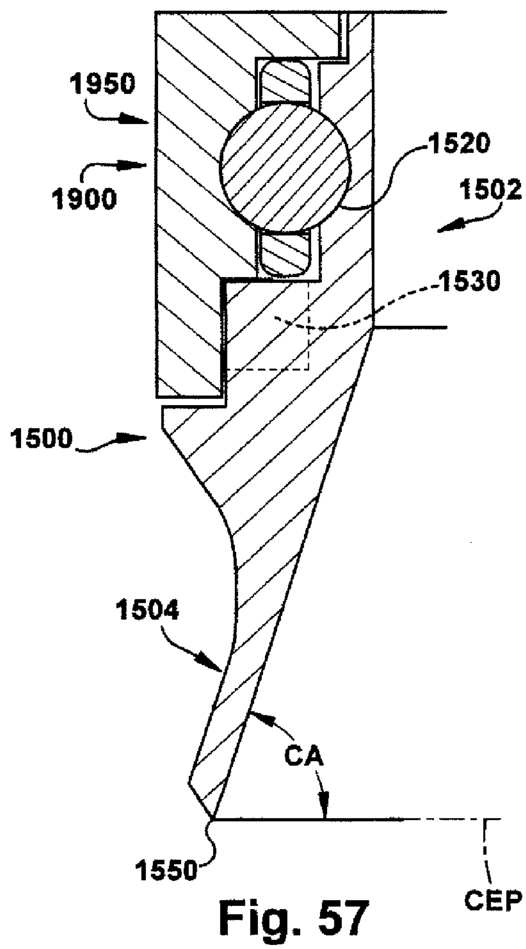
FIG. 57 is a schematic section view of a "straight blade" style rotary knife blade and associated blade housing adapted to be used in the power operated rotary knife of FIG. 1.

A more aggressive blade profile is shown in the "straight blade" style rotary knife blade which is schematically depicted at 1500 in FIG. 57. The cutting angle CA is smaller than the cutting angles of the rotary knife blades 300 and 1000. Indeed, the cutting angle CA of the knife blade 1500 is an acute angle of less than 90° with respect to the plane CEP defined by the cutting edge 1550. The cutting angle CA of the straight blade 1500 is very "steep" and more aggressive than the flat blade 300 or the hook blade 1000. A straight blade is particularly useful when make deep or plunge cuts into a product, i.e., making a deep cut into a meat product for the purpose of removing connective tissue/gristle adjacent a bone.

As can also be seen, the shape of the knife blade body 1502 is also different than the body 302 of the flat rotary knife blade 300. Accordingly, the shape of a blade support section 1950 of a blade housing 1900 is also modified accordingly from the shape of the blade support section 450 of the blade housing 400 when used in the power operated rotary knife 100. However, the blade-blade housing bearing structure 500 and gear train 604, as discussed above, are utilized to support and drive the blade 1000. Additionally, as discussed above, the driven gear 1530 of the knife blade 1500 is spaced axially below the bearing race 1520.

Other rotary knife blades styles, configurations, and sizes exist and may also be used with the power operated rotary knife 100. The blade-blade housing structure 500 of the present disclosure and the other features, characteristics and attributes, as described above, of the power operated rotary knife 100 may be used with a variety of rotary knife blades styles, configurations, and sizes and corresponding blade housings. The examples recited above are typical blade styles (flat, hook, and straight), but numerous other blade styles and combination of blade styles may be utilized, with an appropriate blade housing, in the power operated rotary knife 100 of the present disclosure, as would be understood by one of skill in the art. It is the intent of the present application to cover all such rotary knife blade styles and sizes, together with the corresponding blade housings, that may be used in the power operated rotary knife 100.

Second Exemplary Embodiment

Power Operated Rotary Knife 2100

Overview

Figure 59:
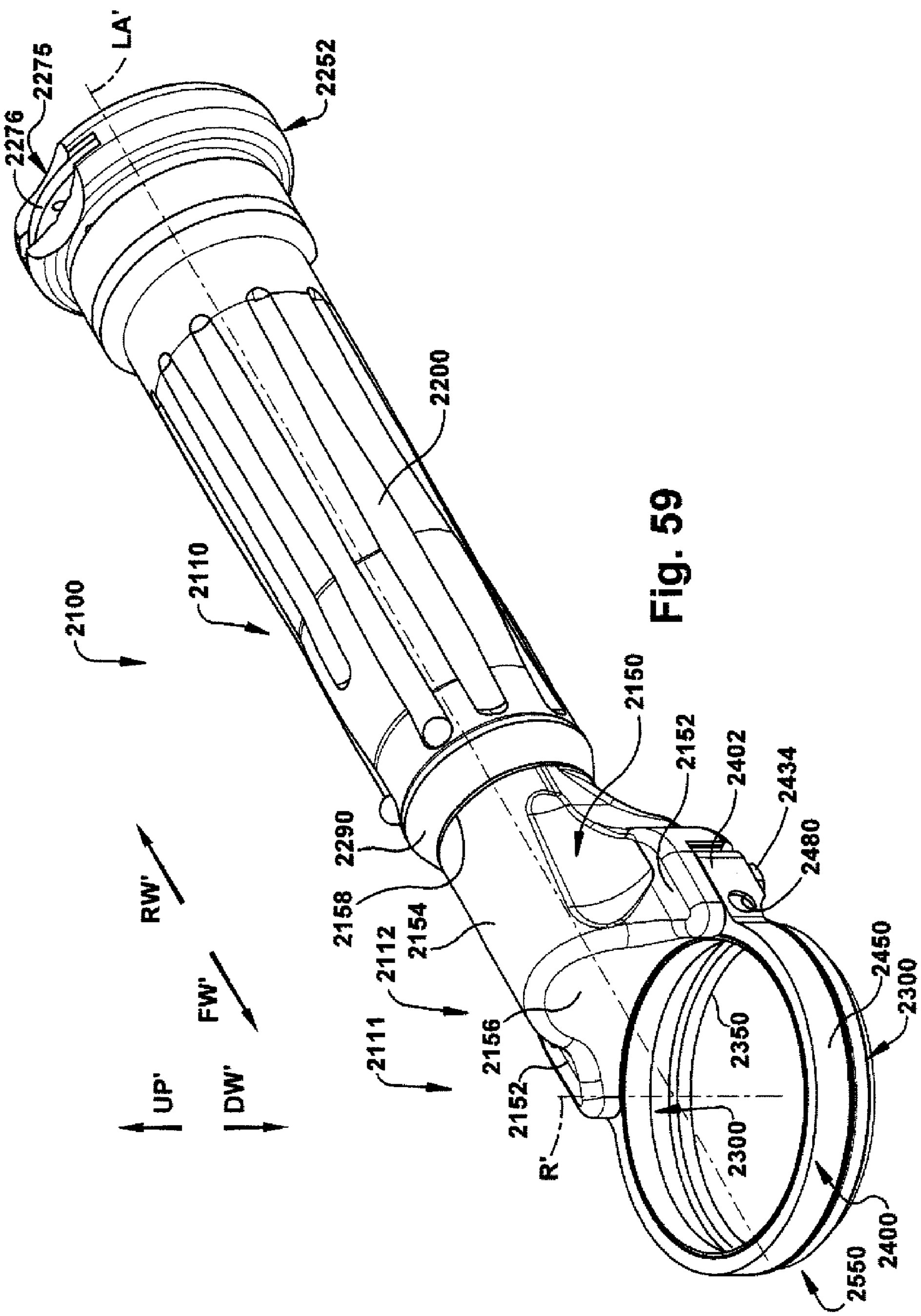
FIG. 59 is a schematic front perspective view of a second exemplary embodiment of a power operated rotary knife of the present disclosure including a head assembly, a handle assembly and a drive mechanism, the head assembly including a gearbox assembly, an annular rotary knife blade, a blade housing, and a blade-blade housing support or bearing structure.
Figure 60:
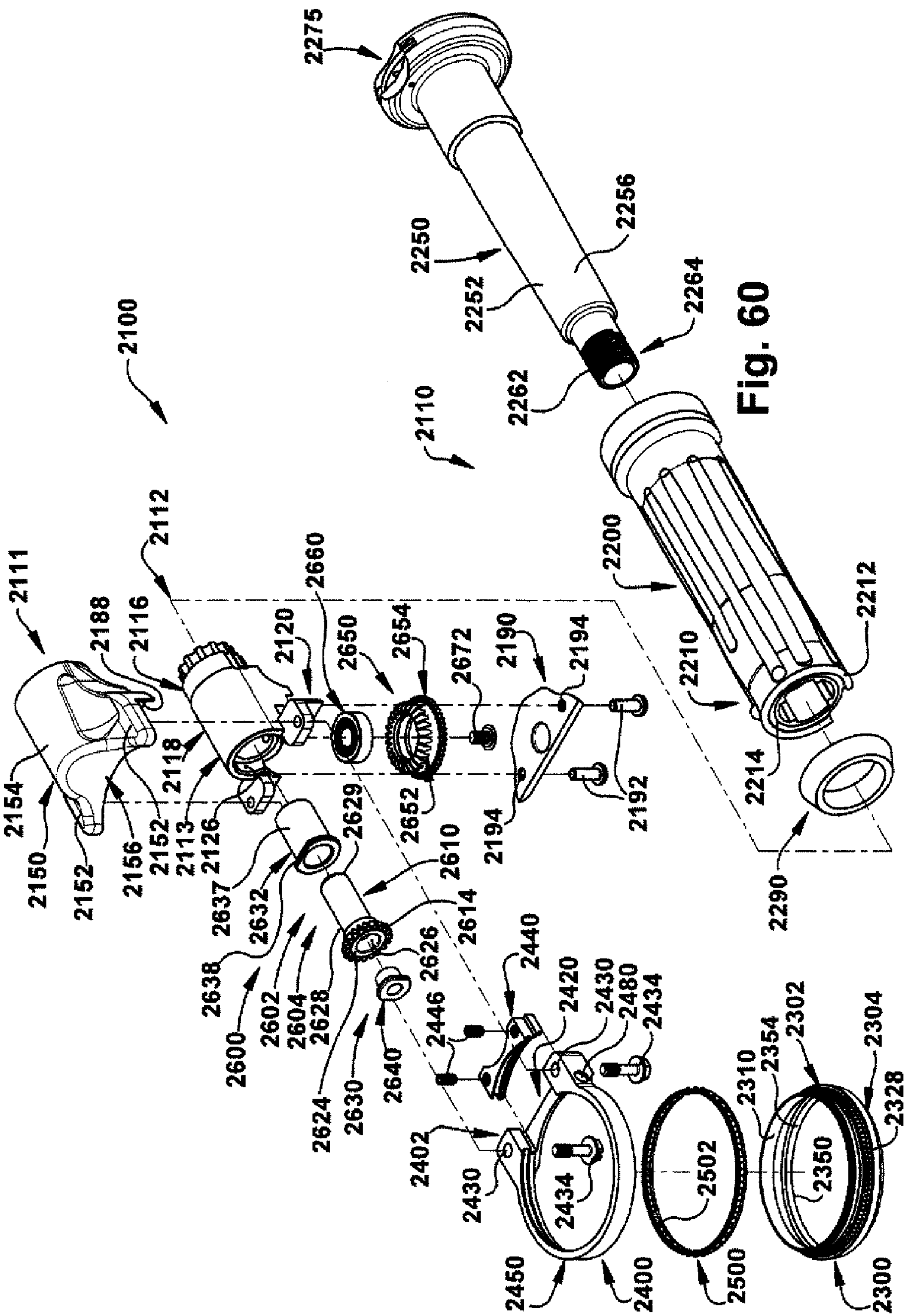
FIG. 60 is a schematic exploded perspective view of the power operated rotary knife of FIG. 59.
Figure 61:
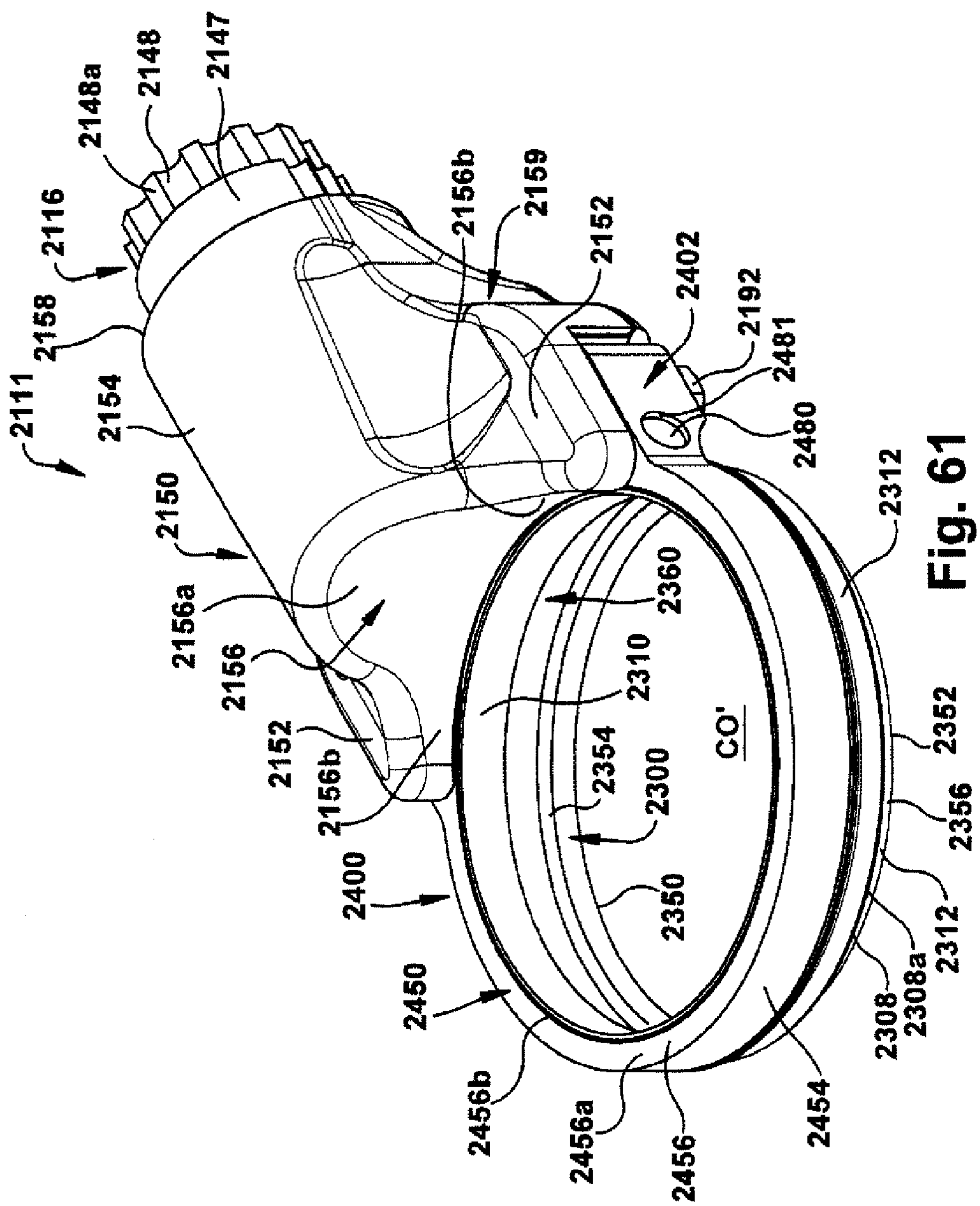
FIG. 61 is a schematic perspective view of the head assembly of the power operated rotary knife of FIG. 59, including the gearbox assembly, the rotary knife blade, the blade housing, and the blade-blade housing support or bearing structure.

A second exemplary embodiment of a power operated rotary knife of the present disclosure is shown generally at 2100 in FIGS. 59 and 60. The power operated rotary knife 2100 includes a handle assembly 2110, a detachable head assembly 2111, and a drive mechanism 2600. The head assembly 2111, best seen in FIGS. 60-68, of the power operated rotary knife 2100 includes a gearbox assembly 2112, a rotary knife blade 2300, a blade housing 2400, and a blade-blade housing support or bearing structure 2500.

The rotary knife blade 2300 is supported for rotation with respect to the blade housing 2400 by the blade-blade housing bearing structure 2500, which includes, in one exemplary embodiment, an elongated rolling bearing strip 2502 (FIGS. 70 and 71) disposed in an annular passageway 2504

Figure 67:
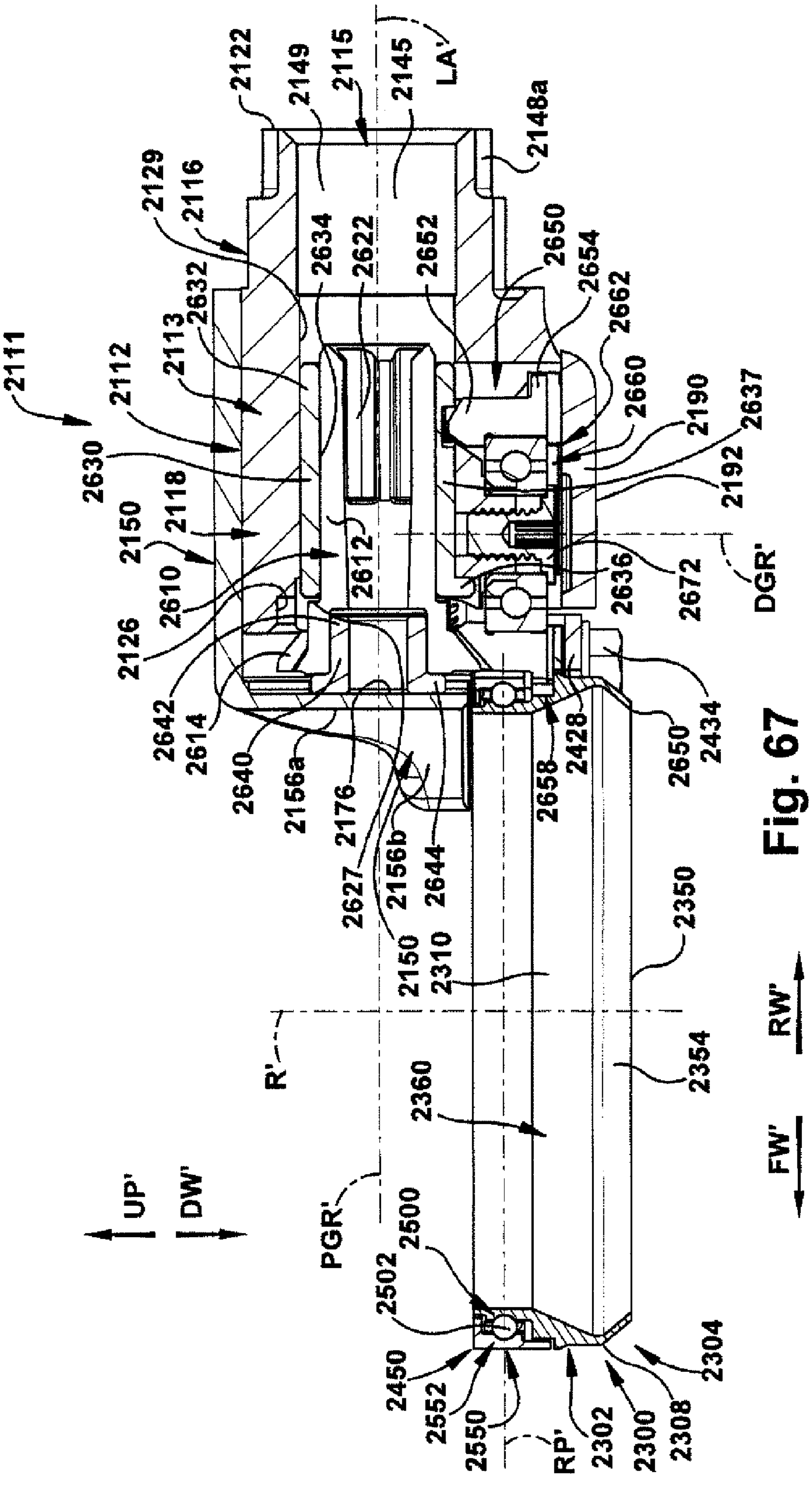
FIG. 67 is a schematic longitudinal section view of the head assembly of FIG. 61.
Figure 68:
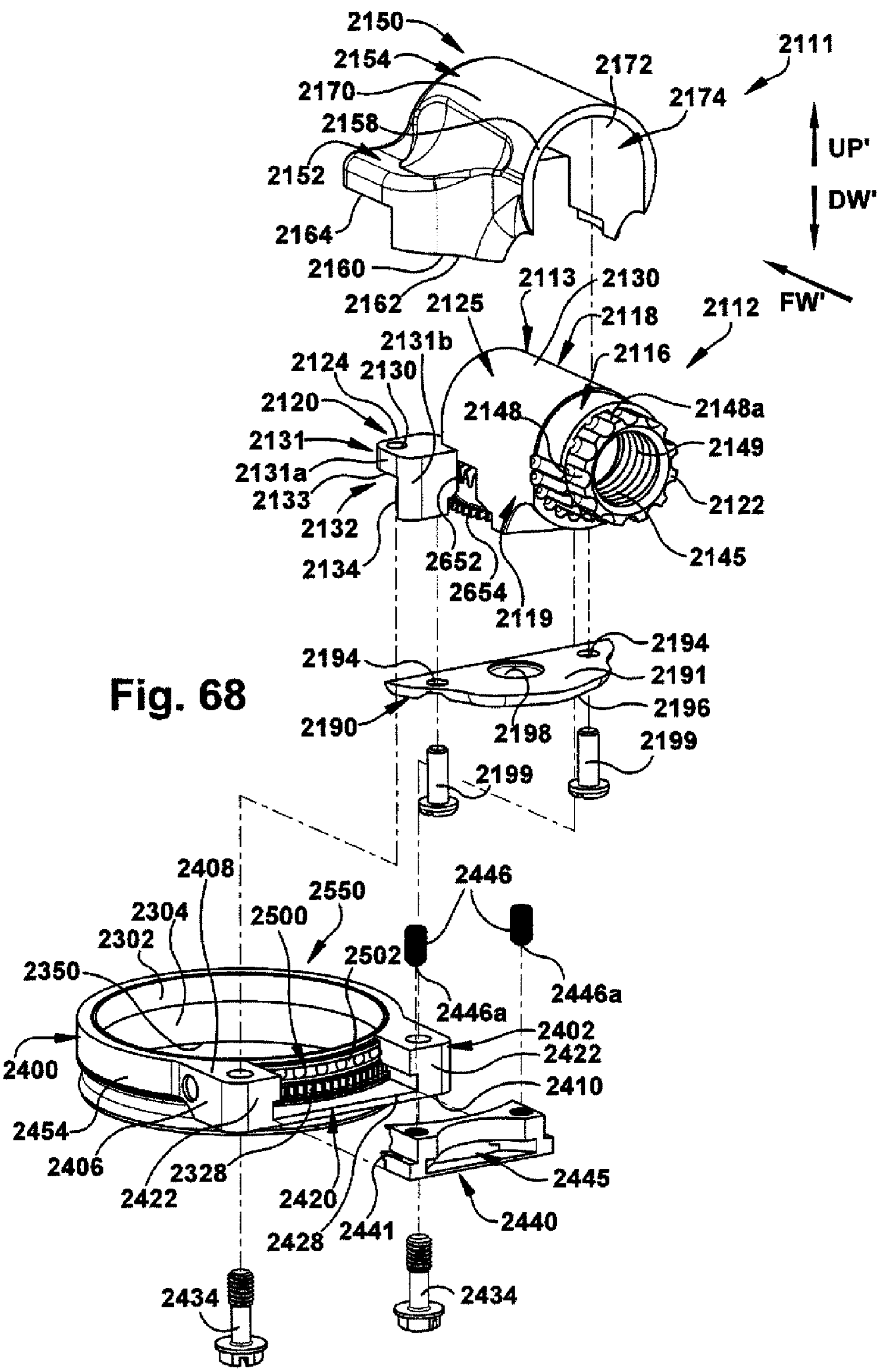
FIG. 68 is a schematic exploded rear perspective view of the head assembly of FIG. 61.

(FIG. 71) formed between opposing bearing surfaces 2319, 2459 of the rotary knife blade 2300 and the blade housing 2400, respectfully. An assembled combination of the rotary knife blade 2300, the blade housing 2400, and the blade-blade housing bearing structure 2500 will be referred to as the blade-blade housing combination 2550 (FIG. 67). The blade-blade housing bearing structure 2500 is similar to the blade-blade housing bearing structure 500 of the power operated rotary knife 100, that is, the blade-blade housing bearing structure 2500 both releasably secures the rotary knife blade 2300 to the blade housing 2400 and provides a bearing structure to support the rotary knife blade 2300 for rotation about an axis of rotation R' (FIGS. 59 and 67).

The gearbox assembly 2112 includes a gearbox housing 2113 and a gearbox 2602 defining a gear train 2604. Similar to the gear train 604 of the power operated rotary knife 100, the gear train 2604 of the power operated rotary knife 2100 includes a pinion gear 2610 and a drive gear 2650. The pinion gear 2610 is rotatably driven about a pinion gear axis of rotation PGR' (FIG. 67) by a flexible shaft drive assembly (not shown). The flexible shaft drive assembly (not shown) is similar to the flexible shaft drive assembly 700 of the power operated rotary knife 100.

The pinion gear 2610, in turn, rotatably drives a drive gear 2650 about a drive gear axis of rotation DGR' (FIG. 67). As was the case with the gear train 604 of the power operated rotary knife 100 of the first embodiment, the drive gear 2650 is a double gear that includes a first upper bevel gear 2652 which meshes with a set of bevel gear teeth 2616 of a gear head 2614 of the pinion gear 2610 to rotate the drive gear 2650, while a second lower spur gear 2654 of the drive gear 2650 engages a drive gear 2328 of the rotary knife blade 2300 forming an involute gear drive 2658 (FIG. 67) to rotate the knife blade 2300 about its axis of rotation R'.

Other components of the drive mechanism 2600 of the power operated rotary knife 2100 include components external to the head and handle assemblies 2111, 2110 of the power operated rotary knife 2100. These external components include a drive motor (not shown) and the flexible shaft drive assembly (not shown) which rotates the pinion gear 2610. Such components of the power operated rotary knife 2100 are similar to the corresponding components discussed with respect to the power operated rotary knife 100, e.g., the flexible shaft drive 700 and drive motor 800.

As is best seen in FIG. 60, the handle assembly 2110 includes a hand piece 2200 and a hand piece retaining assembly 2250. The handle assembly 2110 extends along a longitudinal axis LA' (FIGS. 59 and 67), which is substantially orthogonal to and intersects the rotary knife blade axis of rotation R'. The hand piece retaining assembly 2250 includes an elongated central core 2252 and a handle spacer ring 2290. The elongated central core 2252 includes an outer surface 2256 that includes a threaded portion 2262 at a distal end 2264 of the core 2252. The threaded portion 2262 of the elongated core 2252 threads into threads 2149 (FIG. 89) formed on an inner surface 2145 of a cylindrical rearward section 2116 of the gearbox housing 2113 to secure the hand piece 2200 to the gearbox housing 2113.

The power operated rotary knife 2100 is especially suited to be used with annular rotary knife blades having a smaller blade outer diameter, for example, a blade outer diameter on the order of three and half (3½) inches or less. When using a small diameter rotary knife blade, there is a desire to reduce the physical size or "footprint" of the head assembly and, particularly, the size of the frame body so that the rotary knife blade, the blade housing and the head assembly are all proportionately smaller in size compared to power operated rotary knife used in conjunction with a larger diameter annular rotary knife blades. For example, with a smaller diameter rotary knife blade, the cutting opening of the rotary knife blade is smaller and the cutting or trimming to be done with the power operated rotary knife tends to be smaller in size and more precise. While the size of the blade housing is typically proportional in size to the size of the rotary knife blade, a large head assembly and, specifically, a large frame body may tend to obscure the operator's view of the cutting region and the cutting or trimming operation being performed.

The size and shape of a handle or hand piece of the handle assembly is generally determined by ergonomic considerations, e.g., the size of an average operator's hand, gripping comfort, etc. Thus, the size of the hand piece is typically the same for both large and small blade diameter power operated rotary knives.

In the power operated rotary knife 2100, the size of the head assembly 2111 is effectively reduced by certain features that distinguish it from the head assembly 111 of the power operated rotary knife 100, described above. Specifically, the frame body 2150 of the power operated rotary knife 2100 is reduced in size compared to the frame body 150 of the power operated rotary knife 100. Recall that in the power operated rotary knife 100, the blade-blade housing combination 550 was secured to an arcuate mounting pedestal 152 at a front portion 151 of the frame body 150.

In the power operated rotary knife 2100, the frame body 2150 does not include an arcuate mounting pedestal at a front portion of the frame body. Instead, the blade-blade housing combination 2550 of the power operated rotary knife 2100 is mounted directly to the gearbox housing 2113, specifically, to an L-shaped mounting pedestal 2132 (FIG. 62) defined by a pair of bosses 2131 of a forward mounting section 2120 of the gearbox housing 2113. In addition to the forward mounting section 2120 at a distal end 2124 of the gearbox housing 2113, the gearbox housing 2113 includes an inverted U-shaped central section 2118 and a cylindrical rearward section 2116 at a proximal end 2122 of the housing 2113.

Figure 90:
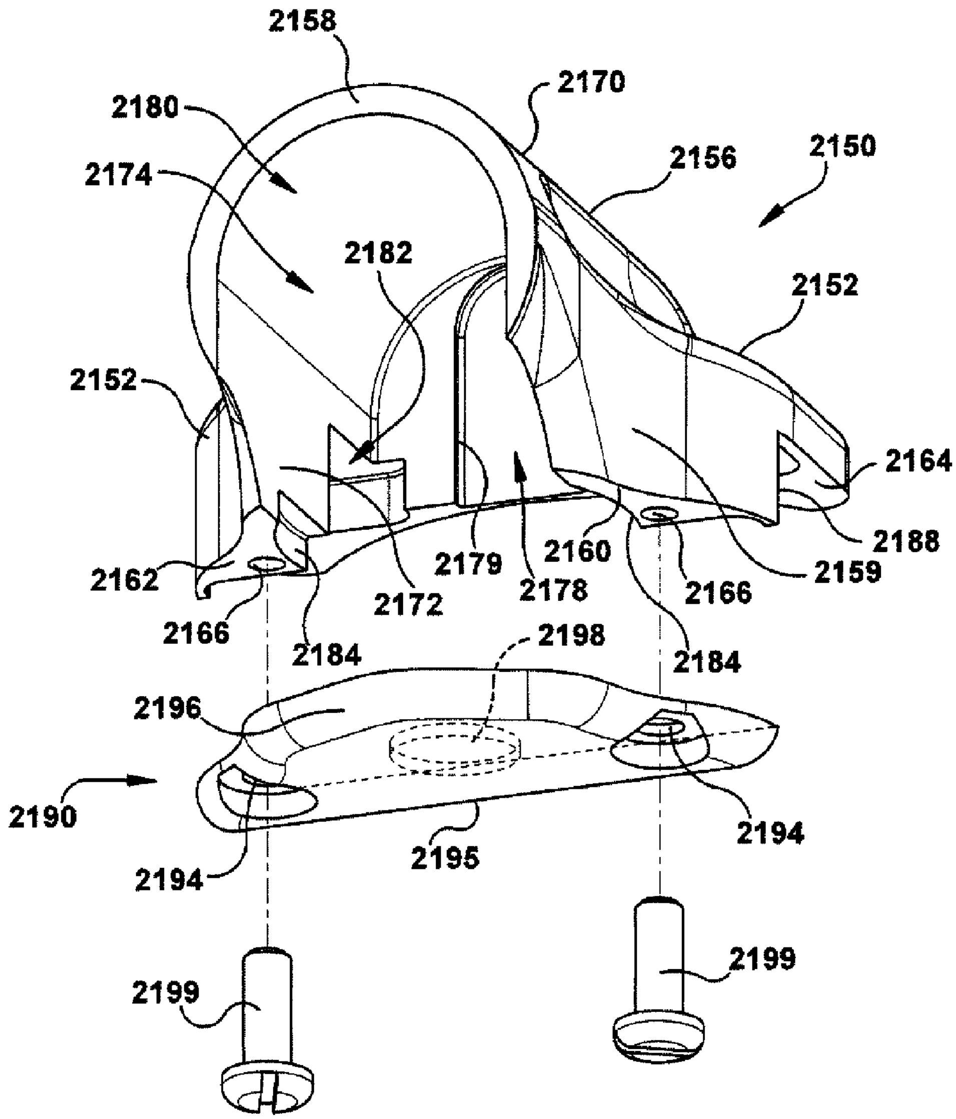
FIG. 90 is a schematic rear, bottom perspective view of the frame body and frame body bottom cover of the head assembly of the power operated rotary knife of FIG. 59.

In the power operated rotary knife 100, the gearbox assembly 112 including the gearbox housing 113 was slidably received within in the cavity 155 defined by the frame body 150, somewhat akin to a dresser drawer being slid into a dresser. The gearbox housing 113 was moved in the forward direction FW along the handle assembly longitudinal axis LA relative to the frame body 150 to be slidably received within the frame body cavity 155. The frame body 150 surrounded both the top and the bottom of the gearbox housing 113. In the power operated rotary knife 2100, the frame body 2150 is smaller and less bulky. The frame body 2150 and a thin frame body bottom cover 2190 are secured together to cover, protect, and support the gearbox housing 2113. The frame body 2150 defines a cavity 2174 (FIG. 90) and has an open bottom wall 2160. This configuration allows the frame body 2150 to be moved in a downward direction DW' (FIG. 68) orthogonal to the handle assembly longitudinal axis LA' to slide over the forward mounting section 2120 and the inverted U-shaped central section 2118 of the gearbox housing 2113. When assembled, a bottom wall 2160 of the frame body 2150 is flush with corresponding bottom surfaces of the forward mounting section 2120 and the inverted U-shaped central section 2118 of the gearbox housing 2113. The frame body bottom cover 2190 is then secured to the bottom wall 2160 of the frame body 2150.

Attachment of the frame body bottom cover 2190 to the frame body 2150 therefore effectively seals the gearbox housing 2113.

Figure 97:
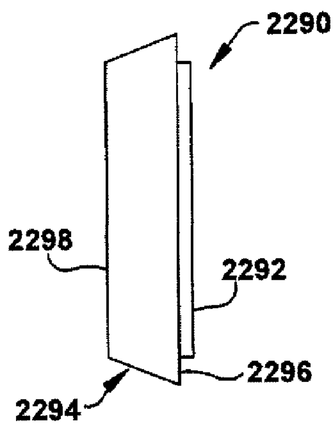
FIG. 97 is a schematic side elevation view of a handle spacer ring of the handle assembly of the power operated rotary knife of FIG. 59.
Figure 98:
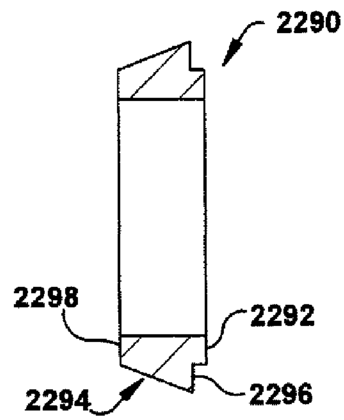
FIG. 98 is a schematic longitudinal section view the handle spacer ring of FIG. 97.

As noted above, the hand piece 200 of the power operated rotary knife 100 and the hand piece 2200 of the power operated rotary knife 2100 are approximately the same size. As can be seen in FIGS. 60, 97 and 98, the handle spacer ring 2290 of the handle assembly 2110 includes a body portion 2294 that tapers radially inwardly from the hand piece 2200 to the frame body 2150. In the power operated rotary knife 100, the handle spacer ring 290 (FIG. 2) was cylindrical and not tapered. This is another indication that the frame body 2150 of the power operated rotary knife 2100 is smaller in size than the corresponding frame body 150 of the power operated rotary knife 100.

As discussed, the head assembly 2111 of the power operated rotary knife 2100 includes structural differences compared to the head assembly 111 of the power operated rotary knife 100 that result in a smaller physical "footprint" of the head assembly 2111 of the power operated rotary knife 2100. However, it should be recognized that, if desired, the power operated rotary knife 2100 may effectively be used with large diameter rotary knife blades just as the power operated rotary knife 100 could, if desired, be effectively used with small diameter rotary knife blades.

For brevity, components and assemblies of the power operated rotary knife 2100 that are substantially similar to corresponding components and assemblies of the power operated rotary knife 100, such as the handle assembly 2110, the blade-blade housing structure 2500, the drive mechanism 2600, the gearbox 2602, the gear train 2604, the flexible shaft drive assembly, and the drive motor, among others, will not be described in detail below. It being understood by one of ordinary skill in the art that the discussion of the structure and function of the components and assemblies of the power operated rotary knife 100, set forth above, is applicable to and is incorporated into the discussion of the power operated rotary knife 2100, set forth below.

Rotary Knife Blade 2300

In one exemplary embodiment and as best seen in FIGS. 71-74, the rotary knife blade 2300 of the power operated rotary knife 2100 is a one-piece, continuous annular structure that is supported for rotation about the axis of rotation R'. The rotary knife blade 2300 includes a body section 2302 and a blade section 2304 extending axially from the body 2302. The body 2302 of the rotary knife blade 2300 includes an upper end 2306 and a lower end 2308 spaced axially apart from the upper end 2306. The knife blade body 2302 further includes an inner wall 2310 and an outer wall 2312 spaced radially apart from the inner wall 2310. The blade section 2304 of the rotary knife blade 2300 includes a blade edge 2350 defined at a distal end portion 2352 of the blade section 2304. The blade section 2304 further includes an inner wall 2354 and an axially spaced apart outer wall 2356. A short angled portion 2358 bridges the inner and outer walls 2354, 2356. As can best be seen in FIG. 74, the blade edge 2350 is formed at the intersection of the short angled portion 2358 and the blade section inner wall 2354. The rotary knife blade 2300 defines an inner wall 2360 which is formed by the inner wall 2310 of the body 2302 and the inner wall 2354 of the blade section 2304. In one exemplary embodiment, the rotary knife blade 2300 includes a knee or discontinuity 2360*a* in the body region of the inner wall 2360, although it should be appreciated that, depending on the specific configuration of the rotary knife blade 2300, the blade may be formed such that there is no discontinuity in the inner wall 2360.

The rotary knife blade 2300 is different in configuration than the rotary knife blades 300, discussed previously. As explained previously, the rotary knife blade 300 is typically referred to as a "flat blade" style rotary knife blade, while the rotary knife blade 2300 is typically referred to as a "hook blade" style rotary knife blade (FIG. 56). As was the case with the power operated rotary knife 100, the power operated rotary knife 2100 may be used with a variety of rotary knife blade styles and sizes, provided that an appropriately configured mating blade housing is provided. As can best be seen in FIG. 74, in a hooked style blade, both the inner and outer walls 2354, 2356 the blade section 2304 extends generally downwardly and radially inwardly with respect to the axis of rotation R'.

Figure 74:
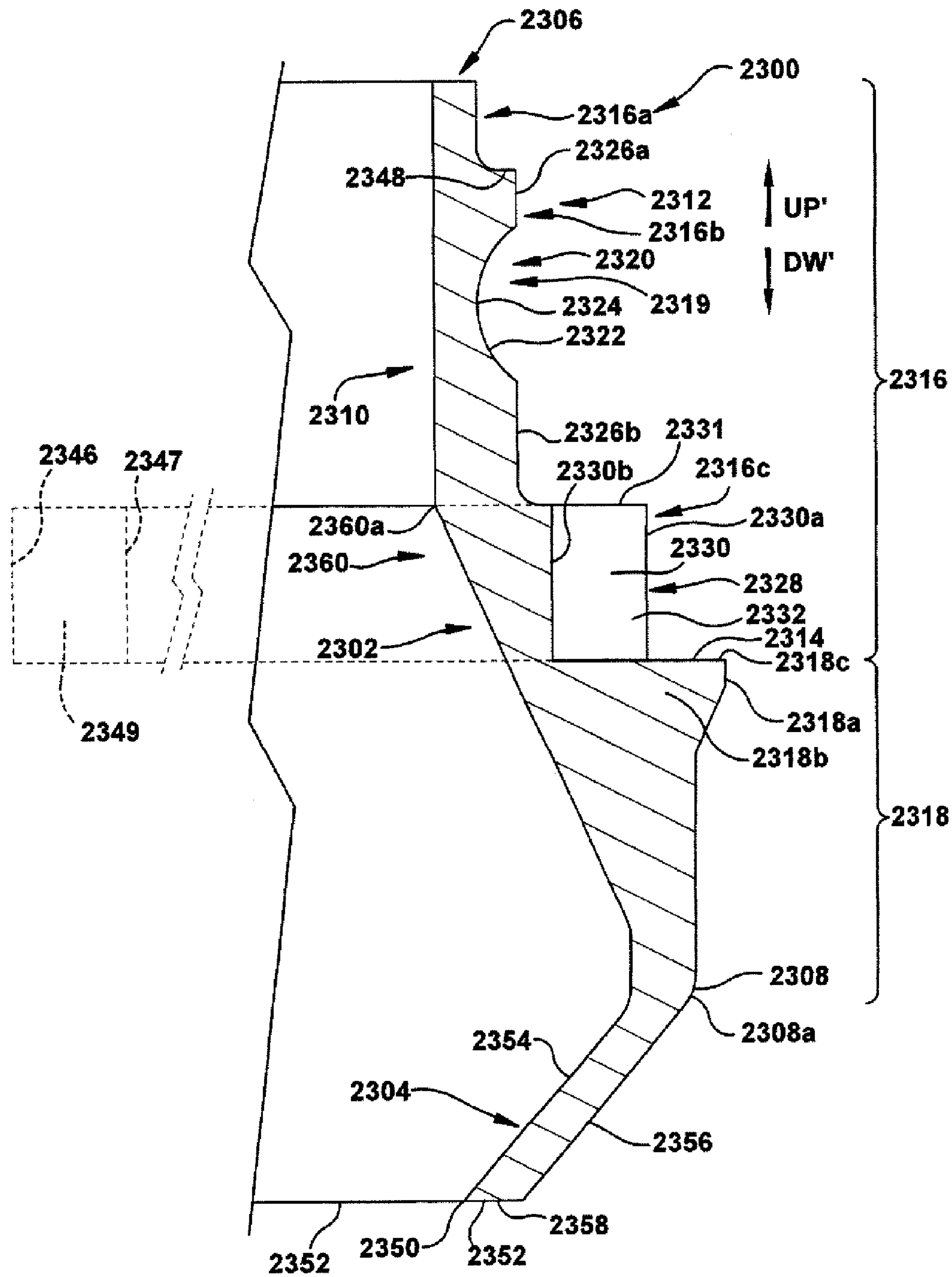
FIG. 74 is a schematic section view of the annular rotary knife blade of FIG. 72, as seen from a plane indicated by the line 74-74 in FIG. 72.
Figure 75:
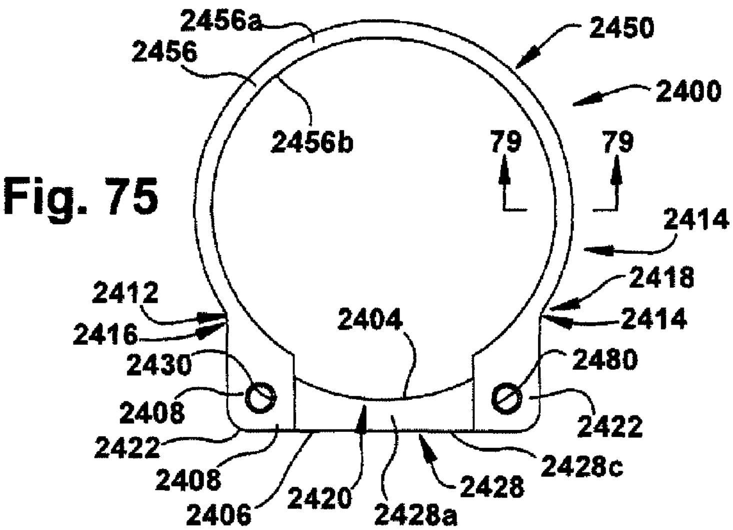
FIG. 75 is a schematic top plan view of the blade housing of the power operated rotary knife of FIG. 59, with the blade housing plug removed.
Figure 76:
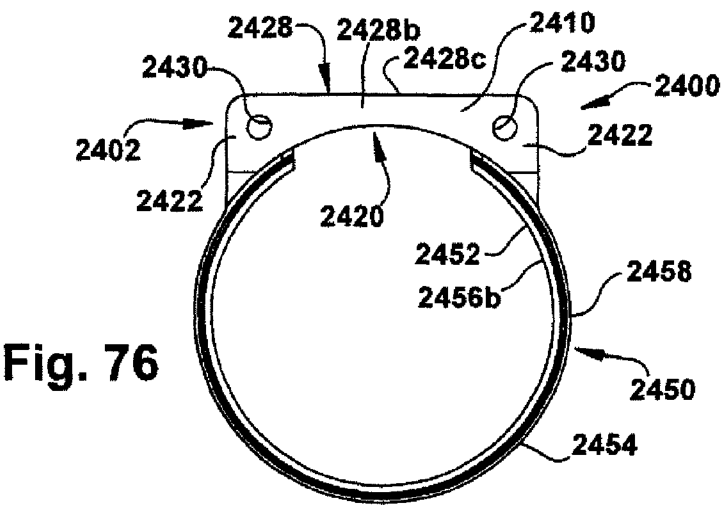
FIG. 76 is a schematic bottom plan view of the blade housing of FIG. 75.

Each time the rotary knife blade 2300 is sharpened, material will be removed from the distal end portion 2352 and the cutting edge 2350 will move along the blade section 2304 generally in an upward direction UP' (FIG. 74). Stated another way, the axial extent of both the inner and outer walls 2354, 2356 of the blade section 2304 will decrease with repeated sharpening of the blade 2300. When repeated sharpening of the rotary knife blade 2300 causes the distal end portion 2352 to impinge on a knee 2308*a* of the blade body 2312 defining the lower end 2308 of the body 2302, the rotary knife blade 2300 would be at or near the end of its useful life.

A radially inwardly step 2314 (FIG. 74) of the body outer wall 2312 defines a line of demarcation between a radially narrower, upper gear and bearing region 2316 of the blade body 2302 and a radially wider, lower support region 2318 of the body 2302. As can be seen in FIG. 74, the upper gear and bearing region 2316 is narrow in cross section being recessed inwardly from an outermost radial extent 2318*a* of the lower support region 2318 defined by the blade body outer wall 2312. The upper gear and bearing region 2316, in one exemplary embodiment, is generally rectangular in cross section and includes an upper section 2316*a*, a generally vertical or axially extending middle section 2316*b*, and a generally vertically extending lower section 2316*c*. As can be seen, the lower section 2316*c* of the upper gear and bearing region 2316 is radially recessed with respect to the outermost radial extent 2318*a* of the outer wall 2312. The middle section 2316*b* of the upper gear and bearing region 2316 is radially recessed with respect to the lower section 2316*c*. And, the upper section 2316*a* of the upper gear and bearing region 2316 is radially recessed with respect to the middle section 2316*b*.

Figure 71:
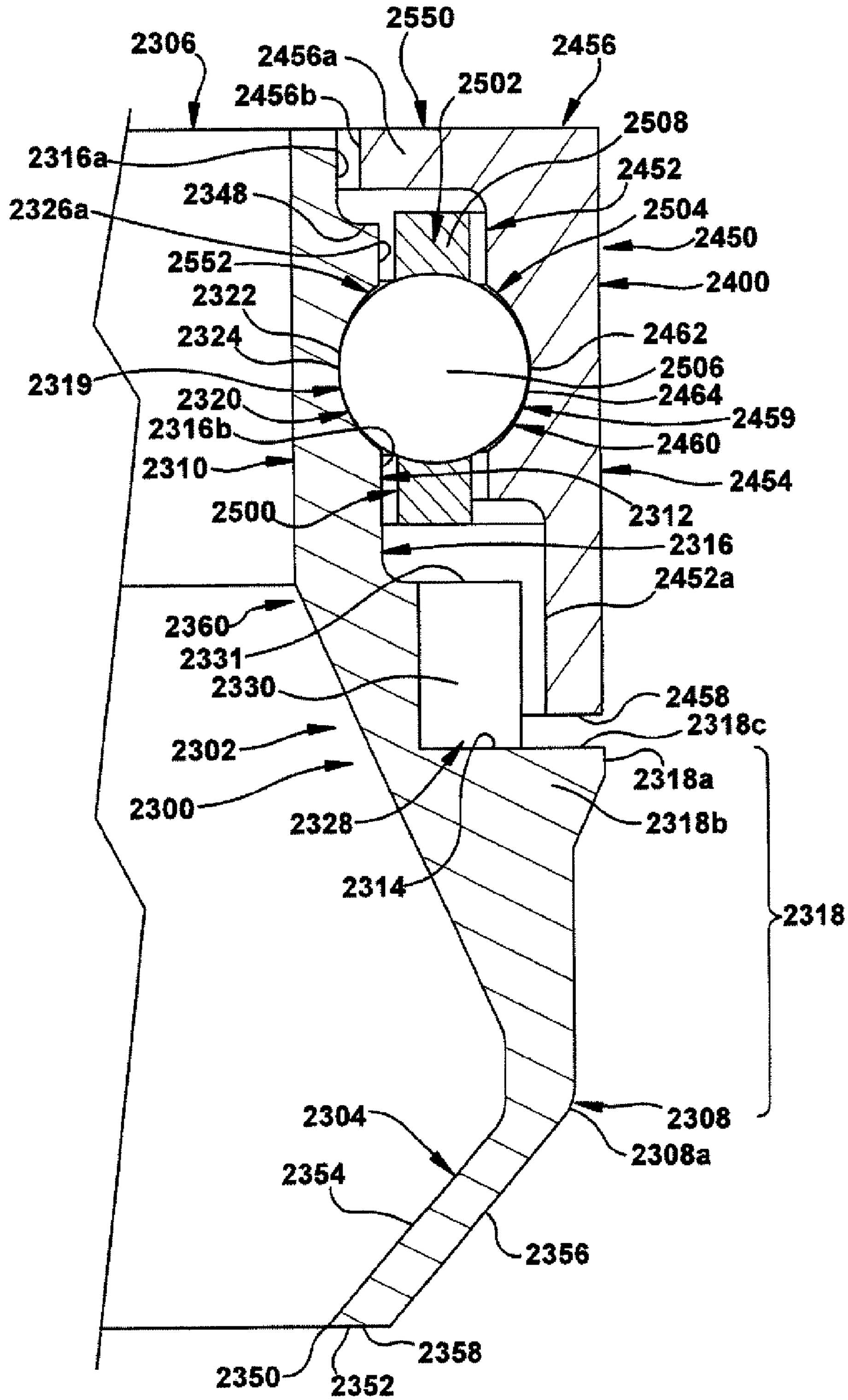
FIG. 71 is a schematic enlarged section view of the blade-blade housing combination of FIG. 69 as seen from a plane indicated by the line 71-71 in FIG. 69.
Figure 72:
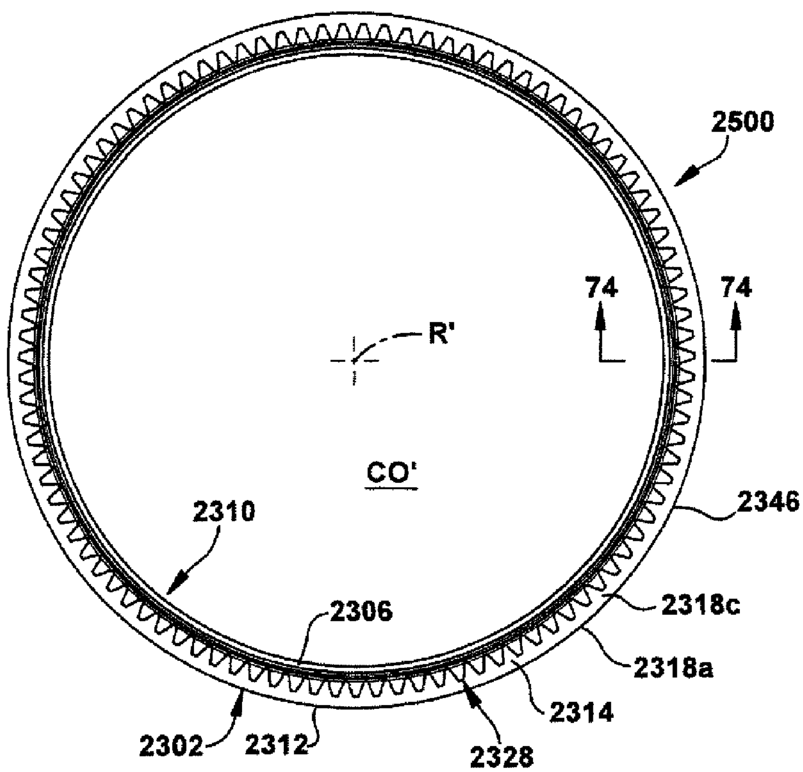
FIG. 72 is a schematic top plan view of the annular rotary knife blade of the power operated rotary knife of FIG. 59.
Figure 73:
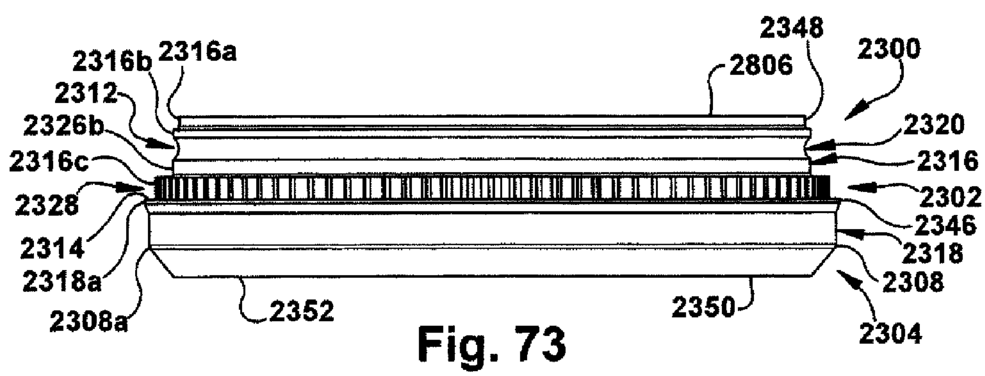
FIG. 73 is schematic front elevation view of the annular rotary knife blade of FIG. 72.

The rotary knife blade 2300 includes the bearing surface 2319. In one exemplary embodiment of the power operated rotary knife 2100 and as best seen in FIGS. 71 and 74, the rotary knife blade bearing surface 2319 comprises a bearing race 2320, which is defined by and extends radially inwardly into the outer wall 2312 in the middle section 2316*b* of the upper gear and bearing region 2316. In one exemplary embodiment, the knife bearing race 2320 defines a generally arcuate bearing face 2322 in a central portion 2324 of the bearing race 2320. As can be seen the middle section 2316*b* of the upper gear and bearing region 2316 includes vertical portions 2326*a*, 2326*b* respectively extending axially above and below the bearing race 2320.

The body outer wall 2312 in the lower section 2316*c* of the upper gear and bearing region 2316 of rotary blade body 2302 defines a driven gear 2328 comprising a set of gear teeth 2330 formed so as to extend radially outwardly in a stepped portion 2331 of the outer wall. The driven gear 2328 is axially below the bearing race 2320, that is, closer to the second lower end 2308 of the blade body 2302. The driven gear 2328, in one exemplary embodiment, defines a plurality of vertically or axially oriented spur gear teeth 2332.

Advantageously, as can be seen in FIG. 74, the set of gear teeth 2330 of the rotary knife blade driven gear 2328 are axially spaced from the upper end 2306 of the rotary knife blade body 2302 by the recessed upper section 2316*a* of the upper gear and bearing region 2316 and are also axially spaced from arcuate bearing race 2320 of the body 2302 by the lower vertical portion 2326*b* of the middle section 2316*b* of the upper gear and bearing region 2316 below the bearing race 2320. The set of gear teeth 2330 of the rotary knife blade drive gear 2328 are also advantageously axially spaced from the lower end 2308 of the blade body 2302 by the lower support portion 2318 of the knife blade body 2302. Advantageously, the bearing race 2320 of the rotary knife blade 2300 is also axially spaced from the upper and lower ends 2306, 2308 of the blade body 2302.

The set of gear teeth 2330 of the driven gear 2328 of the rotary knife blade 2300 is axially spaced from the upper end 2306 of the knife blade body 2302. This advantageously protects the set of gear teeth 2330 from damage that they would otherwise be exposed to if, as is the case with conventional rotary knife blades, the set of gear teeth 2330 were positioned at the upper end 2306 of the blade body 2302 of the rotary knife blade 2300. Additionally, debris are generated by the power operated rotary knife 2100 during the cutting/trimming operations. Generated debris include pieces or fragments of bone, gristle, meat and/or fat that are dislodged or broken off from the product being cut or trimmed by the power operated rotary knife 2100. Debris may also include foreign material, such as dirt, dust and the like, on or near a cutting region of the product being cut or trimmed. Advantageously, spacing the set of gear teeth 2330 from both axial ends 2306, 2308 of the knife blade body 2302, impedes or mitigates the migration of such debris into the region of the knife blade driven gear 2328. Debris in the region of knife blade driven gear 2328 may cause or contribute to a number of problems including blade vibration, premature wear of the driven gear 2328 or the mating drive gear 2650 of the gear train 2604, and "cooking" of the debris.

Similar advantages exist with respect to axially spacing the blade bearing race 2320 from the upper and lower ends 2306, 2308 of the blade body 2302. As will be explained below, the rotary knife blade body 2302 and the blade housing 2400 are configured to provide radially extending projections or caps which provide a type of labyrinth seal to impede ingress of debris into the regions of the knife blade driven gear 2328 and the blade-blade housing bearing structure 2500. These labyrinth seal structures are facilitated by the axial spacing of the knife blade drive gear 2328 and the blade bearing race 2320 from the upper and lower ends 2306, 2308 of the blade body 2302 of the rotary knife blade 2300.

As can best be seen in FIGS. 60 and 67, a lower spur gear 2654 of the drive gear 2650 of the gear train 2604 meshes with the spur gear teeth 2332 of the knife blade driven gear 2328 to rotate the rotary knife blade 2300 with respect to the blade axis of rotation R'. This gearing combination defines an involute spur gear drive, as was previously described with respect to the gear train 604 of the drive mechanism 600 of the power operated rotary knife 100, between the gearbox 2602 and the knife blade 2300 to rotate the knife blade 2300 with respect to the blade housing 2400.

As can be best seen in FIG. 71, in order to impede ingress of fragments or pieces of meat, bone, and/or gristle generated during cutting/trimming operations, and/or other debris into the driven gear 2328 of the rotary knife blade 2300, the outer wall 2312 in the lower support portion of blade body 2318 includes a radially outwardly extending projection or cap 2318*b*. The outwardly extending cap 2318*b* includes the outermost radial extent 2818*a* of the lower support portion 2318 of the rotary knife blade body 2302. As can best be seen in FIG. 74, the cap 2318*b* is axially aligned with and, when viewed in an upward direction UP' from the lower end 2308 of the knife blade body 2302, overlies at least a portion of the set of gear teeth 2330.

A radial outer surface 2330*a* of the set of gear teeth 2330, when viewed in three dimensions, defines a first imaginary cylinder 2346 (shown schematically in dashed line in FIG. 74). That is, the first imaginary cylinder 2346 is defined by the gear tips 2330*a* of each of the gear teeth of the set of gear teeth 2330. A radial inner surface 2330*b* of the set of gear teeth 2330, when viewed in three dimensions, defines a second, smaller diameter imaginary cylinder 2347 (also shown schematically in dashed line in FIG. 74). That is, the second imaginary cylinder 2347 is defined by the gear root 2330*b* of each of the gear teeth of the set of gear teeth 2330. Viewed in an upward direction UP' from a lower end 2308 of the knife blade body 2302, the cap 2318*b* is aligned with and overlies at least a portion of an annulus 2349 defined between the first imaginary cylinder 2346 and the second, smaller diameter cylinder 2347. As the annulus 2349 is coincident with a volume occupied by the set of gear teeth 2330, the cap 2318*b* is aligned with and overlies at least a portion of the set of gear teeth 2330. Further, the cap 2318*b* extends radially outwardly beyond the imaginary cylinder 2346 defined by the radial outer surface 2330*a* of the set of gear teeth 2330.

As can best be seen schematically in FIG. 71, the outwardly extending cap 2318*b* is axially aligned with and overlies at least a portion of a bottom wall or end 2458 of a blade support section 2450 of the blade housing 2400 to form a type of labyrinth seal and minimize ingress of debris into the driven gear 2328. The overlapping cap 2318*a* of the rotary knife blade body 2302 and the bottom wall 2458 of the blade support section 2450 of the blade housing 2400 inhibit ingress of debris from entering between the outer wall 2312 of the blade body 2302 of the rotary knife blade 2300 and the blade housing 2400 and working into the region of the knife blade driven gear 2328. As best seen schematically in FIG. 71, for clearance purposes, there is a small axial gap between an upper surface 2318*e* of the cap 2318*b* and the bottom wall 2458 of the blade housing blade support section 2450. The upper surface 2318*c* of the cap 2318*c* is a portion of the radially inward step 2314 defining the line of demarcation between upper gear and bearing portion 2316 of the blade body 2302 and the lower support portion 2318 of the blade body 2302.

Figure 69:
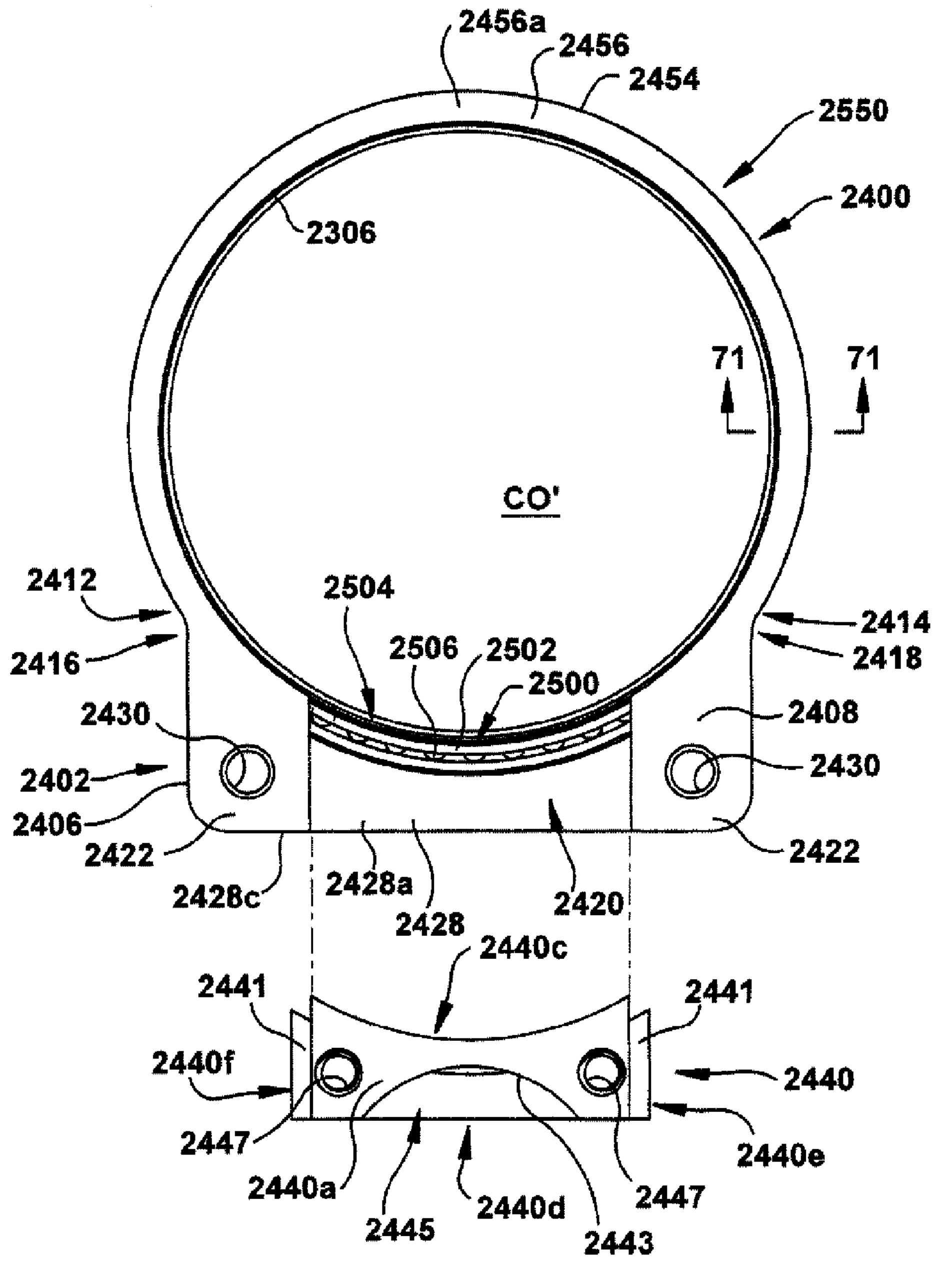
FIG. 69 is a schematic top plan view of a blade-blade housing combination of the head assembly of the power operated rotary knife of FIG. 59 including an assembled combination of the rotary knife blade, the blade housing, and the blade-blade housing bearing structure, with a blade housing plug of the blade housing removed.

An upper portion of the knife blade inner wall 2360 defines a cutting opening CO' (FIGS. 61, 63 and 69) of the power operated rotary knife 2100. That is, a layer of material is cut or trimmed from a product being processed, such as a layer of meat or fat being trimmed from an animal carcass, by moving power operated rotary knife 2100 such that the rotary knife blade 2300 and blade housing 2400 move through the carcass. As the rotary knife blade 2300 and blade housing 2400 move through the carcass, the cut or trimmed layer of material moves with respect to the power operated rotary knife 2100 through the cutting opening CO' defined by the rotary knife blade 2300.

Blade Housing 2400

In one exemplary embodiment and as best seen in FIGS. 70 and 75-79, the blade housing 2400 of the power operated rotary knife 2100 comprises one-piece, continuous annular structure that includes the mounting section 2402 and the blade support section 2450. The blade housing is continuous about its perimeter, that is, unlike prior split-ring annular blade housings, the blade housing 2400 of the present disclosure has no split along a diameter of the housing to allow for expansion of the blade housing diameter. The blade-blade housing bearing structure 2500 secures the rotary knife blade 2300 to the blade housing 2400. Accordingly, removal of the knife blade 2300 from the blade housing 2400 is accomplished by removing the elongated rolling bearing strip 2502 of the blade-blade housing bearing structure 2500 from the power operated rotary knife 2100. The blade-blade housing bearing structure 2500 permits use of the continuous blade housing 2400 because there is no need to expand the blade housing diameter to remove the knife blade 2300 from the blade housing 2400.

The multiple advantages of a continuous annular blade housing of the present disclosure, including the exemplary blade housings 400 and 2400, have been discussed above with respect to the blade housing 400 and will not be repeated here. With respect to the blade housing 2400, the mounting section 2402 extends radially outwardly from the blade support section 2450 and subtends an angle of approximately 120° or, stated another way, extends approximately ⅓ of the way around the circumference of the blade housing 2400. The mounting section 2402 is both axially thicker and radially wider than the blade support section 2450.

The mounting section 2402 includes an inner wall 2404 and a radially spaced apart outer wall 2406 and a first upper end 2408 and an axially spaced apart second lower end 2410. At forward ends 2412, 2414 of the mounting section 2402, there are tapered regions 2416, 2418 (FIG. 75) that transition between the upper end 2408, lower end 2410 and outer wall 2406 of the mounting section 2402 and the corresponding upper end 2456, lower end 2458 and outer wall 2454 of the blade support section 2450. The mounting section 2402 defines an opening 2420 (FIGS. 70 and 75) that extends radially between the inner and outer walls 2404, 2406. The radially extending opening 2420 is bounded by and extends between upright supports or pedestals 2422 and an upper surface 2428*a* of a base 2428 that bridges the pedestals 2422. The pedestals 2422 extend axially upwardly from an upper surface 2428*a* of the base 2428.

Figure 82:
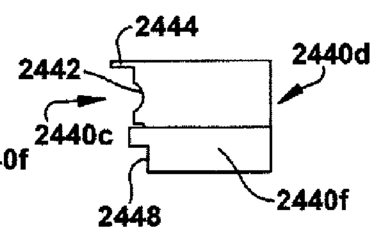
FIG. 82 is a schematic side elevation view of the blade housing plug of FIG. 80 as seen from a plane indicated by the line 82-82 in FIG. 81.
Figure 83:
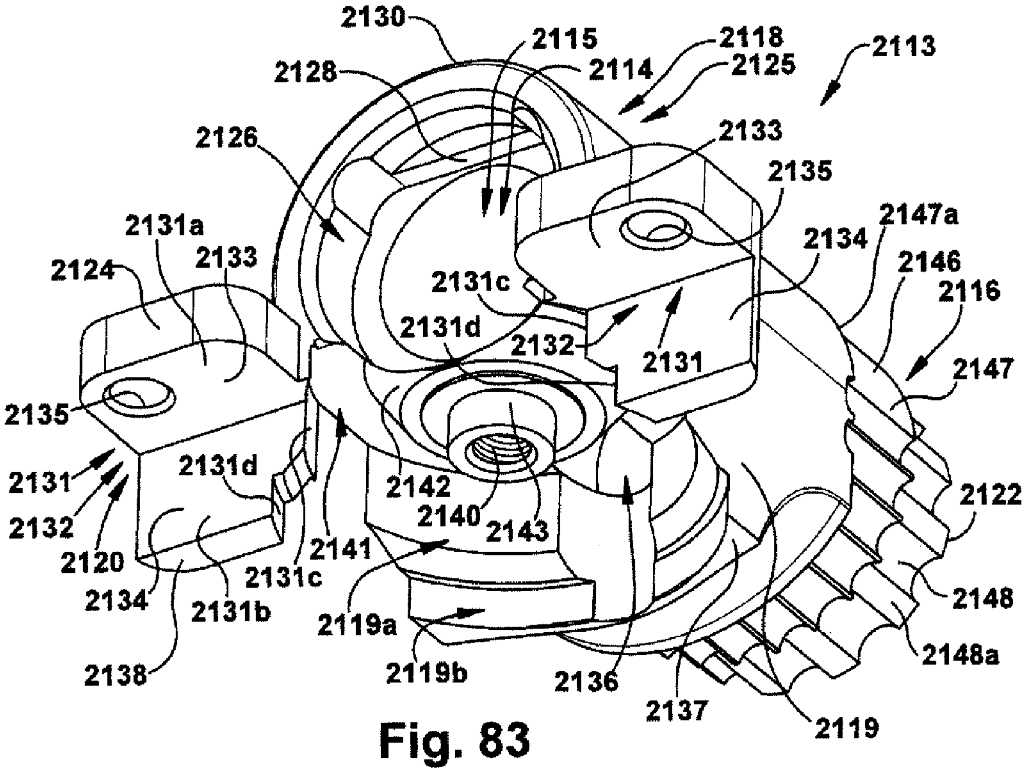
FIG. 83 is a schematic front, bottom perspective view of a gearbox housing of the gearbox assembly of the power operated rotary knife of FIG. 59.
Figure 84:
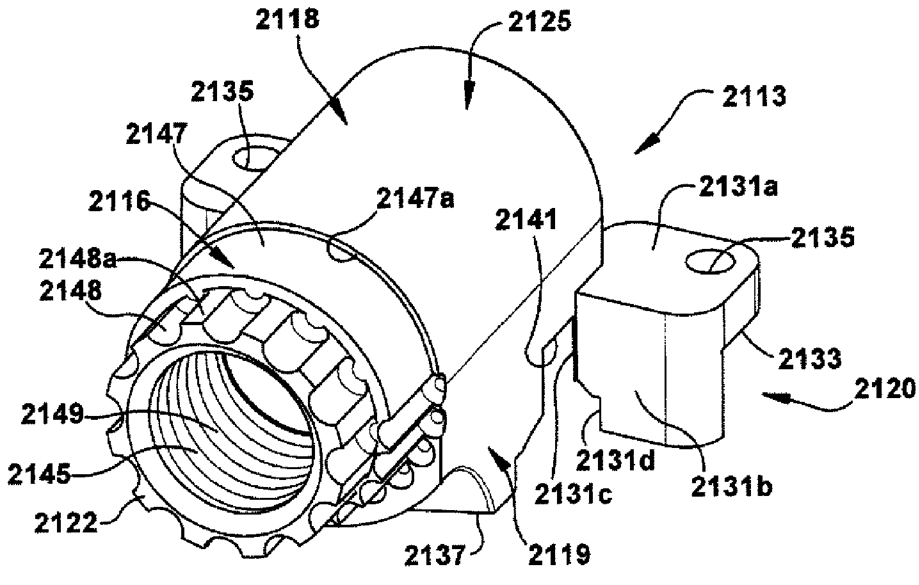
FIG. 84 is a schematic rear, top perspective view of the gearbox housing of FIG. 83.
Figure 85:
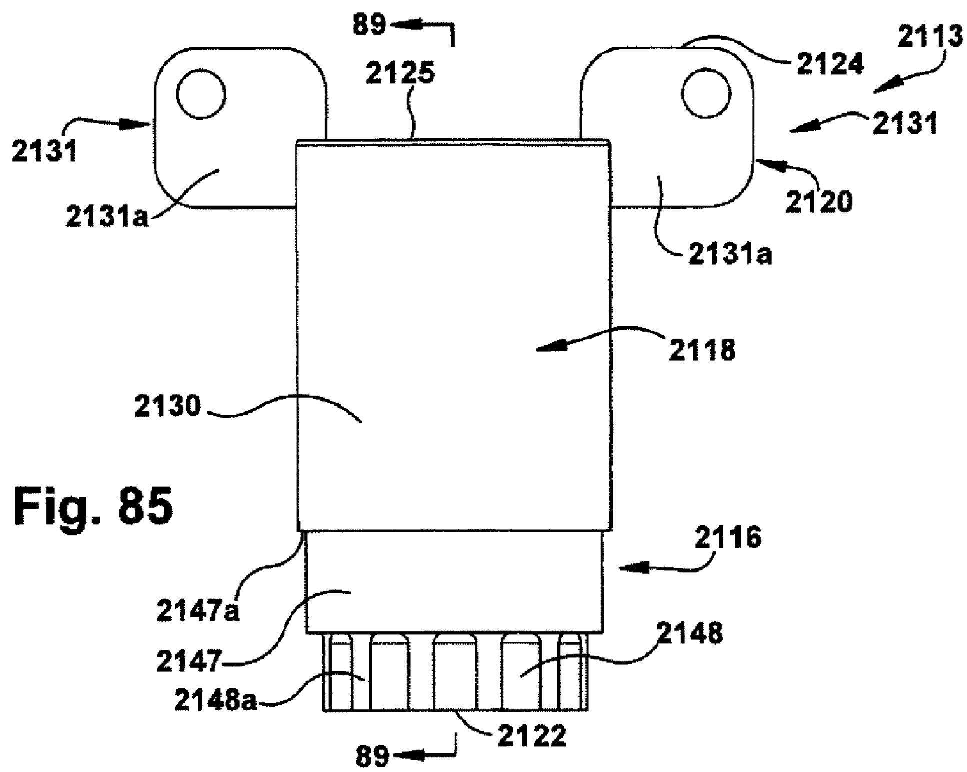
FIG. 85 is a schematic top plan view of the gearbox housing of FIG. 83.
Figure 88:
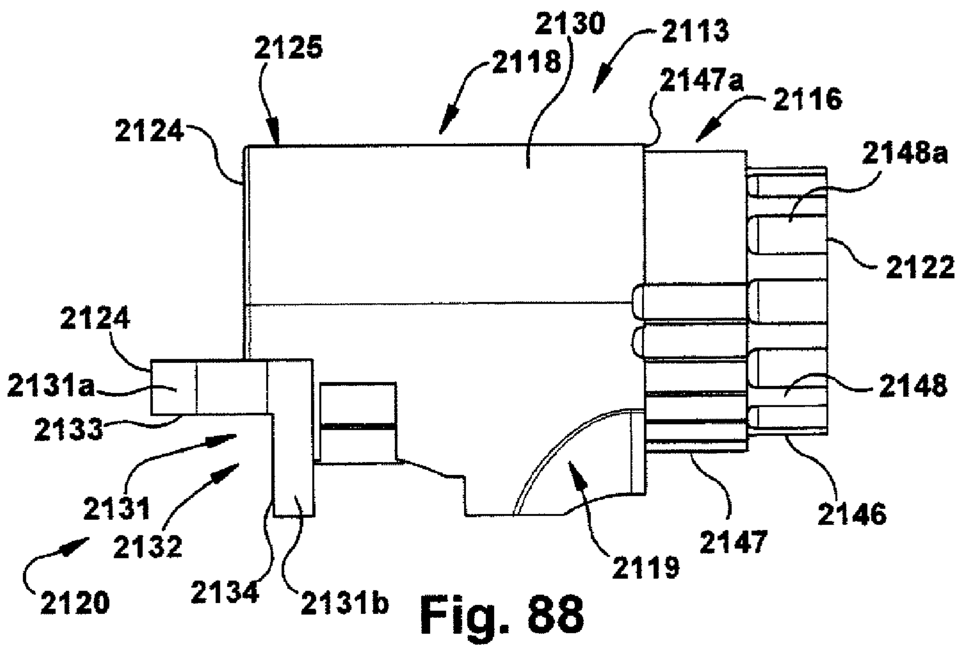
FIG. 88 is a schematic right side elevation view of the gearbox housing of FIG. 83.

As can best be seen in FIGS. 82-84, the base 2428 and the pedestals 2422 above the base 2428 together define two axially extending apertures 2430 between the upper and lower ends 2408, 2410 of the mounting section 2402. The base apertures 2430 receive a pair of threaded fasteners or screws 2434. The threaded fasteners 2434 pass through the base apertures 2430 and thread into respective threaded openings 2130 of a horizontal planar seating surface 2133 of the L-shaped mounting pedestal 2132 (FIG. 88) defined by the forward mounting portion 2120 of the gearbox housing 2113 to releasably secure the blade-blade housing combination 2550 to the gearbox housing 2113 of the head assembly 2111. When blade-blade housing combination 2550 is secured to the gearbox housing 2113 using the threaded fasteners, the upper end 2408 of the mounting section 2402 of the blade housing 2400 is seated on the horizontal planar seating surface 2133 of the L-shaped mounting pedestal 2132 of the forward mounting portion 2120 of the gearbox housing 2113. The outer wall 2406 of the mounting section 2402 of the blade housing 2400 is seated on a vertical planar seating surface 2134 of the L-shaped mounting pedestal 2132 of the forward mounting portion 2120 of the gearbox housing 2113.

Figure 80:
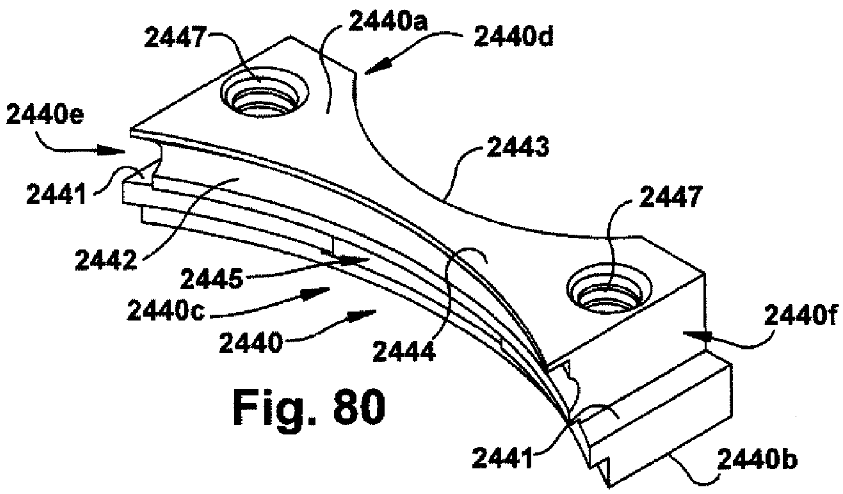
FIG. 80 is a schematic front perspective view of the blade housing plug that is removably secured to the blade housing of FIG. 75.
Figure 81:
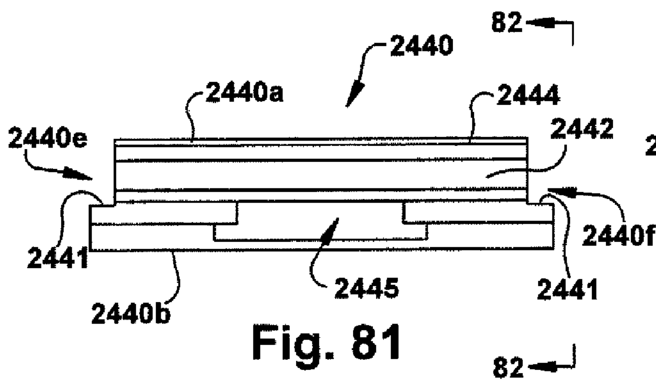
FIG. 81 is a schematic front elevation view of the blade housing plug of FIG. 80.

The radially extending opening 2420 of the blade housing mounting section 2402 includes a narrower upper portion 2420*a* and a wider lower portion 2420*b*. A relative width of the opening 2420 is defined by rearward facing surfaces 2438 of the pedestals 2422 that comprise a portion of the outer wall 2406 of the blade housing mounting portion 2402. The opening 2420 is sized to receive a removable blade housing plug 2440 (FIGS. 80-82). The blade housing plug 2440 is removably received in the mounting section opening 2420. When the blade housing plug 2440 is removed from the opening 2420, access is provided to the elongated rolling bearing strip 2502 of the blade-blade housing bearing structure 2500. The elongated rolling bearing strip 2502 must be inserted to secure the rotary knife blade 2300 to the blade housing 2500 and must be removed to permit the rotary knife blade 2300 to be removed from the blade housing 2400.

The blade housing plug 2440 is positioned in the opening 2420 and releasably attached to the blade housing 2400 via a pair of set screws 2446 (FIG. 70) that, when tightened bear against the upper surface 2428*a* of the mounting section base 2428. Stepped shoulders 2441 formed in opposite sides 2440*e*, 2440*f* of blade housing plug 2440 bear against mating stepped shoulders 2424 of the pair of pedestals 2422 to secure the blade housing plug 2440 with respect to the blade housing mounting section opening 2420. When installed in the blade housing mounting section opening 2420, the blade housing plug 2440 inhibits debris generated during cutting/trimming operations (e.g., pieces or fragments of fat, gristle, bone, etc.) and other foreign materials from migrating to and accumulating on or adjacent the elongated rolling bearing strip 2502 of the blade-blade housing bearing structure 2500 or the driven gear 2328 of the rotary knife blade 2300.

Figure 79:
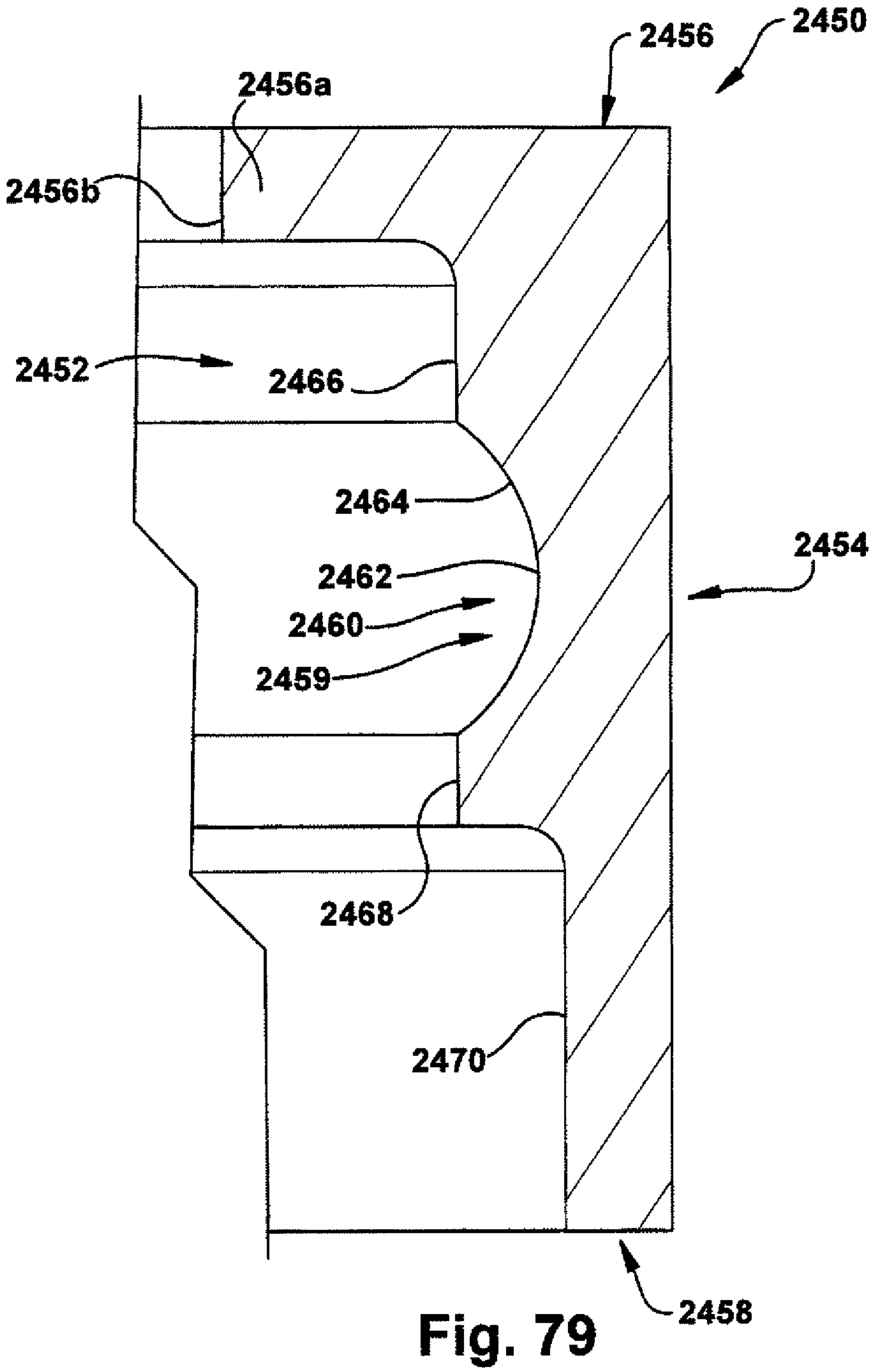
FIG. 79 is a schematic section view of the blade housing of FIG. 25 as seen from a plane indicated by the line 79-79 in FIG. 75.

As can best be seen in FIGS. 71 and 79, the blade support section 2450 includes an inner wall 2452 and radially spaced apart outer wall 2454 and a first upper end 2456 and an axially spaced second lower end 2458. The blade support section 2450 extends about the entire 360° circumference of the blade housing 2400. The blade support section 2450 in a region of the mounting section 2402 is continuous with and forms a portion of the inner wall 2404 of the mounting section 2402. The blade support section inner wall 2452 defines the bearing surface 2459. In one exemplary embodiment of the power operated rotary knife 2100 and as best seen in FIGS. 71 and 79, the bearing surface 2459 of the blade housing 2400 comprises a bearing race 2460 that extends radially inwardly into the inner wall 2452. In one exemplary embodiment, a central portion 2462 of the blade housing bearing race 2460 defines a generally arcuate bearing face 2464.

As can best be seen in FIG. 71, the blade support section upper end 2456 defines a radially inwardly extending projection or cap 2456*a* that overlies a part of a radially inwardly stepped portion 2348 of the outer wall 2312 of the rotary knife blade body 2302 between the recessed upper section 2316*a* of the gear and bearing portion 2316 and the upper vertical portion 2326*a* of the middle section 2316*b* of the gear and bearing portion 2316 above bearing race 2320. The overlap of the projection or cap 2456*a* of the blade housing 2400 and the inwardly stepped portion 2348 of the rotary knife blade body 2402 protects the blade-blade housing bearing structure 2550. In the assembled blade-blade housing combination 2550, the cap 2456*a* is axially aligned with and overlies at least a portion of the rotary knife blade bearing structure 2320 and the set of gear teeth 2330 of the knife blade driven gear 2328.

Specifically, the overlap of the cap 2456*a* of the blade housing 2400 and the inwardly stepped portion 2348 of the rotary knife blade body 2402 forms a type of labyrinth seal. The labyrinth seal inhibits the entry of debris resulting from cutting and trimming operations and other foreign materials into the annular passageway 2504 between facing bearing surfaces 2319, 2459 of rotary knife blade 2300 and the blade housing 2400 and through which the rolling bearing strip 2502 of the blade-blade housing bearing structure 2500 traverses. As best seen schematically in FIG. 71, for clearance purposes, there is a small radial gap between a terminal end 2456*b* of the bearing region cap 2456*a* of the blade housing 2400 and the recessed upper section 2316*a* of the gear and bearing portion 2316 the rotary knife blade body 2402.

As can best be seen in FIG. 79, advantageously the blade housing bearing race 2460 is axially spaced from both the upper and lower ends 2456, 2458 of the blade support section 2450. Specifically, there is a portion 2466 of the inner wall 2452 of the blade support section 2450 extending axially between the blade housing bearing race 2460 and the cap 2456*a* and there are two axially extending portion 2468, 2470 of the inner wall 2452 extending axially between the bearing race 2460 and the blade support section lower end 2458. The first portion 2468 of the inner wall 2452 is directly below the bearing race 2460. The second portion 2470 of the inner wall 2452 is radially offset outwardly from the first portion 2468 and is adjacent the lower end 2458 of the blade housing 2400. As can be seen in FIG. 71, the second portion 2470 provides clearance for the driven gear 2328 of the rotary knife blade 2300.

The blade support section 2450 is configured to be relatively thin in radial cross section such that the combination of the knife blade 2300 and blade housing 2400 define a small cross sectional area. Minimizing drag of the combination of the blade 2300 and blade housing 2400 during cutting and trimming operations reduces operator effort required to move and manipulate the power operated rotary knife 2100 as the rotary knife blade 2300 and blade housing 2400 move through a product being cut or trimmed.

Figure 77:
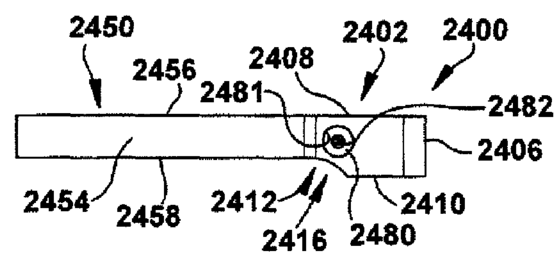
FIG. 77 is a schematic right side elevation view of the blade housing of FIG. 75.
Figure 78:
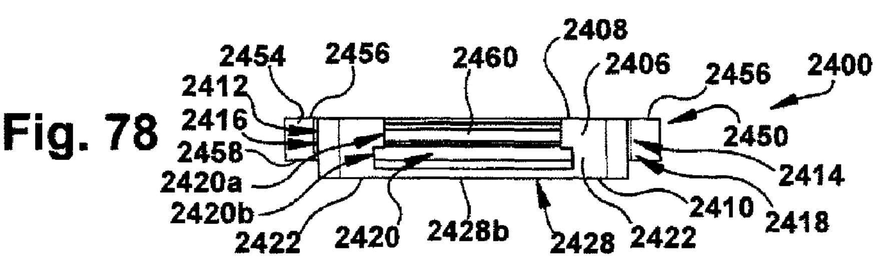
FIG. 78 is a schematic rear elevation view of the blade housing of FIG. 75 showing a plug housing plug opening of a mounting section of the blade housing.

As is best seen in FIG. 77, the right tapered region 2416 (as viewed from a front of the power operated rotary knife 2100) of the blade housing mounting section 2402 includes a cleaning port 2480 for injecting cleaning fluid for cleaning the blade housing 2400 and the knife blade 2300 during a cleaning process. The cleaning port 2480 includes an entry opening 2481 in the outer wall 2406 of the mounting section 2402 and extends through to exit opening 2482 in the inner wall 2404 of the mounting section 2402. A portion of the exit opening 2482 in the mounting section inner wall is congruent with and opens into a region of the bearing race 2460 of the blade housing 2400. The cleaning port 2480 provides for injection of cleaning fluid into bearing race regions 2320, 2460 of the knife blade 2300 and blade housing 2400, respectively, and the driven gear 2328 of the knife blade 2300.

Blade Housing Plug 2440

As can best be seen in FIGS. 70 and 80-82, the blade housing plug 2440 includes an upper end 2440*a*, an axially spaced apart a lower end 2440*b*, an inner wall 2440*c* and a radially spaced apart outer wall 2440*d*. The blade housing plug 2440 also includes the pair of stepped shoulders 2441 formed in opposite sides 2440*e* of the blade housing plug 2440. The inner wall 2440*c* defines an arcuate bearing race 2442 (FIGS. 80-82) that continues the bearing race 2460 of the blade housing blade section inner wall 2452. When the blade housing plug 2440 is installed in the blade housing plug opening 2420 of the blade housing mounting section 2402, the radially inner wall 2440*c* of the blade housing plug 2440 defines a portion of the blade housing bearing race 2460 such that the blade housing bearing race 2460 is continuous about substantially the entire 360° circumference of the blade support section 2450.

As can best be seen in FIG. 81, the blade housing plug 2440 includes an generally rectangular opening 2445 that extends through the blade housing plug 2440 from outer wall 2440*d* to the inner wall 2440*e*. The upper end 2440*a* of the blade housing plug 2440 also defines a first axially extending arcuate recess 2443 (FIG. 80). When the blade housing plug 2440 is installed in the blade housing plug opening 2420, the opening 2445 of the blade housing plug 2440 receives the lower spur gear 2654 of the drive gear 2650 of the drive train 2604 such that the spur gear 2654 meshes with and rotatably drives the driven gear 2328 of the rotary knife blade 2300 and the arcuate recess 2443 of the blade housing plug 2440 provides clearance for the upper bevel gear 2652 of the drive gear 2650.

A portion of the upper end 2440*a* of the blade housing plug 2440 includes a radially inwardly extending bearing region cap 2444 (FIG. 82) that continues the radially inwardly extending bearing region cap 2456*a* of the blade support section 2450 of the blade housing 2400. The upper end 2440*a* of the blade housing plug 2440, when installed in the blade housing opening 2420, is flush with and functions as portion of the upper end 2408 of the mounting section 2402 of the blade housing 2400 for purposes of mounting the blade housing 2400 to the horizontal planar seating surface 2133 of the L-shaped mounting pedestal 2132 of the forward mounting portion 2120 of the gearbox housing 2113. Similarly, the outer wall 2440*d* of the blade housing plug 2440, when installed in the blade housing opening 2420, is flush with and functions as a portion of the outer wall 2406 of the mounting section 2402 of the blade housing 2400 for purposes of mounting the blade housing 2400 to the vertical planar seating surface 2134 of the L-shaped mounting pedestal 2132 of the forward mounting portion 2120 of the gearbox housing 2113.

Figure 70:
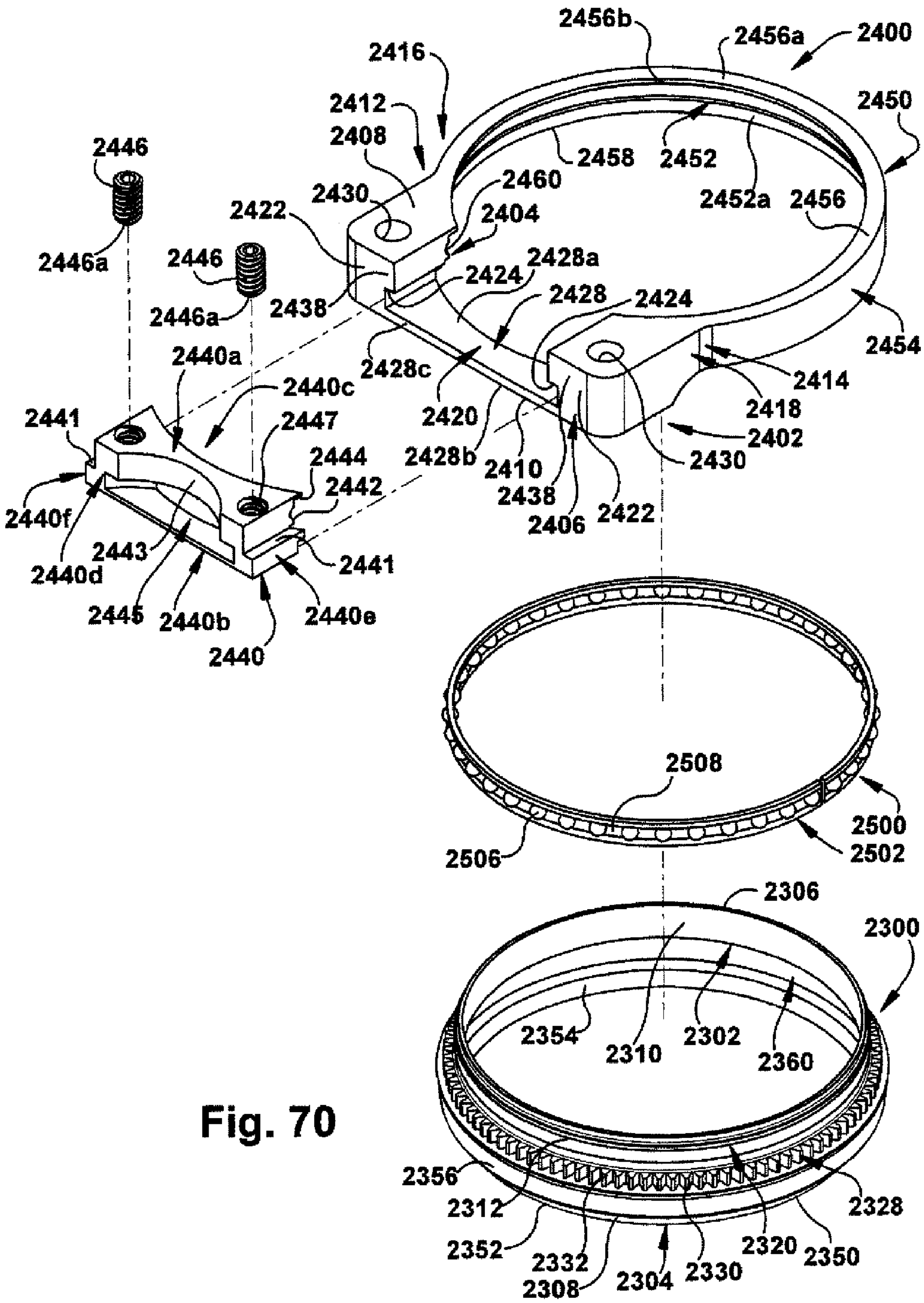
FIG. 70 is a schematic exploded rear perspective view of the blade-blade housing combination of FIG. 69.

The blade housing plug 2440 is removably secured to the blade housing 2400 by the two set screws 2446 (FIG. 70). The set screws 2446 pass through a pair of threaded openings 2447 that extend through the blade housing plug 2440, from the upper end 2440*a* though the lower end 2440*b* of the plug. When the blade housing plug 2440 is installed in the blade housing opening 2420 and the set screws 2446 are tightened, the lower ends of the set screws 2446*a* bear against upper surface 2428*a* of base 2428 of the blade housing mounting section 2402 to secure the blade housing plug 2440 to the blade housing mounting section 2402.

Blade-Blade Housing Bearing Structure 2500

The power operated rotary knife 2100 includes the blade-blade housing bearing structure 2500 (best seen in FIGS. 60, 67 and 66-71) that: a) secures the knife blade 2300 to the blade housing 2400; b) supports the knife blade 2300 for rotation with respect to the blade housing 2400 about the rotational axis R'; and c) defines the rotational plane RP' (FIG. 67) of the knife blade 2300. The blade-blade housing bearing structure 2500 is similar in structure and function to the blade-blade housing bearing structure 500 of the power operated rotary knife 100 and, accordingly, will be described briefly, with reference being made to the discussion above regarding the blade-blade housing structure 500.

The blade-blade housing bearing structure 2500 comprises the elongated rolling bearing strip 2502 (FIGS. 60, 70 and 71) that is routed circumferentially about the axis of rotation R' of the knife blade 2300. The blade-blade housing bearing structure 2500 further includes the blade housing bearing race 2460 and the knife blade bearing race 2320 and the annular passageway 2504 (FIG. 71) defined therebetween.

The rolling bearing strip 2502 is routed between the knife blade 2300 and the blade housing 2400 through the passageway 2504 forming a circle or a portion of a circle about the knife blade axis of rotation R'. The elongated rolling bearing strip 2502, in one exemplary embodiment, comprises a plurality of spaced apart rolling bearings, such as a plurality of ball bearings 2506 supported for rotation in a flexible separator cage 2508. In one exemplary embodiment, the flexible separator cage 2508 comprises an elongated polymer strip, like the elongated polymer strip 520, discussed previously. The plurality of ball bearings 2506 are held in spaced apart relationship in the flexible separator cage 2508, as previously discussed with respect to the flexible separator cage 508.

The plurality of ball bearings 2506 of the elongated rolling bearing strip 2502 are in rolling contact with and provide bearing support between the knife blade bearing race 2320 and the blade housing bearing race 2460. At the same time, while supporting the knife blade 2300 for low friction rotation with respect to the blade housing 2400, the elongated rolling bearing strip 2502 also functions to secure the knife blade 2300 with respect to the blade housing 2400, that is, the bearing strip 2502 prevents the knife blade 2300 from falling out of the blade housing 2400 regardless of the orientation of the power operated rotary knife 2100.

When the rolling bearing strip 2502 is inserted into the passageway 2504, the plurality of ball bearings 2506 support the knife blade 2300 with respect to the blade housing 2400. The plurality of ball bearings 2506 are sized that their radii are smaller than the respective radii of the arcuate bearing surfaces 2464, 2322. In one exemplary embodiment, the radius of each of the plurality of ball bearings 2506 is approximately 1 mm. or 0.039 inch. It should be appreciated however that the radius of the plurality of ball bearings 2506 may be somewhat larger or smaller than 1 mm. and may be smaller than or equal to the radii of the arcuate bearing surfaces 2464, 2322.

Gearbox 2603 and Gear Train 2604

Figure 66:
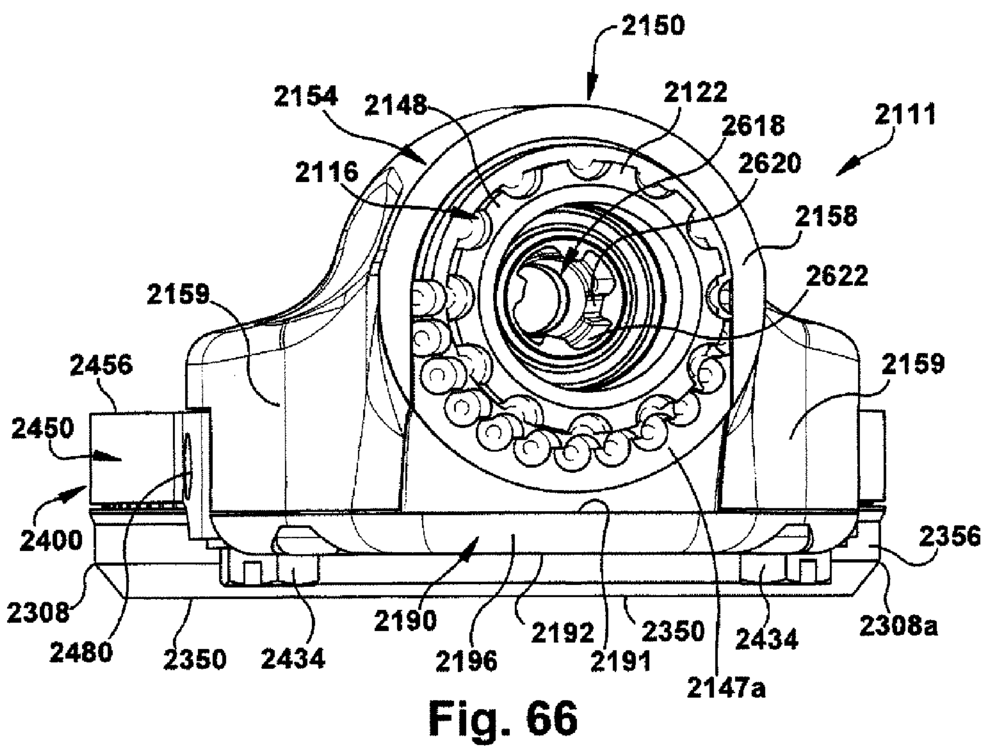
FIG. 66 is a schematic rear perspective view of the head assembly of FIG. 61.

The drive mechanism 2600 (schematically shown in FIG. 60) of the power operated rotary knife 2600 includes the gearbox 2602 for providing motive power for rotating the rotary knife blade 2300 about its axis of rotation R'. The gearbox 2602 includes the gear train 2604 and two bearing support assemblies, namely, a bearing support assembly 2630 that supports the pinion gear 2610 for rotation about the pinion gear rotational axis PGR', and a bearing support assembly 2660 that supports the drive gear 2650 for rotation about the drive gear rotational axis DGR'. The gear train 2604 of the power operated rotary knife 2100 includes the pinion gear 2610 and the drive gear 2650. The drive gear 2650 includes the lower spur gear 2654 and an upper bevel gear 2652 which are axially spaced apart and aligned concentrically about the drive gear rotational axis DGR'. A gear head 2614 of the pinion gear 2610 meshes with the upper bevel gear 2652 of the drive gear 2650 to rotatably drive the drive gear 2650. The pinion gear 2610, in turn, is driven by the flexible shaft drive assembly (not shown) and rotates about the axis of rotation PGR' (FIG. 67) of the pinion gear 2610. The pinion gear 2610 includes an input shaft 2612 extending rearwardly of the gear head 2614. The input shaft 2612 extends from a proximal end 2629 (FIG. 60) to a distal end 2628 adjacent the gear head 2614. The pinion gear input shaft 2612 includes a central opening 2618 (FIG. 66). An interior surface 2620 of the input shaft 2612 defines a cross shaped female socket or fitting 2622 that receives a mating male drive fitting of the flexible shaft drive assembly (not shown) which provides for rotation of the pinion gear 2610.

The pinion gear axis of rotation PGR' is substantially parallel to and coextensive or aligned with the handle assembly longitudinal axis LA'. At the same time, the drive gear 2650 rotates about the drive gear axis of rotation DGR' (FIG. 67) which is substantially parallel to the rotary knife blade axis of rotation R' and is substantially orthogonal to and intersects the pinion gear axis or rotation PGR' and the handle assembly longitudinal axis LA'.

The pinion gear bearing support assembly 2630, in one exemplary embodiment, includes a larger sleeve bushing 2632 and a smaller sleeve bushing 2640. As can best be seen in FIG. 67, the larger sleeve bushing 2632, like the sleeve bushing 632 of the power operated rotary knife 100, includes an annular forward head 2636 and a cylindrical body 2637. The cylindrical body 2637 of the sleeve bushing 2632 defines a central opening 2634 that receives the input shaft 2612 of the pinion gear 2610 to rotatably support the pinion gear 2610 in the gearbox housing 2113. The cylindrical body 2637 of the larger sleeve bushing 2632 is supported within a conforming cavity 2129 (FIGS. 67 and 89) of the inverted U-shaped central section 2118 of the gearbox housing 2113, while the enlarged forward head 2636 of the sleeve bushing 2632 fits within a conforming forward cavity 2126 of the U-shaped central section 2118 of the gearbox housing 2113.

Figure 87:
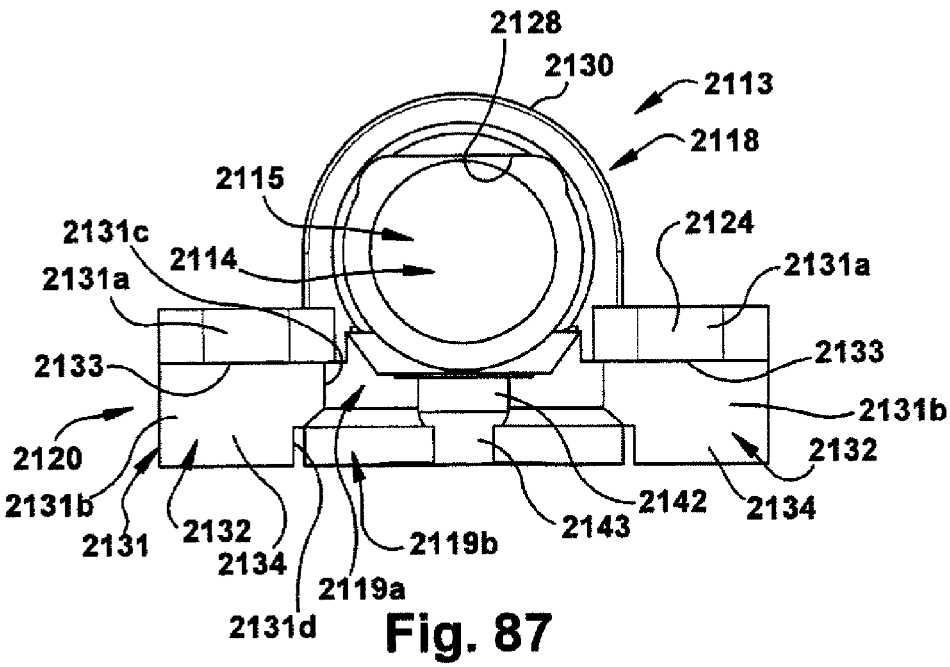
FIG. 87 is a schematic front elevation view of the gearbox housing of FIG. 83.

A flat 2638 (FIG. 60) of the enlarged forward head 2636 of the larger sleeve bushing 2632 interfits with a flat 2128 (FIG. 87) formed in the forward cavity 2126 of the inverted U-shaped central section 2118 of the gearbox housing 2113 to prevent rotation of the sleeve bushing 2632 within the gearbox housing 2113. The cylindrical body 2639 of the larger sleeve bushing 2632 defining the central opening 2634 provides radial bearing support for the pinion gear 2610. The enlarged head 2636 of the sleeve bushing 2632 also provides a thrust bearing surface for a rearward collar 2627 (FIG. 67) of the gear head 2614 to prevent axial movement of the pinion gear 2610 in the rearward direction RW', that is, travel of the pinion gear 2610 along the pinion gear axis of rotation PGR', in the rearward direction RW'.

Figure 99:
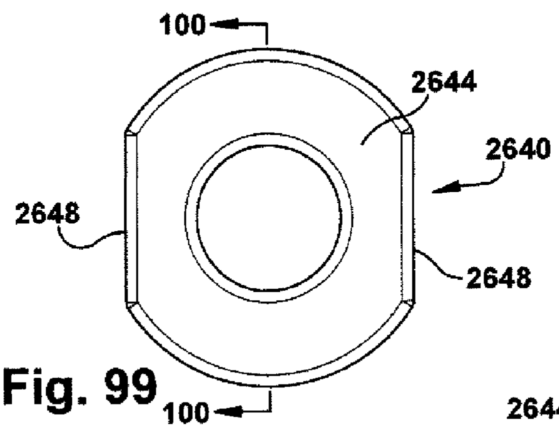
FIG. 99 is a schematic front elevation view of a thrust sleeve bushing of a pinion gear bearing support assembly of the gearbox assembly of the power operated rotary knife of FIG. 59.
Figure 100:
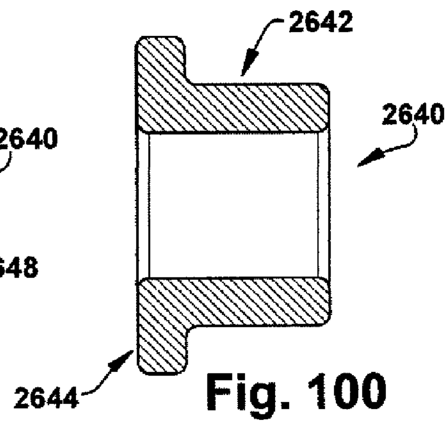
FIG. 100 is a schematic longitudinal section view the thrust sleeve bushing of FIG. 99.

The bearing support assembly 2630 of the pinion gear 2610 also includes the smaller sleeve bushing 2640. As can best be seen in FIG. 60, with some slight differences, the smaller sleeve bushing 2640 is similar to the smaller sleeve bushing 640 of the power operated rotary knife 100. As best seen in FIGS. 99 and 100, the smaller sleeve bushing 2640 includes an annular forward head 2644 and a cylindrical rearward portion 2642. A forward facing surface 2624 of the gear head 2614 of the pinion gear 2610 includes a central recess 2626 which is substantially circular in cross section and is centered about the pinion gear axis of rotation PGR'. The pinion gear central recess 2626 receives a cylindrical reward portion 2642 of the smaller sleeve bushing 2640. The smaller sleeve bushing 2640 functions as a thrust bearing. The annular head 2644 of the smaller sleeve bushing 2640 provides a bearing surface for the gear head 2614 of the pinion gear 2610 and limits axial travel of the pinion gear

2610 in the forward direction FW', that is, travel of the pinion gear 2610 along the pinion gear axis of rotation PGR', in the forward direction FW'.

Figure 62:
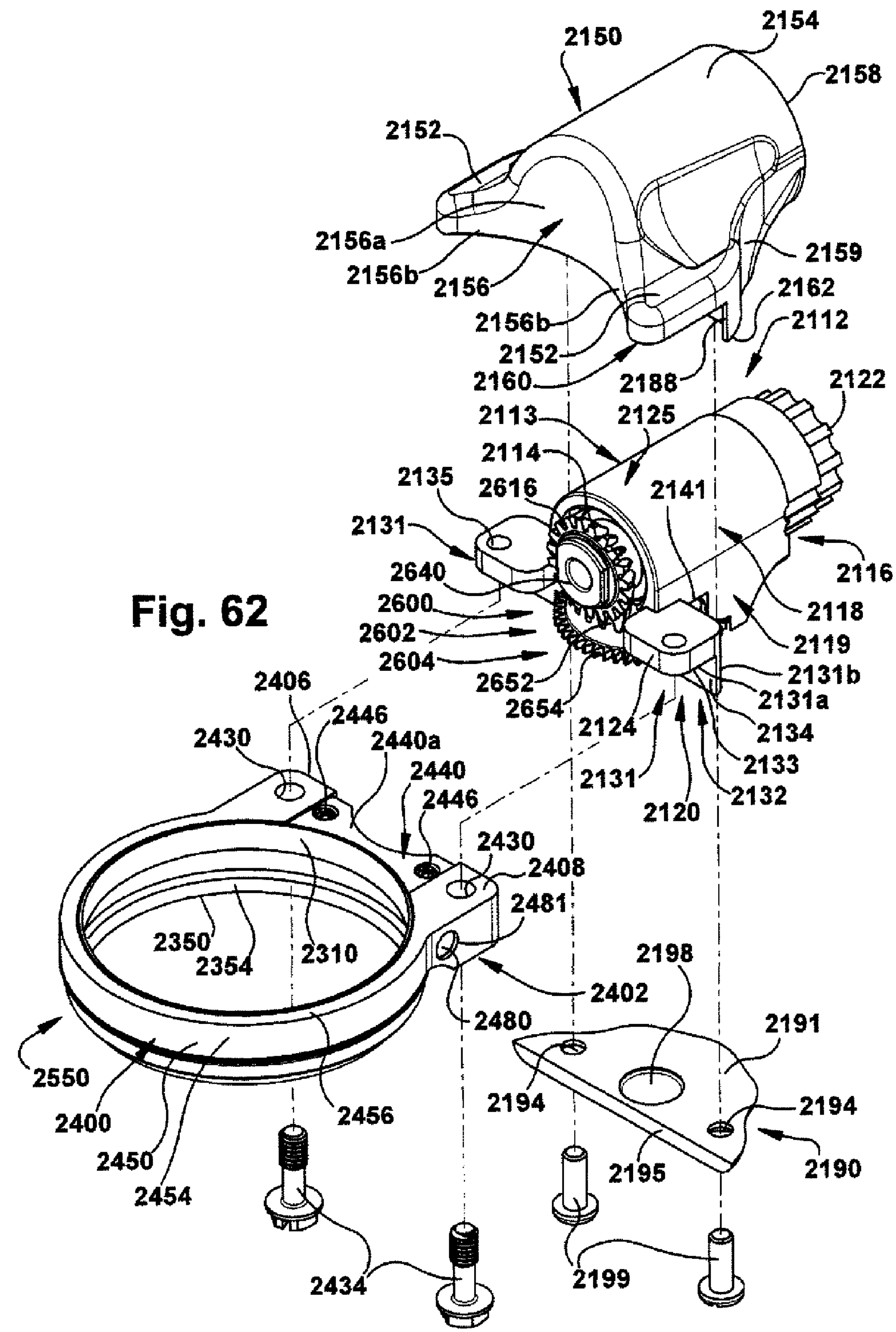
FIG. 62 is a schematic exploded perspective view of the head assembly of FIG. 61.

As can best be seen in FIGS. 62 and 99, the annular head 2644 of the smaller sleeve bushing 2640 includes two parallel peripheral flats 2648 to prevent rotation of sleeve bushing 2640 with rotation of the pinion gear 2610. The parallel flats 2648 of the sleeve bushing 2640 fit within and bear against two spaced-apart parallel shoulders 2179 (FIG. 93) defined by a U-shaped recess 2178 of an inner surface 2176 of a forward wall 2156 of the frame body 2150. The abutment of the parallel flats 2648 of the smaller sleeve bushing 2640 against the shoulders 2179 of the frame body 2150 prevents rotation of the sleeve bushing 2640 as the pinion gear 2610 rotates about its axis of rotation PGR'.

The drive gear bearing support assembly 2660, in one exemplary embodiment, comprises a ball bearing assembly 2662 that supports the drive gear 2650 for rotation about the drive gear rotational axis DGR'. The drive gear bearing support assembly 2660 is secured to a downwardly extending projection 2142 (FIGS. 47 and 48) of the inverted U-shaped central section 2118 of the gearbox housing 2113 by a fastener 2672. The ball bearing assembly 2662 of the gearbox 2602 is similar to the drive gear ball bearing assembly 662 of the power operated rotary knife 100.

Gearbox Housing 2113

As can best be seen in FIGS. 68 and 83-89, the gearbox housing 2113 is part of the gearbox assembly 2112 and defines a gearbox cavity or opening 2114 that supports the gear train 2604 of the gearbox 2602. The gearbox housing 2113 includes the generally cylindrical rearward section 2116 (in the rearward direction RW' away from the blade housing 2400), the inverted U-shaped central section 2118, and the forward mounting section 2120. The gearbox housing 2113 extends between the proximal end 2122 defined by the cylindrical rearward section 2116 and a distal end 2144 defined by the forward mounting section 2120. The inverted U-shaped central section 2118 of the gearbox housing 2113 includes a rearward downwardly extending portion 2119 (FIG. 84) and a forward portion 2125.

The gearbox cavity or opening 2114 is defined in part by a throughbore 2115 which extends generally along the handle assembly longitudinal axis LA' through the gearbox housing 2113 from the proximal end 2122 to the forward portion 2125 of the inverted U-shaped central section 2118. As can best be seen in FIG. 62, the gearbox 2602 is supported in and extends from the gearbox cavity 2114. Specifically, the gear head 2614 of the pinion gear 2610 extends in the forward direction beyond the forward portion 2125 of the gearbox housing 2113 and portions of the drive gear 2650 extend in the forward direction beyond the rearward downwardly extending portion 2119 of the U-shaped central section 2118 of the gearbox housing 2113. The inverted U-shaped central section 2118 and the cylindrical rearward section 2116 combine to define an upper surface 2130 of the gearbox housing 2113.

The forward mounting section 2120 of the gearbox housing 2113 includes the L-shaped blade housing mounting pedestal 2132 that functions as a seating region to releasably receive the blade-blade housing combination 2550. The L-shaped blade housing mounting pedestal 2132 includes a pair of spaced apart bosses 2131 that extend downwardly and forwardly from the forward portion 2125 of the inverted U-shaped central section 2118. As can best be seen in FIGS. 83-88, the pair of bosses 2131 each include an upper horizontal portion 2131*a* and a lower vertical portion 2131*b*. A downward facing surface of the upper horizontal portion 2131*a* defines the first horizontal planar seating surface 2133 of the L-shaped blade housing mounting pedestal 2132, while a forward facing surface of the lower vertical portion 2131*b* defines the second vertical planar seating surface 2134 of the L-shaped blade housing mounting pedestal 2132.

The vertical planar seating surface 2134 is substantially orthogonal to the first horizontal planar seating surface 2133 and parallel to the axis of rotation R' of the rotary knife blade 2300. The horizontal planar seating surface 2133 is substantially parallel to the longitudinal axis LA' of the handle assembly 2110 and the rotational plane RP' of the rotary knife blade 2300. The upper horizontal portion 2131*a* of each of the bosses 2131 includes a threaded opening 2135 that receives a threaded fastener 2191. Each of the threaded fasteners 2191 pass through a respective opening 2430 of the blade housing mounting section 2402 and thread into a respective threaded opening 2135 of the bosses 2131 to secure the blade-blade housing combination 2550 to the gearbox housing 2313.

A bottom portion 2141 (FIGS. 62, 83 and 84) of the forward portion 2125 of the inverted U-shaped central section 2118 includes a downwardly extending projection 2142 (FIG. 83). The downwardly extending projection 2142 includes a cylindrical stem portion 2143 and defines a threaded opening 2140 extending through the projection 2142. A central axis through the threaded opening 2140 defines and is coincident with the axis of rotation DGR' of the drive gear 2650. The rearward downwardly extending portion 2119 of the inverted U-shaped central section 2118 of the gearbox housing 2113 defines upper and lower arcuate recesses 2119*a*, 2119*b* which provide for clearance of the bevel gear 2652 and the spur gear 2654 of the drive gear 2650, respectively. The upper arcuate recess 2119*a* and the wider lower arcuate recesses 2119*b* are centered about the drive gear axis of rotation DGR' and the central axis of the threaded opening 2140. The inner surfaces of the pair of bosses 2131 also include upper and lower recesses 2131*c*, 2131*d* (best seen in FIG. 83) that provide for clearance of the bevel gear 2652 and the spur gear 2654 of the drive gear 2650, respectively.

The throughbore 2115 of the gearbox housing 2113 provides a receptacle for the pinion gear 2610 and its associated bearing support assembly 2630 while the upper and lower arcuate recesses 2119*a*, 2119*b* provide clearance for the drive gear 2650 and its associate bearing support assembly 2660. Specifically, with regard to the pinion bearing support assembly 2630, the cylindrical body 2637 of the larger sleeve bushing 2632 fits within the cylindrical cavity 2129 (FIG. 89) of the inverted U-shaped central section 2118. The enlarged forward head 2636 of the larger sleeve bushing 2632 fits within the forward cavity 2126 (FIGS. 83 and 89) of the forward portion 2125. The cylindrical cavity 2129 and the forward cavity 2126 of the inverted U-shaped central section 2118 are both part of the throughbore 2115.

With regard to the upper and lower arcuate recesses 2119*a*, 2119*b*, the upper recess 2119*a* provides clearance for the first bevel gear 2652 of the drive gear 2650 as the drive gear 2650 rotates about its axis of rotation DGR' upon the first bevel gear 2652 being driven by the pinion gear 2610. The wider lower recess 2119*b* provides clearance for the second spur gear 2654 of the drive gear 2650 as the spur gear 2654 coacts with the rotary knife blade driven gear 2328 to rotate the rotary knife blade 2300 about its axis of rotation R'. As can best be seen in FIGS. 67 and 83, the downwardly extending projection 2142 and the stem 2143 provide seating surfaces for the ball bearing assembly 2662, which supports the drive gear 2650 for rotation within the rearward downwardly extending portion 2119 of the inverted U-shaped central section 2118 of the gearbox housing 2113.

A cleaning port 2136 (FIGS. 83 and 86) extends through the bottom portion 2141 of the forward portion 2125 and through the rearward downwardly extending portion 2119 of the inverted U-shaped central section 2118 of the gearbox housing 2113. The cleaning port 2136 allows cleaning fluid flow injected into the throughbore 2115 of the gearbox housing 2113 from the proximal end 2122 of the gearbox housing 2113 to flow into the upper and lower arcuate recesses 2119*a*, 2119*b* for purpose of cleaning the drive gear 2650.

Figure 89:
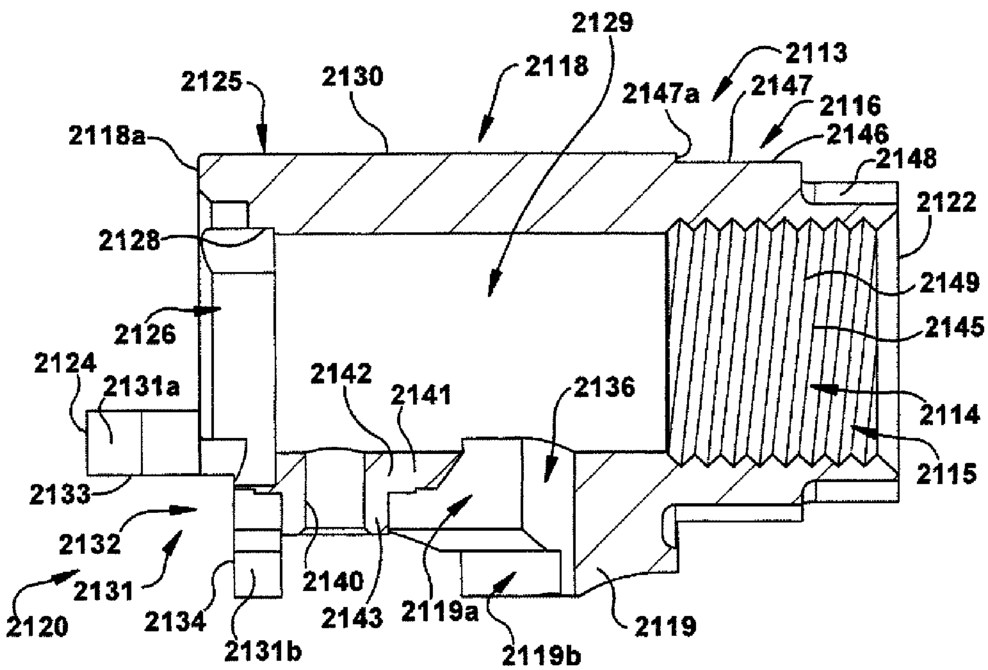
FIG. 89 is a schematic longitudinal section view of the gearbox housing of FIG. 83, as seen from a plane indicated by the line 89-89 in FIG. 85.

As can be seen in FIG. 89, the inner surface 2145 of the cylindrical rearward section 2116 of the gearbox housing 2113 defines a threaded region 2149, adjacent the proximal end 2122 of the gearbox housing 2113. The threaded region 2149 of the gearbox housing 2113 receives the mating threaded portion 2262 (FIG. 60) of the elongated central core 2252 of the hand piece retaining assembly 2250 to secure the hand piece 2200 to the gearbox housing 2113. As seen in FIGS. 83-86 and 88, an outer surface 2146 of the cylindrical rearward section 2116 of the gearbox housing 2113 defines a first portion 2148 adjacent the proximal end 2122 and a second larger diameter portion 2147 disposed forward or in a forward direction FW' of the first portion 2148. The first portion 2148 of the outer surface 2146 of the cylindrical rearward portion 2116 of the gearbox housing 2113 includes a plurality of axially extending splines 2148*a*. As was the case with the gearbox housing 113 and the hand piece 200 of the power operated rotary knife 100, the coacting plurality of splines 2148*a* of the gearbox housing 2113 and the ribs of the hand piece 2200 allow the hand piece 2200 to be oriented at any desired rotational position with respect to the gearbox housing 2113.

The second larger diameter portion 2147 of the outer surface 2146 of the cylindrical rearward section 2116 of the gearbox housing 2113 is configured to receive a spacer ring 2290 (FIGS. 60 and 97-88) of the hand piece retaining assembly 2250. The spacer ring 2290 abuts and bears against a stepped shoulder 2147*a* defined between the cylindrical rearward section 2116 and the inverted U-shaped central section 2118 of the gearbox housing 2113. A rear or proximal surface 2292 (FIGS. 97 and 98) of the spacer ring 2290 acts as a stop for an axially stepped collar 2214 (FIG. 60) of the distal end portion 2210 of the hand piece 2200 when the hand piece 2200 is secured to the gearbox housing 2113 by the elongated central core 2252 of the hand piece retaining assembly 2250.

Figure 63:
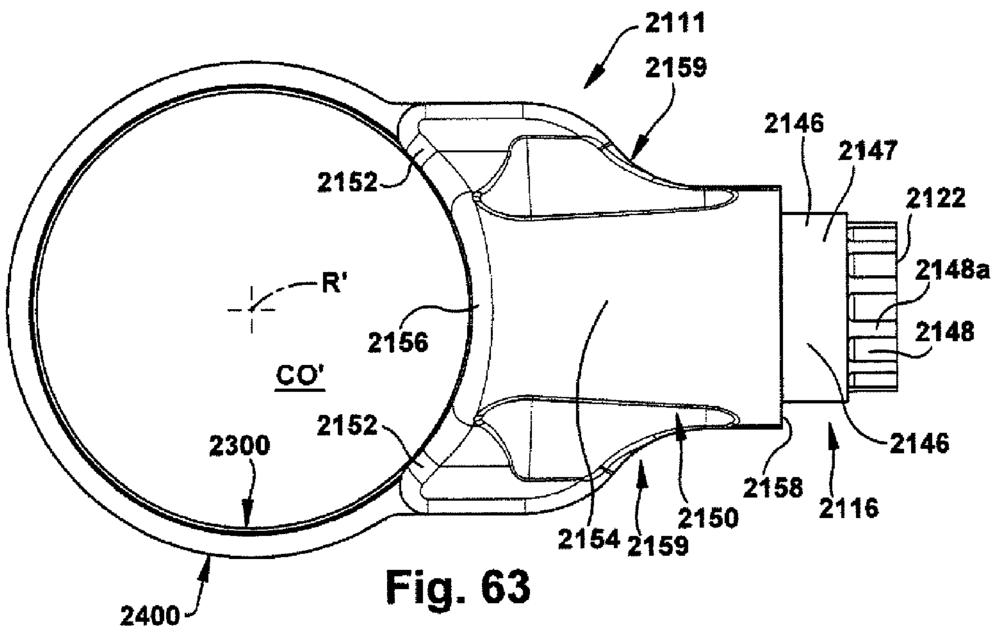
FIG. 63 is a schematic top plan view of the head assembly of FIG. 61.
Figure 64:
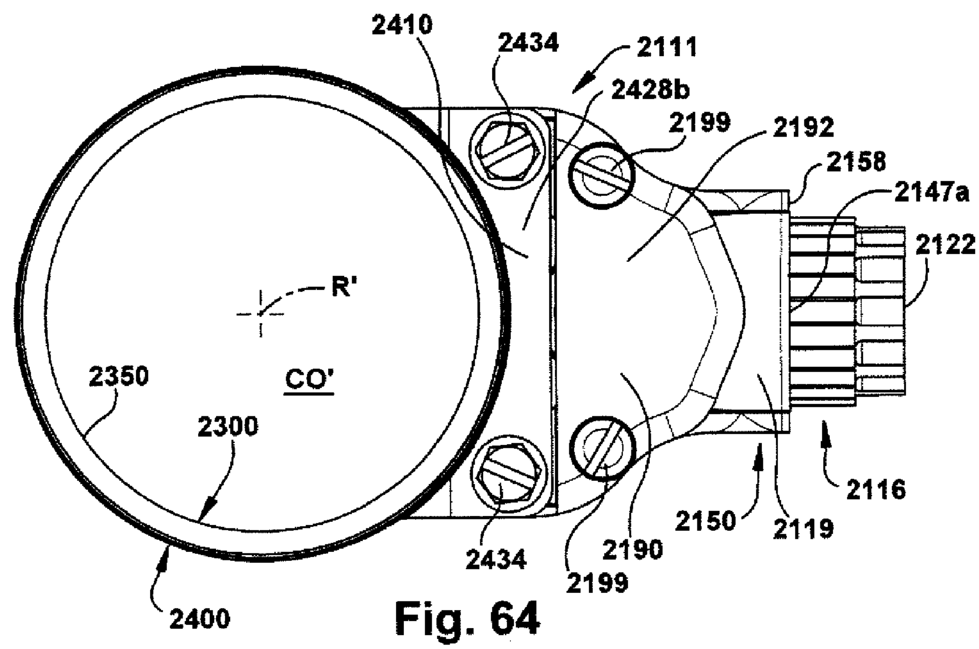
FIG. 64 is a schematic bottom plan view of the head assembly of FIG. 61.
Figure 65:
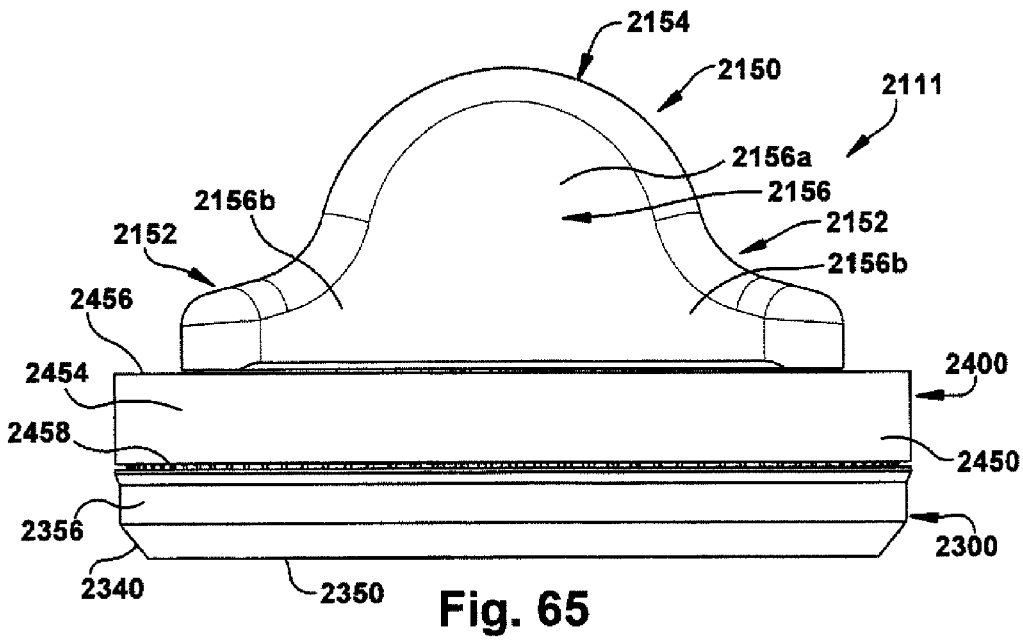
FIG. 65 is a schematic front elevation view of the head assembly of FIG. 61.

As can be seen in FIGS. 97 and 98, a body portion 2294 of the handle spacer ring 2290 is tapered from a larger diameter proximal end 2296 to a smaller diameter distal end 2298. The handle spacer ring body portion 2294 is tapered because, as can be seen in FIG. 60, an outer diameter of the hand piece 2200 exceeds an outer diameter formed by the combination a proximal end 2158 of the frame body 2150 and the rearward downwardly extending portion 2119 of the inverted U-shaped central section 2118 of the gearbox housing 2113 adjacent the stepped shoulder 2147*a*. The outer diameter formed by the combination the frame body proximal end 2158 and the gearbox housing rearward downwardly extending portion 2119 adjacent the stepped shoulder 2147*a* is best seen in FIGS. 63 and 64.

Figure 86:
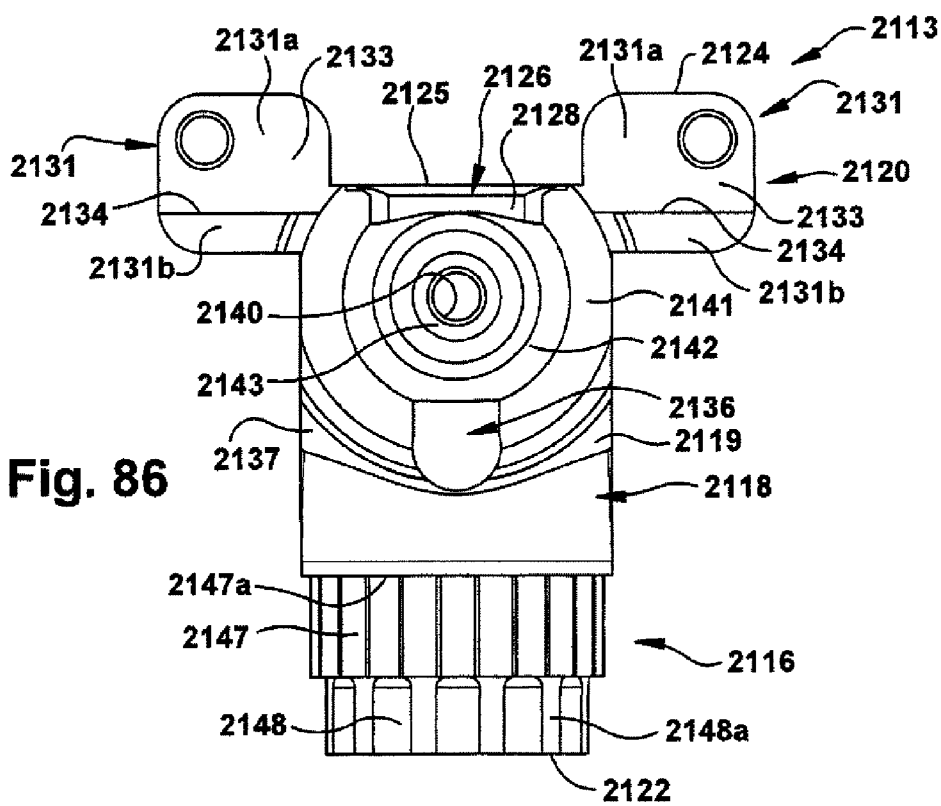
FIG. 86 is a schematic bottom plan view of the gearbox housing of FIG. 83.

The second larger diameter portion 2147 of the outer surface 2146 of the cylindrical rearward section 2116 of the gearbox housing 2113 also includes a plurality of splines (seen in FIGS. 83-84 and 86). The plurality of splines of the second larger diameter portion 2147 are used in connection with an optional thumb support (not shown) that may be used in place of the spacer ring 2290, as previously described with respect to the power operated rotary knife 100.

Frame Body 2150 and Frame Body Bottom Cover 2190

As can best be seen in FIG. 62, when the gearbox 2602 is supported within the gearbox housing 2113, portions of the pinion gear 2610 and the drive gear 2650 are exposed, that is, extend outwardly from the gearbox housing 2113. The frame body 2150 and frame bottom cover 2190, when secured together form an enclosure around the gearbox housing 2113 that advantageously functions to impede entry of debris into the gearbox housing 2113, the pinion gear 2610 and portions of the drive gear 2650. Additionally, the frame body 2150 includes portions that are adjacent to and extend the first horizontal planar seating surface 2133 and the second vertical planar seating surface 2134 of the L-shaped blade housing mounting pedestal 2132 defined by the pair of bosses 2131 of the gearbox housing 2113. This advantageously enlarges the effective seating region of the gearbox housing 2113 for a more secure attachment of the blade-blade housing combination 2550 to the gearbox housing 2113.

Figure 91:
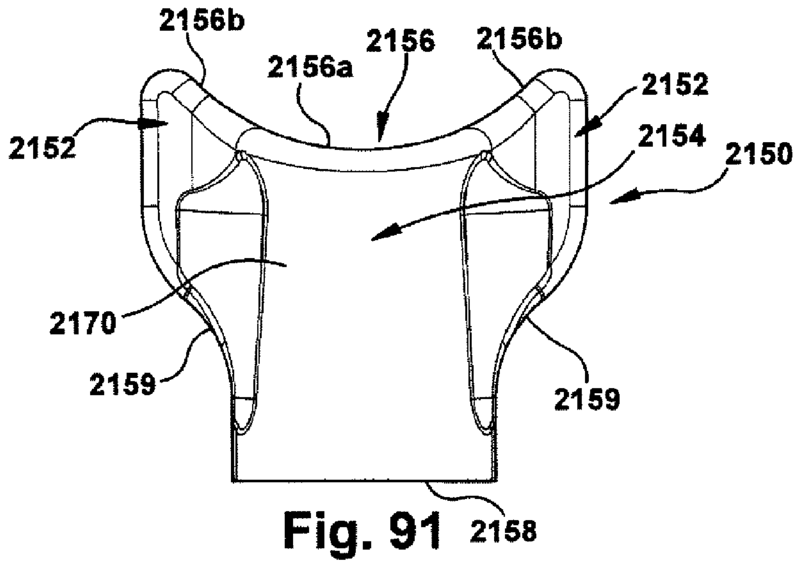
FIG. 91 is a schematic top plan view of the frame body of FIG. 90.

As can best be seen in FIGS. 68 and 90-93, the frame body 2150 includes a central cylindrical region 2154 and a pair of outwardly extending arms 2152 from the central cylindrical region 2154. The frame body 2150 includes a forward wall 2156 at a proximal or forward end of the frame body 2150. A central portion 2156*a* of the forward wall 2156 is defined by the central cylindrical region 2154, while forwardly extending portions 2156*b* of the forward wall 2156 are defined by the outwardly extending arms 2152. As is best seen in FIG. 91, proceeding in a rearward direction RW' from the forward wall 2156 toward a proximal end 2158 of the frame body 2150, there are two tapered regions 2159 where the outwardly extending arms 2152 curve inwardly and blend into the central cylindrical region 2154.

The frame body 2150 includes an outer surface 2170 and an inner surface 2172. The inner surface 2172 defines the cavity 2174 (FIG. 90) that slidably receives portions of the gearbox housing 2113 including the forward mounting section 2120 and the inverted U-shaped central section 2118. As can best be seen in FIG. 68, the frame body 2150 includes a bottom wall 2160 that includes a first, lower planar bottom wall portion 2162 and a second, upper planar bottom wall portion 2164. As can be seen, the upper planar bottom wall portion 2164 is offset in an upward direction UP' from the lower planar bottom wall portion 2162. The bottom wall 2160 is open into the cavity 2174 which allows the frame body 2150 to be slid over the upper surface 2130 of the gearbox housing 2113 in a relative downward direction DW' with respect to the gearbox housing 2113. Specifically, a central dome-shaped portion 2180 of the cavity 2174 is configured to slidably receive the inverted U-shaped central section 2118 of the gearbox housing 2113, while a pair of square-shaped portions 2182 of the cavity 2174 (FIG. 92) flanking the central dome-shaped portion 2180 are configured to slidably receive respective ones of the pair of bosses 2131 of the forward mounting section 2120 of the gearbox housing 2113.

When the frame body 2150 is fully slid onto the gearbox housing 2113, the lower planar portion 2162 of the bottom wall 2160 of the frame body 2150 is flush with a bottom surface 2137 (FIGS. 83, 84 and 86) of the rearward downwardly extending portion 2119 of the inverted U-shaped central section 2118 of the gearbox housing 2113 and with a bottom surface 2137 of the lower vertical portions 2131*b* of the pair of bosses 2131. Additionally, the upper planar portion 2164 of the bottom wall 2160 is flush with the first horizontal seating surface 2133 of the L-shaped blade housing mounting pedestal 2132.

The upper planar portion 2164 of the bottom wall 2160 of the frame body 2150 continues and extends the effective seating region of the first horizontal seating surface 2133 of the L-shaped blade housing mounting pedestal 2132 of the gearbox housing 2113 for a more secure attachment of the blade-blade housing combination 2550 to the gearbox housing 2113. Similarly, as can best be seen in FIGS. 62, 90 and 92, a narrow vertical wall 2188 between the upper planar portion 2164 and the lower planar portion 2162 of the bottom wall 2160 of the frame body 2160 is flush with the second vertical seating surface 2134 of the L-shaped blade housing mounting pedestal 2132 of the gearbox housing 2113. The narrow vertical wall 2188 continues and extends the effective seating region of the second vertical seating surface 2134 of the L-shaped blade housing mounting pedestal 2132 of the gearbox housing 2113 for a more secure attachment of the blade-blade housing combination 2550 to the gearbox housing 2113.

Figure 92:
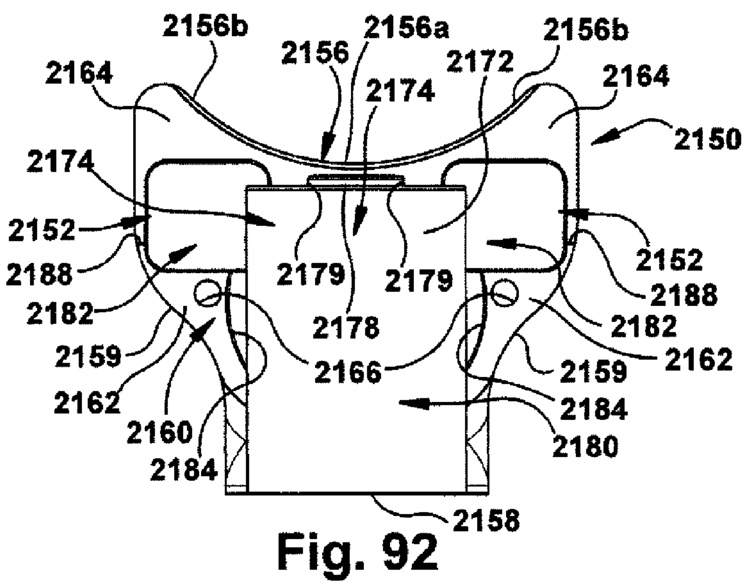
FIG. 92 is a schematic bottom plan view of the frame body of FIG. 90.
Figure 93:
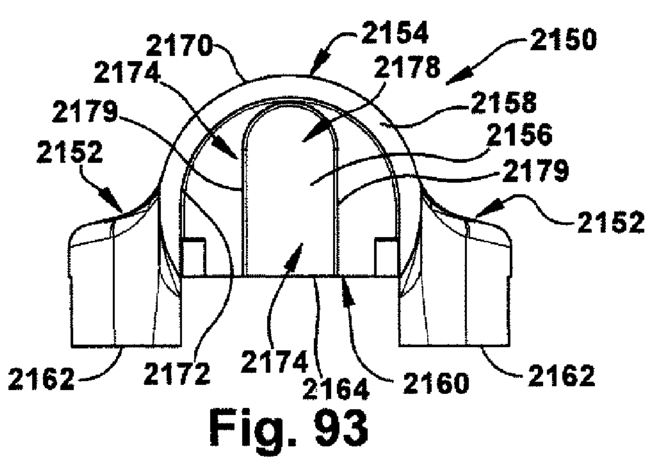
FIG. 93 is a schematic rear elevation view of the frame body of FIG. 90.
Figure 94:
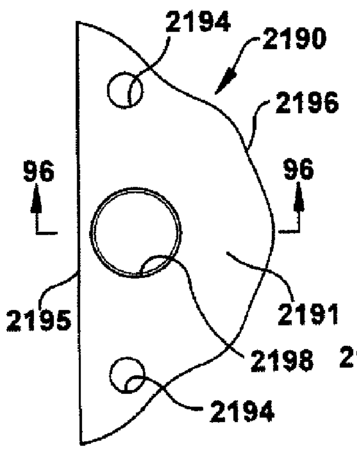
FIG. 94 is a schematic top plan view of the frame body bottom cover of FIG. 90.
Figure 95:
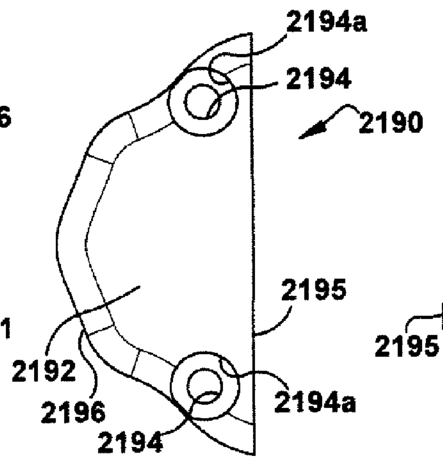
FIG. 95 is a schematic bottom plan view of the frame body bottom cover of FIG. 90.
Figure 96:
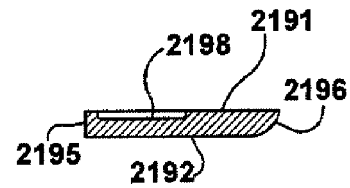
FIG. 96 is a schematic section view of the frame body bottom cover of FIG. 90 as seen from a plane indicated by the line 96-96 in FIG. 94.

As can best be seen in FIG. 92, the lower planar portion 2162 of the bottom wall 2160 includes a pair of threaded openings 2166. The threaded openings 2166 receive respective threaded fasteners 2192 to secure the frame body bottom cover 2190 to the frame body 2150. The inner surface 2176 of the forward wall 2156 of the frame body 2150 includes the U-shaped recess 2178 which defines the pair of spaced apart shoulders 2179 (FIG. 93). As previously explained with respect to the smaller sleeve bushing 2642 of the pinion gear bearing support assembly 2130, the shoulders 2179 provide an abutment or bearing surface for the pair of flats 2648 of the smaller sleeve bushing 2642 to prevent rotation of the sleeve bushing 2642 with rotation of the pinion gear 2610. As can best be seen in FIGS. 90 and 92, the inner surface 2172 of the frame body 2150 includes a pair of arcuate recesses 2184 adjacent the lower portion 2162 of the bottom wall 2160. The pair of arcuate recesses 2184 provide clearance for the spur gear 2154 of the drive gear 2650 and continue the clearance surface defined by the lower arcuate recess 2119*b* of the rearward downwardly extending portion 2119 of inverted U-shaped central section 2118 of the gearbox housing 2113.

As can best be seen in FIGS. 90 and 94-96, the frame body bottom cover 2190 is a thin planar piece that includes an upper surface 2191, facing the gearbox housing 2113, and a lower surface 2192. The frame body cover 2190 includes a pair of openings 2194 extending between the upper and lower surfaces 2191, 2192. The frame body bottom cover 2190 is removably secured to the frame body 2150 by the pair of threaded fasteners 2199 that extend through respective ones of the pair of openings 2113 and thread into respective threaded openings 2166 in the lower planar portion 2162 of the bottom wall 2160 of the frame body 2150. The pair of openings 2194 include countersunk head portions 2194*a* formed in the lower surface 2192 of the frame body bottom cover 2190 such that, when the frame body bottom cover 2190 is secured to the frame body 2150, the enlarged heads of the threaded fasteners 2199 are flush with the lower surface 2192.

The frame body bottom cover 2190 also includes a straight forward wall 2195 and a contoured rearward wall 2196. When the frame body bottom cover 2190 is secured to the frame body 2150, the forward wall 2195 is flush with, continues and extends the effective seating region of the second vertical seating surface 2134 of the L-shaped blade housing mounting pedestal 2132 of the gearbox housing 2113 for a more secure attachment of the blade-blade housing combination 2550 to the gearbox housing 2113. The contour of the rearward wall 2196 of the frame body bottom cover 2190 is configured such that, when the frame body bottom cover 2190 is secured to the frame body 2150, a peripheral portion of the lower surface 2192 adjacent the rearward wall 2196 engages and seats against the lower planar portion 2162 of the bottom wall 2160 of the frame body 2150 and the bottom surface 2137 of the rearward downwardly extending portion 2119 of the inverted U-shaped central section 2118 of the gearbox housing 2113. Because of the contoured configuration of the rearward wall 2196, the lower surface 2192 of the frame body bottom cover 2190 thereby seals against both the gearbox housing 2113 and the frame body 2150 to protect the gearbox 2602 and specifically the drive gear 2650 and the drive gear ball bearing assembly 2662 from ingress of debris into the drive gear region.

The upper surface 2191 of the frame body bottom cover 2190 includes a recess 2198 that provides for clearance of the head of the fastener 2672 that secures the drive gear ball bearing assembly 2662 to the stem 2143 of the gearbox housing 2113.

Securing Blade-Blade Housing Combination to Head Assembly 2111

To removably attach the blade-blade housing combination 2550 to the gearbox housing 2113, the upper end 2408 of the mounting section 2402 of the blade housing 2400 is aligned adjacent the horizontal planar seating surface 2133 of the L-shaped blade housing mounting pedestal 2132 of the forward mounting section 2120 of the gearbox housing 2113 and the outer wall 2406 of the blade housing mounting section 2402 is aligned adjacent the vertical planar seating surface 2134 of the L-shaped blade housing mounting pedestal 2132. Specifically, the mounting section 2402 of the blade housing 2400 is aligned with the forward mounting section 2120 of the gearbox housing 2113 such that the two vertical apertures 2430 extending through the mounting section base 2428 and the pair of upright pedestals 2422 of the mounting section base 2428 are aligned with the vertically extending threaded openings 2135 through the pair of bosses 2131 of the forward mounting section 2120 of the gearbox housing 2113.

When the blade housing 2400 is properly aligned with the forward mounting section 2120 of the gearbox housing 2113, the upper surface 2428*a* of the base 2428 of the blade housing mounting section 2402 and the upper end 2440*a* of the blade housing plug 2440 affixed to the blade housing 2400 are in contact with the horizontal planar seating surface 2133 of the L-shaped blade housing mounting pedestal 2132. Additionally, the rearward surface 2428*c* of the base 2428 of the blade housing mounting section 2402 and the outer wall 2440*d* of the blade housing plug 2440 are in contact with the vertical planar seating surface 2134 of the L-shaped blade housing mounting pedestal 2132.

To affix the assembled blade-blade housing combination 2550 to the gearbox housing 2113, the fasteners 2434 are inserted into the two vertical apertures 2430 of the blade housing mounting section 2402 and threaded into respective ones of the vertically extending threaded openings 2135 through the upper horizontal portions 2131*a* of the pair of bosses 2131 of the forward mounting section 2120 of the gearbox housing 2113. When the blade housing 2400 is assembled to the gearbox housing 2113, the plurality of spur gear drive teeth 2656 of the drive gear 2650 are in meshing engagement with the driven gear teeth 2330 of the rotary knife blade 2300 such that rotation of the drive gear 2650 about its axis of rotation DGR' causes rotation of the rotary knife blade 2300 about its axis of rotation R'.

To remove the blade-blade housing combination 2550 from the gearbox housing 2113, the pair of screws 2434 are unthreaded from the threaded openings 2135 of the upper horizontal portion 2131*a* of the pair of bosses 2131 of the forward mounting section 2120 of the gearbox housing 2113. After the screws 2434 are completely unthreaded from the openings 2135, the blade-blade housing combination 2550 will fall in a downward direction DW' away from the gearbox assembly 2112. The blade-blade housing combination 2550 may be removed from the gearbox housing 2113 without removal of the frame body 2150 or the frame body bottom cover 2190.

Third Exemplary Embodiment

Power Operated Rotary Knife 3100

Overview

Figure 102:
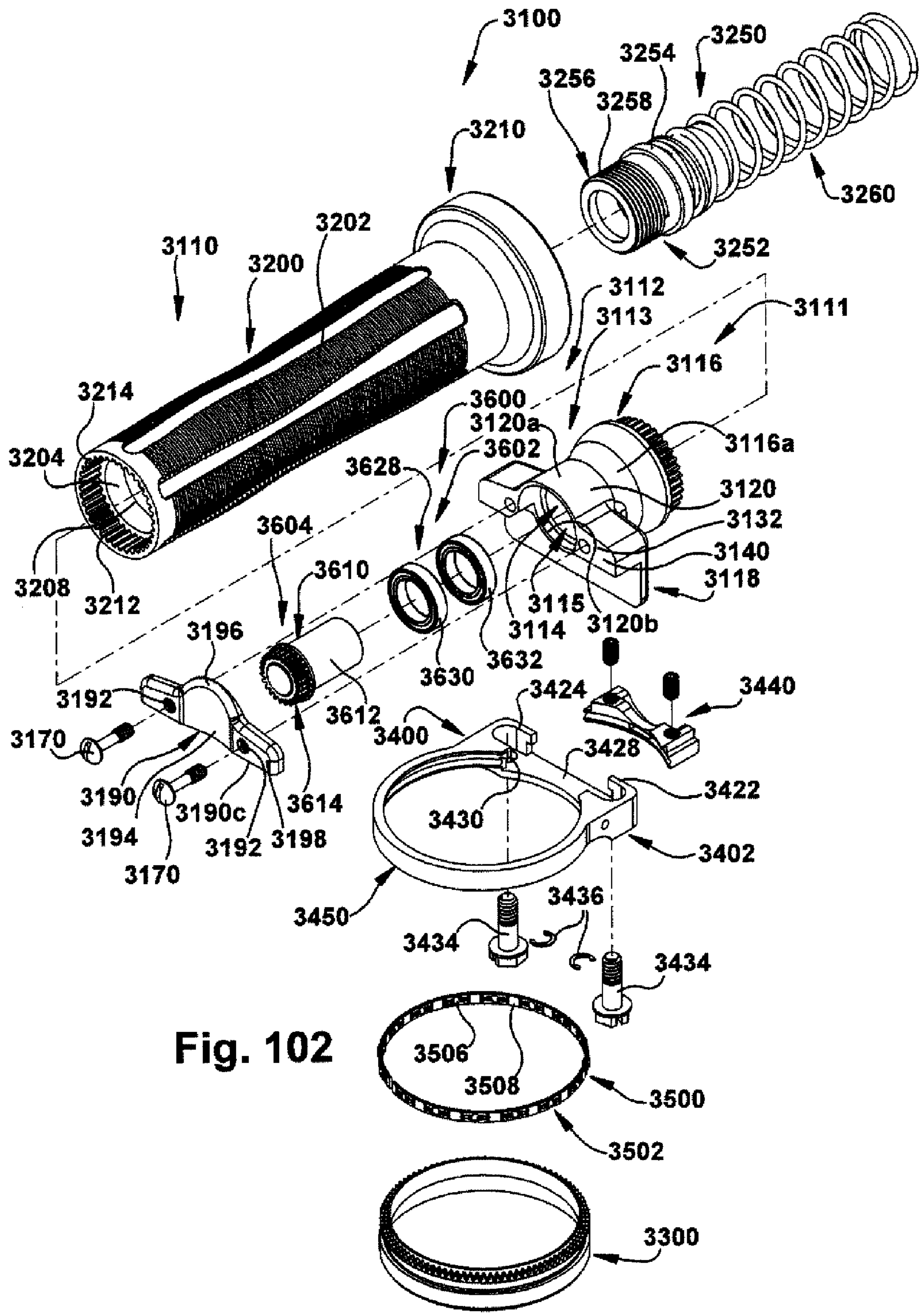
FIG. 102 is a schematic exploded perspective view of the power operated rotary knife of FIG. 101.

A third exemplary embodiment of a power operated rotary knife of the present disclosure is shown generally at 3100 in FIGS. 101-113. The power operated rotary knife 3100 includes a handle assembly 3110, a detachable head assembly 3111, and a drive mechanism 3600. As is best seen in FIG. 102, the head assembly 3111 of the power operated rotary knife 3100 includes a gearbox assembly 3112, a rotary knife blade 3300, a blade housing 3400, and a blade-blade housing support or bearing structure 3500. The gearbox assembly 3112 includes a gearbox housing 3113 which supports a gearbox 3602 of the drive mechanism 3600. The handle assembly 3110 includes a hand piece 3200 and a hand piece retaining assembly 3250 that secures the hand piece 3200 to the gearbox housing 3113.

The power operated rotary knife 3100, like the power operated rotary knife 2100 described above, is especially suited for use with small outer diameter rotary knife blades. Among the differences between the power operated rotary knife 3100 and the power operated rotary knife 2100 are the following: 1) The gearbox 3602 includes a simplified gear train 3604, namely, the gear train 3604 comprises a single gear, namely, a pinion gear 3610. In the power operated rotary knife 3100, the pinion gear 3610 directly engages and drives a driven gear 3328 of the rotary knife blade 3300. The driven gear 3328 of the rotary knife blade 3300 of the power operated rotary knife 3100 comprises a set of gear teeth 3330. The drive gear 2650 of the gear train 2604 of the power operated rotary knife 2100 is eliminated. 2) Because the pinion gear 3610 directly drives the rotary knife blade 3300, a set of gear teeth 3616 of a gear head 3614 of the pinion gear 3610 engage the set of gear teeth 3330 of the driven gear 3328. Accordingly, the set of gear teeth 3330 of the rotary knife blade 3300 of the power operated rotary knife 3100 is disposed above a bearing surface 3319 formed in an outer wall 3312 of a body section 3302 of the knife blade 3300. 3) Like the power operated rotary knife 2100, the blade housing 3400 is secured to an L-shaped mounting pedestal 3124 of a forward mounting portion 3118 of the gearbox housing 3113. However, in the power operated rotary knife 3100, the frame body is eliminated. That is, there is no frame body that overlies and receives the gearbox housing as is the case, for example, with the frame body 2150 of the power operated rotary knife 2100 which receives the gearbox housing 2113. Instead, in the power operated rotary knife 3100, a pinion gear cover 3190 is secured to a pinion gear cover mounting surface 3132 defined by a forward wall 3140 of the gearbox housing 3113. The pinion gear cover 3190 overlies the gear head 3614 of the pinion gear 3610 extending from a central cylindrical portion 3120 of the gearbox housing forward mounting section 3118 to protect the gear head 3614 and seal against the gearbox housing 3113 to inhibit ingress of debris into the region of the gear head 3614 of the pinion gear 3610.

Figure 105:
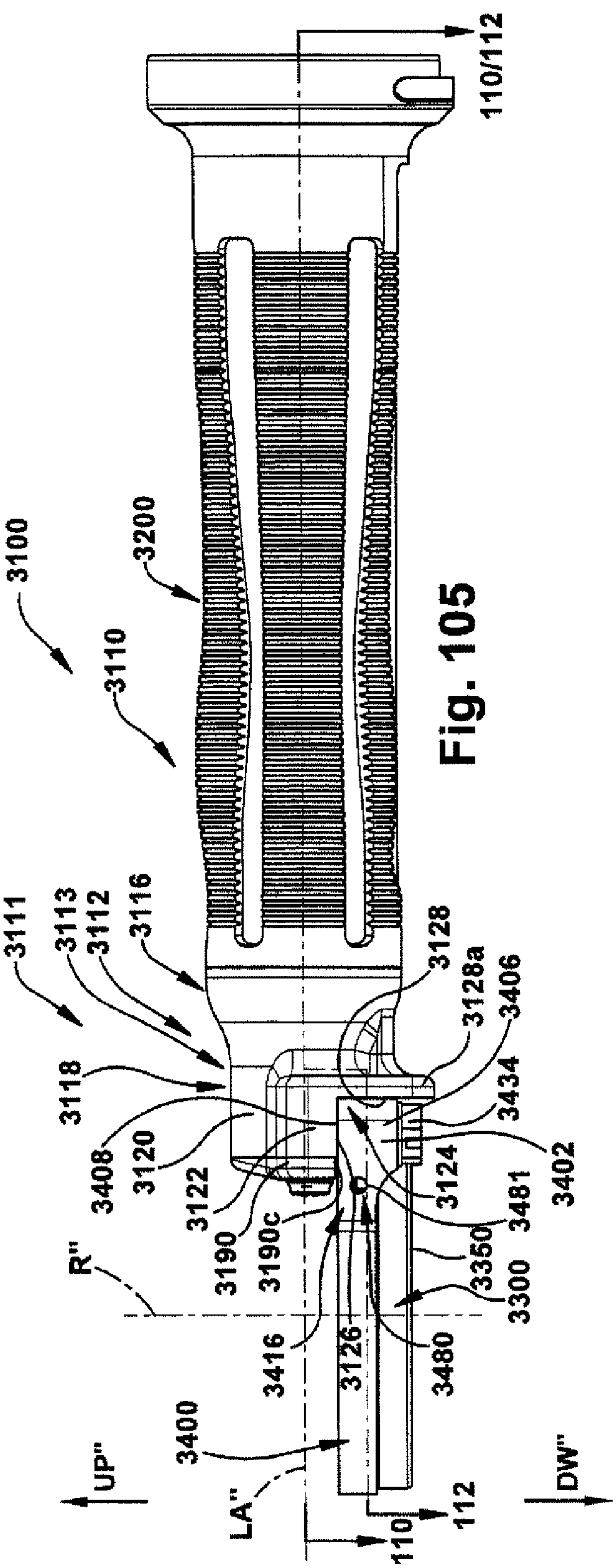
FIG. 105 is a schematic right side elevation view of the power operated rotary knife of FIG. 101.
Figure 107:
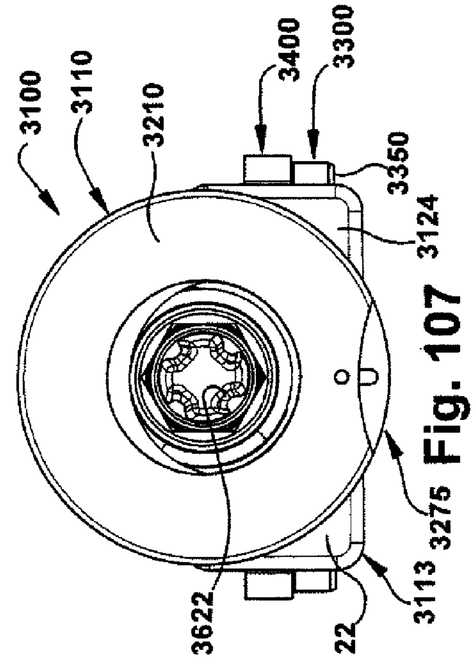
FIG. 107 is a schematic rear elevation view of the power operated rotary knife of FIG. 101.
Figure 106:
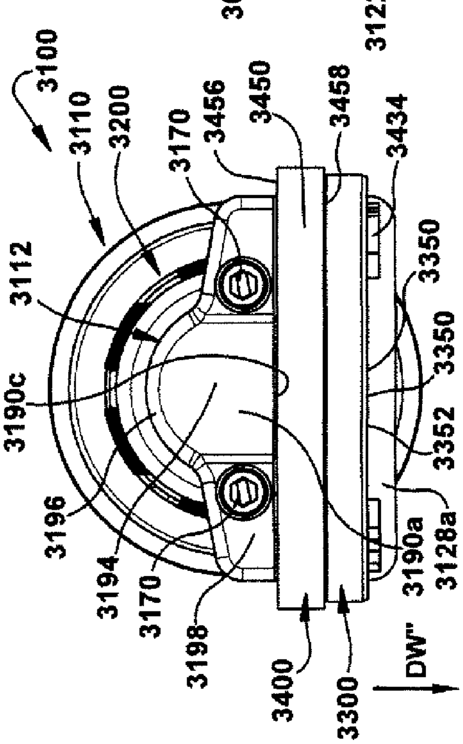
FIG. 106 is a schematic front elevation view of the power operated rotary knife of FIG. 101.
Figure 108:
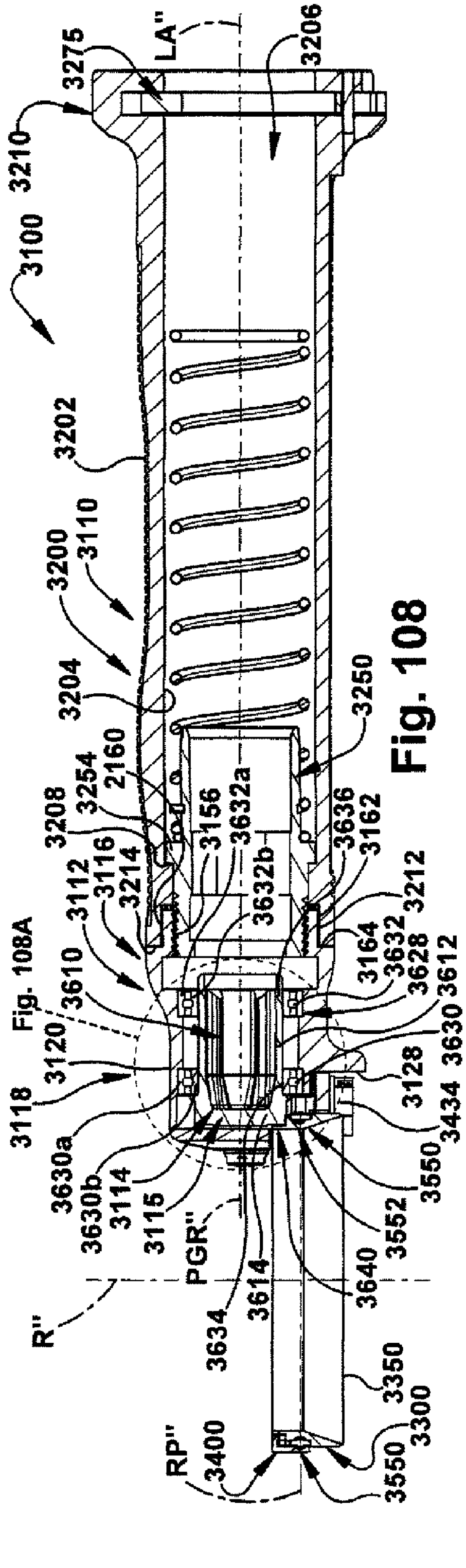
FIG. 108 is a schematic longitudinal section view of the power operated rotary knife of FIG. 101 as seen from a plane indicated by the line 108-108 in FIG. 103.
Figure 109:
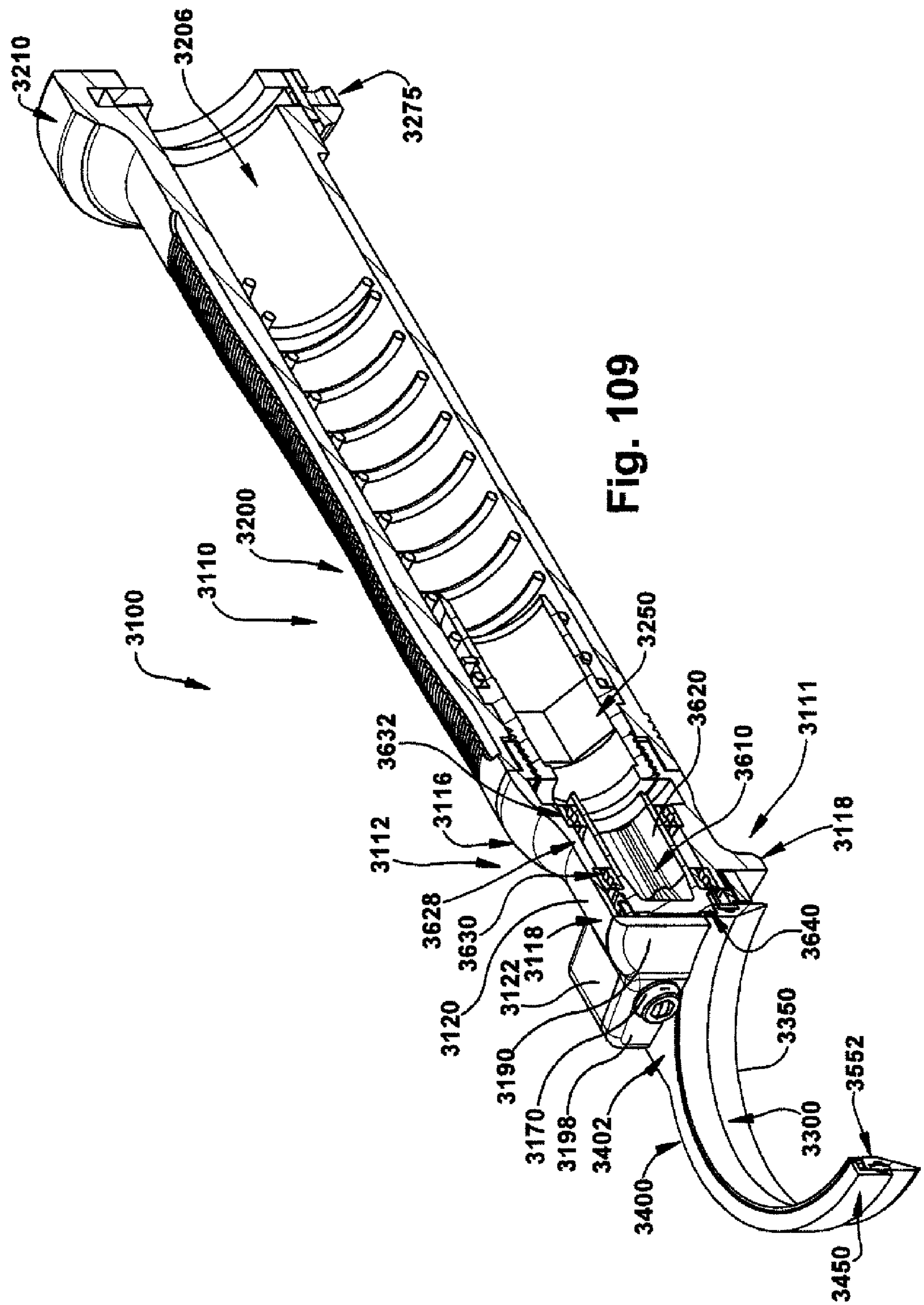
FIG. 109 is a schematic perspective longitudinal section view of the power operated rotary knife of FIG. 101 as seen from a plane indicated by the line 108-108 in FIG. 103.
Figure 110:
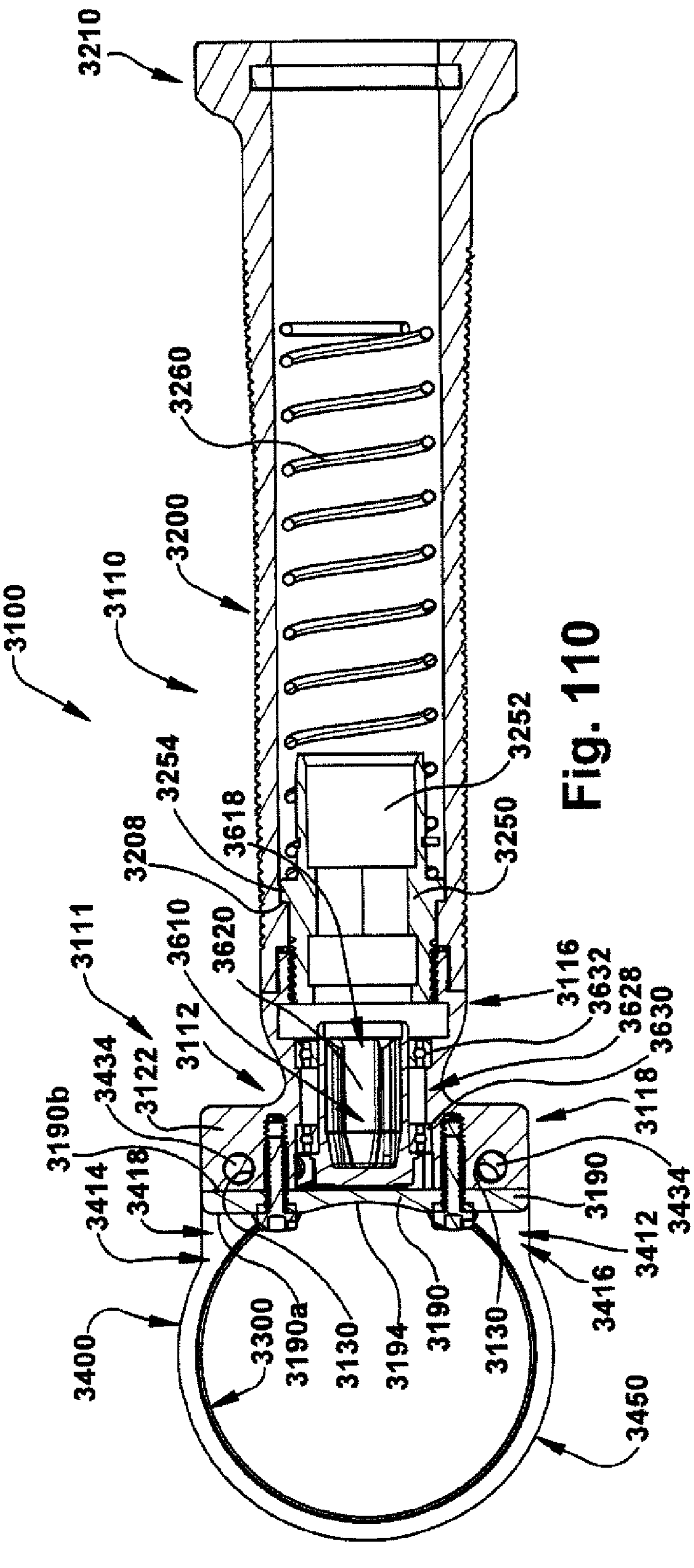
FIG. 110 is a schematic longitudinal section view of the power operated rotary knife of FIG. 101 as seen from a plane indicated by the line 110-110 in FIG. 105.
Figure 111:
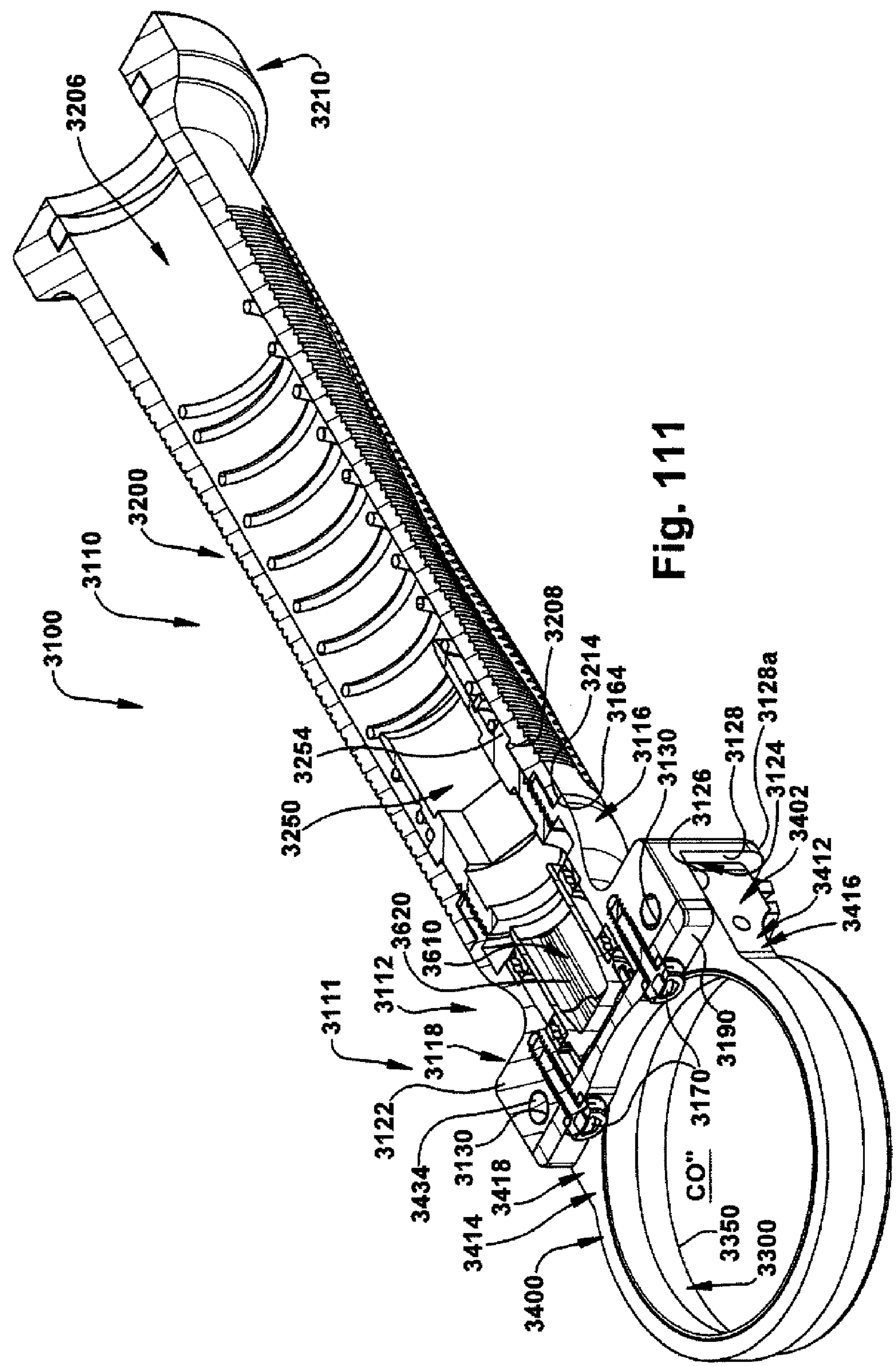
FIG. 111 is a schematic perspective longitudinal section view of the power operated rotary knife of FIG. 101 as seen from a plane indicated by the line 110-110 in FIG. 105.
Figure 112:
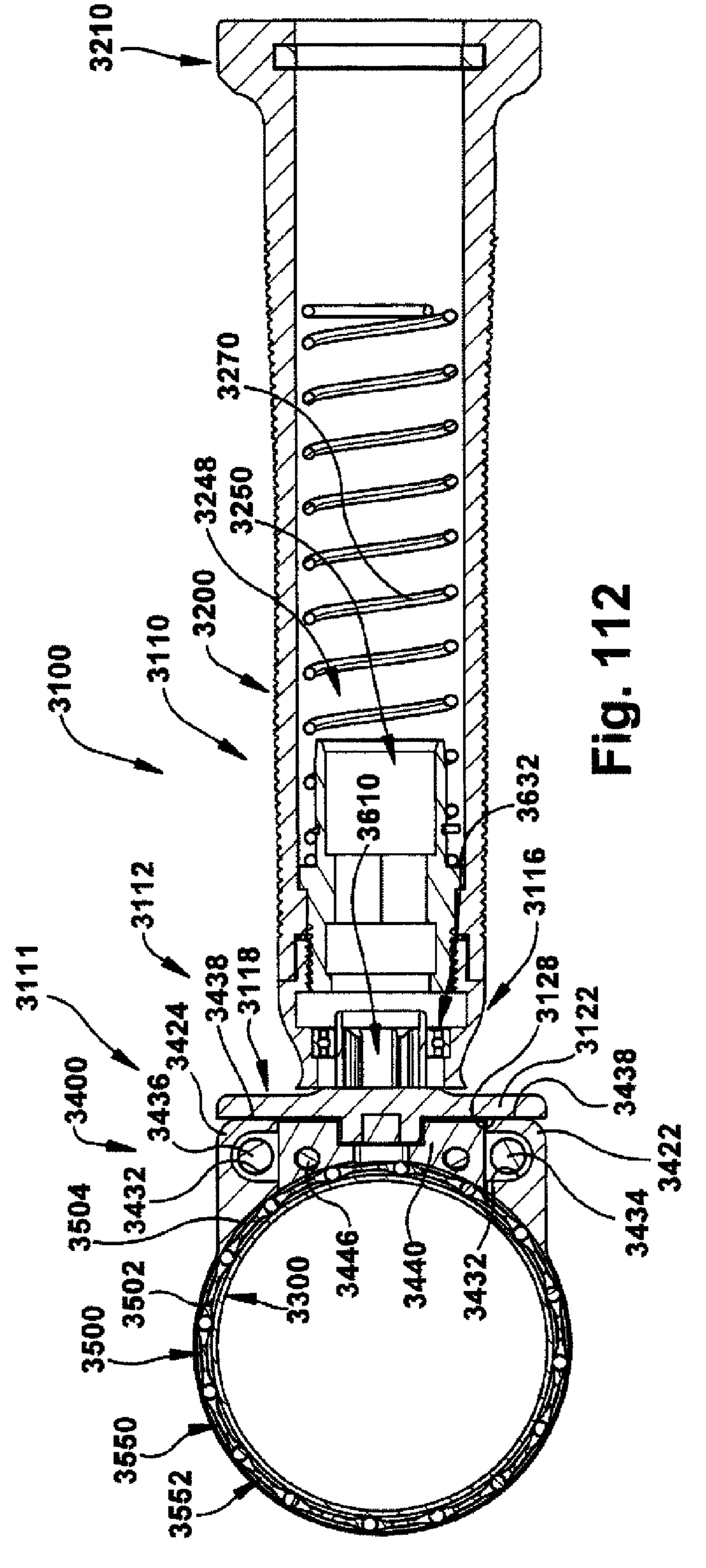
FIG. 112 is a schematic longitudinal section view of the power operated rotary knife of FIG. 101 as seen from a plane indicated by the line 110-112 in FIG. 105.
Figure 113:
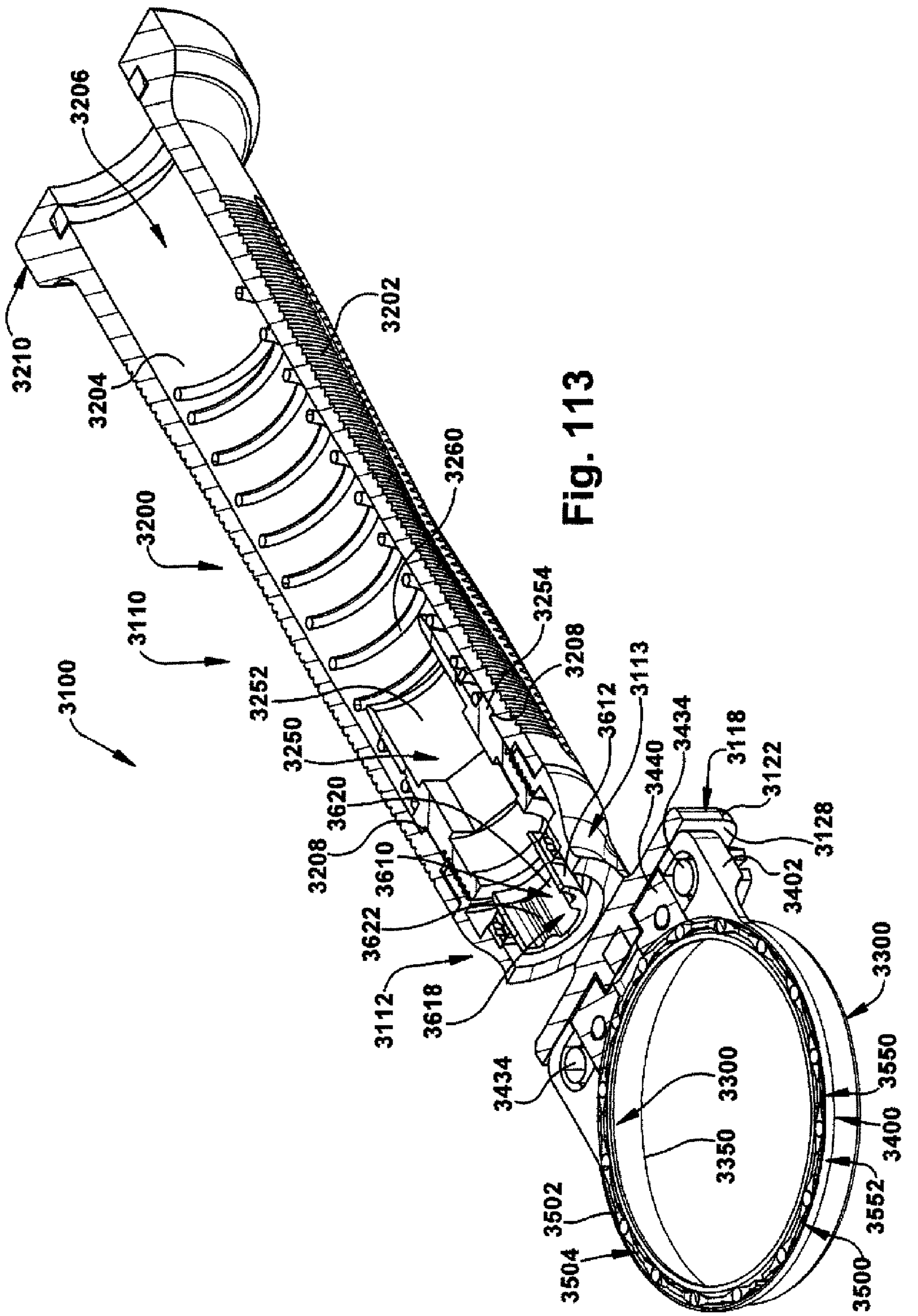
Figure 114:
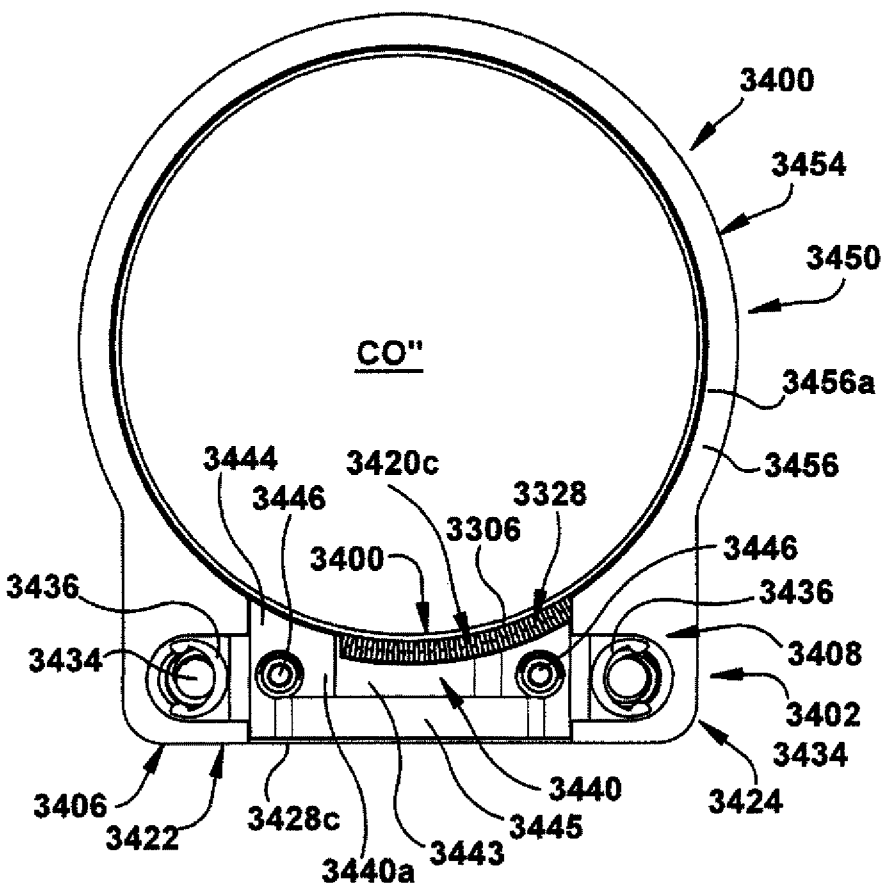

The rotary knife blade 3300 is supported for rotation with respect to the blade housing 3400 by the blade-blade housing bearing structure 3500, similar to the blade-blade housing bearing structures 500, 2500 of the power operated rotary knives 100, 2100. The blade-blade housing bearing structure 3500 includes, in one exemplary embodiment, an elongated rolling bearing strip 3502 (FIGS. 102, 115 and 116) disposed in an annular passageway 3504 (FIG. 116) formed between opposing bearing surfaces facing bearing surfaces 3319, 3459 of the rotary knife blade 3300 and the blade housing 3400, respectfully. The rolling bearing strip includes a plurality of rolling bearings 3506, such a ball bearings, disposed in spaced apart relation in a flexible separator cage 3508 (FIG. 116). Alternately, the blade-blade housing bearing structure 3500 may utilize a plurality of elongated rolling bearing strips in the annular passageway 3504. An assembled combination of the rotary knife blade 3300, the blade housing 3400, and the blade-blade housing bearing structure 3500 will be referred to as the blade-blade housing combination 3550 (FIG. 113-115) and the mating bearing surfaces defined by the blade-blade housing bearing structure 3500, the knife blade bearing surface 3319, the blade housing bearing surface 3459, and the blade housing plug bearing race 3442 that support the knife blade 3300 for rotation in the blade housing 3400 will be referred to as the rotary knife bearing assembly 3552 (FIGS. 108-109 and 113). The blade-blade housing bearing structure 3500 both releasably secures the rotary knife blade 3300 to the blade housing 3400 and provides a bearing structure to support the rotary knife blade 3300 for rotation about an axis of rotation R" (FIGS. 105 and 108). The blade-blade housing bearing structure 3500 also defines a rotational plane RP" (FIG. 108) of the knife blade 3300 which is substantially orthogonal to the knife blade axis of rotation R".

The gearbox assembly 3112 includes a gearbox housing 3113 and the gearbox 3602. The gearbox 3602 includes the gear train 3604 comprising, in one exemplary embodiment, a single gear, namely, the pinion gear 3610 and a bearing support assembly 3628 that supports the pinion gear 3610 for rotation within a cavity 3114 of the gearbox housing 3113. The pinion gear 2610 is rotatably driven about a pinion gear axis of rotation PGR" (FIGS. 108 and 108A) by a flexible shaft drive assembly (not shown). The flexible shaft drive assembly (not shown), which is part of the drive mechanism 3600, is similar to the flexible shaft drive assembly 700 of the power operated rotary knife 100.

Other components of the drive mechanism 3600 of the power operated rotary knife 3100 include components external to the head and handle assemblies 3111, 3110 of the power operated rotary knife 3100. These external components include a drive motor (not shown) and the flexible shaft drive assembly which rotates the pinion gear 3610. Such components of the power operated rotary knife 3100 are similar to the corresponding components discussed with respect to the power operated rotary knife 100, e.g., the flexible shaft drive assembly 700 and the drive motor 800. For brevity, components and assemblies of the power operated rotary knife 3100 that are substantially similar to corresponding components and assemblies of either of the power operated rotary knives 100 and 2100, will not be described in detail below. It being understood by one of ordinary skill in the art that the discussion of the structure and function of the components and assemblies of the power operated rotary knives 100 and 2100, as set forth above, is applicable to and is incorporated into the discussion of the power operated rotary knife 3100, discussed below.

Rotary Knife Blade 3300

In one exemplary embodiment and as seen in FIGS. 102 and 117-119, the rotary knife blade 3300 of the power operated rotary knife 3100 is a one-piece, continuous annular structure and, specifically, is a "straight blade" style rotary knife blade. Although, it should be recognized that other rotary knife blade styles may be used in the power operated rotary knife 3100. The rotary knife blade 3300 includes a body section 3302 and a blade section 3304 extending axially from the body 3302. The body 3302 includes an upper end 3306 and a lower end 3308 spaced axially apart from the upper end 3306. The body 3302 further includes an inner wall 3310 and an outer wall 3312 spaced radially apart from the inner wall 3310. The blade section 3304 includes a blade edge 3350 defined at a distal end portion 3352 of the blade section 3304. The blade section 3304 includes an inner wall 3354 and an axially spaced apart outer wall 3356. A short angled portion 3358 bridges the inner and outer walls 3354, 3356. As can best be seen in FIGS. 117 and 119, the blade edge 3350 is formed at the intersection of the short angled portion 3358 and the inner wall 3354. An inner wall 3360 of the rotary knife blade 3300 is formed by the inner wall 3310 of the body 3302 and the inner wall 3354 of the blade section 3304. In one exemplary embodiment, there is a knee or discontinuity 3360*a* of the inner wall 3360, although it should be appreciated that, depending on the specific configuration of the rotary knife blade 3300, the blade 3300 may be formed such that there is no discontinuity in the inner wall 3360.

A portion 3340 of the body outer wall 3312 defines a recessed region 3318 that extends radially inwardly into the outer wall 3312. The recessed region 3318, in one exemplary embodiment, is generally rectangular in cross section and includes a generally horizontal or radially extending upper section 3318*a*, a generally vertical or axially extending middle section 3318*b*, and a generally horizontal or radially extending lower section 3318*e*. The rotary knife blade 3300 includes the bearing surface 3319. In one exemplary embodiment of the power operated rotary knife 3100, the rotary knife blade bearing surface 3319 comprises a knife blade bearing race 3320 extends radially inwardly into the middle section 3318*b* of the recessed region 3318 of the outer wall 3312. In one exemplary embodiment, the knife bearing race 3320 defines a generally arcuate bearing face 3322 in a central portion 3324 of the race 3320.

Each time the rotary knife blade 3300 is sharpened, material will be removed from the distal end portion 3352 and the cutting edge 3350 will move axially in an upward direction UP". Stated another way, the axial extent of both the inner and outer walls 3354, 3356 of the blade section 3304 will decrease in extent with repeated sharpening of the blade 3300. At such time as sharpening of the blade 3300 would impinge on the recessed region 3318 defining the bearing race 3320, it may be said that the blade would at or near the end of its useful life. Thus, the bottom portion 3318*c* of the recessed region 3318 may be considered as the lower end 3308 of the body section and a boundary between the body and blade sections 3302, 3304 of the rotary knife blade 3300.

The body outer wall 3312 of the rotary blade body 3302 also defines the driven gear 3328 comprising the set of gear teeth 3330. The set of gear teeth 3330 are formed so as to extend radially outwardly in a stepped portion 3331 of the outer wall. The stepped portion 3331 is axially above the bearing race 3320, that is, closer to the first upper end 3306 of the body 3302. The driven gear 3328, in one exemplary embodiment, defines a plurality of vertically or axially oriented gear teeth 3332 which mesh with the set of spur gear teeth 3616 of the pinion gear 3610 comprising a gear drive 3640.

Figure 117:
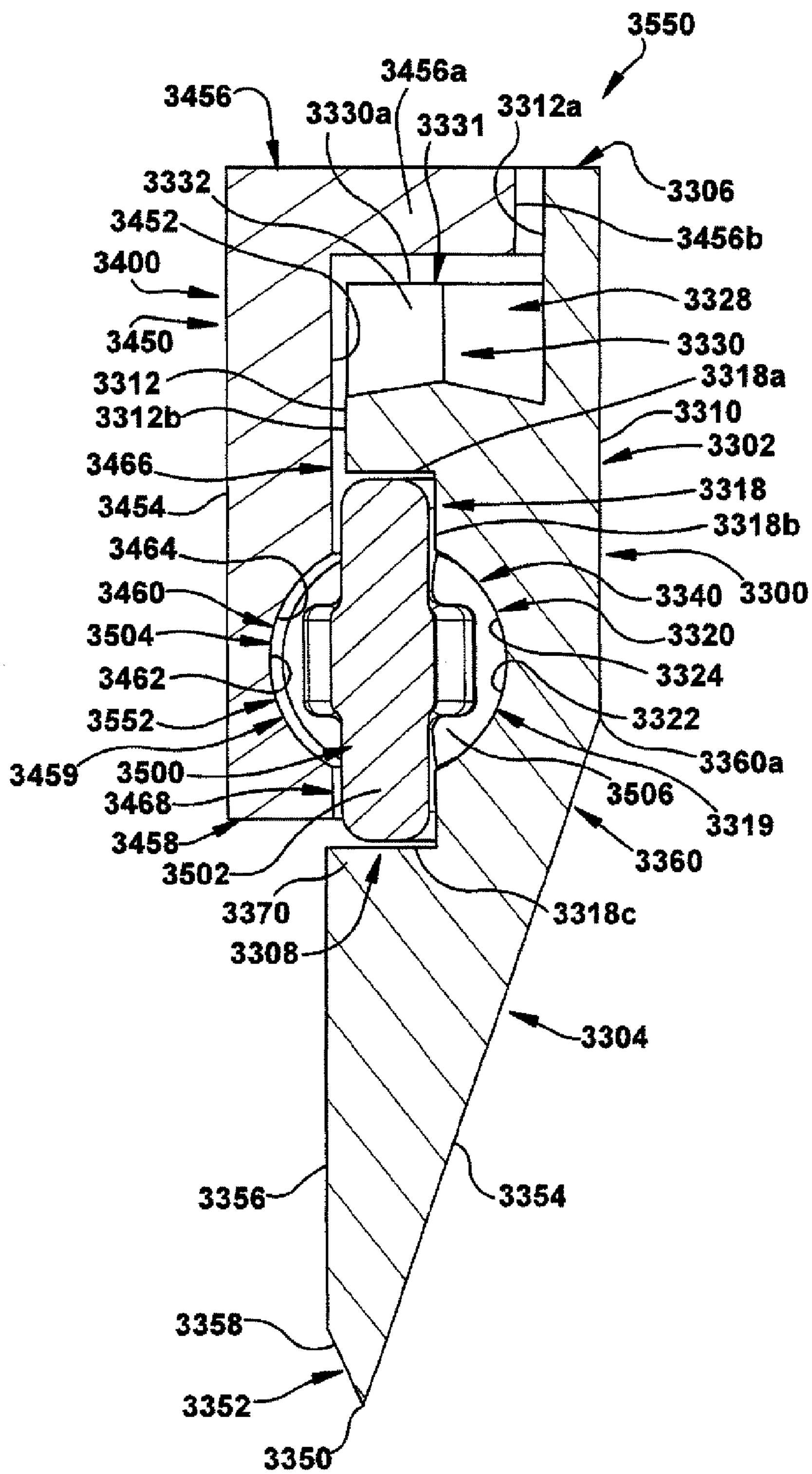

Advantageously, the set of gear teeth 3330 of the knife blade driven gear 3328 are axially spaced from the upper end 3306 of the body 3302 and are axially spaced from arcuate bearing race 3320 of the body 3302. As can be seen in FIG. 117, a portion 3312*a* of the outer wall 3312 of the rotary knife blade body 3302 adjacent the body upper end 3306 defines an axially extending space between the upper end 3306 of the blade body 3302 and the set of gear teeth 3330 of the driven gear 3328. Another portion 3312*b* of the outer wall 3312 of the rotary knife blade body 3302 defines an axially extending space between the set of gear teeth 3330 of the driven gear 3328 and the bearing race 3320.

In the spur gear drive 3640, the set of spur gear teeth 3616 of the pinion gear 3610 are located axially above the set of spur gear teeth 3330 of the driven gear 3328 of the rotary knife blade 3300. Therefore, it is not possible for the rotary knife blade 3300 to include a driven gear projection or cap axially above the gear teeth 3616. Instead, because of the axially extending offset between the set of gear teeth 3330 and the upper end 3306 of the blade body 3302, space provided for a radially inwardly extending projection or cap 3456*a* of an upper end 3456 of the blade support section 3450 of the blade housing 3400. The cap 3456*a* of the blade housing 3400 and the axially offset set of gear teeth 3300 of the rotary knife blade 3300 provide for a type of labyrinth seal that impeded ingress of pieces of meat, bone, gristle, and other debris into the driven gear 3328 of the knife blade 3300. Except for a small clearance gap between facing surfaces of the portion 3312*a* of outer wall 3312 adjacent the upper end 3306 of the knife blade body 2302 and a terminal end 3456*b* of the blade housing cap 3456*a*, the blade housing driven gear cap 2456*a* overlies substantially an entirety of the set of gear teeth 3330, except in a region where clearance is required for the meshing of the pinion gear 3610 and the driven gear 3328 of the rotary knife blade 3300.

Figure 118:
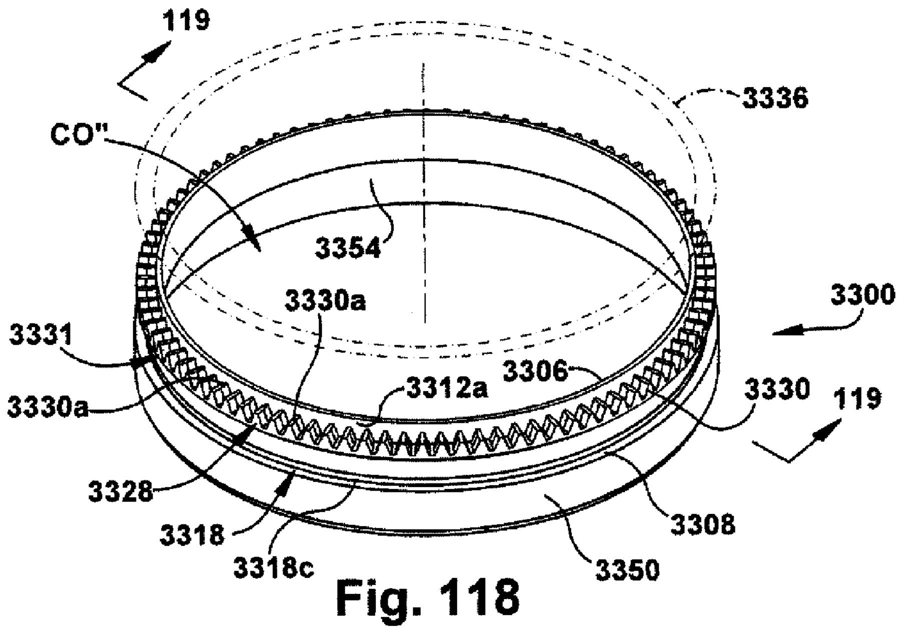
Figure 119:
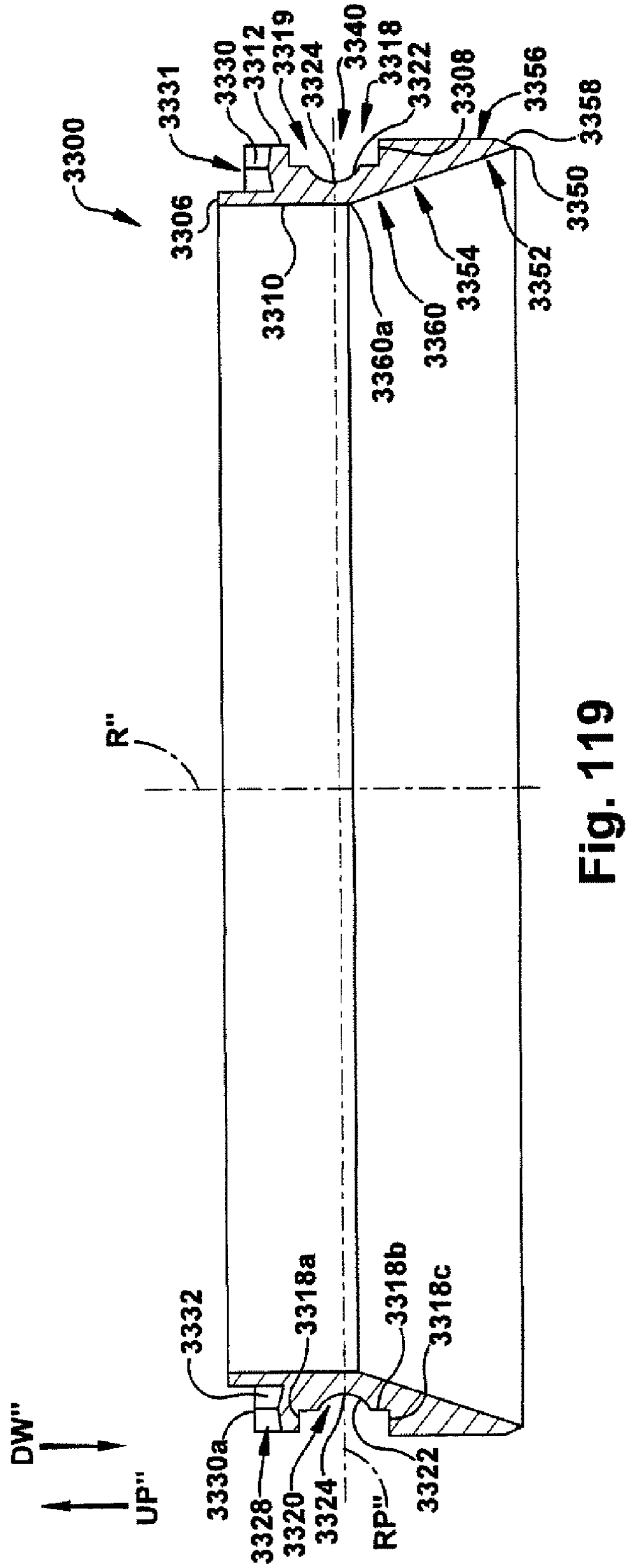

Conceptually, the respective axially upper surfaces 3330*a* of the set of gear teeth 3330, when the knife blade 3300 is rotated, can be viewed as forming an imaginary annulus 3336 (for clarity, the imaginary annulus 3336 is shown schematically in dashed line in FIG. 118 as being spaced axially above the gear teeth 3330). The blade housing cap 3456*a* overlies substantially all of the imaginary annulus 3336 defined by the set of gear teeth 3330, except in a region 3420*c* (FIG. 114) where clearance is required for the meshing of pinion gear 3610 and the driven gear 3328 of the rotary knife blade 3300. As can be seen in FIG. 117, the set of gear teeth 3330 of the knife blade driven gear 3328 are disposed or stepped radially outwardly from the portion 3312*a* of the outer wall 3312 adjacent the upper end 3306 of the rotary knife blade body 3302

At the lower end 3318 of the knife blade body 3302, the horizontal portion 3318*a* of the bearing race recessed region 3318 defines a radially outwardly extending projection or cap 3370. The rotary knife blade cap 3370 is axially aligned with and at least partially overlies (when viewed from the distal end 3353 of the rotary knife blade 3300) the set of gear teeth 3300. Additionally, the rotary knife blade cap 3370 is in close proximity to and slightly axially overlaps a lower end 3458 of the blade support section 3450 of the blade housing 3400 forming a type of labyrinth seal that impeded ingress of pieces of meat, bone, gristle, and other debris into the rotary knife bearing assembly 3552.

Blade Housing 3400

As can best be seen in FIGS. 115-116 and 120-121, the blade housing 3400 of the power operated rotary knife 3100 comprises a unitary or one-piece, continuous annular structure that includes the mounting section 3402 and the blade support section 3450. In one exemplary embodiment, the blade housing is continuous about its perimeter, that is, unlike prior split-ring annular blade housings, the blade housing 3400 of the present disclosure has no split along a diameter of the housing to allow for expansion of the blade housing diameter. The blade-blade housing bearing structure 3500 secures the rotary knife blade 3300 to the blade housing 3400 and supports the blade 3300 for rotation within the blade housing 3400. Accordingly, removal of the knife blade 3300 from the blade housing 3400 is accomplished by removing a portion of the blade-blade housing bearing structure 3500 from the power operated rotary knife 3100.

Figure 115:
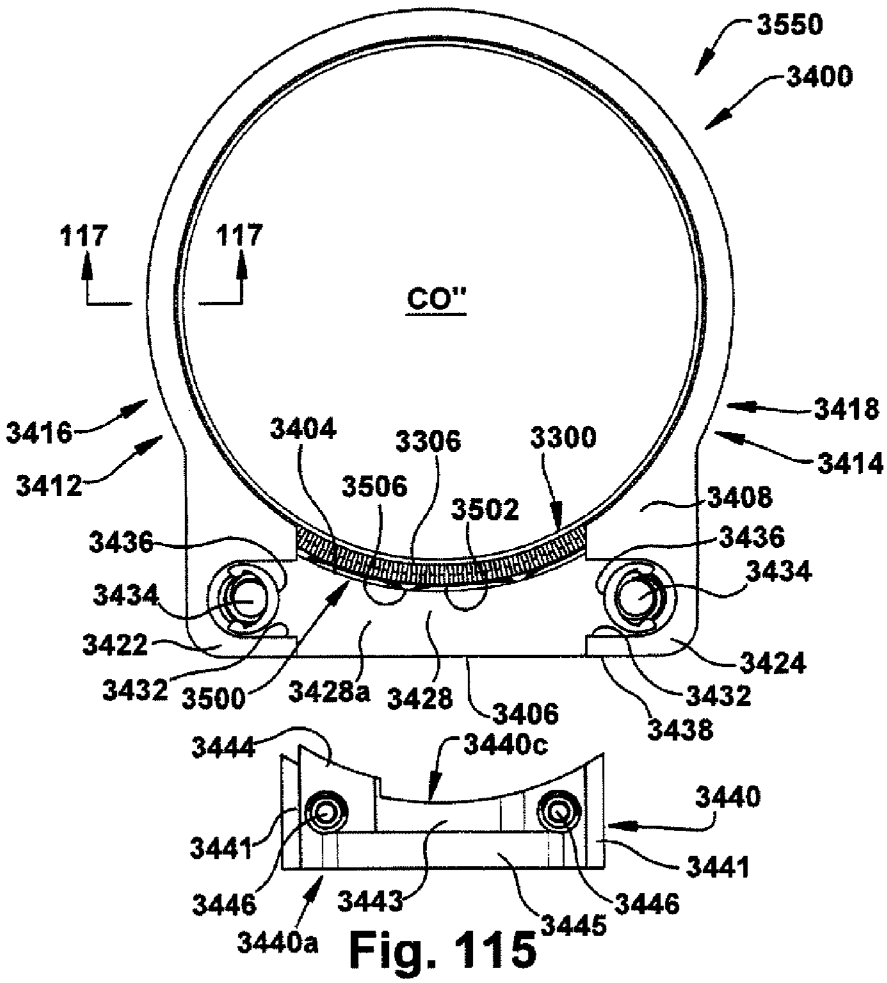
Figure 116:
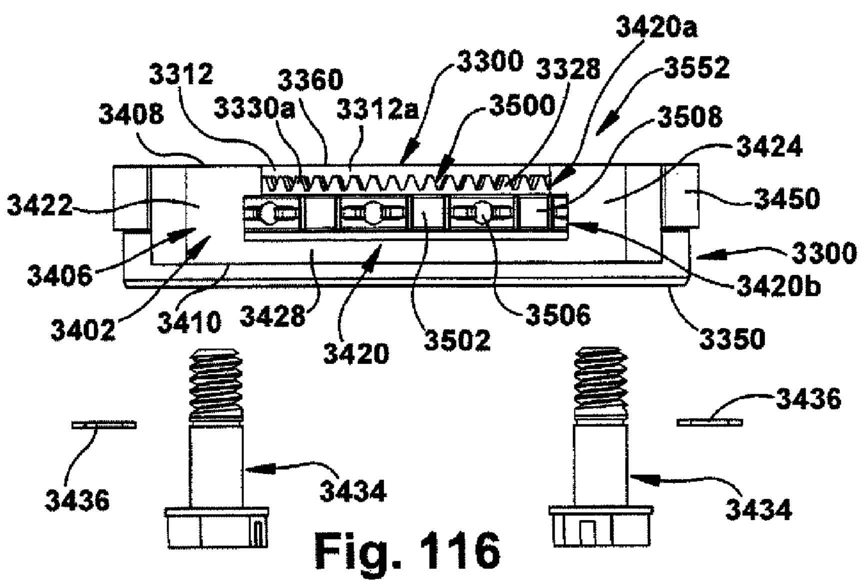
Figure 120:
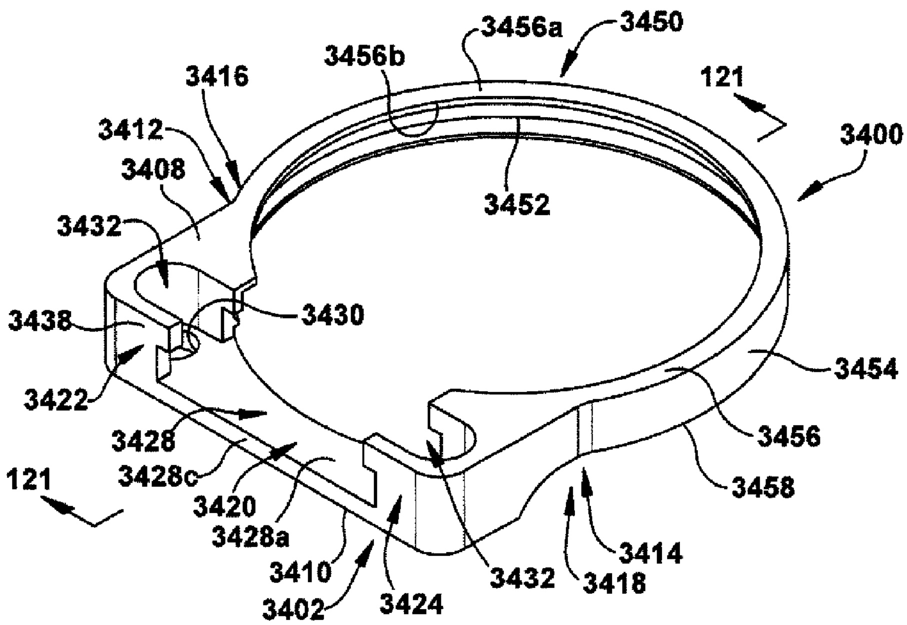
Figure 121:
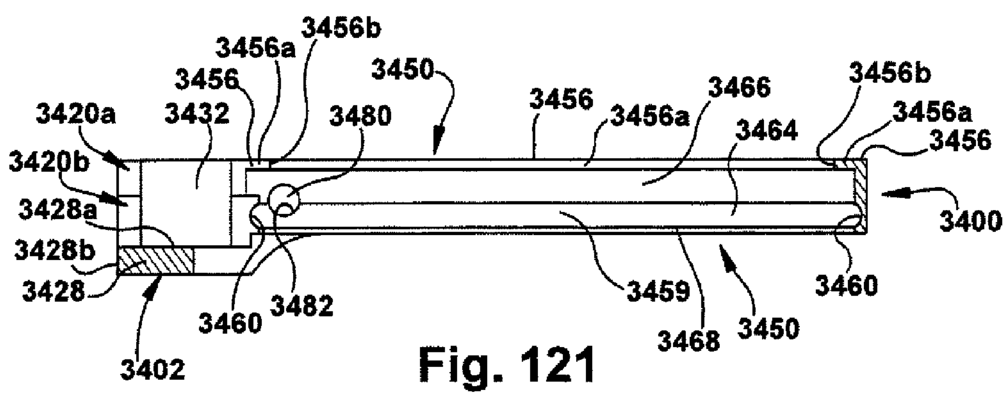

As is best seen in FIGS. 115 and 120-121, the mounting section 3402 of the blade housing 3400 extends radially outwardly from the blade support section 3450 and subtends an angle of approximately 120° or, stated another way, extends approximately ⅓ of the way around the circumference of the blade housing 3400. The mounting section 3402 is both axially thicker and radially wider than the blade support section 3450. The mounting section 3402 includes an inner wall 3404 and a radially spaced apart outer wall 3406 and a first upper end 3408 and an axially spaced apart second lower end 3410. At forward ends 3412, 3414 of the mounting section 3402, there are tapered regions 3416, 3418 (FIGS. 115 and 120) that transition between the upper end 3408, lower end 3410 and outer wall 3406 of the mounting section 3402 and the corresponding upper end 3456, lower end 3458 and outer wall 3454 of the blade support section 3450.

The mounting section 3402 defines an opening 3420 (FIGS. 115 and 120-121) that extends radially between the inner and outer walls 3404, 3405. The radially extending opening 3420 is bounded by and extends between upright supports or pedestals 3422, 3424 and an upper surface 3428*a* of a base 3428 that bridges the pedestals 3422, 3424. The pedestals 3422, 3424 extend axially upwardly from the base 3428. The base 3428 defines two axially extending apertures 3430 and the pedestals 3422, 3424 define axially extending U-shaped recesses 3432. The U-shaped recesses 3432 face each other and are axially aligned with the apertures 3430. The base apertures 3430 receive a pair of threaded fasteners 3434. The fasteners 3434 pass through the base apertures 3430 and the U-shaped pedestal recesses 3432 and thread into respective threaded openings 3130 defined in the L-shaped blade housing mounting pedestal 3124 of the gearbox housing 3113 to releasably secure the blade housing 3400 to the gearbox assembly 3112. The threaded fasteners 3434 are prevented from falling out of their respected threaded openings 3130 by C-shaped retainer clips 3436.

Figure 122:
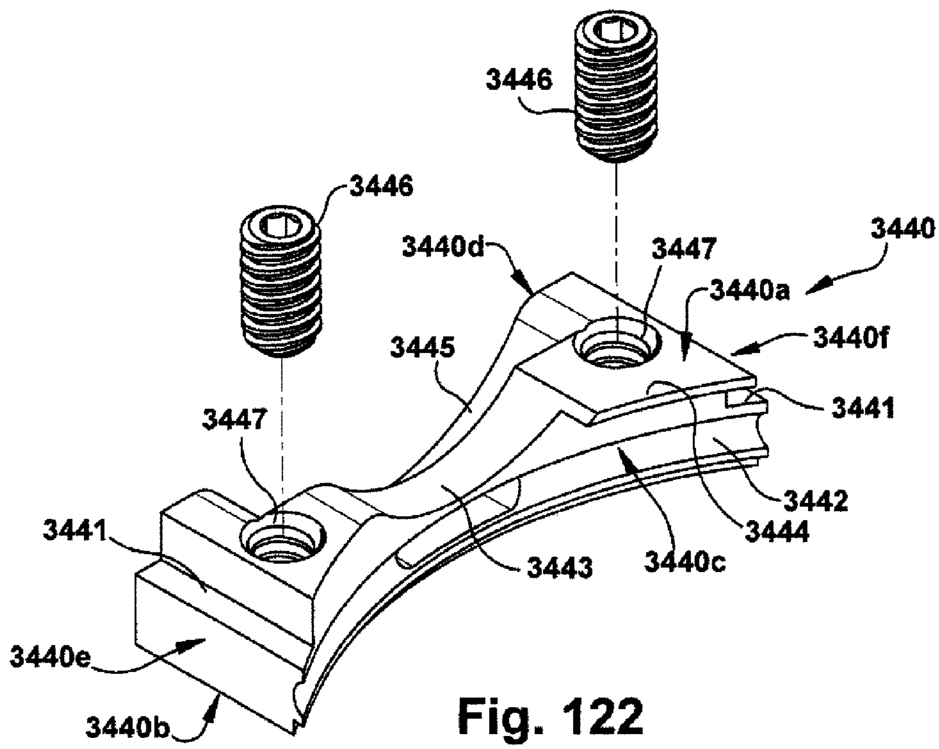

The radially extending opening 3420 of the blade housing mounting section 3402 includes a narrower upper portion 3420*a* and a wider lower portion 3420*b*. A relative width of the opening 3420 is defined by rearward facing surfaces 3438 of the pedestals 3422, 3424 that comprise a portion of the outer wall 3406 of the mounting portion 3402 of the blade housing 3400. The opening 3420 is sized to receive a removable blade housing plug 3440 (FIGS. 115 and 122). The blade housing plug 2440 is removably received in the opening 3420. When the blade housing plug 3440 is removed from the opening 3420, access is provided to the elongated rolling bearing strip 3502 of the blade-blade housing bearing structure 3500. When the blade housing plug 3440 is positioned in the opening 3420 and attached to the blade housing 3400 via a pair of set screws 3446 (FIG. 122), the blade housing plug 3440 inhibits debris created during cutting/trimming operations (e.g., pieces of fat, gristle, bone, etc.) and other foreign materials from migrating to and accumulating on or adjacent the elongated rolling bearing strip 3502 of the blade-blade housing bearing structure 3500 or the driven gear 3328 of the rotary knife blade 3300.

As can best be seen in FIG. 120, the blade support section 3450 includes an inner wall 3452 and radially spaced apart outer wall 3454 and a first upper end 3456 and an axially spaced second lower end 3458. The blade support section 3450 extends about the entire 360° circumference of the blade housing 3400. The blade support section 3450 in a region of the mounting section 3402 is continuous with and forms a portion of the inner wall 3404 of the mounting section 3402. The blade support section inner wall 3452 of the blade housing 3400 includes a bearing surface. In one exemplary embodiment of the power operated rotary knife 3100, the blade housing bearing surface 3459 comprises a bearing race 3460 that extends radially inwardly into the inner wall 3452. In one exemplary embodiment, a central portion 3462 of the blade housing bearing race 3460 defines a generally arcuate bearing face 3464.

The blade support section upper end 3456 defines the driven gear cap 3456*a* that overlies the set of gear teeth 3330 of the driven gear 3328 of the rotary knife blade 3300. As can best be seen in FIG. 117, the blade housing bearing race 3460 is axially spaced from both the upper and lower ends 3456, 3458 of the blade support section 3450. Specifically, there is a portion 3466 of the inner wall 3452 of the blade support section 3450 extending axially between the blade housing bearing race 3460 and the cap 3456*a* and there is a portion 3468 of the inner wall 3452 extending axially between the blade support section lower end 3458 and the bearing race 3460.

As is best seen in FIGS. 105 and 121, the right tapered region 3416 (as viewed from a front of the power operated rotary knife 3100) of the blade housing mounting section 3402 includes a port 3480 for injecting cleaning fluid for cleaning the blade housing 3400 and the rotary knife blade 3300 during a cleaning process. The cleaning port 2480 passes from an entry opening 3481 in the outer wall 3406 of the mounting section right tapered region 3416 to an exit opening 3482 in the inner wall 3404 of the mounting section 3402. The exit opening 3482 (FIG. 121) defined by the port 3480 is in fluid communication with the blade housing bearing race 3460 and the inner wall portion 3466 of the blade support section 3450 above the bearing race 3460.

Blade Housing Plug 3440

As can best be seen in FIGS. 115 and 122, the blade housing plug 3440 includes an upper end 3440*a*, an axially spaced apart a lower end 3440*b*, an inner wall 3440*c* and a radially spaced apart outer wall 3440*d*. The blade housing plug 3440 also includes a pair of stepped shoulders 3441 formed in opposite sides 3440*e* of the blade housing plug 3440. The stepped shoulder 3441 bear against the pedestals 3422, 3424 of the mounting section 3402 to secure the blade housing plug 3440 to the blade housing 3400 when the set screws 3446 pass through respective openings 3447 in the blade housing plug 3440 and are tightened against the blade housing base upper surface 3428*a*. The inner wall 3440*c* defines an arcuate bearing race 3442 that continues the bearing race 3460 of the blade housing blade section inner wall 3452. The radially inner wall 3440*c* of the blade housing plug 3440 defines a portion of the blade housing bearing race 3460 such that the blade housing bearing race 3460 is continuous about substantially the entire 360° circumference of the blade support section 3450.

The upper end 3440*a* of the blade housing plug 3440 defines a first arcuate recess 3443 (FIG. 122) adjacent the inner wall 3452 that provides clearance for the gear head 3614 of the pinion gear 3610. A portion of the upper end 3440*a* on one side of the arcuate recess 3443 includes a radially inwardly extending driven gear cap 3444 that continues the driven gear cap 3456*a* of the blade support section 3450. However, because the spur gear drive 3640 requires that the pinion gear 3610 be located axially above the set of spur gear teeth 3330 of the driven gear 3328 of the rotary knife blade 2300, the clearance region 3420*c* (FIG. 114) of the mounting section opening 3420 must be provided for the meshing engagement of the set of gear teeth 3616 of the pinion gear with the driven gear 3328 of the rotary knife blade 3300. Accordingly, as can best be seen in FIG. 114, the driven gear cap 3444 only extends a portion of the way across the upper end 3440*a* of the blade housing plug 3440 between the right and left sides 3440*e*, 3440*f* of the blade housing plug 3440 such that the clearance region 3420*c* is provided for the meshing engagement of pinion gear 3610 and the rotary knife blade driven gear 3330. The clearance region 3420*c* corresponds to the arcuate region in FIG. 114 where the driven gear 3328 of the rotary knife blade 3300 is visible.

The upper end 3440*a* of the blade housing plug 3440 also includes a second larger arcuate recess 3445 that functions as a seating surface for engagement with a radial seating surface 3120*c* (FIGS. 124-126) of the forward mounting section 3118 of the gearbox housing 3113 when the blade housing 3400 is affixed to the gearbox housing 3113. When the blade housing plug 3440 is installed in the opening 3420 of the mounting section 3402, the outer wall 3440*d* of the blade housing plug 3440 is flush with the outer wall 3406 of the blade housing mounting section 3402 and forms part of a vertical planar seating surface the outer wall 3406 that engages a vertical planar seating surface 3128 (FIG. 126) of the L-shaped blade housing mounting pedestal 3124 of the gearbox housing 3113 when the blade housing 3400 is secured to the gearbox housing 3113. Similarly, when the blade housing plug 3440 is installed in the opening 3420 of the mounting section 3402, the upper end 3440*a* of the blade housing plug 3440 is flush with the upper end 3408 of the blade housing mounting section 3402 and forms part of a horizontal planar seating surface that engages a horizontal planar seating surface 3126 (FIG. 124) of the L-shaped blade housing mounting pedestal 3124 of the gearbox housing 3113 when the blade housing 3400 is secured to the gearbox housing 3113.

Gearbox Assembly 3112

As is best seen in FIGS. 102, 108 and 123-126, the gearbox assembly 3112 of the power operated rotary knife 3100 includes the gearbox housing 3113 and the gearbox 3602, which is supported by the gearbox housing 3113. The gearbox 3602 comprises the gear train 3604, namely, the pinion gear 3610 and the bearing support assembly 3628. As can best be seen in FIG. 108A, the pinion gear bearing support assembly 3638, in one exemplary embodiment, includes first and second spaced apart ball bearing assemblies 3630, 3632 that are supported within the throughbore 3115 of the gearbox housing 3113. The first and second ball bearing assemblies 3630, 3632 support the pinion gear 3610 for rotation about its axis of rotation PGR", which is substantially coincident with the longitudinal axis LA" of the handle assembly 3110.

As is best seen in FIGS. 128 and 129, the pinion gear 3610 includes the gear head 3614 and an input shaft 3612 extending rearwardly from the gear head 3614. A radially outwardly extending collar 3627 (FIG. 108A) separates the gear head 3614 and the input shaft 3612. Supporting the pinion gear 3610 for rotation in the gearbox housing 3113 are the first ball bearing assembly 3630, which is disposed about an end portion 3624 of the pinion gear input shaft 3612 adjacent the collar 3628, and the second ball bearing assembly 3632, which is disposed about an opposite end portion 3626 of the pinion gear input shaft 3612.

Figure 108A:
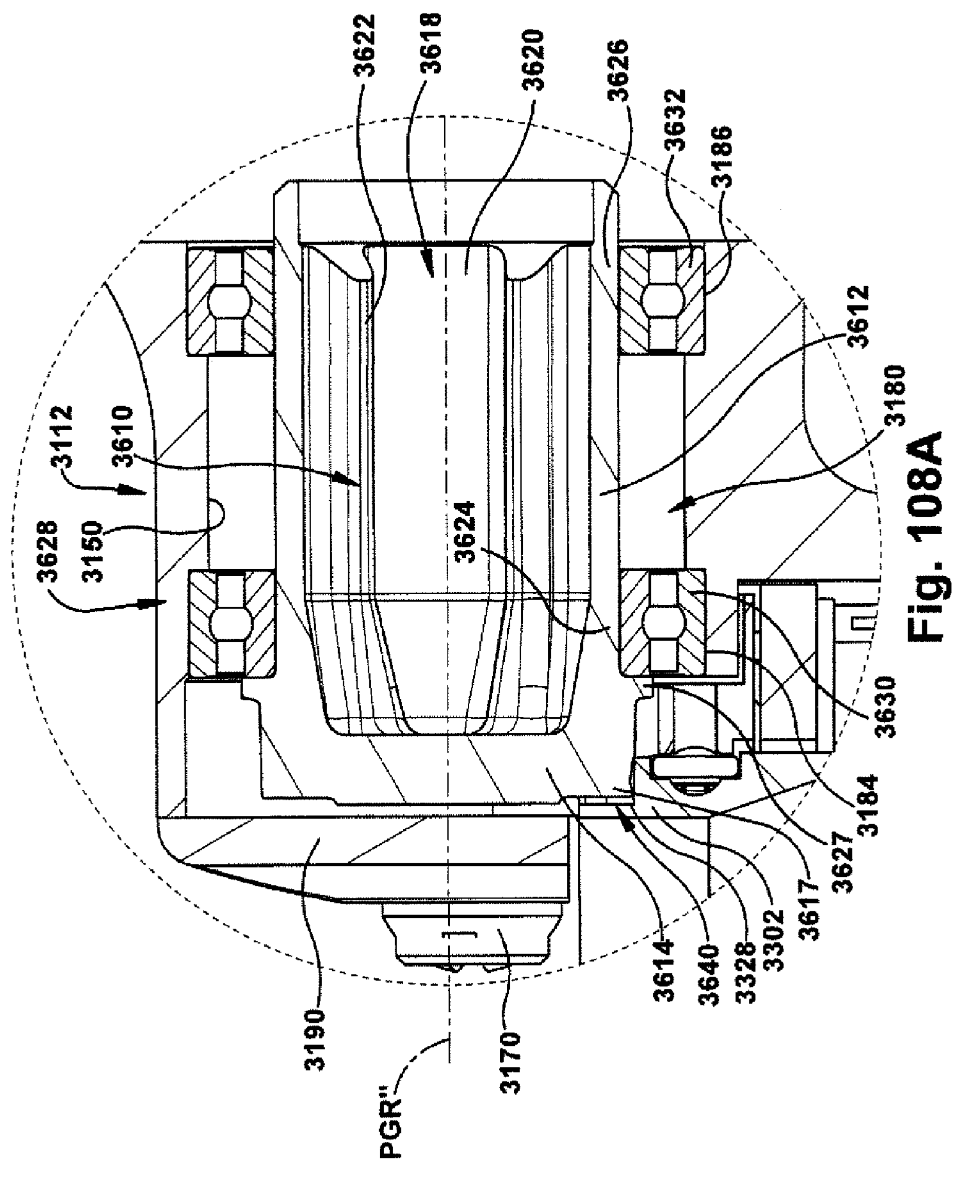
FIG. 108A is a schematic enlarged section view of a portion of the head assembly of the power operated rotary knife of FIG. 101 that is within a dashed circle labeled FIG. 108A in FIG. 108.

The gear head 3614 of the pinion gear defines the set of spur gear teeth 3616. The input shaft 3612 includes a central opening 3618 (FIGS. 108A and 129). An inner surface 3620 of the input shaft central opening 3618 defines a female socket or fitting 3622. The female fitting 3622 in engaged by a mating male drive fitting of the flexible shaft drive assembly (not shown) to rotate the pinion gear 3610, which, in turn, rotates the rotary knife blade 3300 via the spur gear drive 3640.

Gearbox Housing 3113

The gearbox housing 3113 includes a generally cylindrical rearward section 3116 (in the rearward direction RW" away from the blade housing 3400) and an enlarged forward mounting section 3118 (in the forward direction FW" toward the blade housing 3400). The gearbox housing 3113 includes the gearbox cavity or opening 3114 (FIG. 126) which defines the throughbore 3115 extending through the gearbox housing 3113 from a forward end 3140 to a rearward end 3142 of the gearbox 3113. The throughbore 3115 extends generally along the handle assembly longitudinal axis LA" and provides a cavity for receiving the pinion gear 3610 and its associated support bearing assembly 3638.

As can best be seen in FIG. 126, an inner surface 3150 of the gearbox housing 3113 defining the throughbore 3115, when viewed along the longitudinal axis LA', includes a generally cylindrical central region 3180. The cylindrical central region 3180 includes recessed regions 3184, 3186 that are axially spaced apart with respect to the pinion gear axis of rotation PGR". The recessed regions 3184, 3186 receive respective outer races of the first and second ball bearing assemblies 3630, 3632 and hold the respective ball bearing assemblies in place.

The inner surface 3150 of the gearbox housing 3113 also includes a threaded region 3156 adjacent the rearward end 3142 of the gearbox housing 3113. The internal threaded region 3156, which is part of the cylindrical rearward section 3116 of the gearbox housing 3113, receives mating external threads 3258 of a frame screw 3250 of a hand piece retaining assembly 3250 (described below) to secure the hand piece 3200 to the gearbox housing 3113.

As can best be seen in FIGS. 102 and 124-126, the forward mounting section 3118 of the gearbox housing 3113 includes a central portion 3120 that, in effect, continues a reduced diameter portion 3116*a* of the cylindrical rearward section 3116 of the gearbox housing 3113 and defines a portion of the gearbox cavity 3114 and the throughbore 3115. The central cylindrical portion 3120 includes an upper section 3120*a* that is coextensive with the forward end 3140 of the gearbox housing 3113 and a lower section 3120*b* that is recessed from the forward end 3140. The forward mounting section 3118 additionally includes an outwardly and downwardly extending flange 3122 that provides seating or mounting surfaces for: 1) the blade-blade housing combination 3550; and 2) the pinion gear cover 3190. The extending flange 3122 defines the L-shaped blade housing mounting pedestal 3124. The L-shaped blade housing mounting pedestal 3124 comprises the first horizontal planar seating or mounting surface 3126 and a second vertical planar seating or mounting surface 3128. The horizontal planar seating surface 3126 is substantially parallel to the axis of rotation R" of the rotary knife blade 3300 and includes a pair of threaded openings 3130 (FIG. 125).

To removably attach the blade-blade housing combination 3550 to the gearbox housing 3113, the upper end 3408 of the mounting section 3402 of the blade housing 3400 is aligned adjacent the horizontal planar seating surface 3126 of the L-shaped blade housing mounting pedestal 3124 and the outer wall 3406 of the blade housing mounting section 3402 is aligned adjacent the vertical planar seating surface 3128. Specifically, the upper end 3408 of the blade housing mounting section 3402 and the upper end 3440*a* of the blade housing plug 3440 are in contact with the horizontal planar seating surface 3126 of the L-shaped blade housing mounting pedestal 3124. Additionally, a rearward surface 3428*b* of the base 3428 of the blade housing mounting section 3402 and the outer wall 3440*d* of the blade housing plug 3440 are in contact with the vertical planar seating surface 3128 of the L-shaped blade housing mounting pedestal 3124.

The pair of fasteners 3434 is positioned to pass through respective openings 3430 of the base 3428 of the blade housing mounting section 3402 and are threaded into respective ones of the threaded openings 3130 of the horizontal seating surface 3126 and tightened until snug. When the blade housing 3400 is assembled to the gearbox housing 3113, the set of spur gear teeth 3616 of the pinion gear 3610 are in meshing engagement with the driven spur gear teeth 3330 of the rotary knife blade 3300 such that rotation of the pinion gear 3610 about its axis of rotation PGR" causes rotation of the rotary knife blade 3300 about its axis of rotation R". Further, as can best be seen in FIG. 105, when assembled, a lower portion 3128*a* of the vertical planar seating surface 3128 extends in a downward direction DW" below the respective heads of the pair of fasteners 3434.

Figure 123:
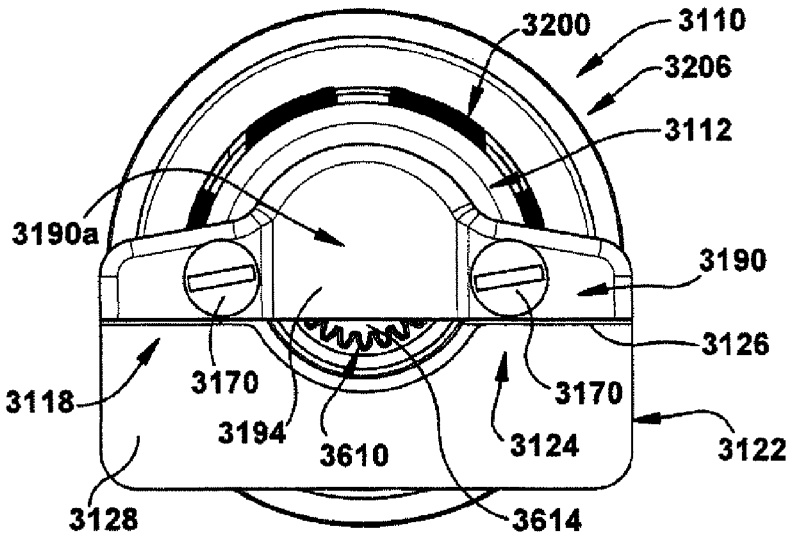
Figure 124:
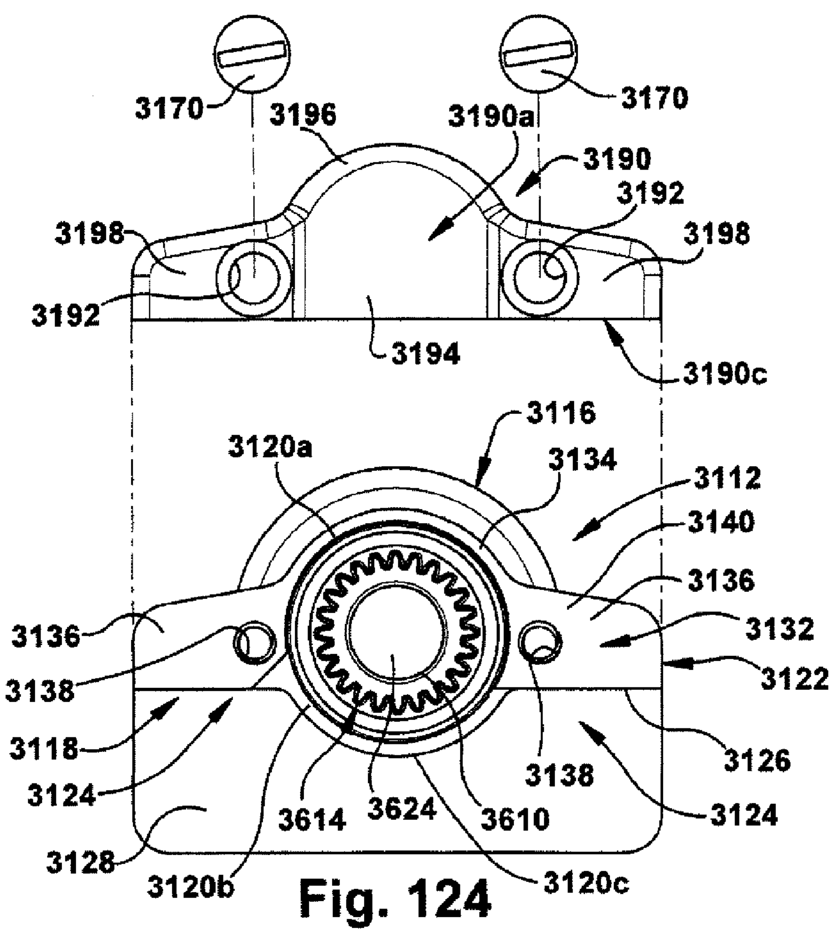

As can best be seen in FIGS. 123 and 124, the forward end 3140 of the gearbox assembly 3113 defines a generally planar pinion gear mounting or seating surface 3132. The pinion gear mounting surface 3132, which is generally vertical and substantially parallel to the second vertical planar seating surface 3128 of the L-shaped blade housing mounting pedestal 3124, is adapted to releasably receive the pinion gear cover 3190 that overlies a portion of a gear head 3614 of the pinion gear 3610.

The planar pinion gear mounting surface 3132 comprises a central arcuate region 3134 and a pair of radially extending wing regions 3136 (FIG. 124) that extend outwardly from the central arcuate region 3134. Each of the extending wing regions 3136 includes a threaded opening 3138. Each of the threaded openings 3138 receives a respective threaded fastener 3170 that secure the pinion gear cover 3190 to the pinion gear mounting surface 3132.

Pinion Gear Cover 3190

As can best be seen in FIGS. 124 and 127, the pinion gear cover 3190 includes a forward or front surface 3190*a* and a rearward or back surface 3190*b* and further includes a central region 3194 and a pair of extending wing regions 3198. Each of the extending wing regions 3198 includes an opening 3192. The threaded fasteners 3170 pass through respective openings 3192 of the pinion gear cover 3190 and thread into the threaded openings 3138 in the pinion gear mounting surface 3132 to secure the pinion gear cover 3190 to the gearbox housing 3113.

As is seen in FIG. 127, the front surface 3190*a* of the pinion gear cover 3190 in the central region 3194 is recessed or concave (bowed inwardly) such that the central region 2194 conforms generally to a radius of curvature of the inner wall 3360 of the rotary knife blade 3300. The front surface 3190*a* of the pinion gear cover 3190 in the extending wing regions 3198 is generally planar. An upper domed region 3196 (FIG. 124) of the pinion gear cover 3190 overlies and conforms to the central arcuate surface 3134 of the pinion gear cover mounting surface 3132 of the gearbox housing 3113, while the extending wing regions 3198 of the pinion gear cover 3190 overlie and conform to the radially outwardly extending regions 3136 of the pinion gear cover mounting surface 3132.

When the rotary knife 3100 is in assembled condition, a bottom surface 3190*c* of the pinion gear cover 3190 (FIG. 105) is in close proximity to or contacts the upper end 3408 of the blade housing mounting section 3402 and is in close proximity to the upper end 3306 of the rotary knife blade body 3302. Thus, the pinion gear cover 3190 inhibits ingress of debris into a region of the gear head 3614 of the pinion gear 3610 and the driven gear 3328 of the rotary knife blade 3300. Additionally, the bottom surface 3190*c* of the pinion gear cover 3190 functions as a cap positioned over a portion of the clearance region 3420*c* (FIG. 114) of the opening 3420 of the blade housing 3400 to further inhibit entry of debris into the knife blade driven gear 2328 in the clearance region 3420*c*.

Handle Assembly 3110

As is best seen in FIG. 102, the handle assembly 3110 of the power operated rotary knife 3100 includes the hand piece 3200 and the hand piece retaining assembly 3250. The handle assembly 3110 extends along a longitudinal axis LA" (FIGS. 101 and 108), which is substantially orthogonal to and intersects the rotary knife blade axis of rotation R". As best seen in FIGS. 102 and 108, the hand piece 3200 includes an outer gripping surface 3202 and an inner surface 3204. The inner surface 3204 defines a throughbore 3206 that extends along the longitudinal axis LA" between a front wall 3214 and an enlarged proximal end 3210 of the hand piece 3200. The inner surface 3204 of the hand piece 3200 defined a plurality of splines 3212 adjacent the front wall 3214 and a stepped shoulder 3408 rearward or proximal of the plurality of splines 3212.

As can be seen in FIG. 108, the enlarged proximal end 3210 of the hand piece 3200 includes a drive shaft latching assembly 3275, similar in structure to the drive shaft latching assemblies 275 and 2275 of the power operated rotary knives 100 and 2100, respectively, for releasably securing a flexible shaft drive assembly (similar to the shaft drive assembly 700) to the handle assembly 3110. The principal difference between the drive shaft latching assembly 3275 of the power operated rotary knife 3100 and the drive shaft latching assemblies 275, 2275 of the power operated rotary knifes 100, 2100 is that the drive shaft latching assembly 3275 is disposed in the enlarged proximal end 3210 of the hand piece 3200, as opposed to being disposed in the enlarged proximal end portion 260 of the elongated central core 252 of the hand piece retaining assembly 250, as was the case with the power operated rotary knife 100.

The hand piece retaining assembly 3250 of the power operated rotary knife 3100 includes the frame screw 3252 and a coil spring 3270 extending in a rearward direction RW" from the frame screw 3252. The frame screw 3252 includes the threaded outer surface 3258 at a distal end 3256 of the frame screw 3252. As is best seen in FIG. 108, the threaded outer surface 3258 of the frame screw 3252 threads into a threaded interior region 3156 of a cylindrical rearward section 3116 of the gearbox housing 3113 to releasably secure the hand piece 3200 to the gearbox housing 3113. When the frame screw 3252 is threaded into the threaded interior region 3156 of the gearbox housing 3113, an outwardly extending central collar 3254 of the frame screw 3252 bears against the stepped shoulder 3208 of the inner surface 3204 of hand piece 3200 to prevent the hand piece 3200 from moving in the rearward direction RW". At the same time, the front wall 3214 of the hand piece 3200 bears against a shoulder 3164 of the cylindrical rearward section 3116 of the gearbox housing 3113 to prevent the hand piece 3200 from moving in the forward direction FW". The plurality of splines 3212 of the inner surface 3204 of the hand piece 3200 interfit with a plurality of splines 3162 formed on an outer surface 3160 of the gearbox housing 3113 to allow the hand piece 3200 to be position in any desired rotational orientation about the handle assembly longitudinal axis LA" with respect to the gearbox housing 3113.

Fourth Exemplary Embodiment

Power Operated Rotary Knife 4100

Overview

A fourth exemplary embodiment of a power operated rotary knife of the present disclosure is shown generally at 4100 in FIGS. 130-139. The power operated rotary knife 4100 includes a handle assembly 4110, a detachable head assembly 4111, and a drive mechanism 4600. As is best seen in FIG. 131, the head assembly 4111 of the power operated rotary knife 4100 includes a gearbox assembly 4112, a rotary knife blade 4300, a blade housing 4400, and a blade-blade housing support or bearing structure 4500. The knife blade 4300 rotates about an axis of rotation R''' within the blade housing 4400.

The rotary knife blade 4300 is supported for rotation with respect to the blade housing 4400 by the blade-blade housing bearing structure 4500, similar to the blade-blade housing bearing structures 500, 2500, 3500 of the power operated rotary knives 100, 2100, 3100. The blade-blade housing bearing structure 4500 includes, in one exemplary embodiment, an elongated rolling bearing strip 4502 (FIGS. 131-132 and 141-142) disposed in an annular passageway 4504 (FIG. 142) formed between opposing bearing surfaces 4319, 4459 of the rotary knife blade 4300 and the blade housing 4400, respectfully. The rolling bearing strip 4502 includes a plurality of rolling bearings 4506, such a ball bearings, disposed in spaced apart relation in a flexible separator cage 4508 (FIG. 132). Alternately, the blade-blade housing bearing structure 4500 may utilize a plurality of elongated rolling bearing strips in the annular passageway 4504 disposed in head-to-tail or spaced apart relationship.

An assembled combination of the rotary knife blade 4300, the blade housing 4400, and the blade-blade housing bearing structure 4500 will be referred to as the blade-blade housing combination 4550 (FIGS. 140 and 141) and the mating bearing surfaces defined by the blade-blade housing bearing structure 4500, the knife blade bearing surface 4319, the blade housing bearing surface 4459, and the blade housing plug bearing race 4446 that support the knife blade 4300 for rotation in the blade housing 4400 will be referred to as the rotary knife bearing assembly 4552 (FIGS. 139A and 142). The blade-blade housing bearing structure 4500 both releasably secures the rotary knife blade 4300 to the blade housing 4400 and provides a bearing structure to support the rotary knife blade 4300 for rotation about an axis of rotation R''' (FIGS. 105 and 108). The blade-blade housing bearing structure 4500 also defines a rotational plane RP''' (FIG. 139) of the knife blade 4300 which is substantially orthogonal to the knife blade axis of rotation R'''.

The gearbox assembly 4112 includes a gearbox housing 4113 which supports a gearbox 4602 of the drive mechanism 4600. The gearbox assembly 4112 also includes a frame body 4150 which receives the gearbox housing 4113 and a frame body bottom cover 4190 which is affixed to the frame body 4150 to seal the gearbox housing 4113 within the frame body 4150. The handle assembly 4110, which extends along a longitudinal axis LA''', which is substantially orthogonal to and intersects the knife blade axis of rotation R''', includes a hand piece 4200 and a hand piece retaining assembly 4250 that secures the hand piece 4200 to the gearbox housing 4113. The handle assembly 4110 also includes a drive shaft latching assembly 4275 disposed in an enlarged proximal end 4210 of the hand piece 4200. The handle assembly 4110, hand piece retaining assembly 4250 and the drive shaft latching assembly 4275 are similar to the handle assembly 3110, the hand piece retaining assembly 3250, and the drive shaft latching assembly 3275 of the power operated rotary knife 3100.

The gearbox 4602 of the power operated rotary knife 4100 includes a gear train 4204 which, similar to the gear trains 604, 2604 of the power operated rotary knives 100, 2100, comprises a pinion gear 4610 and a drive gear 4650. The drive gear 4650 is a double gear which includes a first bevel gear 4652 which is driven by the pinion gear 4610. The drive gear 4650 also includes a second spur gear 4654 which engages a drive gear 4328 of the rotary knife blade 4300 to rotate the rotary knife blade 3300 about the knife blade axis of rotation R''' via a spur gear drive.

The power operated rotary knife 4100, like the power operated rotary knife 100 described above, is especially suited for use with larger outer diameter rotary knife blades. Among the differences between the power operated rotary knife 4100 and the power operated rotary knife 100 are the following: 1) In the power operated rotary knife 4100, a set of gear teeth 4330 of the driven gear 4328 of the annular rotary knife blade 4300 is disposed above the bearing surface 4319 formed in an outer wall 4312 of a body section 4302 of the knife blade 4300. 2) Like the power operated rotary knife 100, the blade housing 4400 of the power operated rotary knife 4100 is secured to a mounting pedestal 4152 of the frame body 4150. However, in the power operated rotary knife 100, the frame body 150 received the gearbox housing 113 in the cavity 155 of the frame body 150 as the gearbox housing 113 was moved in the forward direction FW along the longitudinal axis LA with respect to the frame body 150, somewhat akin to a dresser drawer being slid into a dresser. The frame body 150 surrounded both the top and the bottom of the gearbox housing 113.

By contrast, in the power operated rotary knife 4100, the structural relationship between the frame body 4150 and the gearbox housing 4113 is generally similar to the structural relationship between the frame body 2150 and the gearbox housing 2113 of the power operated rotary knife 2100. Specifically, in the power operated rotary knife 4100, the frame body 4150 defines a socket 4156 (FIG. 150) and has an open bottom wall 4182. This configuration allows the frame body 4150 to be moved in a downward direction DW''' (FIG. 148) orthogonal to the handle assembly longitudinal axis LA''' to slide over the gearbox housing 4113. A thin frame body bottom cover 4190 is secured to the frame body 4150 to cover, protect, and support the gearbox housing 2113.

Other components of the drive mechanism 4600 of the power operated rotary knife 4100 include components external to the head and handle assemblies 4111, 4110 of the power operated rotary knife 4100. These external components include a drive motor (not shown) and the flexible shaft drive assembly which rotates the pinion gear 4610. Such components of the power operated rotary knife 4100 are similar to the corresponding components discussed with respect to the power operated rotary knife 100, e.g., the flexible shaft drive assembly 700 and the drive motor 800. For brevity, components and assemblies of the power operated rotary knife 4100 that are substantially similar to corresponding components and assemblies of any of the power operated rotary knives 100, 3100 and 2100, will not be described in detail below. It being understood by one of ordinary skill in the art that the discussion of the structure and function of the components and assemblies of the power operated rotary knives 100, 2100 and 3100, as set forth above, is applicable to and is incorporated into the discussion of the power operated rotary knife 4100, discussed below.

Rotary Knife Blade 4300

As best seen in FIGS. 143 and 144, the rotary knife blade 4300 of the power operated rotary knife 4100 is continuous annular and comprises a unitary or one-piece annular structure. The rotary knife blade 4300 is a "flat style" rotary knife blade, but, it should be understood, that the power operated rotary knife 4300 may be used with a variety of rotary knife blade styles and sizes, depending on the specific cutting or trimming application. The rotary knife blade 4300 includes a body 4302 and a blade section 4304 extending axially from the body 4302. The knife blade body 4302 includes an upper end 4306 and a lower end 4308 spaced axially apart from the upper end 4306. The body 4302 further includes an inner wall 4310 and an outer wall 4312 spaced radially apart from the inner wall 4310. The body outer wall 4312 defines a knife blade bearing surface. In one exemplary embodiment of the power operated rotary knife 4100, the knife blade bearing surface 4319 comprises a knife blade bearing race 4320 (best seen in FIG. 144) that extends radially inwardly into the outer wall 4312. In one exemplary embodiment, the knife bearing race 4320 defines a generally arcuate bearing face 4322 in a central portion 4324 of the race 4320.

The body outer wall 4312 of the rotary blade body 4302 also defines a driven gear 4328 comprising a set of gear teeth 4330 formed so as to extend radially outwardly in a stepped portion 4331 of the outer wall. The stepped portion 4331 is axially above the bearing race 4320, that is, closer to the first upper end 4306 of the body 4302. The driven gear 4328, in one exemplary embodiment, defines a plurality of involute spur gear teeth 4332.

Advantageously, the set of gear teeth 4330 of the knife blade driven gear 4328 are axially spaced from the upper end 4306 of the body 4302 and are axially spaced from arcuate bearing race 4320 of the body 4302. In order to minimize the ingress of pieces of meat, bone and other debris into the driven gear 4328 of the knife blade 4300, a radially outwardly extending projection or cap 4334. As can best be seen in FIG. 144, the cap 4334 is generally rectangular in cross section and is axially aligned with and overlies the driven gear 4328, when viewed from the upper end 4306 of the blade body 4302. An upper surface of the driven gear cap 4334 defines the upper end 4306 of the knife blade body 4302 and an angled surface 4335 of the cap 4334 defines part of the outer wall 4312 of the body 4302. Conceptually, the respective radially outer surfaces 4330*a* of the set of gear teeth 4330, when the knife blade 4300 is rotated, can be viewed as forming an imaginary cylinder 4336 (shown schematically in FIG. 144). The driven gear cap 4334 extends slightly radially outwardly of the imaginary cylinder 4336 defined by the set of gear teeth 4330. Additionally, as can also be seen in FIG. 144, the set of gear teeth 4330 of the knife blade driven gear 4328 are disposed or stepped radially outwardly from a portion 4340 of the outer wall 4312 that defines the knife blade bearing race 4320.

In the rotary knife blade 4300, the second end 4308 of the knife blade body 4302 transitions radially inwardly between the body 4302 and the blade section 4304. The second end 4308 of the body 4302 is defined by a radially inwardly extending step or shoulder 4308*a*. The blade section 4304 extends from the second end 4308 of the body 4302 and includes a blade cutting edge 4350 at an inward end 4352 of the blade section 4304. As can be seen, the blade section 4304 includes an inner wall 4354, a radially spaced apart outer wall 4356 and a bridging portion 4358 between the inner and outer walls 4354, 4356.

The rotary knife blade body inner wall 4310 and the blade section inner wall 4354 together form a continuous knife blade inner wall 4360 that extends from the body upper end 4306 to the cutting edge 4350. The knife blade inner wall 4360 is generally frustoconical in shape, converging in a downward direction (labeled DW''' in FIG. 144). The knife blade inner wall 4360 defines a cutting opening CO''' (FIG. 143) of the power operated rotary knife 4100.

Blade Housing 4400

In one exemplary embodiment and as best seen in FIGS. 140-141 and 145-147, the blade housing 4400 of the power operated rotary knife 4100 is continuous annular and comprises a unitary or one-piece annular structure. The blade housing 4400 includes a mounting section 4402 and a blade support section 4450.

The blade housing mounting section 4402 includes an inner wall 4404 and a radially spaced apart outer wall 4406 and a first upper end 4408 and an axially spaced apart second lower end 4410. At forward ends 4412, 4414 of the mounting section 4402, there are tapered regions 4416, 4418 that transition between the upper end 4408, lower end 4410 and outer wall 4406 of the mounting section and the corresponding upper end, lower end and outer wall of the blade support section 4450. The blade housing mounting section 4402 includes two mounting inserts 4420 (FIG. 132) that extend between the upper and lower ends 4408, 4410 of the mounting section 4402. The mounting inserts 4420 define threaded openings 4422. When the mounting insert threaded openings 4420 are engaged by respective threaded fasteners 4170 extending through threaded openings 4172 of arcuate arms 4160, 4162 of the frame body 4150, the blade housing 4400 is releasably secured to the gearbox assembly 4112. The mounting section 4402 further includes an opening 4424 that extends radially between the inner and outer walls 4404, 4406. As can best be seen in FIGS. 146 and 147, the opening 4424 includes a narrower upper portion 4426 and a wider lower portion 4428.

The narrower upper portion 4426 of the opening 4424 is sized to receive the spur gear 4654 of the drive gear 4650 of the gear train 4604. The gear teeth 4656 of the spur gear 4654 mesh with the set of gear teeth 4330 of the knife blade driven gear 4328 to rotate the knife blade 4300 with respect to the blade housing 4400. The wider lower portion 4428 of the opening 4424 is sized to receive a blade housing plug 4430 (FIGS. 131-132, 140 and 145). The blade housing plug 4430 is removably secured to the blade housing 4400 by two screws 4432 (FIG. 132). The screws 4432 pass through a pair of countersunk openings 4434 that extend from the upper end 4408 of the mounting section 4402 to the lower portion 4428 of the opening 4424 and engage a pair of aligned threaded openings 4438 of the blade housing plug 4430.

The blade housing 4400 also includes a semicircular recess 4440 (FIG. 140) in the outer wall 4406. The semicircular recess 4440 extends radially inwardly almost to the inner wall 4404 and provides clearance for the axially oriented bevel gear 4652 of the drive gear 4650. The blade housing plug 4430 includes a recess 4442 in an upper surface 4443 of the plug 4430 to provide clearance for the spur gear 4654 of the drive gear 4650. A cutout 4444 in a radially outer wall 4445 of the blade housing plug 4430 provides for clearance for a fastener 4672 of a ball bearing support assembly 4660 of the gearbox 4602 that rotatably supports the drive gear 4650.

As can best be seen in FIGS. 142 and 145-147, the blade support section 4450 includes an inner wall 4452 and radially spaced apart outer wall 4454 and a first upper end 4456 and an axially spaced second lower end 4458. The blade support section 4450 extends about the entire 360° circumference of the blade housing 4400. The blade support section 4450 in a region of the mounting section 4402 is continuous with and forms a portion of the inner wall 4404 of the mounting section 4402, that is, the portion between the lines labeled IWBS''' in FIG. 147. The blade support section inner wall 4452 defines a bearing surface. In one exemplary embodiment of the power operated rotary knife 4100, the blade housing bearing surface 4459 comprises a bearing race 4460 that extends radially inwardly into the inner wall 4452. In one exemplary embodiment, a central portion 4462 of the blade housing bearing race 4460 defines a generally arcuate bearing face 4464. A portion of the radially inner wall 4447 (FIG. 145) of the blade housing plug 4430 defines a blade housing bearing race 4446 that is aligned with and continues the blade housing bearing race 4460 such that the blade housing bearing race 4460 is substantially continuous about the entire 360° circumference of the blade support section 4450.

As is best seen in FIG. 142, the blade support section inner wall 4452 of the blade housing 4400 includes a first radially outwardly extending ledge 4470 that is located axially above the blade housing bearing race 4460. The blade support section inner wall 4452 also includes a second radially outwardly extending angled ledge 4472 that is axially spaced above the first radially outwardly extending ledge 4470. The first and second ledges 4470, 4472 provide a seating regions for a bottom surface 4362 of the set of gear teeth 4330 and the angled surface 4335 of the driven gear cap 4334, respectively, to support the knife blade 4300 when the knife blade 4300 is positioned in the blade housing 4400 from axially above and the rolling bearing strip 4502 of the blade-blade housing bearing structure 4500 has not been inserted into a passageway 4504 (FIG. 142 between the rotary knife blade 4300 and the blade housing 4400. Of course, it should be understood that without insertion of the rolling bearing strip 4502 into the passageway 4504 between opposing arcuate bearing faces 4322, 4464 of the rotary knife blade 4300 and the blade housing 4400, if the power operated rotary knife 4100 were turned upside down, that is, upside down from the orientation of the power operated rotary knife 4100 shown, for example, in FIG. 130, the rotary knife blade 4300 would fall out of the blade housing 4400.

When the rolling bearing strip 4502 of the blade-blade housing bearing structure 4500 is inserted in the passageway 4504, as schematically depicted in FIG. 142, there is a small operating clearance between the angled ledge 4472 of the inner wall 4452 of the blade housing blade support section 4450 and the angled surface 4335 of the outer wall 4312 of the rotary knife blade body 4302. The proximity and shape of the rotary blade angled surface 4335 and the blade housing angled ledge 4472 from a type of labyrinth seal to inhibit ingress of debris into the region of the driven gear 4328 of the knife blade 4300. As is best seen in FIGS. 145-147, the tapered region 4416 of the blade housing mounting section 4402 includes a port 4480 for injecting cleaning fluid for cleaning the blade housing 4400 and the knife blade 4300 during a cleaning process. The port 4480 passes from an entry opening 4481 in the mounting section outer wall 4406 to an exit opening 4482 in the mounting section inner wall 4404. The exit opening 4482 is in fluid communication with the blade housing bearing race 4460.

Gearbox Assembly 4112

The gearbox assembly 4112 is part of the head assembly 4111 of the power operated rotary knife 4100 and includes the gearbox 4602, the gearbox housing 4113, the frame body 4150 and the frame body bottom cover 4190. The gearbox 4602 is supported in the gearbox housing 4113, while the gearbox housing 4113 is received and supported in the combination of the frame body 4150 and the frame body bottom cover 4190. The blade-blade housing combination 4550 is releasably secured to an arcuate mounting pedestal 4152 of the frame body 4150 to complete the head assembly 4111 of the power operated rotary knife 4100.

The gearbox 4602 comprises a gear train 4604 and associated bearing support assemblies for rotatably supporting gears of the gear train 4604. The gear train 4604 of the power operated rotary knife 4100 is similar to the gear trains 604, 2604 of the power operated rotary knifes 100, 2100 in that the gear train 4604 includes a pinion gear 4610 and a drive gear 4650. A pinion gear bearing support assembly 4628 of the power operated rotary knife 4100 that supports the pinion gear 4610 for rotation about its axis of rotation PGR''' (FIG. 139A) is, in one exemplary embodiment, different from the pinion gear bearing support assemblies 628 and 2628 of the power operated rotary knives 100, 2100. By contrast, a drive gear bearing support assembly 4660 of the power operated rotary knife 4100 that supports the drive gear 4650 for rotation about its axis of rotation DGR''' is, in one exemplary embodiment, similar to the drive gear bearing support assemblies 660, 2660 of the power operated rotary knives 100, 2100.

The pinion gear 4610 includes a gear head 4614 comprising a set of bevel gear teeth 4616 and an input shaft 4612 extending rearwardly from the gear head 4614. The gear head 4614 of the pinion gear 4610 engages the drive gear 4650 to drive the annular rotary knife blade 4300. The gearbox drive gear 4650 is a double gear that includes an upper, vertically or axially oriented bevel gear 4652 and a lower, horizontally or radially oriented spur gear 4654. The drive gear upper bevel gear 4652 engages and is rotatably driven by the set of bevel gear teeth 4616 of the gear head 4614 of the pinion gear 4610. The drive gear lower spur gear 4654 defines a plurality of drive gear teeth 4656 that are mating involute gear teeth that mesh with the involute gear teeth 4332 of the rotary knife blade driven gear 4328 to rotate the rotary knife blade 4300. This gearing combination between the drive gear 4650 and the rotary knife blade 4300 defines a spur gear involute gear drive 4658 (FIG. 139A) to rotate the knife blade 4300.

The pinion gear bearing support assembly 4628, in one exemplary embodiment, includes first and second rolling or ball bearing assemblies 4630, 4632 which are axially spaced apart with respect to the longitudinal axis LA'''. The pair of axially spaced apart rolling or ball bearing assemblies 4630, 4632 is lodged in the gearbox housing throughbore 4115. As is best seen in FIG. 139A, the first ball bearing assembly 4630 is disposed around an end portion 4634 of the pinion gear input shaft adjacent a stepped shoulder 4617 of the gear head 4614 and the second ball baring assembly 4632 is disposed around an opposite end portion 4636 of the pinion gear input shaft 4612.

The drive gear 4650, like the drive gear 650 of the power operated rotary knife 100, is a double gear with an axially aligned first gear 4652 and an integral second gear 4654, the drive gear 4650 rotating about the drive gear axis of rotation DGR''' (FIG. 139A). The drive gear axis of rotation DGR''' is substantially parallel to the rotary knife blade axis of rotation R''' and is substantially orthogonal to and intersects the pinion gear axis of rotation PGR''' and the handle assembly longitudinal axis LA'''. The first gear 4652 of the drive gear 4650 is a bevel gear and includes a set of bevel gear teeth 4653 that mesh with the set of bevel gear teeth 4616 of the gear head 4614 of the pinion gear 4610. The second gear 4654 comprises a spur gear including a set of involute gear teeth 4656. The spur gear 4654 of the drive gear 4650 and the driven gear 4328 of the knife blade 4300 comprise an involute spur gear drive, having respective axes of rotation DGR''', R''' that are substantially parallel.

The drive gear 4650 is supported for rotation by a bearing support assembly 4660 (FIGS. 133 and 139A) that, in one exemplary embodiment, comprises a ball bearing assembly 4662, like the ball bearing assembly 662, 2662 of the power operated rotary knives 100, 2100. The ball bearing assembly 4662 includes a plurality of balls 4666 trapped between an inner race 4664 and an outer race 4664. A central opening 4670 (FIG. 133) of the drive gear 4650 receives the outer race 4664 of the ball bearing assembly 4662. The ball bearing assembly 4662 is secured to the gearbox housing 4113 by a threaded fastener 4672 that threads into an opening 4140 (FIG. 153) in a downwardly extending projection 4142 extending from a bottom portion 4141 of an inverted U-shaped forward section 4118 of the gearbox housing 4113.

Gearbox Housing 4113

The gearbox housing 4113 (FIGS. 133, 149 and 153-154), in one exemplary embodiment, includes a cylindrical rearward section 4116 (in the rearward direction RW''' away from the blade housing 4400), an inverted U-shaped forward section 4118 (in the forward direction FW toward the blade housing 4400) and a generally rectangular base section 4120 disposed axially below the inverted U-shaped forward section 4118. The gearbox housing 4113 includes the gearbox cavity or opening 4114 which defines a throughbore 4115 extending through the gearbox housing 4113 from a rearward end 4122 to a forward end 4124 of the gearbox housing 4113. The throughbore 4115 extends generally along the handle assembly longitudinal axis LA''' and provides a cavity for the pinion gear input shaft 4612. The throughbore 4115 includes the axially spaced apart recesses 4126, 4128 which receive the pinion gear ball bearing assemblies 4630, 4632 to support the pinion gear 4610 for rotation about its axis of rotation PGR'''. The inverted U-shaped forward section 4118 and the cylindrical rearward section 4116 combine to define an upper surface 4130 of the gearbox housing 4113.

The generally rectangular shaped base 4120 of the gearbox housing 4113 extends downwardly from the inverted U-shaped forward section 4118, i.e., away from the gearbox housing upper surface 4130. As can be seen in FIGS. 153 and 154, the rectangular base 4120 includes a front wall 4120*a*, a rear wall 4120*b*, an upper wall 4120*c*, a bottom wall 4120*d*, an outer wall 4120*e*, and an inner wall 4120*f*. The front wall 4120*a*, the upper wall 4120*c*, the bottom wall 4120*d* and the outer wall 4120*e* are generally planar. As is best seen in FIG. 153, extending radially inwardly into the front wall 4120*a* of the rectangular base 4120 and the bottom portion 4141 of the inverted U-shaped forward section of the gearbox housing 4113 are first and second recesses 4120*g*, 4120*h*. The first arcuate recess 4120*g* is an upper recess, that is, the upper recess 120*g* is adjacent the bottom portion 4141 of the inverted U-shaped forward section 4118. The second arcuate recess 4120*h* is a lower recess and extends through the bottom wall 120*c* of the rectangular base 120. The first, upper recess 4120*g* provides clearance for the bevel gear 4652 of the drive gear 4650, while the second, lower recess 4120*h*, which is wider than the upper recess 4120*g*, provides clearance for the spur gear 4654 of the drive gear 4650.

The lower portion 4141 of the inverted U-shaped forward section 4118 also includes a port or opening 4136 that provides a passageway between the throughbore 4115 and the first, upper recess 4120*g*. The opening 4136 provides for clearance of an upper portion of the bevel gear 4652 and provides a passageway for communication of cleaning fluid injected into the throughbore 4115 from the proximal end 4122 of the gearbox housing 4113 to enter the regions of the first and second recesses 4120*g*, 4120*h* for purposes of cleaning the drive gear 4650.

The bottom portion 4141 of the inverted U-shaped forward section 4118 includes the downwardly extending projection 4142. The downwardly extending projection 4142 includes a cylindrical stem portion 4143 that defines the threaded opening 4140 extending through the downwardly extending projection 4142. A central axis through the threaded opening 4140 defines and is coincident with the axis of rotation DGR''' of the drive gear 4650. The threaded opening 4140 receives the fastener 4672 to secure the drive gear ball bearing assembly 4662 to the downwardly extending projection 4142. Specifically, the inner race 4664 of the drive gear ball bearing assembly 4662 is secured to the cylindrical stem portion 4143. The upper and lower arcuate recesses 4120*g*, 4120*h* are centered about the drive gear axis of rotation DGR''' and the central axis of the threaded opening 4140.

As can be seen in FIG. 154, an inner surface 4145 of the cylindrical rearward section 4116 of the gearbox housing 4113 defines a threaded region 4149, adjacent the proximal end 4122 of the gearbox housing 4113. The threaded region 4149 of the gearbox housing 4113 receives a mating threaded portion 4258 of a frame screw 4252 of the hand piece retaining assembly 4250 to secure the hand piece 4200 to the gearbox housing 4113. An outer surface 4146 of the cylindrical rearward section 4116 of the gearbox housing 4113 defines a plurality of axially extending splines 4148.

Frame Body 4150

The frame body 4150 (FIGS. 148, 150 and 151) includes the pair of arcuate arms 4160, 4162 extending outwardly from a central cylindrical region 4154. The arcuate arms 4160, 4162 include respective threaded openings 4172 that receive the pair of threaded fasteners 4170. A front or forward portion of the frame body 4150 defines the arcuate mounting pedestal 4152. The arcuate mounting pedestal 4152 provides a seating region 4152*a* (FIG. 148) to receive the mounting section 4402 of the blade housing 4400. Specifically, the mounting pedestal 4152 includes an inner wall 4174, an upper wall 4176 extending radially in a forward direction FW''' from an upper end of the inner wall 4174, and a lower wall or ledge 4178 extending radially in a forward direction FW''' from a lower end of the inner wall 4174.

The frame body 4150 slides downwardly over an upper surface 4130 of the gearbox housing 4113. The central cylindrical region 4154 of the frame body 4150 defines the interior socket 4156. An inner surface 4158 of the frame body 4150 defining the socket 4156 is configured and contoured to snuggly fit over and engage the upper surface 4130 of the gearbox housing 4113, that is, the frame body socket 4156 is configured such that the inner surface 4158 engages the cylindrical rearward section 4116, the inverted U-shaped forward section 4118, and the rectangular base 4120 of the gearbox housing 4113. When the gearbox housing 4113 is received in the frame body 4150, the frame body socket 5156 overlies the outer wall 4120*e* of the gearbox housing base 4120 and a recessed portion 4180 (FIGS. 150 and 151) of a bottom wall 4182 of the frame body 4150 is flush with the bottom wall 4120 (FIG. 153) of the gearbox housing base 4120.

A necked down or smaller diameter region 4158*a* (FIG. 151) of the inner surface 4158 of frame body 4150 snuggly fits over an upper portion 4132 (FIGS. 149 and 154) of the cylindrical rearward section 4116 of the gearbox housing 4113. A larger diameter region 4158*b* of the inner surface 4158 of the frame body 4150 snuggly fits over an upper portion 4134 of the inverted U-shaped forward section 4118 of the gearbox housing 4113. As is best seen in FIG. 139A, clearance for the gear head 4614 of the pinion gear 4610 is provided by a space or gap between a forward wall 4158*c* (FIG. 150) defined by the inner surface 158 of the frame body 4150 and a front wall 4138 of the inverted U-shaped forward section 4118 of the gearbox housing 4113. The front wall 4138 of the inverted U-shaped forward section 41118 defines the distal end 4124 of the gearbox housing 4113.

When the frame body 4150 is slid onto the gearbox housing 4113, a pair of parallel horizontal ledges 4186 of the inner surface 4158 of the frame body 4150 rest on the upper wall 4120*c* of the base section 4120 of the gearbox housing 4113 to prevent relative movement of the gearbox housing 4113 with respect to the frame body 4150 in the upward direction UP'''. A stepped shoulder 4147 (FIG. 154) formed between the cylindrical rearward section 4116 and the inverted U-shaped forward section 4118 abuts a stepped shoulder formed between the small diameter portion 4158*a* and the large diameter portion 4158*b* of the inner surface 4158 of the frame body 4150 to prevent movement of the gearbox housing 4113 with respect to the frame body 4150 in the rearward direction RW'''.

Frame Body Bottom Cover 4190

After sliding the frame body 4150 over the gearbox housing 4113, the frame body 4150 is secured in place with respect to the gearbox housing 4113 by the frame body bottom cover 4190 (FIGS. 148 and 152). The frame body bottom cover 4190 fits a recessed portion 4180 of a bottom surface 4182 of the frame body 4150. A pair of threaded fasteners 4192 passes through respective openings 4194 in the frame body bottom cover 4190 and thread into an aligned pair of threaded openings 4184 in the recessed portion 4180 of the frame body 4150. When the fasteners 4192 are threaded into the openings 4184 of the frame body 4150, an upper surface 4196 of the bottom cover 4190 bears against the bottom wall 4120*d* of the base section 4120 of the gearbox housing 4113 and against the recessed portion 4180 of the bottom surface 4182 of the frame body 4150 to secure the gearbox housing 4113 to the frame body 4150.

As can best be seen in FIG. 138, when the frame body bottom cover 4190 is installed, a lower surface 4195 (FIG. 148) of the bottom cover 4190 is generally flush with the bottom surface 4182 of the frame body 4150. A recess 4196*a* (FIG. 152) in the upper surface 4196 of the frame body bottom cover 4190 provides clearance for the fastener 4672 which supports the drive gear ball bearing support assembly 4662 of the gearbox 602.

Securing Blade-Blade Housing Combination to Gearbox Housing

The frame body 4150 releasably secures the blade-blade housing combination 4550 to the gearbox housing 4113. When the blade-blade housing combination 4550 is assembled and the mounting section 4402 of the blade housing 4400 is properly aligned and moved into engagement with the arcuate mounting pedestal 4152 of the frame body 4150: 1) the outer wall 4406 of the blade housing mounting section 4402 bears against the inner wall 4174 of the arcuate mounting pedestal 4152 and the forward facing wall 4120*a* (FIG. 153) of the base section 4120 of the gearbox housing 4113; 2) the first upper end 4408 of the blade housing mounting section 4402 bears against the upper wall 4176 of the arcuate mounting pedestal 4152; and 3) a radially inwardly stepped portion 406*a* of the outer wall 406 of the blade housing mounting section 402 bears against an upper face and a forward face of the radially outwardly projecting mounting pedestal lower wall or ledge 4178 (FIGS. 133, 148 and 151) of the arcuate mounting pedestal 4152 of the frame body 4150.

The frame body bottom cover 4190 includes a radially outwardly projecting stepped portion 4197 (FIG. 152) formed in a front wall 4197*a* of the bottom cover 4190 that continues the lower wall or ledge 4178 of the arcuate mounting pedestal 4152 and also continues a portion of the inner wall 4174 of the arcuate mounting pedestal 4152 of the frame body 4150 across the spaced apart axially recessed portions 4180 on the bottom surface 4182 of frame body 4150.

The pair of fasteners 4170 of the arcuate arms 4160, 4162 of the frame body 4150 are threaded into respective threaded openings 4422 of the mounting inserts 4420 of the blade housing mounting section 4402 to secure the blade-blade housing combination 4550 to the frame body 4150 thereby coupling the blade-blade housing combination 4550 to the gearbox housing 4113.

A forward wall 4154*a* (FIGS. 133, 148 and 151) of the central cylindrical region 4154 of frame body 4150 includes a projection 4198 that supports a steeling assembly 4199. The steeling assembly, shown schematically in FIGS. 130 and 131, of the power operated rotary knife 4100 is similar in structure and function to the steeling assembly 199 of the power operated rotary knife 100.

Handle Assembly 4110

As is best seen in FIG. 131, the handle assembly 4110 of the power operated rotary knife 4100 includes the hand piece 4200 and the hand piece retaining assembly 4250. The handle assembly 4110 extends along a longitudinal axis LA'''. As best seen in FIGS. 131 and 139, the hand piece 4200 of the handle assembly 4110 includes an outer gripping surface 4202 and an inner surface 4204. The inner surface 4204 defines a throughbore 4206 that extends along the longitudinal axis LA''' between a front wall 4214 and the enlarged proximal end 4210 of the hand piece 4200. The inner surface 4204 of the hand piece 4200 defines a plurality of splines 4212 adjacent the front wall 4214 and a stepped shoulder 4408 rearward or proximal to the plurality of splines 4212.

As can be seen in FIG. 131, the enlarged proximal end 4210 of the hand piece 4200 includes the drive shaft latching assembly 4275, similar in structure to the drive shaft latching assembly 4275 of the power operated rotary knife 3200, for releasably securing a flexible shaft drive assembly (similar to the shaft drive assembly 700 of the power operated rotary knife 100) to the handle assembly 4110.

The hand piece retaining assembly 4250 of the power operated rotary knife 4100 is similar to the hand piece retaining assembly 3250 of the power operated rotary knife 3100. Specifically, the hand piece retaining assembly 4250 of the handle assembly 4100 includes the frame screw 4252 and a coil spring 4270 extending in a rearward direction RW" from the frame screw 4252. The frame screw 4252 includes the threaded outer surface 4258 at a distal end 4256 of the frame screw 4252. As is best seen in FIG. 139, the threaded outer surface 4258 of the frame screw 4252 threads into the threaded region 4149 defined on the inner surface 4145 of the cylindrical rearward section of the cylindrical rearward section 4116 of the gearbox housing 4113 to releasably secure the hand piece 4200 to the gearbox housing 4113.

When the frame screw 4252 is threaded into the threaded interior region 4149 of the gearbox housing 4113, an outwardly extending central collar 4254 of the frame screw 4252 bears against the stepped shoulder 4208 of the inner surface 4204 of hand piece 4200 to prevent the hand piece 4200 from moving in the rearward direction RW'''. At the same time, the front wall 4214 of the hand piece 4200 bears against a shoulder 4144 (FIG. 154) of the cylindrical rearward section 4116 of the gearbox housing 4113 and against the rearward wall 4159 (FIG. 150) of the frame body 4150 to prevent the hand piece 4200 from moving in the forward direction FW'''.

The plurality of splines 4148 of the gearbox housing 4113 accept and interfit with the plurality of splines 4212 formed on the inner surface 4204 of the hand piece 4200. The coacting plurality of splines 4148 of the gearbox housing 4113 and the plurality of splines 4212 of the hand piece 4200 allow the hand piece 4200 to be oriented at any desired rotational position about the handle assembly longitudinal axis LA''' with respect to the gearbox housing 4113.

Fifth Exemplary Embodiment

Power Operated Rotary Knife 5100

Overview

A fifth exemplary embodiment of a power operated rotary knife of the present disclosure is shown generally at 5100 in FIGS. 155 and 156. The power operated rotary knife 5100 includes a handle assembly 5110, a detachable head assembly 5111, and a drive mechanism 5600. The head assembly 5111, best seen in FIGS. 157-165, of the power operated rotary knife 5100 includes a gearbox assembly 5112, a rotary knife blade 5300, a blade housing 5400, and a blade-blade housing support or bearing structure 5500. The power operated rotary knife 5100 is similar in configuration and function to the power operated rotary knife 2100 of the second embodiment and, like the power operated rotary knife 2110, is particularly suited for use with small diameter rotary knife blades.

The rotary knife blade 5300 is supported for rotation with respect to the blade housing 5400 by the blade-blade housing bearing structure 5500, which is similar to the blade-blade housing bearing structures 2500 of the power operated rotary knife 2100. The blade-blade housing bearing structure 5500, includes, in one exemplary embodiment, an elongated rolling bearing strip (FIGS. 174 and 175) disposed in an annular passageway 5504 (FIG. 175) formed between opposing bearing surfaces 5319, 5459 of the rotary knife blade 5300 and the blade housing 5400, respectfully. The elongated rolling bearing strip 5502, like the elongated rolling bearing strip 2502 of the power operated rotary knife 2100, includes a plurality of rolling bearings 5506 rotatably supported in space apart relationship in a flexible separator cage 5508 disposed in a flexible separator cage 5508.

An assembled combination of the rotary knife blade 2300, the blade housing 2400, and the blade-blade housing bearing structure 2500 will be referred to as the blade-blade housing combination 5550 (FIGS. 166-173). The blade-blade housing bearing structure 5500 both releasably secures the rotary knife blade 5300 to the blade housing 5400 and provides a bearing structure to support the rotary knife blade 5300 for rotation about an axis of rotation (FIGS. 155 and 164).

The gearbox assembly 5112 includes a gearbox housing 5113 and a gearbox 5602 defining a gear train 5604. Similar to the gear train 2604 of the power operated rotary knife 2100, the gear train 5604 of the power operated rotary knife 5100 includes a pinion gear 5610 and a drive gear 5650. The pinion gear 5610 is rotatably driven about a pinion gear axis of rotation PGR'''' (FIG. 164) by a flexible shaft drive assembly (not shown). The flexible shaft drive assembly (not shown) is similar to the flexible shaft drive assembly 700 of the power operated rotary knife 100.

A gear head 5614 of the pinion gear 5610, in turn, rotatably drives a drive gear 5650 about a drive gear axis of rotation DGR'''' (FIG. 164). As was the case with the gear train 2604 of the power operated rotary knife 2100, the drive gear 5650 is a double gear that includes a first upper bevel gear 5652 which meshes with a set of bevel gear teeth 5616 of the gear head 5614 of the pinion gear 5610 to rotate the drive gear 5650, while a second lower spur gear 5654 of the drive gear 5650 engages a drive gear 5328 of the rotary knife blade 5300 forming an involute gear drive 5658 (FIG. 164) to rotate the knife blade 5300 about its axis of rotation R''''. The upper bevel gear 5632 and the lower spur gear 5654 of the drive gear 5650 are concentric with the drive gear rotational axis DGR'''' and are spaced axially apart with respect to the rotational axis DGR''''.

Other components of the drive mechanism 5600 of the power operated rotary knife 2100 include components external to the head and handle assemblies 5111, 5110 of the power operated rotary knife 5100. These external components include a drive motor (not shown) and the flexible shaft drive assembly (not shown) which rotates the pinion gear 5610. Such components of the power operated rotary knife 5100 are similar to the corresponding components discussed with respect to the power operated rotary knife 100, e.g., the flexible shaft drive assembly 700 and the drive motor 800.

As is best seen in FIG. 156, the handle assembly 5110 of the power operated rotary knife 5100 includes a hand piece 5200 and a hand piece retaining assembly 5250, similar to the hand piece 2200 and the hand piece retaining assembly 2250 of the power operated rotary knife 2100. The handle assembly 5110 extends along a longitudinal axis LA'''' (FIGS. 155 and 164), which is substantially orthogonal to and intersects the rotary knife blade axis of rotation R''''. The hand piece retaining assembly 5250 includes an elongated central core 2252 and a handle spacer ring 5290. The elongated central core 5252 includes an outer surface 5256 that includes a threaded portion 5262 at a distal end 5264 of the core 5252. The threaded portion 5262 of the elongated core 5252 threads into threads 5149 (FIG. 204) formed on an inner surface 5145 of a cylindrical rearward section 5116 of the gearbox housing 5113 to secure the hand piece 5200 to the gearbox housing 5113.

The elongated core 5252 of the hand piece retaining assembly 5250 includes a drive shaft latching mechanism 5275 (FIGS. 155 and 156), like the drive shaft latching mechanisms 275, 2275 of the power operated rotary knives 100, 2100. The drive shaft latching mechanism 5275 includes a slidable latch 5276 which functions to secure the shaft drive assembly to the handle assembly 5110 of the power operated rotary knife 5100.

One of the primary differences between the power operated rotary knife 5100 and the power operated rotary knife 2100, discussed previously, involves the relative positions or locations of the bearing race and the set of spur gear teeth of the respective rotary knife blades 2300, 5300. Specifically, as can best be seen in FIG. 71, in the rotary knife blade 2300 of the power operated rotary knife 2100, the bearing surface 2319 is located axially above the driven gear 2328, that is, the bearing surface 2319 is located closer to the upper end 2306 of the blade body 2302 than the driven gear 2328. By contrast, as can best be seen in FIG. 175, in the rotary knife blade 5300 of the power operated rotary knife 5300, the bearing surface 5319 is located axially below a driven gear 5328 of the knife blade 5300, that is, the driven gear 5328 is closer to an upper end 5306 of a body 5302 of the knife blade 5300 than the bearing surface 5319. Note, however, that the driven gear 5328 is still axially spaced from the upper end 5306 of the knife blade body 5302.

In the power operated rotary knife 5100, the driven gear 5328 of the rotary knife blade 5300 is positioned closer to the upper end 5306 of the blade body 5302 than was the case with the driven gear 2328 of the rotary knife blade 2300 of the power rotary knife 2100. This results in a number of modifications of the gearbox assembly 5112 including the configuration of the gearbox housing 5113, a frame body 5150 and a frame body bottom cover 5190. The position of the blade housing 5400 relative to the gearbox housing 5113 is lower (that is, in a downward direction DW'''' in FIG. 161) compared to the relative position of the blade housing 2400 and the gearbox housing 2113 in the power operated rotary knife 2100. The lower position of the blade housing 5400 relative to the gearbox housing 5113 provides for proper meshing of the driven gear 5328 of the rotary knife blade 5300 and the lower spur gear 5654 of a drive gear 5650 (as can be seen in the schematic sectional view of FIG. 164).

To minimize the amount that the blade housing 5400 of the power operated rotary knife 5100 must be lowered with respect to the gearbox housing 5113 and still have proper alignment of the driven gear 5328 of the rotary knife blade 5300 and the lower spur gear 5654 of the drive gear 5650, the pinion gear 5610 and the drive gear 5650 of the drive train 5604 of the power operated rotary knife 5100 are positioned slightly higher (that is, in an upward position UP'''' in FIG. 161) in the gearbox housing 5113 than was the case with the pinion gear 2610 and drive gear 2650 of the drive train 2604 of the power operated rotary knife 2100. That is, a throughbore 5115 of the gearbox housing 5113, which receives the pinion gear 5610, is raised slightly upwardly within the gearbox housing 5113, as compared to the throughbore 2115 of the gearbox housing 2113 of the power operated rotary knife 2100.

In the power operated rotary knife 5100, raising the pinion gear 5610 and the drive gear 5650 with respect to the gearbox housing 5113 is accomplished by modifying the larger sleeve bushing 5632 of the pinion gear bearing support assembly 5630, as compared to the larger sleeve bushing 2632 of the pinion gear bearing support assembly 5630 of the power operated rotary knife 2100. The larger sleeve bushing 5632 includes a cylindrical body 5637 and an annular forward head 5636. A central opening 5634 of the sleeve bushing 5632 receives an input shaft 5612 of the pinion gear 5610. The annular forward head 5636 includes a flat 5638 to prevent rotation of sleeve bushing 5632 with rotation of the pinion gear 5610.

In a modification to the configuration to the corresponding sleeve bushing 2632 of the power operated rotary knife 2100, in the sleeve bushing 5632 of the power operated rotary knife 5100, a longitudinal recess 5639 is formed in an upper surface 5639*a* of the cylindrical body 5637. As can best be seen in FIG. 212, the longitudinal recess 5639 essentially continues an upper surface of the flat 5638 of the annular forward head 5636. This allows the throughbore 5114 and the sleeve bushing 5632 to both be positioned slightly higher in the gearbox housing 5113 than would otherwise be the case without the longitudinal recess 5639. Since the position of the throughbore 5115 and the sleeve bushing 5632 within the gearbox housing 5113 determine the position of the pinion gear 5610, the pinion gear 5610 is positioned higher within the gearbox housing 5113, as compared to the relative positions of the pinion gear 2610 and gearbox housing 2113 in the power operated rotary knife 2100.

As the pinion gear 5610 and drive gear 5650 are substantially identical to the pinion gear 2610 and drive gear 2650 of the power operated rotary knife 2100, the higher position of the pinion gear 5610 within the gearbox housing 5113 also allows the position of the drive gear 5650 to be correspondingly raised with respect to the gearbox housing 5113. Recall that the upper bevel gear 5652 of the drive gear 5650 meshes with the gear head 5614 of the pinion gear 5610. Raising the position of the drive gear 5650 with respect to the gearbox housing 5113 and lowering the position of the blade housing 5400 with respect to the gearbox housing 51113 allows for the lower spur gear 5654 of the drive gear 5650 to properly mesh with the driven gear 5328 of the rotary knife blade 5300, as can be seen in FIG. 164.

The head assembly 5111 of the power operated rotary knife 5100 is similar to the head assembly 2111 of the power operated rotary knife 2100 in that both have a smaller physical "footprint" than, for example, the head assembly 111 of the power operated rotary knife 100. However, it should be recognized that, if desired, the power operated rotary knife 5100 may effectively be used with large diameter rotary knife blades just as the power operated rotary knife 100 could, if desired, be effectively used with small diameter rotary knife blades.

For brevity, components and assemblies of the power operated rotary knife 5100 that are substantially similar to corresponding components and assemblies of the power operated rotary knife 2100 and/or the power operated rotary knife 100, such as the handle assembly 5110, the blade-blade housing structure 5500, the drive mechanism 5600, the gear train 5604, the flexible shaft drive assembly, and the drive motor, among others, will not be described in detail below. It being understood by one of ordinary skill in the art that the discussion of the structure and function of the components and assemblies of the power operated rotary knives 100, 2100, 3100, 4100, set forth above, is applicable to and is incorporated into the discussion of the power operated rotary knife 5100, set forth below.

Rotary Knife Blade 5300

In one exemplary embodiment and as best seen in FIGS. 176-179, the rotary knife blade 5300 of the power operated rotary knife 5100 is a one-piece, continuous annular structure that is supported for rotation about the axis of rotation R"". The rotary knife blade 5300 includes the body section 5302 and a blade section 5304 extending axially from the body 5302. The body 5302 of the rotary knife blade 5300 includes the upper end 5306 and a lower end 5308 spaced axially apart from the upper end 5306. The knife blade body 5302 further includes an inner wall 5310 and an outer wall 5312 spaced radially apart from the inner wall 5310. The blade section 5304 of the rotary knife blade 5300 includes a blade edge 5350 defined at a distal end portion 5352 of the blade section 5304. The blade section 5304 further includes an inner wall 5354 and an axially spaced apart outer wall 5356. A short angled portion 5358 bridges the inner and outer walls 5354, 5356. As can best be seen in FIG. 179, the blade edge 5350 is formed at the intersection of the short angled portion 5358 and the blade section inner wall 5354. The rotary knife blade 5300 defines an inner wall 5360 which is formed by the inner wall 5310 of the body 5302 and the inner wall 5354 of the blade section 5304. In one exemplary embodiment, the rotary knife blade 5300 includes a knee or discontinuity 5360*a* in the body region of the inner wall 5360, although it should be appreciated that, depending on the specific configuration of the rotary knife blade 5300, the blade may be formed such that there is no discontinuity in the inner wall 5360.

The rotary knife blade 5300 is a "straight blade" style rotary knife blade. Although, it should be recognized that other rotary knife blade styles may be used in the power operated rotary knife 5100. A radially inwardly step 5314 (FIG. 179) of the body outer wall 5312 defines a line of demarcation between a radially narrower, upper gear and bearing region 5316 of the blade body 5302 and a radially wider, lower support region 5318 of the body 5302. As can be seen in FIG. 179, the upper gear and bearing region 5316 is narrow in cross section being recessed inwardly from an outermost radial extent 5318*a* of the lower support region 5318 defined by the blade body outer wall 5312. The upper gear and bearing region 5316, in one exemplary embodiment, is generally rectangular in cross section and includes a radially thin upper section 5316*a*, a generally vertical or axially extending middle section 5316*b*, and a generally vertically extending lower section 5316*c*. As can be seen, the middle section 5316*b* of the upper gear and bearing region 5316 is radially recessed with respect to the outermost radial extent 5318*a* of the outer wall 5312. The lower section 5316*c* and the upper section 5316*a* of the upper gear and bearing region 5316 are both radially recessed with respect to the middle section 5316*b*.

The rotary knife blade 5300 includes the bearing surface 5319. In one exemplary embodiment of the power operated rotary knife 5100 and as best seen in FIGS. 175 and 179, the rotary knife blade bearing surface 5319 comprises a bearing race 5320, which is defined by and extends radially inwardly into the outer wall 5312 in the lower section 5316*b* of the upper gear and bearing region 5316. In one exemplary embodiment, the knife bearing race 5320 defines a generally arcuate bearing face 5322 in a central portion 5324 of the bearing race 5320. As can be seen the lower section 5316*c* of the upper gear and bearing region 5316 includes vertical portions 5326*a*, 5326*b* respectively extending axially above and below the bearing race 5320.

The body outer wall 5312 in the middle section 5316*b* of the upper gear and bearing region 5316 of rotary blade body 5302 defines the driven gear 5328 comprising a set of gear teeth 5330 formed so as to extend radially outwardly in a stepped portion 5331 of the outer wall. The driven gear 5328 is axially above the bearing race 5320, that is, closer to the first upper end 5306 of the blade body 5302. The driven gear 5328, in one exemplary embodiment, defines a plurality of vertically or axially oriented spur gear teeth 5332.

Advantageously, as can be seen in FIG. 179, both the set of gear teeth 5330 of the rotary knife blade driven gear 5328 and the knife blade bearing race 5320 are axially spaced from the upper end 5306 of the rotary knife blade body 5302 by the recessed upper section 5316*a* of the upper gear and bearing region 5316. The driven gear 5328 is also axially spaced from arcuate bearing race 5320 of the body 5302 by a vertical portion 5317 of the middle section 5316*b* of the upper gear and bearing region 5316 and the upper vertical portion 5326*a* of the lower section 5316*c* above bearing race 5320 of the upper gear and bearing region 5316. The knife blade bearing race 5320 is also advantageously axially spaced from the lower end 5308 of the blade body 5302 by the lower support portion 5318 of the knife blade body 5302 and the lower vertical portion 5326*b* of the lower section 5316*c* below the bearing race 5320.

The set of gear teeth 5330 of the driven gear 5328 of the rotary knife blade 5300 is axially spaced from the upper end 5306 of the knife blade body 5302. This advantageously protects the set of gear teeth 5330 from damage that they would otherwise be exposed to if, as is the case with conventional rotary knife blades, the set of gear teeth 5330 were positioned at the upper end 5306 of the blade body 5302 of the rotary knife blade 5300. Additionally, spacing the set of gear teeth 5330 from both axial ends 5306, 5308 of the knife blade body 5302, impedes or mitigates the migration of debris generated during the cutting process into the region of the knife blade driven gear 5328. Debris in the region of knife blade driven gear 5328 may cause or contribute to a number of problems including blade vibration, premature wear of the driven gear 5328 or the mating drive gear 5650 of the gear train 5604, and "cooking" of the debris.

Similar advantages exist with respect to axially spacing the blade bearing race 5320 from the upper and lower ends 5306, 5308 of the blade body 5302. As will be explained below, the rotary knife blade body 5302 and the blade housing 5400 are configured to provide radially extending projections or caps which provide a type of labyrinth seal to impede ingress of debris into the regions of the knife blade driven gear 5328 and the blade-blade housing bearing structure 5500. These labyrinth seal structures are facilitated by the axial spacing of the knife blade drive gear 5328 and the blade bearing race 5320 from the upper and lower ends 5306, 5308 of the blade body 5302 of the rotary knife blade 5300.

As can best be seen in FIG. 164, a lower spur gear 5654 of the drive gear 5650 of the gear train 5604 meshes with the spur gear teeth 5332 of the knife blade driven gear 5328 to rotate the rotary knife blade 5300 with respect to the blade axis of rotation R"". This gearing combination defines an involute spur gear drive, as was previously described with respect to the gear train 2604 of the drive mechanism 2600 of the power operated rotary knife 2100.

As can be best seen in FIG. 179, in order to impede ingress of fragments or pieces of meat, bone, and/or gristle generated during cutting/trimming operations, and/or other debris into the driven gear 5328 and the bearing race 5320 of the rotary knife blade 5300, the outer wall 5312 in the lower support portion of blade body 5318 includes a radially outwardly extending projection or cap 5318*b*. The outwardly extending cap 5318*b* includes the outermost radial extent 5818*a* of the lower support portion 5318 of the rotary knife blade body 5302. As can best be seen in FIG. 179, the cap 5318*b* is axially aligned with and, when viewed in an upward direction UP"" from the lower end 5308 of the knife blade body 5302, overlies at least a portion of the set of gear teeth 5330. A radial outer surface 5330*a* of the set of gear teeth 5330, when viewed in three dimensions, defines a first imaginary cylinder 5346 (shown schematically in dashed line in FIG. 179). A radial inner surface 5330*b* of the set of gear teeth 5330, when viewed in three dimensions, defines a second, smaller diameter imaginary cylinder 5347 (also shown schematically in dashed line in FIG. 179).

Viewed in an upward direction UP"" from the lower end 5308 of the knife blade body 5302, the cap 5318*b* is aligned with and overlies at least a portion of an annulus 5349 defined between the first imaginary cylinder 5346 and the second, smaller diameter cylinder 5347. As the annulus 5349 is coincident with a volume occupied by the set of gear teeth 5330, the cap 5318*b* is aligned with and overlies at least a portion of the set of gear teeth 5330. Further, the cap 5318*b* extends radially outwardly beyond the imaginary cylinder 5346 defined by the radial outer surface 5330*a* of the set of gear teeth 5330.

As can best be seen schematically in FIG. 175, the outwardly extending cap 5318*b* is axially aligned with and overlies at least a portion of a bottom wall or end 5458 of a blade support section 5450 of the blade housing 5400 to form a type of labyrinth seal and minimize ingress of debris into the regions of the driven gear 5328 and the annular passageway 5504 defined between the knife blade bearing surface 5319 and the blade housing bearing surface 5459. The overlapping cap 5318*a* of the rotary knife blade body 5302 and the bottom wall 5458 of the blade support section 5450 of the blade housing 5400 inhibit ingress of debris from entering between the outer wall 5312 of the blade body 5302 of the rotary knife blade 5300 and the blade housing 5400 and working into the region of the knife blade driven gear 5328 and the annular passageway 5504. As best seen schematically in FIG. 175, for clearance purposes, there is a small axial gap between an upper surface 5318*c* of the cap 5318*b* and the bottom wall 5458 of the blade housing blade support section 5450. The upper surface 5318*c* of the cap 5318*c* is a portion of the radially inward step 5314 defining the line of demarcation between upper gear and bearing portion 5316 of the blade body 5302 and the lower support portion 5318 of the blade body 5302. An upper portion of the knife blade inner wall 5360 defines a cutting opening CO"" (FIGS. 157, 159 and 160) of the power operated rotary knife 5100.

Blade Housing 5400

In one exemplary embodiment and as best seen in FIGS. 181-185, the blade housing 5400 of the power operated rotary knife 5100 comprises one-piece, continuous annular structure that includes the mounting section 5402 and the blade support section 5450. In one exemplary embodiment, the blade housing 5400 is continuous about its perimeter. The blade-blade housing bearing structure 5500 secures the rotary knife blade 5300 to the blade housing 5400. Accordingly, removal of the knife blade 5300 from the blade housing 5400 is accomplished by removing the elongated rolling bearing strip 5502 of the blade-blade housing bearing structure 5500 from the power operated rotary knife 5100. The blade-blade housing bearing structure 5500 permits use of the continuous blade housing 5400 because there is no need to expand the blade housing diameter to remove the knife blade 5300 from the blade housing 5400.

The mounting section 5402 of the blade housing 5400 extends radially outwardly from the blade support section 5450 and subtends an angle of approximately 120° or, stated another way, extends approximately ⅓ of the way around the circumference of the blade housing 5400. The mounting section 5402 is both axially thicker and radially wider than the blade support section 5450.

The blade housing mounting section 2402 includes an inner wall 5404 and a radially spaced apart outer wall 5406 and a first upper end 5408 and an axially spaced apart second lower end 5410. At forward ends 5412, 5414 of the mounting section 5402, there are tapered regions 5416, 5418 (FIG. 181) that transition between the upper end 5408, lower end 5410 and outer wall 5406 of the mounting section 5402 and the corresponding upper end 5456, lower end 5458 and outer wall 5454 of the blade support section 5450. The mounting section 5402 defines an opening 5420 (FIGS. 180 and 183) that extends radially between the inner and outer walls 5404, 5406. The radially extending opening 5420 is bounded by and extends between upright supports or pedestals 5422 and an upper surface 5428*a* of a base 5428 that bridges the pedestals 5422. The pedestals 5422 extend axially upwardly from an upper surface 5428*a* of the base 5428.

As can best be seen in FIGS. 180 and 181, the base 5428 and the pedestals 5422 above the base 5428 together define two axially extending apertures 5430 between the upper and lower ends 5408, 5410 of the mounting section 5402. The base apertures 5430 receive a pair of threaded fasteners or screws 5434. The threaded fasteners 5434 pass through the base apertures 5430 and thread into respective threaded openings 5130 of a horizontal planar seating surface 5133 of an L-shaped mounting pedestal 5132 (FIGS. 158 and 203) defined by a forward mounting portion 5120 of the gearbox housing 5113 to releasably secure the blade-blade housing combination 5550 to the gearbox housing 5113 of the head assembly 5111. When blade-blade housing combination 5550 is secured to the gearbox housing 5113 using the threaded fasteners, the upper end 5408 of the mounting section 5402 of the blade housing 5400 is seated on the horizontal planar seating surface 5133 of the L-shaped mounting pedestal 5132 of the forward mounting portion 5120 of the gearbox housing 5113. The outer wall 5406 of the mounting section 5402 of the blade housing 5400 is seated on a vertical planar seating surface 5134 of the L-shaped mounting pedestal 5132 of the forward mounting portion 5120 of the gearbox housing 5113.

The radially extending opening 5420 of the blade housing mounting section 5402 includes a narrower upper portion 5420*a* and a wider lower portion 5420*b*. A relative width of the opening 5420 is defined by rearward facing surfaces 5438 of the pedestals 5422 that comprise a portion of the outer wall 5406 of the blade housing mounting portion 5402. The opening 5420 is sized to receive a removable blade housing plug 5440 (FIGS. 186-189). The blade housing plug 5440 is removably received in the mounting section opening 5420. When the blade housing plug 5440 is removed from the opening 5420, access is provided to the elongated rolling bearing strip 5502 of the blade-blade housing bearing structure 5500.

The blade housing plug 5440 is positioned in the opening 5420 and releasably attached to the blade housing 5400 via a pair of set screws 5446 (FIG. 165) that, when tightened bear against the upper surface 5428*a* of the mounting section base 5428. Stepped shoulders 5441 formed in opposite sides 5440*e*, 5440*f* of blade housing plug 5440 bear against mating stepped shoulders 5424 of the pair of pedestals 5422 to secure the blade housing plug 5440 with respect to the blade housing mounting section opening 5420. When installed in the blade housing mounting section opening 5420, the blade housing plug 5440 inhibits debris generated during cutting/trimming operations (e.g., pieces or fragments of fat, gristle, bone, etc.) and other foreign materials from migrating to and accumulating on or adjacent the elongated rolling bearing strip 5502 of the blade-blade housing bearing structure 5500 or the driven gear 5328 of the rotary knife blade 5300.

As can best be seen in FIG. 185, the blade support section 5450 includes an inner wall 5452 and radially spaced apart outer wall 5454 and a first upper end 5456 and an axially spaced second lower end 5458. The blade support section 5450 extends about the entire 360° circumference of the blade housing 5400. The blade support section 5450 in a region of the mounting section 5402 is continuous with and forms a portion of the inner wall 5404 of the mounting section 5402. The blade support section inner wall 5452 defines a bearing surface 5459. In one exemplary embodiment of the power operated rotary knife 5100 and as best seen in FIG. 185, the bearing surface 5459 of the blade housing 5400 comprises a bearing race 5460 that extends radially inwardly into the inner wall 5452. In one exemplary embodiment, a central portion 5462 of the blade housing bearing race 5460 defines a generally arcuate bearing face 5464.

As can best be seen in FIGS. 175 and 185, the blade support section upper end 5456 defines a radially inwardly extending projection or cap 5456*a* that axially overlies at least portions the driven gear 5328 and the bearing race 5320 of the rotary knife blade 5300. The overlap of the projection or cap 5456*a* of the blade housing 5400 and the driven gear 5328 and bearing race 5320 of the rotary knife blade 5300 protects the blade-blade housing bearing structure 2550, the bearing races 5320, 5460 of the knife blade 5300 and the blade housing 5400, respectively, and the driven gear 5328 of the knife blade 5300.

Specifically, the overlap of the cap 2456*a* of the blade housing 2400 and an inwardly stepped portion 2348 of the rotary knife blade body 2402 that extends between the recessed upper section 5316*a* of gear and bearing portion 5316 and the upper surface 5330*c* of the set of gear teeth 5330 of the driven gear 5328 forms a type of labyrinth seal. The labyrinth seal inhibits the entry of debris resulting from cutting and trimming operations and other foreign materials into the annular passageway 5504 between facing bearing surfaces 5319, 5459 of rotary knife blade 5300 and the blade housing 5400 and through which the rolling bearing strip 5502 of the blade-blade housing bearing structure 5500 traverses. As best seen schematically in FIG. 175, for clearance purposes, there is a small radial gap between a terminal end 5456*b* of the bearing region cap 5456*a* of the blade housing 5400 and the recessed upper section 5316*a* of the gear and bearing portion 5316 the rotary knife blade body 5302.

As can best be seen in FIG. 185, advantageously the blade housing bearing race 5460 is axially spaced from both the upper and lower ends 5456, 5458 of the blade support section 5450. Specifically, there is a portion 5466 of the inner wall 5452 of the blade support section 5450 extending axially between the blade housing bearing race 5460 and the cap 5456*a* and there an axially extending portion 5468 of the inner wall 5452 extending axially between the bearing race 5460 and the blade support section lower end 5458.

As is best seen in FIG. 184, both the right and left tapered regions 5416, 5418 of the blade housing mounting section 5402 include a cleaning port 5480 for injecting cleaning fluid for cleaning the blade housing 5400 and the knife blade 5300 during a cleaning process. Each of the cleaning ports 5480 includes an entry opening 5481 in the outer wall 5406 of the mounting section 5402 and extends through to exit opening 5482 in the inner wall 5404 of the mounting section 5402. Lower portions of the respective exit openings 5482 in the mounting section inner wall are in fluid communication with and open into a region of the bearing race 5460 of the blade housing 5400. The cleaning port 5480 provides for injection of cleaning fluid into bearing race regions 5320, 5460 of the knife blade 5300 and blade housing 5400, respectively, and the driven gear 5328 of the knife blade 5300.

Blade Housing Plug 5440

As can best be seen in FIGS. 174 and 186-189, the blade housing plug 5440 includes an upper end 5440*a*, an axially spaced apart a lower end 5440*b*, an inner wall 5440*c* and a radially spaced apart outer wall 5440*d*. The blade housing plug 5440 also includes the pair of stepped shoulders 5441 formed in opposite sides 5440*e* of the blade housing plug 5440. The inner wall 5440*c* defines an arcuate bearing race 5442 (FIGS. 186 and 189) that continues the bearing race 5460 of the blade housing blade section inner wall 5452. When the blade housing plug 5440 is installed in the blade housing plug opening 5420 of the blade housing mounting section 5402, the radially inner wall 5440*c* of the blade housing plug 5440 defines a portion of the blade housing bearing race 5460 such that the blade housing bearing race 5460 is continuous about substantially the entire 360° circumference of the blade support section 5450.

As can best be seen in FIG. 187, the blade housing plug 5440 includes an generally rectangular opening 5445 that extends through the blade housing plug 5440 from outer wall 5440*d* to the inner wall 5440*c*. The upper end 5440*a* of the blade housing plug 5440 also defines a first axially extending arcuate recess 5443 (FIG. 186). When the blade housing plug 2440 is installed in the blade housing plug opening 5420, the opening 5445 of the blade housing plug 5440 receives the lower spur gear 5654 of the drive gear 5650 of the drive train 5604 such that the spur gear 5654 meshes with and rotatably drives the driven gear 5328 of the rotary knife blade 5300 and the arcuate recess 5443 of the blade housing plug 5440 provides clearance for the upper bevel gear 5652 of the drive gear 5650.

A portion of the upper end 5440*a* of the blade housing plug 5440 includes a radially inwardly extending bearing region cap 5444 (FIG. 189) that continues the radially inwardly extending bearing region cap 5456*a* of the blade support section 5450 of the blade housing 5400. The upper end 5440*a* of the blade housing plug 5440, when installed in the blade housing opening 5420, is flush with and functions as portion of the upper end 5408 of the mounting section 5402 of the blade housing 5400 for purposes of mounting the blade housing 5400 to the horizontal planar seating surface 5133 of the L-shaped mounting pedestal 5132 of the forward mounting portion 5120 of the gearbox housing 5113. Similarly, the outer wall 5440*d* of the blade housing plug 5440, when installed in the blade housing opening 5420, is flush with and functions as a portion of the outer wall 5406 of the mounting section 5402 of the blade housing 5400 for purposes of mounting the blade housing 5400 to the vertical planar seating surface 5134 of the L-shaped mounting pedestal 5132 of the forward mounting portion 5120 of the gearbox housing 5113.

Blade-Blade Housing Bearing Structure 5500

The power operated rotary knife 5100 includes the blade-blade housing bearing structure 5500 (best seen in FIGS. 156, and 174) that: a) secures the knife blade 5300 to the blade housing 5400; b) supports the knife blade 5300 for rotation with respect to the blade housing 5400 about the rotational axis R'; and c) defines the rotational plane RP"" (FIG. 164) of the knife blade 5300. The blade-blade housing bearing structure 5500 is similar in structure and function to the blade-blade housing bearing structure 2500 of the power operated rotary knife 2100 and reference is made to the prior discussion.

Gearbox 5603 and Gear Train 5604

The drive mechanism 5600, a portion of which is schematically shown in FIG. 156, includes the gearbox assembly 5112 for providing motive power for rotating the rotary knife blade 5300 about its axis of rotation R"". The gearbox assembly 5112 includes the gear train 5604 and two bearing support assemblies, namely, the bearing support assembly 5630 that supports the pinion gear 5610 for rotation about the pinion gear rotational axis PGR"", and a bearing support assembly 5660 that supports the drive gear 5650 for rotation about the drive gear rotational axis DGR"". The gear train 5604 of the power operated rotary knife 5100 includes the pinion gear 5610 and the drive gear 5650. The drive gear 5650 includes the lower spur gear 5654 and an upper bevel gear 5652 which are axially spaced apart and aligned concentrically about the drive gear rotational axis DGR"". The gear head 5614 of the pinion gear 5610 meshes with the upper bevel gear 5652 of the drive gear 5650 to rotatably drive the drive gear 5650. The pinion gear 5610, in turn, is driven by the flexible shaft drive assembly (not shown) and rotates about the axis of rotation PGR"" (FIG. 164) of the pinion gear 5610. The pinion gear 5610 includes the input shaft 5612 extending rearward of the gear head 5614. The input shaft 5612 extends from a proximal end 5629 (FIG. 156) to a distal end 5628 adjacent the gear head 5614. The pinion gear input shaft 5612 includes a central opening 5618 (FIG. 163). An interior surface 5620 of the input shaft 5612 defines a cross shaped female socket or fitting 5622 that receives a mating male drive fitting of the flexible shaft drive assembly (not shown) which provides for rotation of the pinion gear 5610.

The pinion gear axis of rotation PGR"" is substantially parallel to and coextensive or aligned with the handle assembly longitudinal axis LA"". At the same time, the drive gear 5650 rotates about the drive gear axis of rotation DGR"" (FIG. 164) which is substantially parallel to the rotary knife blade axis of rotation R"" and is substantially orthogonal to and intersects the pinion gear axis or rotation PGR"" and the handle assembly longitudinal axis LA"".

The pinion gear bearing support assembly 5630, in one exemplary embodiment, includes the larger sleeve bushing 5632 and a smaller sleeve bushing 5640. As can best be seen in FIGS. 156, 164 and 212-214, the larger sleeve bushing 2632, like the sleeve bushing 2632 of the power operated rotary knife 2100, includes the annular forward head 5636 and the cylindrical body 5637. The cylindrical body 5637 of the sleeve bushing 5632 defines the central opening 5634 that receives the input shaft 5612 of the pinion gear 5610 to rotatably support the pinion gear 5610 in the gearbox housing 5113. The cylindrical body 5637 of the larger sleeve bushing 5632 is supported within a conforming cavity 5129 (FIGS. 164, 196 and 197) of an inverted U-shaped forward section 5118 of the gearbox housing 5113, while the enlarged forward head 5636 of the sleeve bushing 5632 fits within a conforming forward cavity 5126 of the U-shaped forward section 5118 of the gearbox housing 5113.

A flat 5638 (FIG. 212) of the enlarged forward head 5636 of the larger sleeve bushing 5632 interfits with a flat 5128 (FIG. 198) of the inverted U-shaped forward section 5118 of the gearbox housing 5113 to prevent rotation of the sleeve bushing 5632 within the gearbox housing 5113. As can best be seen in FIG. 212, the sleeve bushing 5632 includes the longitudinal recess 5639 formed in an upper surface 5639*a* of the cylindrical body 5637. The longitudinal recess 5639 is slightly below an upper surface of the flat 5638 of the annular forward head 5636. When the sleeve bushing 5632 is inserted into the conforming cavity 5129 (FIGS. 164, 196 and 197) of an inverted U-shaped forward section 5118 of the gearbox housing 5113, the sleeve bushing 5632 is positioned slightly higher in the gearbox housing 5113 than would otherwise be the case without the longitudinal recess 5639. This results in both the pinion gear 5610 and the drive gear 5650 being positioned higher within the gearbox housing 5113 as well, as compared to the relative positions of, for example, the pinion gear 2610 and gearbox housing 2113 in the power operated rotary knife 2100.

As the pinion gear 5610 and drive gear 5650 are substantially identical to the pinion gear 2610 and drive gear 2650 of the power operated rotary knife 2100, the higher position of the pinion gear 5610 within the gearbox housing 5113 effectively raises the position of the drive gear 5650 with respect to the gearbox housing 5113. Raising the position of the drive gear 5650 with respect to the gearbox housing 5113 allows for the lower spur gear 5654 of the drive gear 5650 to properly mesh with the driven gear 5328 of the rotary knife blade 5300, as can be seen in FIG. 164. This higher position of the lower spur gear 5654 is required because in the rotary knife blade 5300, the position of the driven gear 5328 is axially higher (in the UP"" direction) than was the case with the rotary knife blade 2300 of the power operated rotary knife 2100. Comparing, for example, the schematic representations of the rotary knife blades 2300 and 5300 depicted in FIGS. 74 and 179, one can readily see the relatively higher position of the driven gear 5328 with respect to the upper end 5306 of the body 5302 of the rotary knife blade 5300 compared to the driven gear 2328 with respect to the upper end 2306 of the body 2302 of the rotary knife blade 2300.

The cylindrical body 5639 of the larger sleeve bushing 5632 defining the central opening 5634 provides radial bearing support for the pinion gear 5610. The enlarged head 5636 of the sleeve bushing 5632 also provides a thrust bearing surface for a rearward collar 5627 (FIG. 197) of the gear head 5614 to prevent axial movement of the pinion gear 5610 in the rearward direction RW"", that is, travel of the pinion gear 5610 along the pinion gear axis of rotation PGR"", in the rearward direction RW'.

The bearing support assembly 5630 of the pinion gear 5610 also includes the smaller sleeve bushing 5640. As can best be seen in FIG. 156, the smaller sleeve bushing 5640 of the power operated rotary knife 5100 is similar to the smaller sleeve bushing 2640 of the power operated rotary knife 2100. As best seen in FIGS. 190 and 196, the smaller sleeve bushing 5640 includes an annular forward head 5644 and a cylindrical rearward portion 5642. A forward facing surface 5624 of the gear head 5614 of the pinion gear 5610 includes a central recess 5626 which is substantially circular in cross section and is centered about the pinion gear axis of rotation PGR"". The pinion gear central recess 5626 receives a cylindrical reward portion 5642 of the smaller sleeve bushing 5640. The smaller sleeve bushing 5640 functions as a thrust bearing. The annular head 5644 of the smaller sleeve bushing 5640 provides a bearing surface for the gear head 5614 of the pinion gear 5610 and limits axial travel of the pinion gear 5610 in the forward direction FW"", that is, travel of the pinion gear 5610 along the pinion gear axis of rotation PGR"", in the forward direction FW"".

As can best be seen in FIGS. 190 and 191, the annular head 5644 of the smaller sleeve bushing 5640 includes two parallel peripheral flats 5648 to prevent rotation of sleeve bushing 5640 with rotation of the pinion gear 5610. The parallel flats 5648 of the sleeve bushing 5640 fit within and bear against two spaced-apart parallel shoulders 5179 (FIG. 208) defined by a U-shaped recess 5178 of an inner surface 5176 of a forward wall 5156 of the frame body 5150. The abutment of the parallel flats 5648 of the smaller sleeve bushing 5640 against the shoulders 5179 of the frame body 5150 prevents rotation of the sleeve bushing 5640 as the pinion gear 5610 rotates about its axis of rotation PGR"".

The drive gear bearing support assembly 5660, in one exemplary embodiment, comprises a ball bearing assembly 5662 that supports the drive gear 5650 for rotation about the drive gear rotational axis DGR'. The drive gear bearing support assembly 5660 is secured to a downwardly extending projection 5142 (FIGS. 197-198 and 201) of the inverted U-shaped central section 5118 of the gearbox housing 5113 by a fastener 5672. The ball bearing assembly 5662 of the gearbox assembly 5112 is similar to the drive gear ball bearing assembly 2662 of the power operated rotary knife 2100.

Gearbox Housing 5113

As can best be seen in FIGS. 190-204, the gearbox housing 5113 is part of the gearbox assembly 5112 and defines a gearbox cavity or opening 5114 that supports the gear train 5602 and the bearing support assemblies 5630, 5660. The gearbox housing 5113 includes a generally cylindrical rearward section 5116 (in the rearward direction RW"" away from the blade housing 5400), the inverted U-shaped central section 5118, and the forward mounting section 5120. The gearbox housing 5113 extends between a proximal end 5122 defined by the rearward section 5116 and a distal end 5144 defined by the forward mounting section 5120. The inverted U-shaped central section 5118 of the gearbox housing 5113 includes a rearward downwardly extending portion 5119 (FIG. 84) and a forward portion 5125.

The gearbox cavity or opening 5114 is defined in part by a throughbore 5115 which extends generally along the handle assembly longitudinal axis LA"" through the gearbox housing 5113 from the proximal end 5122 to the forward portion 5125 of the inverted U-shaped central section 5118. As can best be seen in FIGS. 190-196, the gear train 5604 is supported in and extends from the gearbox cavity 5114. Specifically, the gear head 5614 of the pinion gear 5610 extends in the forward direction FW"" beyond the forward portion 5125 of the gearbox housing 5113 and portions of the drive gear 5650 extend in the forward direction beyond the rearward downwardly extending portion 5119 of the U-shaped central section 5118 of the gearbox housing 5113. The inverted U-shaped central section 5118 and the cylindrical rearward section 5116 combine to define an upper surface 5130 of the gearbox housing 5113.

The forward mounting section 5120 of the gearbox housing 5113 includes the L-shaped blade housing mounting pedestal 5132 that functions as a seating region to releasably receive the blade-blade housing combination 5550. The L-shaped blade housing mounting pedestal 5132 includes a pair of spaced apart bosses 5131 that extend downwardly and forwardly from the forward portion 5125 of the inverted U-shaped central section 5118. As can best be seen in FIGS. 198-204, the pair of bosses 5131 each includes an upper horizontal portion **5131*a* and a lower vertical portion 5131*b*. A downward facing surface of the upper horizontal portion 5131*a* defines the first horizontal planar seating surface 5133 of the L-shaped blade housing mounting pedestal 5132, while a forward facing surface of the lower vertical portion 5131*b* defines the second vertical planar seating surface 5134 of the L-shaped blade housing mounting pedestal 5132**.

The vertical planar seating surface 5134 is substantially orthogonal to the first horizontal planar seating surface 5133 and parallel to the axis of rotation R"" of the rotary knife blade 5300. The horizontal planar seating surface 5133 is substantially parallel to the longitudinal axis LA"" of the handle assembly 5110 and the rotational plane RP"" of the rotary knife blade 5300. The upper horizontal portion **5131*a* of each of the bosses 5131 includes a threaded opening 5135 that receives a threaded fastener 5191. Each of the threaded fasteners 5191 pass through a respective opening 5430 of the blade housing mounting section 5402 and thread into a respective threaded opening 5135 of the bosses 5131 to secure the blade-blade housing combination 5550 to the gearbox housing 5313**.

A bottom portion 5141 (FIGS. 198 and 201) of the forward portion 5125 of the inverted U-shaped middle section 5118 includes a downwardly extending projection 5142 (FIG. 198). The downwardly extending projection 5142 includes a cylindrical stem portion 5143 and defines a threaded opening 5140 extending through the projection 5142. A central axis through the threaded opening 5140 defines and is coincident with the axis of rotation DGR"" of the drive gear 5650. The rearward downwardly extending portion 5119 of the inverted U-shaped central section 5118 of the gearbox housing 5113 defines upper and lower arcuate recesses **5119*a*, 5119*b* which provide for clearance of the bevel gear 5652 and the spur gear 5654 of the drive gear 5650, respectively. The upper arcuate recess 5119*a* and the wider lower arcuate recesses 5119*b* are centered about the drive gear axis of rotation DGR"" and the central axis of the threaded opening 5140. The inner surfaces of the pair of bosses 5131 also include upper and lower recesses 5131*c*, 5131*d* (best seen in FIGS. 198 and 199) that provide for clearance of the bevel gear 5652 and the spur gear 5654 of the drive gear 5650**, respectively.

The throughbore 5115 of the gearbox housing 5113 provides a receptacle for the pinion gear 5610 and its associated bearing support assembly 5630 while the upper and lower arcuate recesses **5119*a*, 5119*b* provide clearance for the drive gear 5650 and its associate bearing support assembly 5660. Specifically, with regard to the pinion bearing support assembly 5630, the cylindrical body 5637 of the larger sleeve bushing 5632 fits within the cylindrical cavity 5129 (FIG. 204) of the inverted U-shaped middle section 5118. The enlarged forward head 5636 of the larger sleeve bushing 5632 fits within the forward cavity 5126 (FIGS. 198 and 204) of the forward portion 5125. The cylindrical cavity 5129 and the forward cavity 5126 of the inverted U-shaped central section 5118 of the gearbox housing 5113 are both part of the throughbore 5115. When the larger sleeve bushing 5632 is positioned in the gearbox housing throughbore 5115, the flat 5638 of the annular forward head 5636 bears against a flat 5128 formed in the forward cavity 5126 of the U-shaped central section 5118 of gearbox housing 5113 to prevent rotation of sleeve bushing 5632 within the gearbox housing 5113. As discussed previously, the cylindrical body 5637 of the larger sleeve bushing 5632 includes a longitudinally extending recess 5639. The longitudinal recess 5639 allows the cylindrical body 5637 to clear the flat 5128 of the forward cavity 5126 of the gearbox housing 5113. Thus, the longitudinal recess 5639 of the larger sleeve bushing 5632 allows the throughbore 5115 and the gear train 5604 to be positioned slightly higher in the gearbox housing 5113, as compared to the throughbore 2115 and gear train 5602 in the gearbox housing 2113 of the power operated rotary knife 2100**.

With regard to the upper and lower arcuate recesses 5119*a*, 5119*b*, the upper recess 5119*a* provides clearance for the first bevel gear 5652 of the drive gear 5650 as the drive gear 5650 rotates about its axis of rotation DGR"". The wider lower recess 5119*b* provides clearance for the second spur gear 5654 of the drive gear 5650 as the spur gear 5654 coacts with the rotary knife blade driven gear 5328 to rotate the rotary knife blade 5300 about its axis of rotation R"". As can best be seen in FIGS. 164 and 198, the downwardly extending projection 5142 and the stem 5143 provide seating surfaces for the ball bearing assembly 5662, which supports the drive gear 5650 for rotation within the rearward downwardly extending portion 5119 of the inverted U-shaped central section 5118 of the gearbox housing 5113.

A cleaning port 5136 (FIGS. 198 and 201) extends through the bottom section 5141 of the forward portion 5125 and through the rearward downwardly extending portion 5119 of the inverted U-shaped middle section 5118 of the gearbox housing 5113. The cleaning port 5136 allows cleaning fluid flow injected into the throughbore 5115 of the gearbox housing 5113 from the proximal end 5122 of the gearbox housing 5113 to flow into the upper and lower arcuate recesses 5119*a*, 5119*b* for purpose of cleaning the drive gear 5650.

As can be seen in FIG. 204, the inner surface 5145 of the cylindrical rearward section 5116 of the gearbox housing 5113 defines a threaded region 5149, adjacent the proximal end 5122 of the gearbox housing 5113. The threaded region 5149 of the gearbox housing 5113 receives the mating threaded portion 5262 (FIG. 156) of the elongated central core 5252 of the hand piece retaining assembly 5250 to secure the hand piece 5200 to the gearbox housing 5113. As seen in FIGS. 198-201 and 203-204, an outer surface 5146 of the cylindrical rearward section 5116 of the gearbox housing 5113 defines a first portion 5148 adjacent the proximal end 5122 and a second larger diameter portion 5147 disposed forward or in a forward direction FW"" of the first portion 5148. The first portion 5148 of the outer surface 5146 of the cylindrical rearward portion 5116 of the gearbox housing 5113 includes a plurality of axially extending splines 5148*a*. As was the case with the gearbox housing 2113 and the hand piece 2200 of the power operated rotary knife 2100, the coacting plurality of splines 5148*a* of the gearbox housing 5113 and the ribs of the hand piece 5200 allow the hand piece 5200 to be oriented at any desired rotational position with respect to the gearbox housing 5113.

The second larger diameter portion 5147 of the outer surface 5146 of the cylindrical rearward section 2116 of the gearbox housing 5113 is configured to receive a spacer ring 5290 (FIG. 156) of the hand piece retaining assembly 5250. Like the spacer ring 2290 of the power operated rotary knife 2100, the spacer ring 5290 abuts and bears against a stepped shoulder 5147*a* defined between the cylindrical rearward section 5116 and the inverted U-shaped middle 5118 of the gearbox housing 5113. A rear or proximal surface 5292 of the spacer ring 5290 acts as a stop for an axially stepped collar 5214 of the distal end portion 5210 of the hand piece 5200 when the hand piece 5200 is secured to the gearbox housing 5113 by the elongated central core 5252 of the hand piece retaining assembly 5250.

The second larger diameter portion 2147 of the outer surface 2146 of the cylindrical rearward section 5116 of the gearbox housing 5113 also includes a plurality of splines (seen in FIGS. 198-199 and 201). The plurality of splines of the second larger diameter portion 5147 is used in connection with an optional thumb support (not shown) that may be used in place of the spacer ring 5290.

Frame Body 5150 and Frame Body Bottom Cover 5190

As can best be seen in FIG. 158, when the gear train 5604 is supported within the gearbox housing 5113, portions of the pinion gear 5610 and the drive gear 5650 are exposed, that is, extend outwardly from the gearbox housing 5113. The frame body 5150 and frame bottom cover 5190, when secured together form an enclosure around the gearbox housing 5113 that advantageously functions to impede entry of debris into the gearbox housing 5113, the pinion gear 5610 and portions of the drive gear 5650. Additionally, the frame body 5150 includes portions that are adjacent to and extend the first horizontal planar seating surface 5133 and the second vertical planar seating surface 5134 of the L-shaped blade housing mounting pedestal 5132 defined by the pair of bosses 5131 of the gearbox housing 5113. This advantageously enlarges the effective seating region of the gearbox housing 5113 for a more secure attachment of the blade-blade housing combination 5550 to the gearbox housing 5113.

As can best be seen in FIGS. 165 and 205-205, the frame body 5150 includes a central cylindrical region 5154 and a pair of outwardly extending arms 5152 from the central cylindrical region 5154. The frame body 5150 includes a forward wall 5156 at a proximal or forward end of the frame body 5150. A central portion 5156*a* of the forward wall 5156 is defined by the central cylindrical region 5154, while forwardly extending portions 5156*b* of the forward wall 5156 are defined by the outwardly extending arms 5152. In comparing FIGS. 162 and 67, one can see an extended vertical height of the frame body 5150 of the power operated knife 5100 when compared to the frame body 2150 of the power operated rotary knife 2100. The increased vertical height of the frame body 5150, compared to the vertical height of the frame body 2150 of the power operated rotary knife 2100, is necessitated by a lower position of the blade housing 5200 relative to the gearbox housing 5113 in the power operated rotary knife 5100, as explained above.

As is best seen in FIG. 206, proceeding in a rearward direction RW"" from the forward wall 5156 toward a proximal end 5158 of the frame body 5150, there are two tapered regions 5159 where the outwardly extending arms 5152 curve inwardly and blend into the central cylindrical region 5154.

The frame body 5150 includes an outer surface 5170 and an inner surface 5172. The inner surface 5172 defines the cavity 5174 (FIG. 205) that slidably receives portions of the gearbox housing 5113 including the forward mounting section 5120 and the inverted U-shaped central section 5118. As can best be seen in FIG. 165, the frame body 5150 includes a bottom wall 5160 that includes a first, lower planar bottom wall portion 5162 and a second, upper planar bottom wall portion 5164. As can be seen, the upper planar bottom wall portion 5164 is offset in an upward direction UP"" from the lower planar bottom wall portion 5162. The bottom wall 5160 is open into the cavity 5174 which allows the frame body 5150 to be slid over the upper surface 5130 of the gearbox housing 5113 in a relative downward direction DW"" with respect to the gearbox housing 5113. Specifically, a central dome-shaped portion 5180 of the cavity 5174 is configured to slidably receive the inverted U-shaped central section 5118 of the gearbox housing 5113, while a pair of square-shaped portions 5182 of the cavity 5174 (FIG. 207) flanking the central dome-shaped portion 5180 are configured to slidably receive respective ones of the pair of bosses 5131 of the forward mounting section 5120 of the gearbox housing 5113.

When the frame body 5150 is fully slid onto the gearbox housing 5113, the lower planar portion 5162 of the bottom wall 5160 of the frame body 5150 is flush with a bottom surface 5137 (FIGS. 198, 199 and 201) of the rearward downwardly extending portion 5119 of the inverted U-shaped central section 5118 of the gearbox housing 5113 and with a bottom surface 5137 of the lower vertical portions 5131*b* of the pair of bosses 5131. Additionally, the upper planar portion 5164 of the bottom wall 5160 is flush with the first horizontal seating surface 5133 of the L-shaped blade housing mounting pedestal 5132.

The upper planar portion 5164 of the bottom wall 5160 of the frame body 5150 continues and extends the effective seating region of the first horizontal seating surface 5133 of the L-shaped blade housing mounting pedestal 5132 of the gearbox housing 5113 for a more secure attachment of the blade-blade housing combination 5550 to the gearbox housing 5113. Similarly, as can best be seen in FIGS. 158, 205 and 207, a narrow vertical wall 5188 between the upper planar portion 5164 and the lower planar portion 5162 of the bottom wall 5160 of the frame body 5160 is flush with the second vertical seating surface 5134 of the L-shaped blade housing mounting pedestal 5132 of the gearbox housing 5113. The narrow vertical wall 5188 continues and extends the effective seating region of the second vertical seating surface 5134 of the L-shaped blade housing mounting pedestal 5132 of the gearbox housing 5113 for a more secure attachment of the blade-blade housing combination 5550 to the gearbox housing 5113.

As can best be seen in FIG. 207, the lower planar portion 5162 of the bottom wall 5160 includes a pair of threaded openings 5166. The threaded openings 5166 receive respective threaded fasteners 5192 to secure the frame body bottom cover 5190 to the frame body 5150. The inner surface 5176 of the forward wall 5156 of the frame body 5150 includes the U-shaped recess 5178 which defines the pair of spaced apart shoulders 5179 (FIG. 208). As previously explained with respect to the smaller sleeve bushing 5642 of the pinion gear bearing support assembly 5130, the shoulders 5179 provide an abutment or bearing surface for the pair of flats 5648 (FIGS. 190 and 191) of the smaller sleeve bushing 5642 to prevent rotation of the sleeve bushing 5642 with rotation of the pinion gear 5610. As can best be seen in FIGS. 205 and 207, the inner surface 5172 of the frame body 5150 includes a pair of arcuate recesses 5184 adjacent the lower portion 5162 of the bottom wall 5160. The pair of arcuate recesses 5184 provides clearance for the spur gear 5154 of the drive gear 5650 and continues the clearance surface defined by the lower arcuate recess 5119*b* of the rearward downwardly extending portion 5119 of inverted U-shaped central section 5118 of the gearbox housing 5113.

As can best be seen in FIGS. 205 and 209-211, the frame body bottom cover 5190 is a thin planar piece that includes an upper surface 5191, facing the gearbox housing 5113, and a lower surface 5192. The frame body cover 5190 includes a pair of openings 5194 extending between the upper and lower surfaces 5191, 5192. The frame body bottom cover 2190 is removably secured to the frame body 5150 by the pair of threaded fasteners 5199 that extend through respective ones of the pair of openings 5113 and thread into respective threaded openings 5166 in the lower planar portion 5162 of the bottom wall 5160 of the frame body 5150. The pair of openings 5194 include countersunk head portions 5194*a* formed in the lower surface 5192 of the frame body bottom cover 5190 such that, when the frame body bottom cover 5190 is secured to the frame body 5150, the enlarged heads of the threaded fasteners 5199 are flush with the lower surface 5192.

The frame body bottom cover 5190 also includes a straight forward wall 5195 and a contoured rearward wall 5196. When the frame body bottom cover 5190 is secured to the frame body 5150, the forward wall 5195 is flush with, continues and extends the effective seating region of the second vertical seating surface 5134 of the L-shaped blade housing mounting pedestal 5132 of the gearbox housing 5113 for a more secure attachment of the blade-blade housing combination 5550 to the gearbox housing 5113. The contour of the rearward wall 5196 of the frame body bottom cover 5190 is configured such that, when the frame body bottom cover 5190 is secured to the frame body 5150, a peripheral portion of the lower surface 5192 adjacent the rearward wall 5196 engages and seats against the lower planar portion 5162 of the bottom wall 5160 of the frame body 5150 and the bottom surface 5137 of the rearward downwardly extending portion 5119 of the inverted U-shaped central section 5118 of the gearbox housing 5113. Because of the contoured configuration of the rearward wall 5196, the lower surface 5192 of the frame body bottom cover 5190 thereby seals against both the gearbox housing 5113 and the frame body 5150 to protect the gearbox 5602 and specifically the drive gear 5650 and the drive gear ball bearing assembly 5662 from ingress of debris into the drive gear region.

In comparing FIGS. 67 and 164, it can be seen that the height (or thickness) of the frame body bottom cover 5190 of the power operated rotary knife 5100 is greater than the corresponding height of the frame body bottom cover 2190 of the power operated rotary knife 2100. This is because the frame body 5150 necessarily has a greater height than the frame body 2150 to account for the fact that the blade housing 5400 of the power operated rotary knife 5100 is positioned relatively lower with respect to the gearbox housing 5113, as compared with the position of the blade housing 2400 with respect to the gearbox housing 2113 of the power operated rotary knife 2100.

Securing Blade-Blade Housing Combination to Head Assembly 5111

To removably attach the blade-blade housing combination 5550 to the gearbox housing 5113, the upper end 5408 of the mounting section 5402 of the blade housing 5400 is aligned adjacent the horizontal planar seating surface 5133 of the L-shaped blade housing mounting pedestal 5132 of the forward mounting section 5120 of the gearbox housing 5113 and the outer wall 5406 of the blade housing mounting section 5402 is aligned adjacent the vertical planar seating surface 5134 of the L-shaped blade housing mounting pedestal 5132. Specifically, the mounting section 5402 of the blade housing 5400 is aligned with the forward mounting section 5120 of the gearbox housing 5113 such that the two vertical apertures 5430 extending through the mounting section base 5428 and the pair of upright pedestals 5422 of the mounting section base 5428 are aligned with the vertically extending threaded openings 5135 through the pair of bosses 5131 of the forward mounting section 5120 of the gearbox housing 5113.

When the blade housing 5400 is properly aligned with the forward mounting section 5120 of the gearbox housing 5113, the upper surface 5428*a* of the base 5428 of the blade housing mounting section 5402 and the upper end 5440*a* of the blade housing plug 5440 affixed to the blade housing 5400 are in contact with the horizontal planar seating surface 5133 of the L-shaped blade housing mounting pedestal 5132. Additionally, the rearward surface 5428*c* of the base 5428 of the blade housing mounting section 5402 and the outer wall 5440*d* of the blade housing plug 5440 are in contact with the vertical planar seating surface 5134 of the L-shaped blade housing mounting pedestal 5132.

To affix the assembled blade-blade housing combination 5550 to the gearbox housing 5113, the fasteners 5434 are inserted into the two vertical apertures 5430 of the blade housing mounting section 5402 and threaded into respective ones of the vertically extending threaded openings 5135 through the upper horizontal portions 5131*a* of the pair of bosses 5131 of the forward mounting section 5120 of the gearbox housing 5113. When the blade housing 5400 is assembled to the gearbox housing 5113, the plurality of spur gear drive teeth 5656 of the drive gear 5650 are in meshing engagement with the driven gear teeth 5330 of the rotary knife blade 5300 such that rotation of the drive gear 5650 about its axis of rotation DGR'''' causes rotation of the rotary knife blade 5300 about its axis of rotation R''''.

To remove the blade-blade housing combination 5550 from the gearbox housing 5113, the pair of screws 5434 is unthreaded from the threaded openings 5135 of the upper horizontal portion 5131*a* of the pair of bosses 5131 of the forward mounting section 5120 of the gearbox housing 5113. After the screws 5434 are completely unthreaded from the openings 5135, the blade-blade housing combination 5550 will fall in a downward direction DW'''' away from the gearbox assembly 5112. The blade-blade housing combination 5550 may be removed from the gearbox housing 5113 without removal of the frame body 5150 or the frame body bottom cover 5190.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. An annular blade housing for a power operated rotary knife, the blade housing including a circumferentially extending blade support section, the blade support section comprising an inner wall and an outer wall, the outer wall spaced radially outwardly with respect to the inner wall, and a first upper end and a second lower end, spaced axially apart, the inner wall of the blade support section including a first portion of the inner wall, the first portion of the inner wall having a first upper end and a second lower end and a blade housing bearing surface that extends radially into the first portion of the inner wall of the blade support section in a direction toward the outer wall, the blade housing bearing surface having an upper end and a lower end, the upper end of the blade housing bearing surface being spaced axially from and below the first upper end of the first portion of the inner wall of the blade support section and the lower end of the blade housing bearing surface being spaced axially from and above the second lower end of the first portion of the inner wall of the blade support section, the blade housing bearing surface being axially spaced from the first upper end and the second lower end of the blade support section, the blade support section further including a projection at one of the first upper end and the second lower end of the blade support section, the projection extending radially in a direction away from the outer wall beyond the first portion of the inner wall of the blade support section, the projection being axially spaced from the upper and lower ends of the blade housing bearing surface, the blade housing further including a mounting section, the blade support section extending about a circumference of the blade housing and the mounting section extending about less than the circumference of the blade housing, the mounting section and the blade support section overlapping in a region of the mounting section, the mounting section including an inner wall and a radially spaced apart circumferentially extending outer wall and a first upper end and a second lower end spaced axially apart, tapered regions extending between the outer wall of the blade support section and the outer wall of the mounting section, the blade support section inner wall forming a portion of the mounting section inner wall in the region of the mounting section and the mounting section outer wall being spaced radially outwardly from a circumference defined by the blade support section outer wall, the second lower end of the mounting section spaced below the second lower end of the blade support section.

2. The annular blade housing of claim 1 wherein the blade housing is a one-piece, continuous annular blade housing.

3. The annular blade housing of claim 1 wherein the blade housing bearing surface comprises a bearing race that extends into the inner wall of the blade support section.

4. The annular blade housing of claim 1 wherein the projection is a cap, substantially rectangular in cross section.

5. The annular blade housing of claim 1 wherein the first portion of the inner wall of the blade support section is substantially vertical.

6. The annular blade housing of claim 1 wherein the projection of the blade support section is at the second lower end of the blade support section.

7. The annular blade housing of claim 1 wherein the mounting section includes a cleaning port extending from an outer surface of the mounting section through the inner wall of the blade housing.

8. The annular blade housing of claim 7 wherein the cleaning port at the inner wall opens into the bearing surface of the blade housing.

9. The annular blade housing of claim 1 wherein the projection is at the first upper end of the blade support section.

10. The annular blade housing of claim 1 wherein the projection is at the second lower end of the blade support section.

11. The annular blade housing of claim 1 wherein the projection of the blade support section is continuous about the blade support section.

12. The annular blade housing of claim 1 wherein the mounting section outer wall of the blade housing is spaced radially outwardly from the circumference defined by the blade support section outer wall along an entirety of the mounting section outer wall.

13. An annular blade housing for a power operated rotary knife, the blade housing including a circumferentially extending blade support section, the blade support section comprising an inner wall and an outer wall, the outer wall spaced radially outwardly with respect to the inner wall, and a first upper end and a second lower end, spaced axially apart, the inner wall of the blade support section including a first portion of the inner wall, the first portion of the inner wall having a first upper end and a second lower end and a blade housing bearing surface that extends radially into the first portion of the inner wall of the blade support section in a direction toward the outer wall, the blade housing bearing surface having an upper end and a lower end, the upper end of the blade housing bearing surface being spaced axially from and below the first upper end of the first portion of the inner wall of the blade support section and the lower end of the blade housing bearing surface being spaced axially from and above the second lower end of the first portion of the inner wall of the blade support section, the blade housing bearing surface being axially spaced from the first upper end and the second lower end of the blade support section, the blade support section further including a projection at one of the first upper end and the second lower end of the blade support section, the projection extending radially in a direction away from the outer wall beyond the first portion of the inner wall of the blade support section, the projection being axially spaced from the upper and lower ends of the blade housing bearing surface, the blade housing further including a mounting section, the blade support section extending about a circumference of the blade housing and the mounting section extending about less than the circumference of the blade housing, the mounting section and the blade support section overlapping in a region of the mounting section, the mounting section including an inner wall and a radially spaced apart circumferentially extending outer wall and upper end and a lower end and an opening extending axially through the mounting section between the upper and lower ends, the blade support section inner wall forming a portion of the mounting section inner wall in the region of the mounting section and the mounting section outer wall being spaced radially outwardly from a circumference defined by the blade support section outer wall.

14. The annular blade housing of claim 13 wherein the mounting section opening is defined by a mounting insert extending between the upper and lower ends of the mounting section.

15. The annular blade housing of claim 13 wherein the mounting section opening comprises a threaded opening.

16. A power operated rotary knife comprising:

an annular rotary knife blade including a wall defining a knife blade bearing surface;

an annular blade housing including a circumferentially extending blade support section, the blade support section comprising an inner wall and an outer wall, the outer wall spaced radially outwardly with respect to the inner wall, and a first upper end and a second lower end, spaced axially apart, the inner wall of the blade support section including a first portion of the inner wall, the first portion of the inner wall having a first upper end and a second lower end and a blade housing bearing surface that extends radially into the first portion of the inner wall of the blade support section in a direction toward the outer wall, the blade housing bearing surface having an upper end and a lower end, the upper end of the blade housing bearing surface being spaced axially from and below the first upper end of the first portion of the inner wall of the blade support section and the lower end of the blade housing bearing surface being spaced axially from and above the second lower end of the first portion of the inner wall of the blade support section, the blade housing bearing surface being axially spaced from the first upper end and the second lower end of the blade support section, the blade support section further including a projection at one of the first upper end and the second lower end of the blade support section, the projection extending radially in a direction away from the outer wall beyond the first portion of the inner wall of the blade support section, the projection being axially spaced from the upper and lower ends of the blade housing bearing surface, the blade housing further including a mounting section, the blade support section extending about a circumference of the blade housing and the mounting section extending about less than the circumference of the blade housing, the mounting section and the blade support section overlapping in a region of the mounting section, the mounting section including an inner wall and a radially spaced apart circumferentially extending outer wall, and a first upper end and a second lower end spaced axially apart, tapered regions extending between the outer wall of the blade support section and the outer wall of the mounting section, the blade support section inner wall forming a portion of the mounting section inner wall in the region of the mounting section and the mounting section outer wall being spaced radially outwardly from a circumference defined by the blade support section outer wall, the second lower end of the mounting section spaced below the second lower end of the blade support section; and the rotary knife blade rotating in the blade housing about a central axis of rotation.

17. The power operated rotary knife of claim 16 wherein the blade housing is a one-piece, continuous annular blade housing.

18. The power operated rotary knife of claim 16 wherein the blade housing bearing surface comprises a bearing race that extends into the inner wall of the blade support section.

19. The power operated rotary knife of claim 16 wherein the projection is a cap, substantially rectangular in cross section.

20. The power operated rotary knife of claim 16 wherein the first portion of the inner wall of the blade support section is substantially vertical.

21. The power operated rotary knife of claim 16 wherein the projection of the blade housing axially overlies the knife blade bearing surface of the rotary knife blade.

22. The power operated rotary knife of claim 16 wherein the wall of the rotary knife blade defining the knife blade bearing surface additionally defines a driven gear.

23. The power operated rotary knife of claim 22 wherein the projection of the blade housing axially overlies the driven gear of the rotary knife blade.

24. The power operated rotary knife of claim 16 wherein the blade housing bearing surface is axially spaced from the projection by an axially extending portion of the inner wall.

25. The power operated rotary knife of claim 16 wherein the projection of the blade support section is at the second lower end of the blade support section.

26. The power operated rotary knife of claim 16 wherein the mounting section includes a cleaning port extending from an outer surface of the mounting section through the inner wall of the blade housing.

27. The power operated rotary knife of claim 26 wherein the cleaning port at the inner wall opens into the bearing surface of the blade housing.

28. The power operated rotary knife of claim 16 wherein the projection is at the first upper end of the blade support section.

29. The power operated rotary knife of claim 16 wherein the projection of the blade support section is continuous about the blade support section.

30. The power operated rotary knife of claim 16 wherein the mounting section outer wall of the blade housing is spaced radially outwardly from the circumference defined by the blade support section outer wall along an entirety of the mounting section outer wall.

* * * * *